(12) United States Patent
Kornfield et al.

(10) Patent No.: US 11,905,379 B2
(45) Date of Patent: *Feb. 20, 2024

(54) ASSOCIATIVE POLYMERS AND RELATED COMPOSITIONS, METHODS AND SYSTEMS

(71) Applicant: CALIFORNIA INSTITUTE OF TECHNOLOGY, Pasadena, CA (US)

(72) Inventors: Julia A. Kornfield, Pasadena, CA (US); Ming-Hsin Wei, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,559

(22) Filed: Aug. 24, 2022

(65) Prior Publication Data
US 2023/0235127 A1 Jul. 27, 2023

Related U.S. Application Data

(63) Continuation of application No. 17/240,028, filed on Apr. 26, 2021, now abandoned, which is a
(Continued)

(51) Int. Cl.
*C08G 83/00* (2006.01)
*C10L 1/16* (2006.01)
(Continued)

(52) U.S. Cl.
CPC .......... *C08G 83/005* (2013.01); *C08G 61/08* (2013.01); *C08G 83/00* (2013.01); *C08G 83/008* (2013.01);
(Continued)

(58) Field of Classification Search
CPC ...... C08G 83/005; C08G 61/08; C08G 83/00; C08G 83/008; C08G 2261/132;
(Continued)

(56) References Cited

U.S. PATENT DOCUMENTS 4,857,217 A 8/1989 Gutierrez et al.
9,458,399 B2 * 10/2016 Wei ...................... C08G 83/008
(Continued)

FOREIGN PATENT DOCUMENTS

CN 1929811 A 3/2007
CN 1950406 A 4/2007
(Continued)

OTHER PUBLICATIONS

Brazilian Office Action for BR Application No. BR112018005394-5 filed on Sep. 19, 2016 on behalf of California Institute of Technology dated Mar. 18, 2021 9 pages (English + Original).
(Continued)

*Primary Examiner* — Ellen M McAvoy
(74) *Attorney, Agent, or Firm* — Steinfl + Bruno LLP

(57) ABSTRACT

Described herein are associative polymers capable of controlling a physical and/or chemical property of non-polar compositions and related compositions, methods and systems. Associative polymers herein described have a non-polar backbone and functional groups presented at ends of the non-polar backbone, with a number of the functional groups presented at the ends of the non-polar backbone formed by associative functional groups capable of undergoing an associative interaction with another associative functional group with an association constant (k) such that the strength of each associative interaction is less than the strength of a covalent bond between atoms and in particular less than the strength of a covalent bond between backbone atoms.

17 Claims, 85 Drawing Sheets

US 11,905,379 B2
Page 2

Related U.S. Application Data continuation of application No. 16/581,603, filed on Sep. 24, 2019, now abandoned, which is a continuation of application No. 15/913,828, filed on Mar. 6, 2018, now Pat. No. 10,472,470, which is a continuation of application No. 14/859,181, filed on Sep. 18, 2015, now abandoned.

(60) Provisional application No. 62/052,355, filed on Sep. 18, 2014.

(51) Int. Cl.
| | |
|---|---|
| C08L 101/02 | (2006.01) |
| C10L 1/236 | (2006.01) |
| C08L 101/08 | (2006.01) |
| F17D 1/17 | (2006.01) |
| C08G 61/08 | (2006.01) |
| C10L 10/02 | (2006.01) |
| C08K 5/00 | (2006.01) |
| C10L 1/195 | (2006.01) |
| C10L 10/08 | (2006.01) |

(52) U.S. Cl.
CPC .......... *C08K 5/0008* (2013.01); *C08L 101/02* (2013.01); *C08L 101/025* (2013.01); *C08L 101/08* (2013.01); *C10L 1/1658* (2013.01); *C10L 1/195* (2013.01); *C10L 1/236* (2013.01); *C10L 10/02* (2013.01); *C10L 10/08* (2013.01); *F17D 1/17* (2013.01); *C08F 2438/01* (2013.01); *C08G 2261/132* (2013.01); *C08G 2261/1644* (2013.01); *C08G 2261/3323* (2013.01); *C08G 2261/418* (2013.01); *C08G 2261/63* (2013.01); *C08G 2261/64* (2013.01); *C08G 2261/72* (2013.01); *C10L 2230/22* (2013.01); *C10L 2250/04* (2013.01)

(58) Field of Classification Search
CPC .... C08G 2261/1644; C08G 2261/3323; C08G 2261/418; C08K 5/0008; C08L 101/02; C08L 101/025; C08L 101/08; C10L 1/1658; C10L 1/195; C10L 1/236; C10L 10/02; C10L 10/08; F17D 1/17; C08F 2438/01
See application file for complete search history.

(56) References Cited

U.S. PATENT DOCUMENTS

| | | | |
|---|---|---|---|
| 10,087,310 B2* | 10/2018 | Kornfield | ............... C10L 10/02 |
| 10,119,084 B2* | 11/2018 | Kornfield | ............... C10L 1/198 |
| 10,472,470 B2* | 11/2019 | Kornfield | ............ C08G 83/005 |
| 2004/0241130 A1 | 12/2004 | Tamareselvy et al. | |
| 2007/0287815 A1 | 12/2007 | Gaillard et al. | |
| 2010/0130396 A1 | 5/2010 | Dong | |
| 2012/0029139 A1 | 2/2012 | Dufaure et al. | |
| 2014/0259887 A1 | 9/2014 | Kornfield et al. | |
| 2020/0040141 A1 | 2/2020 | Kornfield et al. | |
| 2020/0190420 A1 | 6/2020 | Kornfield et al. | |
| 2020/0199319 A1 | 6/2020 | Bulger et al. | |
| 2020/0247977 A1 | 8/2020 | Kornfield et al. | |
| 2021/0395491 A1 | 12/2021 | Kornfield et al. | |
| 2022/0081632 A1 | 3/2022 | Kornfield et al. | |
| 2022/0145012 A1 | 5/2022 | Kornfield et al. | |

FOREIGN PATENT DOCUMENTS

| | | |
|---|---|---|
| CN | 107001644 B | 9/2020 |
| EP | 3611228 A1 | 2/2020 |
| JP | H0270795 A | 3/1990 |
| JP | 2001122950 A | 5/2001 |
| JP | 2011079742 A | 4/2011 |
| JP | 2012509956 A | 4/2012 |
| JP | 2018535287 A | 11/2018 |
| JP | 6917336 B2 | 8/2021 |
| JP | 7148669 B2 | 10/2022 |
| KR | 102262320 B1 | 6/2021 |

OTHER PUBLICATIONS

Canadian Examination Report for CA Application No. 2,999,033 filed on Sep. 19, 2016 on behalf of California Institute of Technology dated Jun. 3, 2022 3 pages.
Certificate of Grant for Chinese Application No. 201680067408.8 filed on Sep. 19, 2016 on behalf of California Institute of Technology. Dated May 25, 2021. 230 pages. (English + Original).
Certificate of Grant for Japanese Application No. 2018-074672 filed on Mar. 17, 2014 on behalf of California Institute of Technology. Dated Jul. 21, 2021. 4 pages. (English + Original).
Certificate of Patent for Korean Application No. 10-2015-7029862 filed on October 15-7029862 on behalf of California Institute of Technology. Dated Jun. 2, 2021. 4 pages. (English + Original).
Chinese Certificate of Patent for CN Application No. 201580062820 filed on Sep. 18, 2015 on behalf of California Institute of Technology dated Sep. 29, 2020 4 pages (English + Original).
Chinese Examination Report for CN Application No. 201810903694.8 filed on Mar. 17, 2014 on behalf of California Institute of Technology dated Oct. 9, 2020 (English + Original) 28 pages.
Chinese First Examination Report for Chinese Application No. 201680067408 filed on Sep. 19, 2016 on behalf of California Institute of Technology dated Nov. 1, 2019 14 pages (English + Original).
Chinese Notice of Allowance for CN Application No. 201580062820.6 filed on Sep. 18, 2015 on behalf of California Institute of Technology dated Jun. 29, 2020 2 pages (English + Original).
Chinese Second Examination Report for Chinese Application No. 201680067408.8 filed on Sep. 19, 2016 on behalf of California Institute of Technology. Dated Aug. 13, 2020. 14 pages. (English + Original).
Communication pursuant to Article 94(3) EPC issued for EP Application No. 15842258.4 filed on Apr. 12, 2017, on behalf of California Institute of Technology. Dated Feb. 21, 2022. 11 Pages.
European Communication pursuant to Article 94(3) EPC for EP Application No. 19197396.5 filed on Mar. 17, 2014 on behalf of California Institute of Technology dated Dec. 3, 2020 5 pages.
European Patent Office Action for EP Application No. 16847571.3 filed Mar. 19, 2018 on behalf of California Institute of Technology. Dated Jul. 31, 2020. 7 pages.
European Patent Office Communication Decision to Refuse in relation to Application No. 19197396.5 filed Sep. 13, 2019 on behalf of California Institute of Technology. Dated Jun. 30, 2022. 19 pages.
European Patent Office Communication Notification of Decision in relation to Application No. 19197396.5 5 filed Sep. 13, 2019 on behalf of California Institute of Technology. Dated Aug. 11, 2023. 14 pages.
European Patent Office Communication pursuant to Rules 161(2) and 162 EPC in relation to Application No. 14764716.8 filed Mar. 17, 2014 on behalf of California Institute of Technology. Dated Oct. 22, 2015. 2 pages.
European Patent Office Communication pursuant to Rules 161(2) and 162 EPC in relation to Application No. 16847571.3 filed Mar. 19, 2018 on behalf of California Institute of Technology. Dated Jun. 28, 2018. 4 pages.
European Patent Office Communication pursuant to Rules 70(2) and 70a(2) in relation to Application No. 14764716.8 filed Mar. 17, 2014 on behalf of California Institute of Technology. Dated Aug. 12, 2016. 1 page.
European Patent Office Communication pursuant to Rules 70(2) and 70a(2) in relation to Application No. 158422584 filed Apr. 12, 2017 on behalf of California Institute of Technology. Dated May 18, 2018. 1 page.

(56) References Cited

OTHER PUBLICATIONS

European Patent Office Communication pursuant to Rules 70(2) and 70a(2) in relation to Application No. 16847571.3 filed Mar. 19, 2018 on behalf of California Institute of Technology. Dated Mar. 19, 2019. 1 page.
European Patent Office Decision on Request for Further Processing under Rule 135(3) in relation to Application No. 16847571.3 filed Mar. 19, 2018 on behalf of California Institute of Technology. Dated May 6, 2021. 1 pages.
European Patent Office Decision to Refuse a European Patent Application in relation to Application No. 16847571.3 filed Mar. 19, 2018 on behalf of California Institute of Technology. Dated Jan. 30, 2023. 9 pages.
European Patent Office Notice of Loss of Rights pursuant to Rules112(1) in relation to Application No. 16847571.3 filed Mar. 19, 2018 on behalf of California Institute of Technology. Dated Mar. 4, 2021. 2 pages.
European Patent Office Oral Summons in relation to Application No. 14764716.8 filed Mar. 17, 2014 on behalf of California Institute of Technology. Dated Feb. 15, 2019. 7 pages.
European Patent Office Summons to Attend Oral Proceedings pursuant to Rule 115(1) in relation to Application No. 16847571.3 filed Mar. 19, 2018 on behalf of California Institute of Technology. Issue Date: Mar. 14, 2022. 9 pages.
Examination Report for Canadian Application No. 2,999,033 filed Mar. 16, 2018 on behalf California Institute of Technology. Dated Jan. 24, 2023. 3 pages.
Examination Report for Chinese Application No. 201580062820.6 filed on May 18, 2017 on behalf of California Institute of Technology. Dated Aug. 2, 2019. 40 pages. (English + Original).
Hearing Notice for Indian Application No. 201817009971 filed on Mar. 19, 2018 on behalf of California Institute of Technology Mail Date: Jul. 28, 2021 2 pages.
Indian Examination Report for IN Application No. 201817009971 filed on Mar. 19, 2018 on behalf of California Institute of Technology dated Jul. 20, 2020 6 pages.
Japanese Notification of Reasons for Refusal for JP Application No. 2018514800 filed on Mar. 19, 2018 on behalf of California Institute of Technology dated Aug. 4, 2020 9 pages (English + Original).
Japanese Office Action for Japanese Application No. 2018-514800 filed on Mar. 19, 2018 on behalf of California Institute of Technology dated Jun. 29, 2021 7 pages (English only).
Japanese Office Action for JP Application No. 2021-062569 filed on Apr. 1, 2021 on behalf of California Institute of Technology dated May 10, 2022 8 pages (English + Original).
Japanese Official Decision of Refusal for JP Application No. 2018074672 filed on Apr. 9, 2018 on behalf of California Institute of Technology dated Nov. 26, 2020 (English + Original) 6 pages.
Kasparkova, V., et al., "Determination of molar mass and radius of gyration by size exclusion chromatography with on-line viscometer and multi-angle laser light scattering. High temperature characterization of polystyrene", Polymer, Elsevier, Amsterdam, Nl, vol. 34, No. 8, Apr. 1, 1993. pp. 1765-1767. 3 Pages. XP024120493, ISSN: 0032-3861, DOI: 10.1016/0032-3861 (93)90339-C.
Korean Office Action for KR Application No. 1020157029862 filed on Mar. 17, 2014 on behalf of California Institute of Technology dated Sep. 4, 2020 5 pages (English + Original).
Lumley, J.L, "Drag Reduction by Additives," Annu. Rev. Fluid Mech, 31 Dec. 31, 1969. pp. 367-384. 18 Pages. XP055892208, Retrieved from the Internet: URL: https://www.annualreviews.org/doi/pdf/10.1146/annurev.fl.01.010169.002055.
Lumley, J.L. "Drag Reduction in Turbulent Flow by Polymer Additives" Journal of Polymer Science: Macromolecular Reviews, vol. 7, 1973, pp. 263-290.
Non-Final Office Action for U.S. Appl. No. 16/526,806, filed Jul. 30, 2019 on behalf of California Institute of Technology dated Jul. 27, 2020 13 pages.
Non-Final Office Action for U.S. Appl. No. 16/566,729, filed Sep. 10, 2019 on behalf of California Institute of Technology dated Jul. 27, 2020 12 pages.
Non-Final Office Action for U.S. Appl. No. 17/157,362, filed Jan. 25, 2021 on behalf of California Institute of Technology dated Aug. 5, 2022 9 pages.
Non-Final Office Action Issued for U.S. Appl. No. 17/157,589, filed Jan. 25, 2021, on behalf of California Institute of Technology. Dated Aug. 19, 2022. 12 Pages.
Notification of Allowance for Chinese Application No. 201680067408.8 filed on Sep. 19, 2016 on behalf of California Institute of Technology. Dated Feb. 20, 2021. 2 pages. (English + Original).
Notification of Reasons for Refusal for Japanese Patent Application No. 2018-074672, filed on Apr. 9, 2018, on behalf of California Institute of Technology. Dated Jan. 15, 2019. 12 pages.
Preliminary Examination Report for Brazilian Application No. BR112018005394-5 filed Mar. 19, 2018 on behalf California Institute of Technology. Dated Feb. 20, 2020. 40 pages. (English + Original).
Second Office Action for Canadian Application No. CA2905185 filed on Mar. 17, 2014 on behalf of California Institute of Technology dated Aug. 11, 2020 3 pages.
European Communication pursuant to Article 94(3) EPC for EP Application No. 19197396.5 filed Mar. 17, 2014 on behalf of California Institute of Technology, dated Nov. 8, 2023. 9 pages.

* cited by examiner

Examples of Suitable Associative Functional Groups

Carboxylic acid

Carboxylic acid

Carboxylic acid    Tertiary amine

Diacetamidopyridine (DAAP)    Thymine

"Hamilton Receptor"    Cyanuric Acid (CA)

Exemplary Architectures

Linear, difunctional

Partially cross-linked variants, functional at the chain ends

Branched, trifunctional
(tetra, penta, etc.. possible)

Hyperbranched, functional at the chain ends where represents a generic polymer backbone soluble in fuel

Exemplary Block Architectures

Associative groups at the ends and clustered in the middle

Associative groups at the ends and several clusters along the chain length where represents a generic polymer backbone soluble in fuel

ROMP with Chain-transfer agent (CTA) → Telechelic

COD 1,4-polybutadiene

Precisely Four associative moieties in each FG

A  B

Synthesis of Octa-Functional *tert*-Butyl Ester CTA

A

Non-associative telechelic polymers (NA)

| Polymer | Solubility in Fuel | $E_a$ of Thermal Backbone Scission (kJ/mol) |
|---|---|---|
| 4.2M PIB | Excellent | 42 |
| FM-9 | Very poor | 99 |
| Polycyclooctadiene (PCOD) | Excellent | 181 |

PIB:     FM-9:

|  | Cyclohexane (CH) | Tetralin |
|---|---|---|
| Dielectric constant ($\varepsilon$) at 25°C | 2.02 | 2.77 |
| Refractive index (n) at 20°C | 1.426 | 1.541 |

FIG. 79

| Property | Base fuel | 1000 ppm[a] | 3000 ppm[a] |
|---|---|---|---|
| Flash point[b] (ASTM D93) | 65.0 °C | 64.5 °C | 64.5 °C |
| Acid No.[c] (ASTM D3242) | 0.004 mgKOH/g | 0.003 mgKOH/g | 0.004 mgKOH/g |
| Density[d] @15°C (ASTM D4052) | 0.8107 kg/L | 0.8108 kg/L | 0.8109 kg/L |
| Viscosity[e] @-20°C (ASTM D445) | 4.8 mm$^2$/s | 6.3 mm$^2$/s | 12.0 mm$^2$/s |

FIG. 80

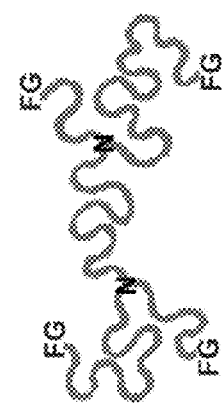 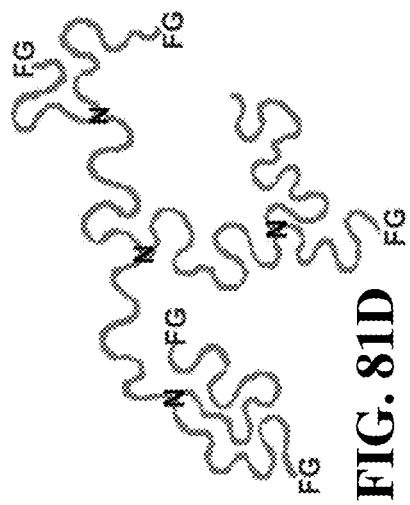 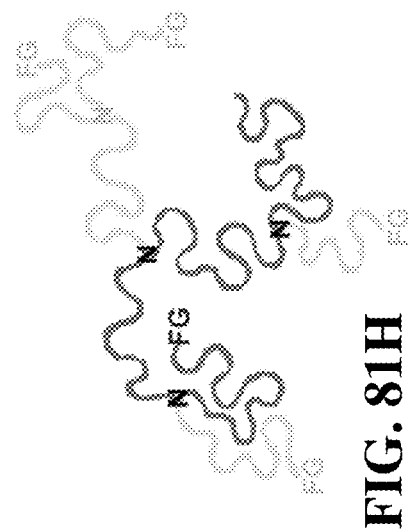
FIG. 81A  FIG. 81B    FIG. 81C              FIG. 81D
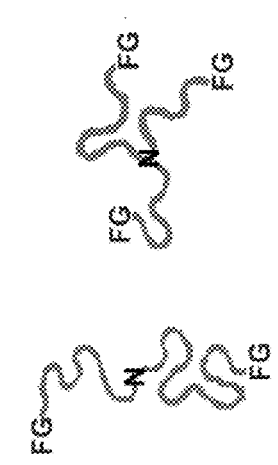  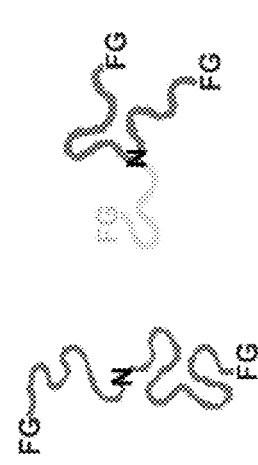
FIG. 81E  FIG. 81F    FIG. 81G              FIG. 81H

ASSOCIATIVE POLYMERS AND RELATED COMPOSITIONS, METHODS AND SYSTEMS

CROSS-REFERENCE TO RELATED APPLICATIONS

This application is a continuation of U.S. application Ser. No. 17/240,028 filed on Apr. 26, 2021 which is a continuation of U.S. application Ser. No. 16/581,603 filed on Sep. 24, 2019 which is a continuation of U.S. application Ser. No. 15/913,828 filed on Mar. 6, 2018, which issued as U.S. Pat. No. 10,472,470 on Nov. 12, 2019 which is a continuation of U.S. application Ser. No. 14/859,181 entitled "Associative Polymers and Related Compositions, Methods and Systems" filed on Sep. 18, 2015, which claims priority to the U.S. Provisional Application Ser. No. 62/052,355 entitled "Associative Polymers and Related Compositions, Methods and Systems" filed on Sep. 18, 2014 with docket number P1173-USP2, which may be related to provisional application 61/799,670 entitled "Associative Polymers and related Compositions Methods and Systems" filed on Mar. 15, 2013 with docket number P1173-USP, to U.S. application Ser. No. 14/217,142 entitled Associative Polymers and related Compositions Methods and Systems" filed on Mar. 17, 2014 with docket number P1173-US, and to PCT application S/N PCT/US14/30772, entitled Associative Polymers and related Compositions Methods and Systems" filed on Mar. 17, 2014 with docket number P1173-PCT, the contents of each of which is incorporated herein by reference in its entirety.

STATEMENT OF GOVERNMENT GRANT

The invention described herein was made in the performance of work under a NASA contract NNN12AA01C, and is subject to the provisions of Public Law 96-517 (35 USC 202) in which the Contractor has elected to retain title.

FIELD

The present disclosure relates to associative polymers and related compositions methods and systems. In particular, the present disclosure relates to associative polymers suitable to be used in connection with control of physical and/or chemical properties of non-polar compositions.

BACKGROUND

Several non-polar compositions are known in the art for which control of the related physical and/or chemical properties is desired. For example, in hydrocarbon compositions which can be used for combustion and energy production, control of properties such as mist, drag, and combustion can be desirable.

Also in non-polar liquid hydrocarbon compositions suitable to be used as ink, pesticide or fuel, control of properties such as mist and drop breakup can be desirable.

However, despite development of several approaches, control of those properties is still challenging.

SUMMARY

Provided herein are associative polymers which in several embodiments can be used as additives in a non-polar composition, and related compositions, methods, and systems. In particular associative polymers herein described in several embodiments allows control of physical and/or chemical properties, and in particular rheological properties, thus allowing for example drag reduction, mist control, lubrication, fuel efficiency and/or control of viscoelastic properties of a non-polar composition.

In general associative polymers herein described have a non-polar backbone and functional groups presented at ends of the non-polar backbone, with a number of the functional groups presented at the ends of the non-polar backbone being associative functional groups. An associative functional group in associative polymers herein described are capable of undergoing an associative interaction with another associative functional group with an association constant (k) such that the strength of each associative interaction is less than the strength of a covalent bond between atoms and in particular less than the strength of a covalent bond between backbone atoms. In particular, in associative polymers herein described associative functional groups can have an association constant (k)

$$k(M^{-1}) \geq \frac{\frac{4}{3}\pi(R_g^2)^{\frac{3}{2}} N_a}{n_F} \times 10^{-23}$$

in which $R_g$ is the radius of gyration of the associative polymer in a non-polar composition ($R_g$ in nanometers), $N_a$ is Avogadro's constant; and $n_F$ is the average number of the associative functional groups in the associative polymer. In some embodiments, an associative polymer herein described can have an overall weight average molecular weight, $M_w$, equal to or lower than about 2,000,000 g/mol, and/or a $M_w$ equal to or higher than about 100,000 g/mol.

According to a first aspect, a linear or branched associative polymer is described, herein also indicated as framing associative polymer, which comprises a linear, branched, or hyperbranched backbone having at least two ends and functional groups presented at two or more ends of the at least two ends of the backbone. In the framing associative polymer, the linear or branched polymer backbone is substantially soluble in a non-polar composition, and a number of the functional groups presented at the two or more ends of the of the at least two ends of the backbone is formed by associative functional groups. In some embodiments, the linear or branched framing associative polymer has an overall weight average molecular weight, $M_w$, equal to or lower than about 2,000,000 g/mol, and/or a Mw equal to or higher than about 100,000 g/mol.

According to a second aspect, a linear or branched associative polymer is described, herein also indicated as capping associative polymer, which comprises a linear, branched, or hyperbranched polymer backbone having at least two ends and an associative functional group presented at one end of the at least two ends of the backbone. In the capping associative polymer, the linear or branched backbone is substantially soluble in a non-polar composition. In some embodiments the capping associative polymer has an overall weight average molecular weight, $M_w$, equal to or lower than about 2,000,000 g/mol, and/or a Mw equal to or higher than about 100,000 g/mol. In some embodiments, the terminal linear or branched associative polymer is a linear polymer.

According to a third aspect, any one of the associative polymers herein described and in particular any one of the framing associative polymers and/or capping associative polymers herein described, can have a weight averaged molecular weight equal to or lower than 1,000,000 g/mol. In those embodiments, associative polymer herein described can be shear resistant depending on the structure of the backbone and on the presence, number and location of secondary, tertiary and quaternary carbon atoms in backbone. In some embodiments, framing associative polymers and/or capping associative polymers herein described can have a weight averaged molecular weight equal to or lower than 750,000 g/mol. In some embodiments, framing associative polymers and/or capping associative polymers herein described can have a weight averaged molecular weight between 400,000 g/mol and 1,000,000 g/mol.

According to a fourth aspect a modified non-polar composition is described, the modified non-polar composition comprising a host composition having a dielectric constant equal to or less than about 5 and at least one framing associative polymer herein described, and optionally at least one capping associative polymer herein described, the at least one framing associative polymer and the at least one capping associative polymer substantially soluble in the host composition. In particular, in the modified non polar composition the at least one framing associative polymer herein described can be comprised in the host composition at a concentration from about 0.001 c* to 10 c*, with respect to an overlap concentration c* for the at least one framing associative polymer relative to the host composition. In embodiments where the capping associative polymer is comprised in the non-polar composition, the capping associative polymer can be comprised in an amount up to 20% of a total polymer concentration of the non-polar composition.

According to a fifth aspect a method is described, to control one or more physical and/or chemical properties and in particular a rheological property of a non-polar composition. The method comprises: providing a host composition having a dielectric constant equal to or less than about 5; and providing at least one framing associative polymer herein described substantially soluble in the host composition and optionally at least one capping associative polymer herein described. The method further comprises combining the host composition and the at least one framing associative polymer herein described at a selected concentration c between from about 0.001 c* to 10 c*, depending on the weight averaged molecular weight and/or Radius of gyration of the at least one framing associative polymer and on the physical and/or chemical property to be controlled. In embodiments where the capping associative polymer is provided, the method further comprises combining the at least one capping associative polymer in the non-polar composition in an amount up to 20% of a total polymer concentration of the non-polar composition.

According to a sixth aspect a method is described, to control resistance to flow and/or to control flow rate enhancement of a non-polar composition alone or in combination with control of another physical and/or chemical property of the non-polar composition. The method comprises: providing a host composition having a dielectric constant equal to or less than about 5; and providing at least one framing associative polymer herein described substantially soluble in the host composition and optionally at least one capping associative polymer herein described. In the method the framing associative polymer and the capping associative polymer having a weight averaged molecular weight equal to or higher to 200,000 g/mol. The method further comprises combining the host composition and the at least one framing associative polymer herein described at a selected concentration c between from about 0.001 c* to 1 c*, depending on the weight averaged molecular weight and/or Radius of gyration of the at least one framing associative polymer and on the extent of drag reduction desired alone or in combination with another physical and/or chemical property to be controlled. In embodiments where the capping associative polymer is provided, the method further comprises combining the at least one capping associative polymer in the non-polar composition in an amount up to 20% of a total polymer concentration of the non-polar composition.

According to a seventh aspect a method to control sizes, and/or to control distribution of sizes of the droplets of a fluid (e.g. a fluid mist) in a non-polar composition alone or in combination with another physical and/or chemical property is described. The method comprises providing a host composition having a dielectric constant equal to or less than about 5; providing at least one framing associative polymer herein described and optionally at least one capping associative polymer herein described. In the method, the framing associative polymer and the capping associative polymer are substantially soluble in the host composition and have a weight averaged molecular weight equal to or higher to 400,000 g/mol. The method further comprises combining the host composition and the at least one framing associative polymer herein described at a selected concentration c between from about 0.05 c* to 3 c*, depending on the weight averaged molecular weight and/or Radius of gyration of the at least one framing associative polymer and on the another physical and/or chemical property to be controlled. In embodiments where the capping associative polymer is provided, the method further comprises combining the at least one capping associative polymer in the non-polar composition in an amount up to 20% of a total polymer concentration of the non-polar composition.

According to an eight aspect a method to provide an associative polymer is described. The method comprises providing a linear, branched or hyperbranched polymer backbone substantially soluble in a non-polar composition and having at least two ends and having a weight averaged molecular weight equal to or higher than about 100,000 g/mol; and attaching an associative functional group at one or more ends of the at least two ends of the backbone. In particular in embodiments where the attaching is performed at two or more ends of the at least two ends of the linear, branched or hyperbranched backbone the method provides a framing associative polymer. In some embodiments the associative polymer has an overall weight average molecular weight, $M_w$, equal to or lower than about 2,000,000 g/mol, and/or a Mw equal to or higher than about 100,000 g/mol.

According to a ninth aspect a system is described for controlling a physical or chemical property, and in particular a rheological property, of a non-polar composition alone or in combination with another physical and/or chemical property, and in particular a rheological property, of the non-polar composition. The system comprises at least two between at least one associative polymer herein described and at least one host composition having a dielectric constant equal to or less than 5. In some embodiments the system can further comprise at least one terminal polymer herein described.

The associative polymers, capping associative polymers and related material compositions, methods and systems herein described can be used in connection with applications wherein control of physical and/or chemical properties of non-polar compositions is desired with particular reference to drag reduction and/or flow rate enhancement. Exemplary applications comprise fuels and more particularly crude oils and refined fuels, inks, paints, cutting fluids, drugs, lubricants, pesticides and herbicides as well as synthetic blood, adhesive processing aids, personal care products (e.g. massage oils or other non-aqueous compositions) and additional applications which are identifiable by a skilled person. Additional applications comprise industrial processes in which reduction of flow resistance, mist control, lubrication, and/or control of viscoelastic properties of a non-polar composition and in particular a liquid non polar composition is desired.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 1A shows schematics of telechelic donor/acceptor interaction. FIG. 1B shows schematics of telechelic self-associating interactions.

FIG. 2A describes an exemplary donor acceptor association FIG. 2B describes an exemplary self-association.

FIG. 11, shows a diagram illustrating the GPC traces of a telechelic 1,4-PB with a backbone length of 430,000 g/mol ($M_w$) and end groups having 4 tert-butyl ester groups on each (denoted TE groups hereinafter; the polymer is denoted 430K di-TE PB hereinafter) and the resulting polymer of its hydrolysis reaction (in THF). The resulting end-groups with 4 acid groups and the polymer are hereinafter denoted TA groups and 430K di-TA PB (di-TA PB also called octa acid PB herein), respectively.

FIG. 13, shows a diagram illustrating the GPC traces of telechelic 1,4-PB with a backbone length of 430,000 g/mol and end-groups with 4 chloro groups on each and the corresponding tertiary amine-terminated polymer (the end groups with 4 tertiary amines are denoted TB groups, and the corresponding polymer is denoted 430K di-TB PB hereinafter).

FIG. 15, Panel B shows that dewatering operations occur as quickly and completely in the composition (right) as in an untreated host (left).

FIG. 16 shows an exemplary relationship between the radius of gyration $R_g$ of a backbone polymer as a function of its weight average molecular weight ($M_w$ in g/mol).

FIG. 23, Panel A shows the effect of end functionality N=1, 2, 4, 8 for polymers with Mw~220,000 g/mol (Table 3.1). Data are not available for octa-carboxyl end groups (N=8) due to insolubility of the material in both in CDD and TL. FIG. 23, Panel B shows results of N=4 at Mw=76, 230 and 430,000 g/mol. Graphs are on different scales.

FIG. 24, Panel A shows the effect in 1-chlorododecane (CDD). FIG. 24, Panel B shows the effect in tetralin (TL). Graphs are on different scales.

FIG. 26A shows CDD solutions of di-TA 1,4-PBs at three concentrations (0.4, 0.7 and 1.0 wt %) as a function of Mw: FIG. 26A, Panel, A 76,000 g/mol, FIG. 26A, Panel, B Mw=230,000 g/mol, and FIG. 26A, Panel, C 430,000 g/mol. FIG. 26B shows TL solutions of di-TA 1,4-PBs at three concentrations (0.4, 0.7 and 1.0 wt %) as a function of Mw: FIG. 26B, Panel, A 76,000 g/mol, FIG. 26B, Panel, B Mw=230,000 g/mol, and FIG. 26B, Panel, C 430,000 g/mol.

FIG. 27, Panel A shows the THY (thymine) spectrum. FIG. 27, Panel B shows DAAP (diacetamidopyridine). FIG. 27, Panel C shows the spectrum of a mixture of the two polymers with a mass ratio of 1:2, which represents a stoichiometric ratio of approximately 1:2. The concentration of polymer in solution is approximate 1 wt %.

FIG. 28, Panel A shows the spectrum of 1,4-PB of $M_w$=50,000 g/mol with CA (cyanic acid) end groups FIG. 28, Panel B shows the spectrum of 1,4-PB of $M_w$=24,000 g/mol with HR (Hamilton receptor) end groups. FIG. 28, Panel C shows a mixture of the two polymers with a mass ratio of 1:1.4, which represents a stoichiometric ratio of CA:HR of approximately 1:2. The concentration of polymer in solution is approximate 1 wt %.

FIG. 29, Panel A shows the spectrum of 1,4-PB of $M_w$=22,000 g/mol with TB end groups. FIG. 29, Panel B shows the spectrum of a mixture of 1,4-PB of $M_w$=22,000 g/mol with TB end groups and 1,4-PB of $M_w$=22,000 g/mol with TA end groups two polymers with a mass ratio of 1:1. The concentration of polymer in solution is approximate 1 wt %.

FIG. 30, Panel A shows the spectrum of 1,4-PB of $M_w$=288,000 g/mol with THY end groups. FIG. 30, Panel B shows the spectrum of 1,4-PB of $M_w$=219,000 g/mol with DAAP end groups. FIG. 30, Panel C shows the spectrum of a mixture of the two polymers with a mass ratio of 1:2. The concentration of polymer in solution is approximate 1 wt %.

FIG. 31, Panel A shows the spectrum of 1,4-PB of $M_w$=200,000 g/mol with CA end groups. FIG. 31, Panel B shows the spectrum of 1,4-PB of $M_w$=240,000 g/mol with HR end groups. FIG. 31, Panel C shows the spectrum of a mixture of the two polymers with a mass ratio of 1:2. The concentration of polymer in solution is approximate 1 wt %.

FIG. 32, Panel A shows the spectrum of 1,4-PB of $M_w$=250,000 g/mol with TB end groups. FIG. 32, Panel B shows the spectrum of a mixture of 1,4-PB of $M_w$=250,000 g/mol with TB end groups and 1,4-PB of $M_w$=230,000 g/mol with TA end groups two polymers with a mass ratio of 1:1. The concentration of polymer in solution is approximate 1 wt %.

FIG. 46A shows a synthesis of a CTA with only one tert-butyl ester on each side (compound 3). FIG. 46B shows a synthesis of a CTA with only one tert-butyl ester on each side (compound 10), with the conditions being: (a) 2.2 eq. of 2 or 2', $K_2CO_3$, N,N-dimethylformamide (DMF), 80° C., 5 h; (b) 4 eq. of $LiAlH_4$, THF, R.T., overnight; (c) 6 eq. of 2 or 2', 6 eq. of $PPh_3$, 6 eq. of DIAD, THF, 0° C. then 40° C., overnight; (d) 8 eq. of $LiAlH_4$, THF, R.T., overnight; (e) 12 eq. of 3, 12 eq. of $PPh_3$, 12 eq. of DIAD, THF, 0° C. then 40° C., overnight.

FIG. 47B ring-chain equilibrium distribution of cyclic (filled) and linear (open) supramolecules; FIG. 47C synthesis of telechelics (non-associative with FG end-groups, structures in Figure. 61 and FIG. 45A) and post-polymerization conversion to associative telechelics (FGa, bottom). (1): Grubbs II, dichloromethane (DCM), 40° C., 1 h; (2): Grubbs II, DCM, 40° C., until stir bar stops (>5 min), equivalents of COD for desired molecular weight. DA: di-acid. DB: di-base. TA: tetra-acid.

FIG. 48A effect of telechelics size (k=kg/mol) on specific viscosity of supramolecular solutions and controls in cyclohexane (CH) at 2 mg/ml (0.25% wt, 25° C.); FIG. 48B effect of solvent on specific viscosity for 2 mg/ml (0.25% wt) solutions (25° C.) of telechelics having $M_w$=670 k due to both polarity (dielectric constant, FIG. 80) and solvent quality for the backbone (FIG. 63, Panel A); FIG. 48C, static light scattering (35° C.) shows that association of ~670 k DA with DB chains in CH at 0.22 mg/ml (0.028% wt) produces supramolecules (filled) with an apparent $M_w$ greater than 2,000 kg/mol, which separate into individual building blocks (x) when an excess of a small-molecule tertiary amine is added (open symbols, 10 ul/ml of triethylamine, TEA; see FIG. 63, Panels A-B for its effect on viscosity). Curves show predictions of the model for complementary telechelics 1,000 kg/mol in solution at 1400 ppm (solid, supramolecules; dashed, non-associated telechelics), details in FIG. 63, Panel C.

FIG. 49B Specific viscosities of 2.4 mg/ml (0.3% wt) of a 1:1 molar ratio of α,ω-di(isophthalic acid) and α,ω-di(di(tertiary amine)) polycyclooctadienes (~670 kg/mol DA/DB) in Jet-A at 25° C., sheared vs. unsheared; FIG. 49C Emission data using an unmodified long-haul diesel engine. Control: untreated diesel. Treated: diesel treated with 0.1% wt 670 k DA/DB (details in Example 63).

FIG. 50A Jet-A with 4.2M PIB (0.35% wt) and Jet-A with 430 k TA (0.3% wt), "unsheared" and "sheared"; FIG. 50B effect of TA molecular weight (76 kg/mol to 430 kg/mol) in Jet-A at 0.5% wt (unsheared).

FIG. 57, Panel A chemical structures and molar masses of the end-associative polymers (excepting isophthalic acid/tertiary amine functionalized ones that are shown in FIG. 47C); FIG. 57, Panel B specific viscosities of telechelic polymers at 8.7 mg/ml total polymer in 1-chlorododecane; FIG. 57, Panel C illustration of secondary electrostatic interactions (SEIs) in THY/DAAP and HR/CA pair.

Figure 59:
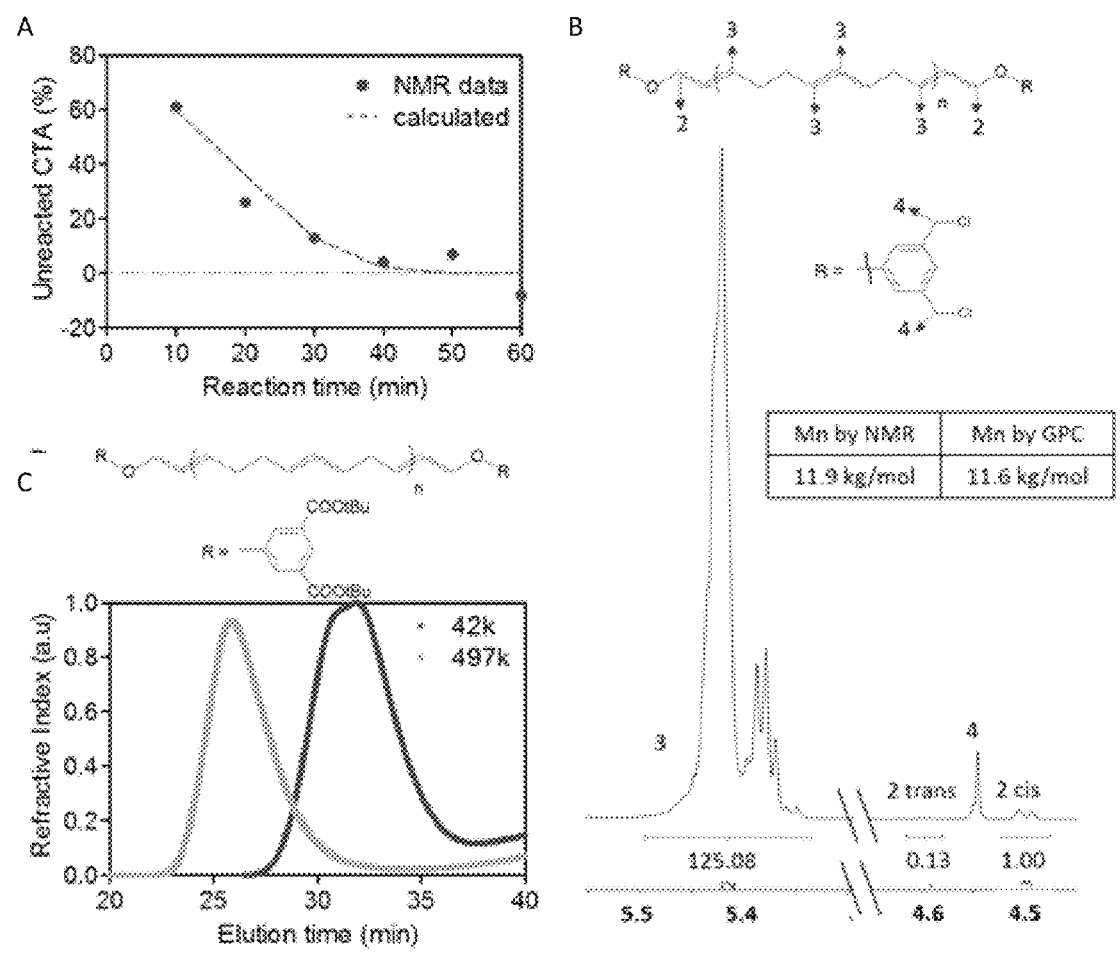

FIG. 58, $^1H$ NMR of characteristic peaks for di(di-tert-butyl-isophthalate) CTA (structure of end-group shown in FIG. 57), unreacted CTA (proton 1) and CTA incorporated into macromer (proton 2), at three time points; the integrations of the peaks were used to calculate the percentage of unreacted CTA, shown in FIG. 59, Panel A. FIG. 59, Panel A, Kinetic curves show that the peaks characteristic of the unincorporated CTA are already difficult to quantify in the sample taken after 40 min, and it is not evident for the sample taken at 1 hour (given the magnitude of the noise in the spectra, the amount of unincorporated CTA is less than 3%). Dashed curve is calculated based the data point at 10 min assuming exponential decay of unreacted CTA. FIG. 59, Panel B, In an example with di-chloro PCOD, the $M_n$ calculated by NMR is in good agreement with that measured by GPC, considering the inherent uncertainty in NMR integration and the inherent uncertainty in GPC measurement (5-10%). FIG. 59, Panel C, GPC traces show no indication of macro CTA (42 kg/mol) in the chain-extended telechelics (structure shown in FIG. 59, Panel C, 497 kg/mol) produced in the second step.

Figure 60:
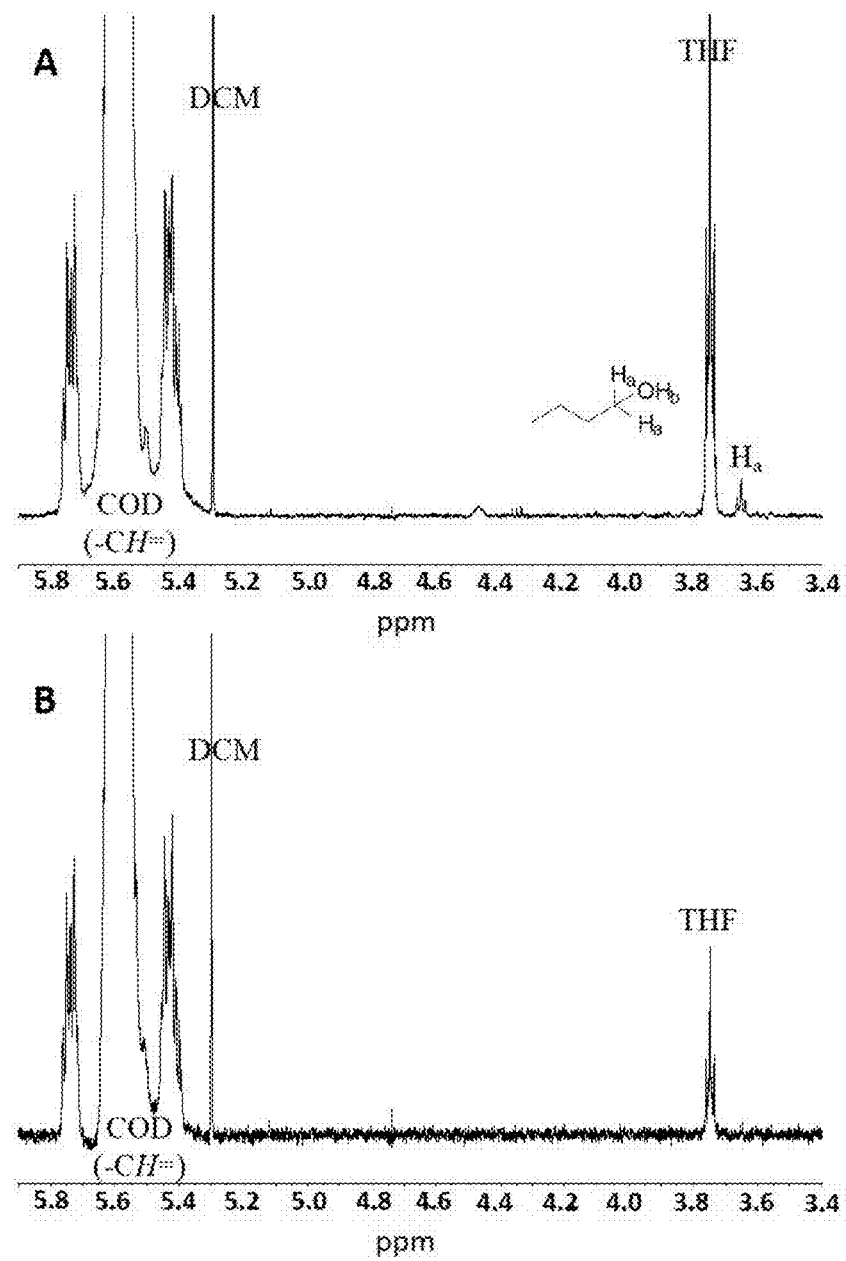

FIG. 60 shows $^1$H NMR spectra of increasingly purified COD in the range from 3.4 to 5.9 ppm: FIG. 60, Panel A COD after $BH_3 \cdot THF$ treatment and vacuum distillation (containing ~330 ppm of butanol based on integration); FIG. 60, Panel B COD further purified with magnesium silicate/$CaH_2$ treatments (to show removal of butanol and the resulting purity of COD used as monomer).

Figure 61A:
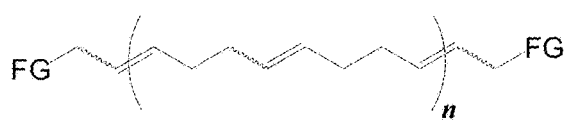
Figure 61A:
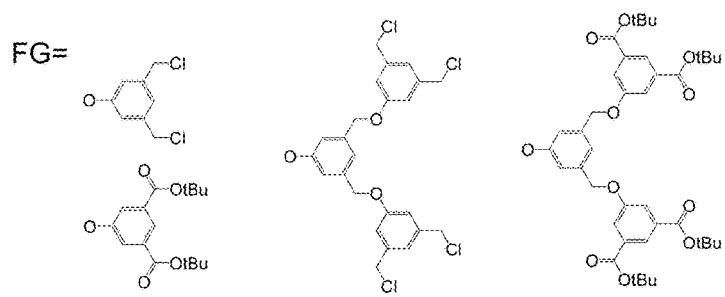
Figure 61B:
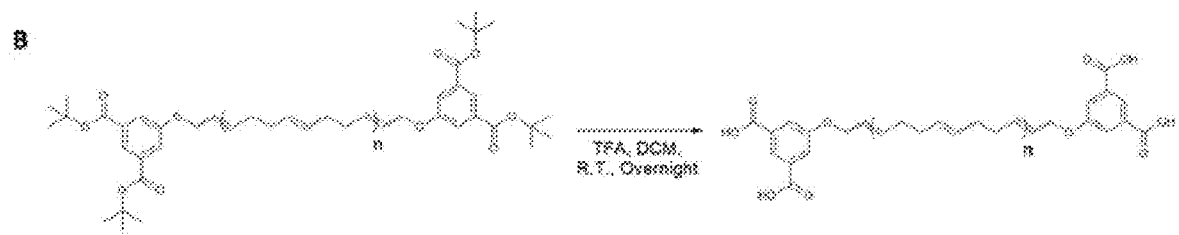

FIGS. 61A-61B show FIG. 61A, structures of non-associative (NA) end-groups and the conversion from NA to associative end-groups; FIG. 61B, isophthalic acid end groups obtained by deprotection of the tBu groups in the tBu-ester-ended non-associative precursor.

Figure 62A:
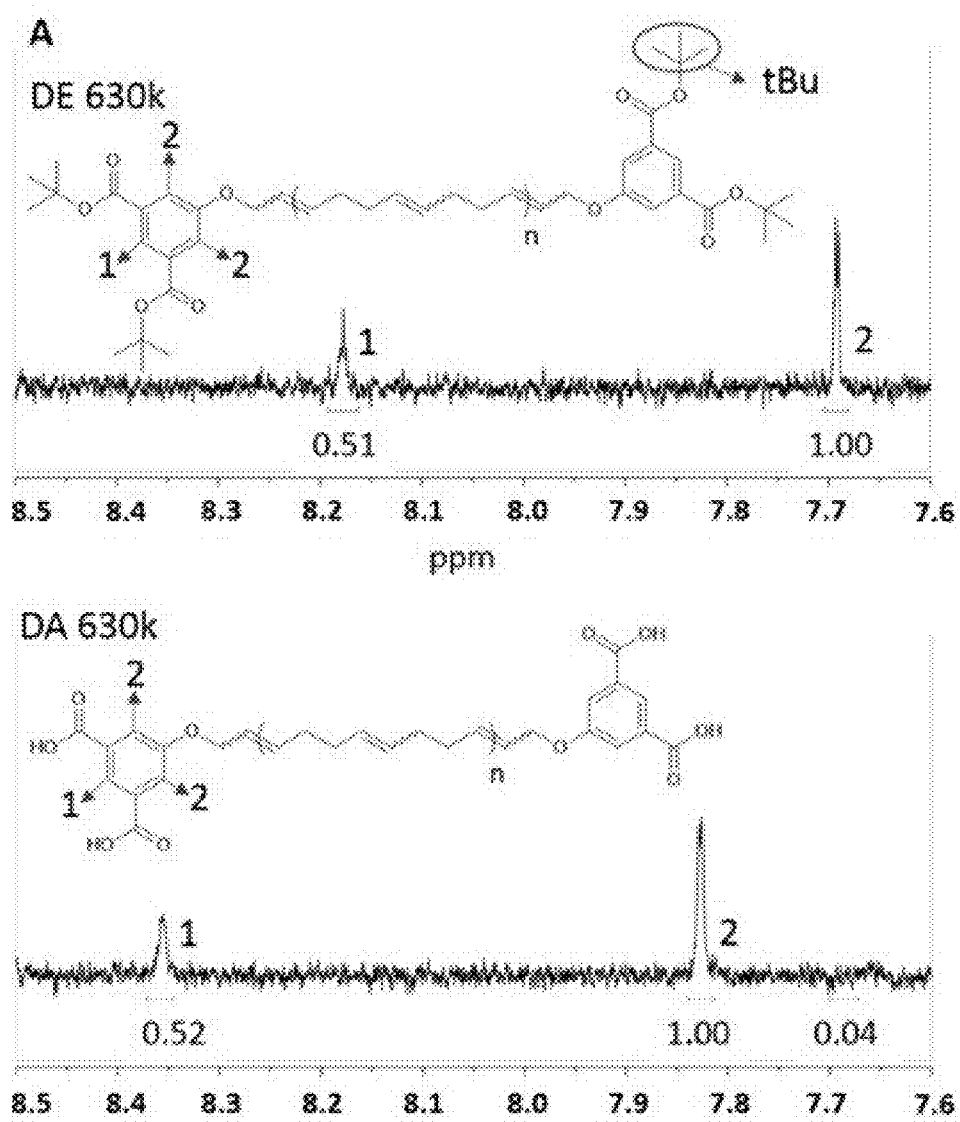
Figure 62B:
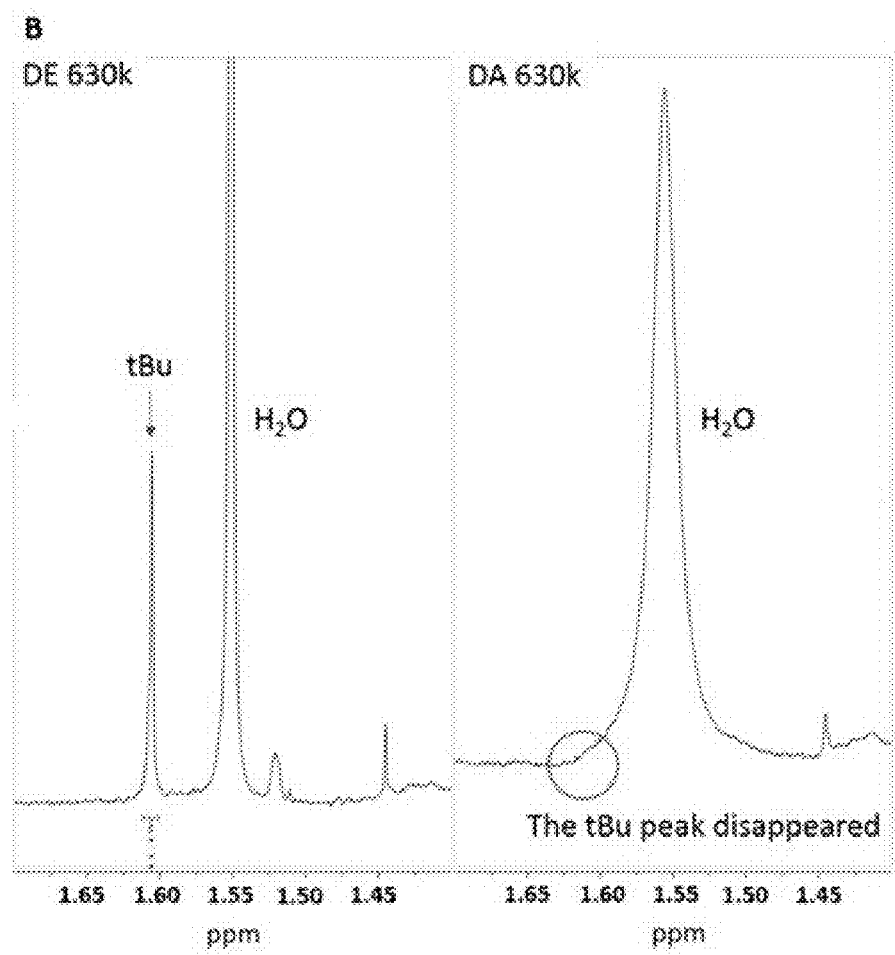

FIGS. 62A-62B show $^1$H NMR spectra of tBu-ester ended (DE) and isophthalic acid ended (DA) polycyclooctadiene ($M_w$=630 kg/mol) showing high degree of conversion of the end-groups: FIG. 62A, the peaks for protons on the phenyl ring (protons 1 and 2) shift due to the removal of tBu; FIG. 62B, the peak for tBu group disappears in the spectrum for DA.

Figure 62C:
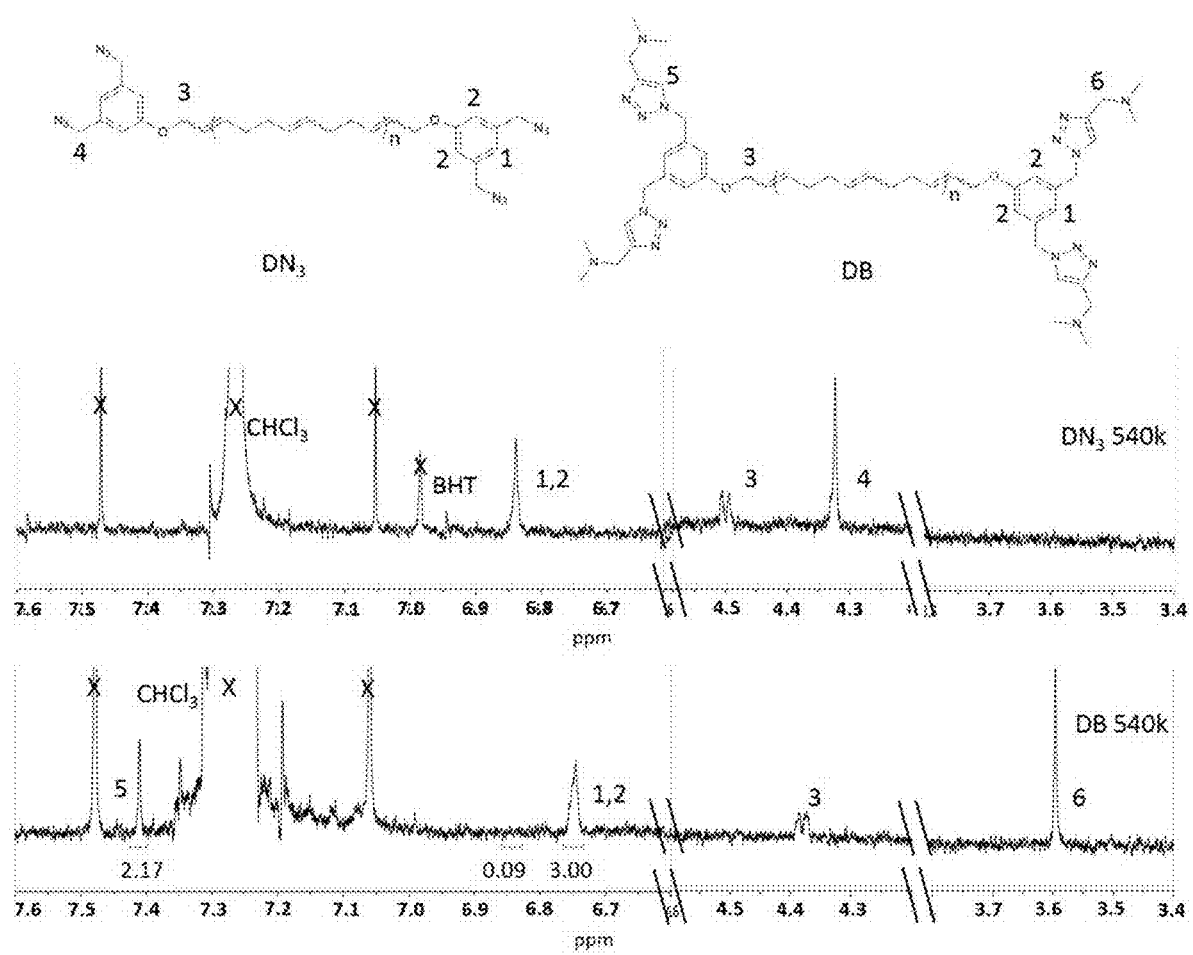

FIG. 62C shows $^1$H NMR spectra of azide ended ($DN_3$) and tertiary amine ended (DB) polycyclooctadiene ($M_w$=540 kg/mol) showing high degree of conversion of the end-groups.

Figure 63:
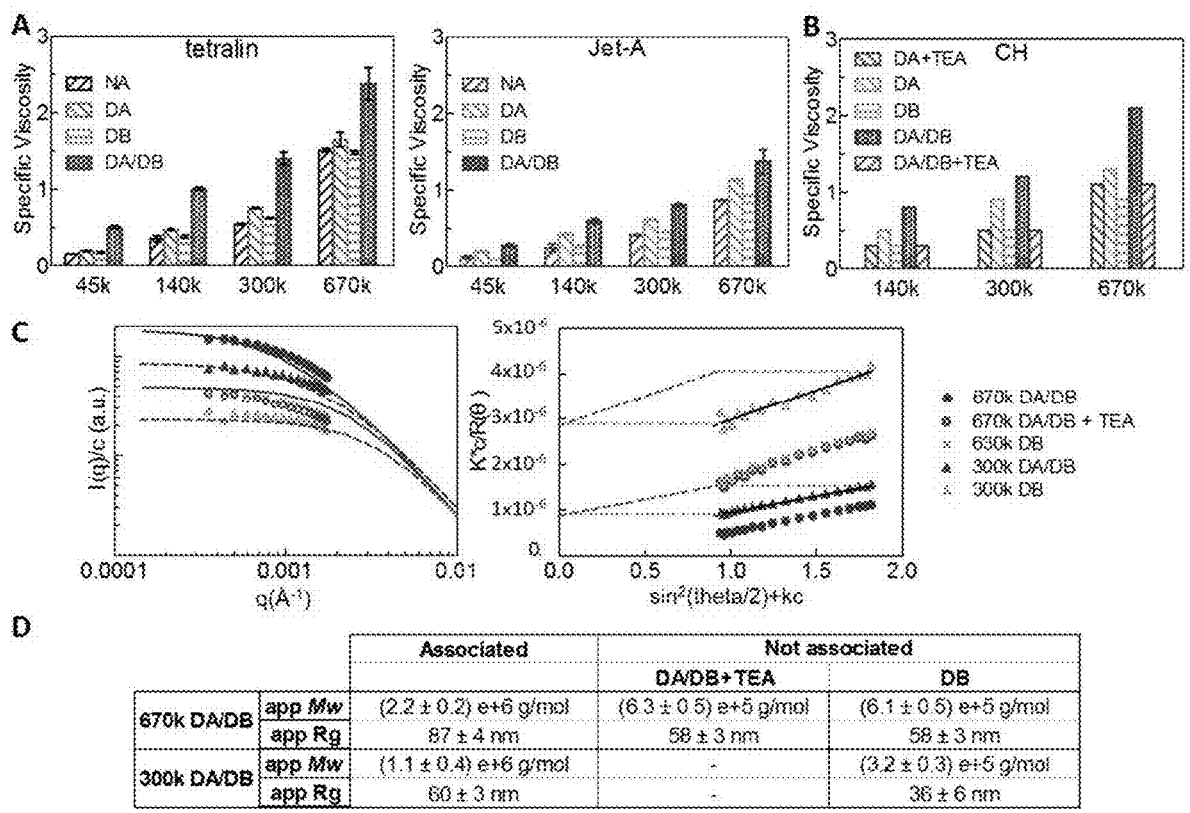
FIG. 63, Panel D concentration-normalized SANS intensities (25° C.) for 50 k telechelics in $d_{12}$-cyclohexane at concentrations well below the overlap concentration of NA (2 mg/ml for NA and DB; 0.05 mg/ml for DA and DA/DB).

FIG. 63 shows formation of supramolecules in equimolar solutions of α,ω-di(isophthalic acid) polycyclooctadiene, α,ω-di(di(tertiary amine)) polycyclooctadiene (DA/DB), with non-associated controls: FIG. 63, Panel A, effect of chain length on specific viscosity of telechelics in tetralin and Jet-A (2 mg/ml) at 25° C.; FIG. 63, Panel B, effect of TEA (2.5 µl/ml) on the viscosities of associative telechelic polymers DA/DB; FIG. 63, Panel C, left: static light scattering shows that association between DA and DB chains (circle: 670 k series; triangle: 300 k series) in CH at 0.22 mg/ml (0.028%) produces supramolecules (filled), which separate into individual building blocks (x) when an excess of a small-molecule tertiary amine is added (open symbols, 10 µl/ml of triethylamine, TEA). Curves show predictions of the model (see Examples 37-49); right: Zimm plot of the same static light scattering data shown in Left part. Lines indicate the fitting to the Zimm equation and dashed lines indicate the extrapolation that was used to evaluate the intercept at zero concentration, zero angle; the slope of the line and the value of the intercept are used to evaluate the apparent $M_w$ and apparent $R_g$; FIG. 63, Panel D, resulting values of apparent $M_w$ and $R_g$ for the five polymer solutions in FIG. 63, Panel C.

Figure 64:
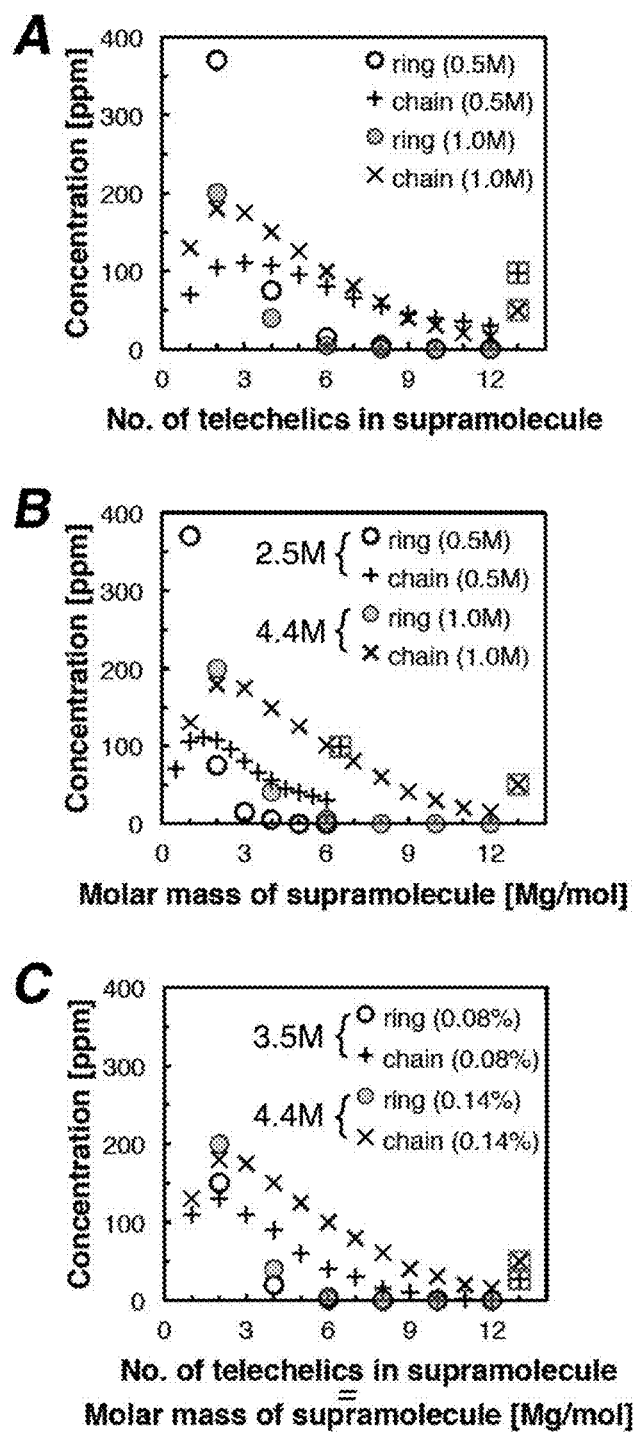

FIG. 64 shows modeling of interplay of telechelic length and concentration in a stoichiometric mixture of complementary end-associative telechelics in the regime of long telechelics: FIG. 64, Panel A, effect of telechelic length on the distribution of the number of telechelics in a supramolecule, given as the concentration in ppm wt/wt of each species, cyclic (circles) or linear (xor +), at a fixed total concentration of 1400 ppm; FIG. 64, Panel B, the same distributions as in FIG. 64, Panel A, presented in terms of the molar mass of the supramolecules; the weight-average molar mass of the supramolecules is given to the left of the legend; FIG. 64, Panel C, effect of concentration on the distribution of supramolecules for telechelics of 1M g/mol (see Examples 37-49).

Figure 65:
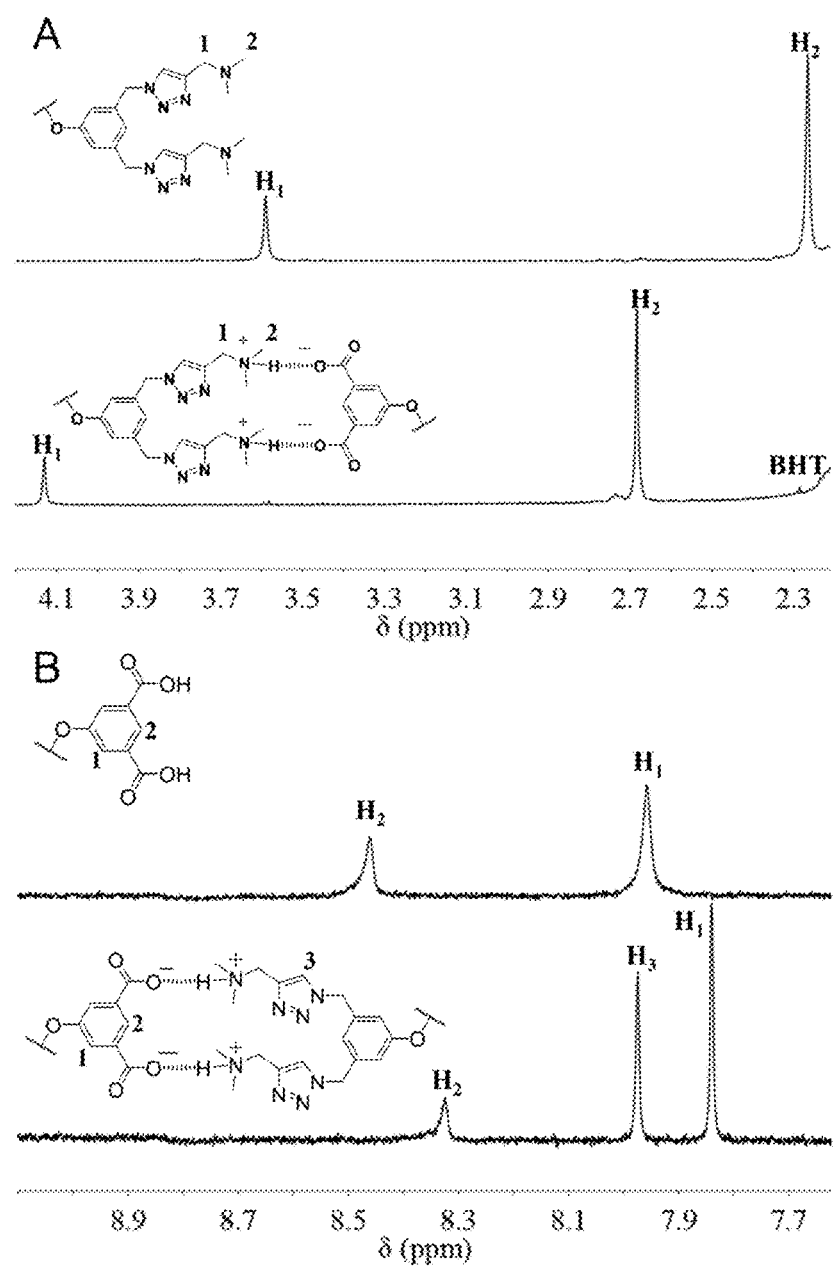

FIG. 65 shows $^1$H NMR spectra of isophthalic acid ended (DA) and di(tertiary amine) ended (DB) polycyclooctadienes ($M_W$=45 kg/mol) and 1:1 molar mixture of DA/DB in deuterated chloroform ($CDCl_3$) indicating that carboxylic acid-amine hydrogen bonds dominate over carboxylic acid-carboxylic acid hydrogen bonds: FIG. 65, Panel A, $^1$H NMR peaks due to hydrogens on carbons adjacent to nitrogens of tertiary amine groups of DB (methylene protons 1; methyl protons 2) shift downfield when they form charge-assisted hydrogen bonds with carboxylic acid groups of DA; FIG. 65, Panel B, $^1$H NMR peaks due to hydrogens on the phenyl ring of DA shift upfield upon formation of charge-assisted hydrogen bonds between carboxylic acids and tertiary amines.

Figure 66:
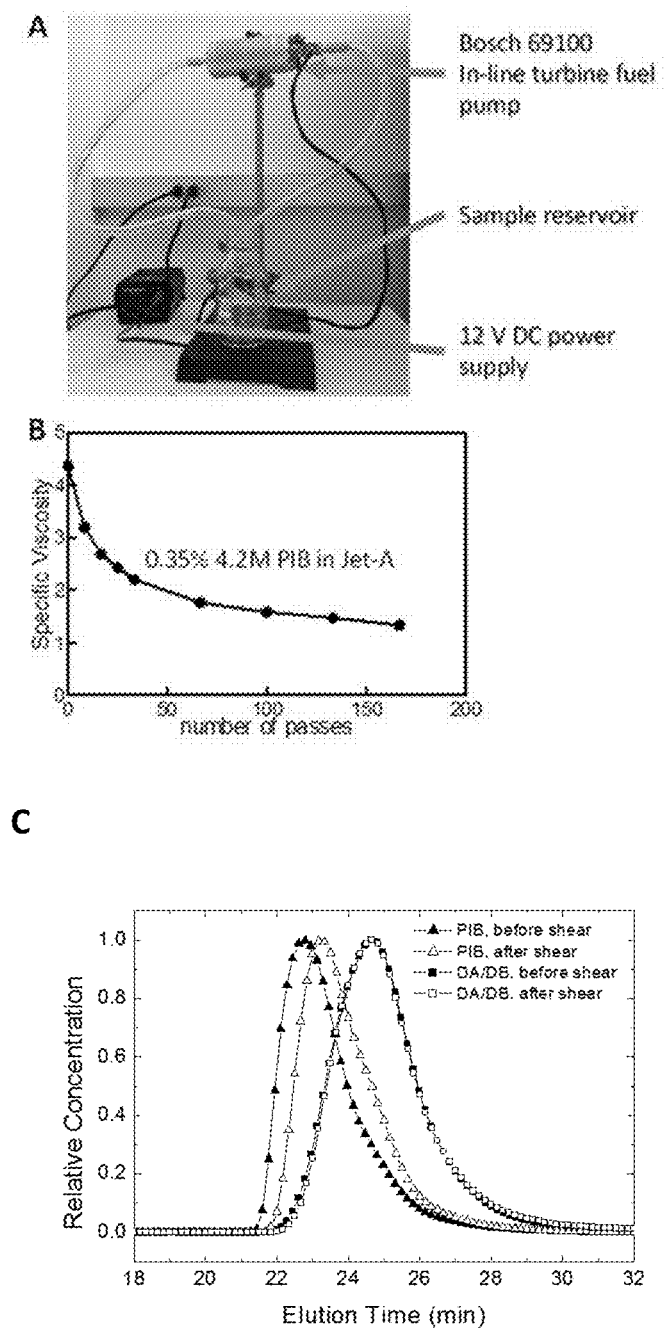

FIG. 66 shows: FIG. 66, Panel A, home-built apparatus for "shear degradation" test; FIG. 66, Panel B, an initially 4,200 kg/mol PIB at a concentration of 0.35% in Jet-A shows the decrease in specific viscosity indicative of shear degradation with increasing number of passes through the pump; FIG. 66, Panel C, GPC validation of "shear degradation" test using PIB and confirmation that associative polymers resist degradation (see Example 61). (symbols)

Figure 67:
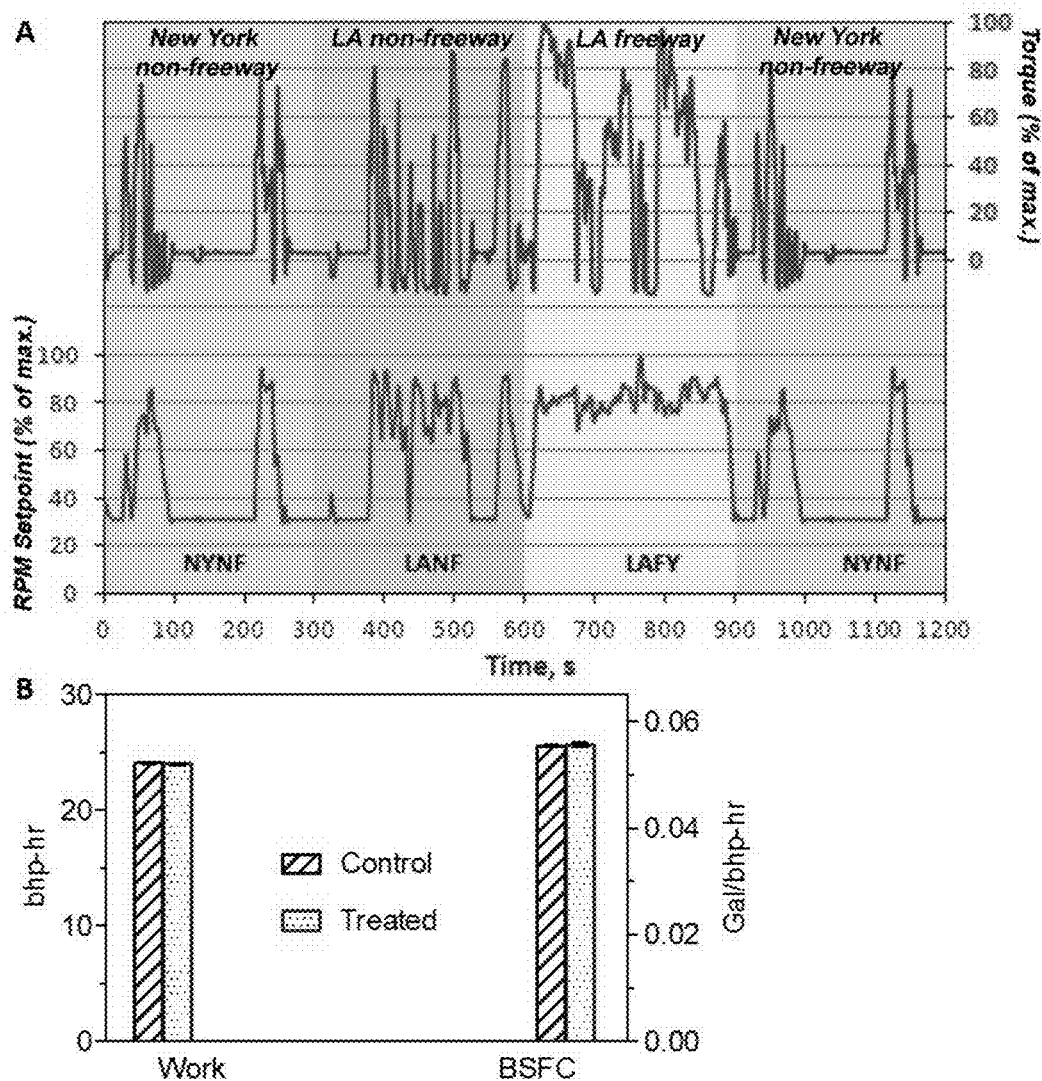

FIG. 67 shows FIG. 67, Panel A results of diesel engine tests using The Federal Test Protocol (FTP); FIG. 67, Panel B work and fuel efficiency data using an unmodified long-haul diesel engine. Control: untreated diesel. Treated: diesel with 0.14% w/v 670 k DA/DB (see Examples 63 and 64).

Figure 49A:
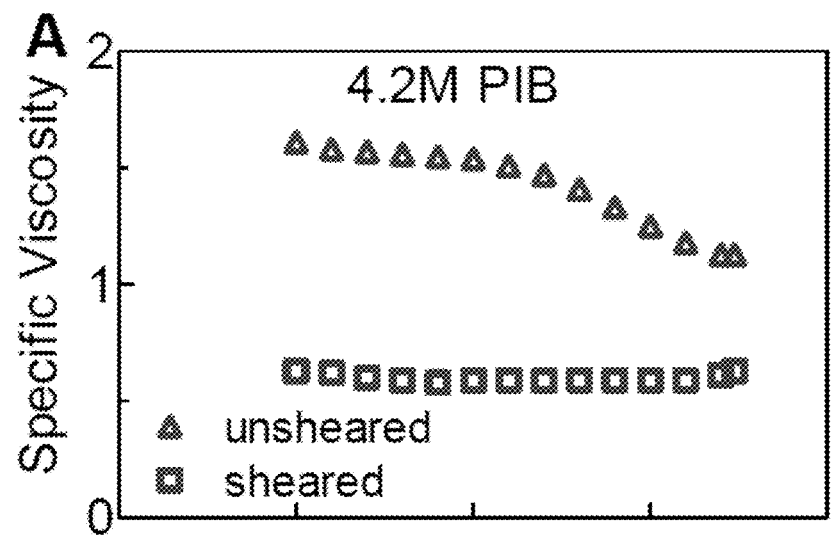
FIGS. 49A-49C show FIG. 49A the decrease of specific viscosity for 4.2M PIB 1.6 mg/ml (0.2% wt) in Jet-A at 25° C. after approximately 60 passes through a Bosch fuel pump as shown in FIG. 66, Panel A (sheared) relative to as-prepared (unsheared) indicates shear degradation.
Figure 49B:
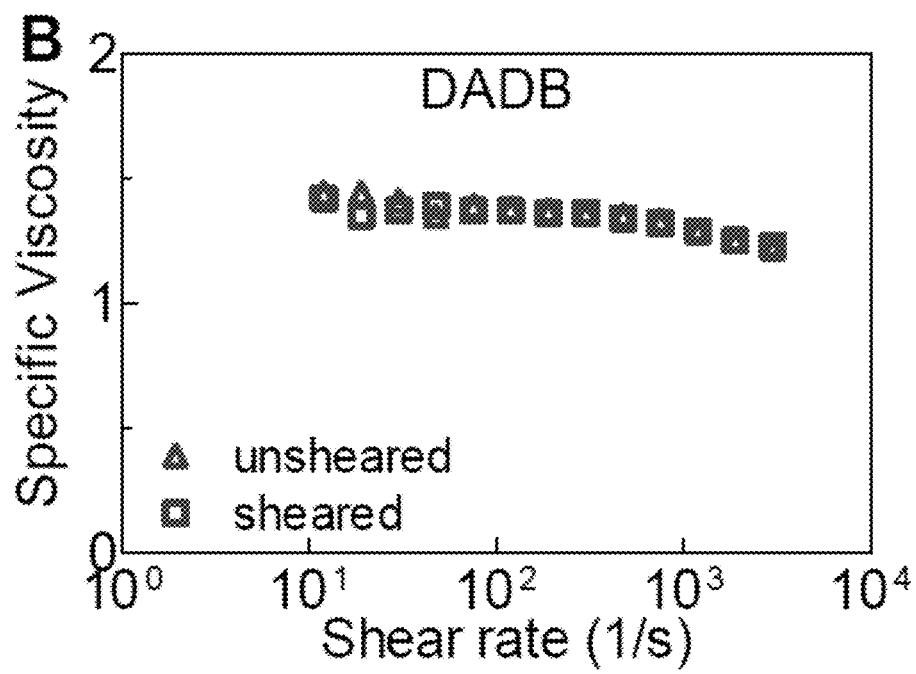
Figure 49C:
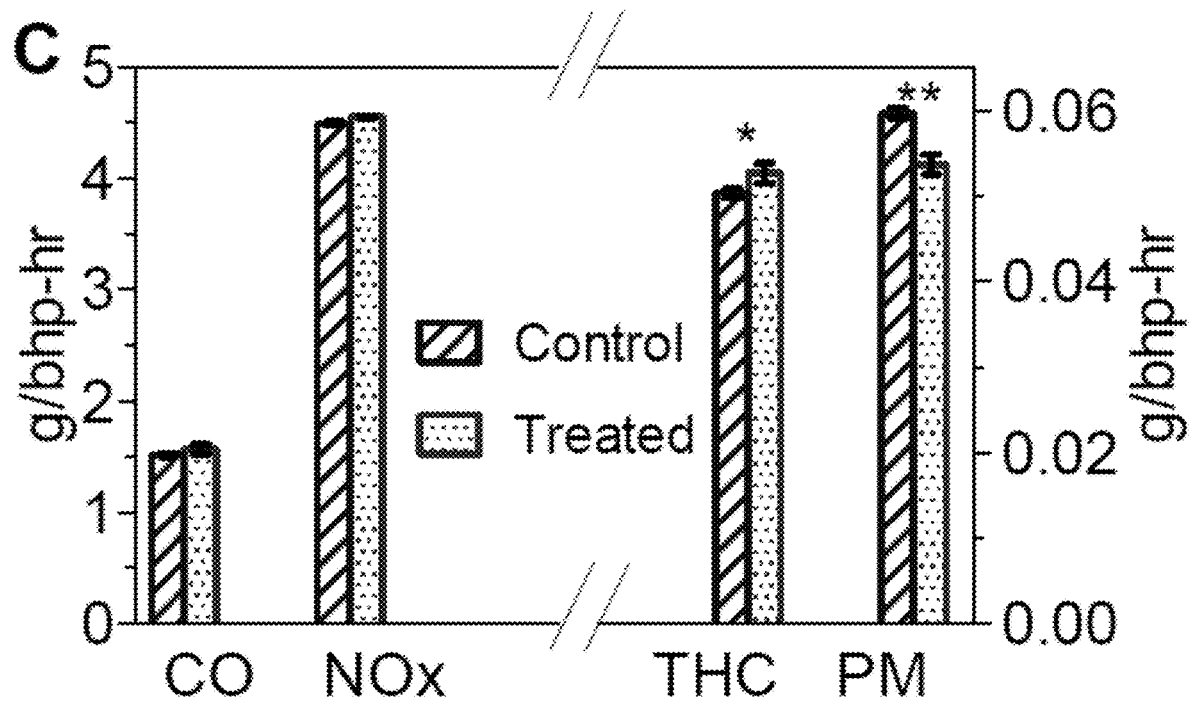
Figure 68:
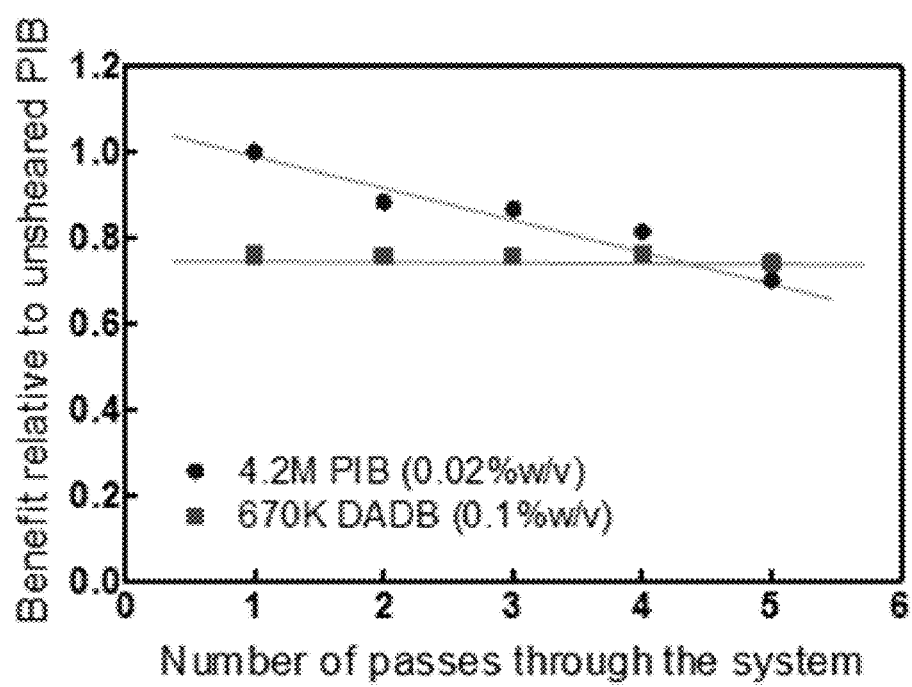

FIG. 68 shows average mass flow rate normalized to that of "as prepared" 4.2M PIB solution for a 0.02% solution of 4.2M PIB in Jet-A and a 0.1% solution of 670 k DA/DB in Jet-A (similar to that used in the diesel engine tests of FIG. 49C).

Figure 69:
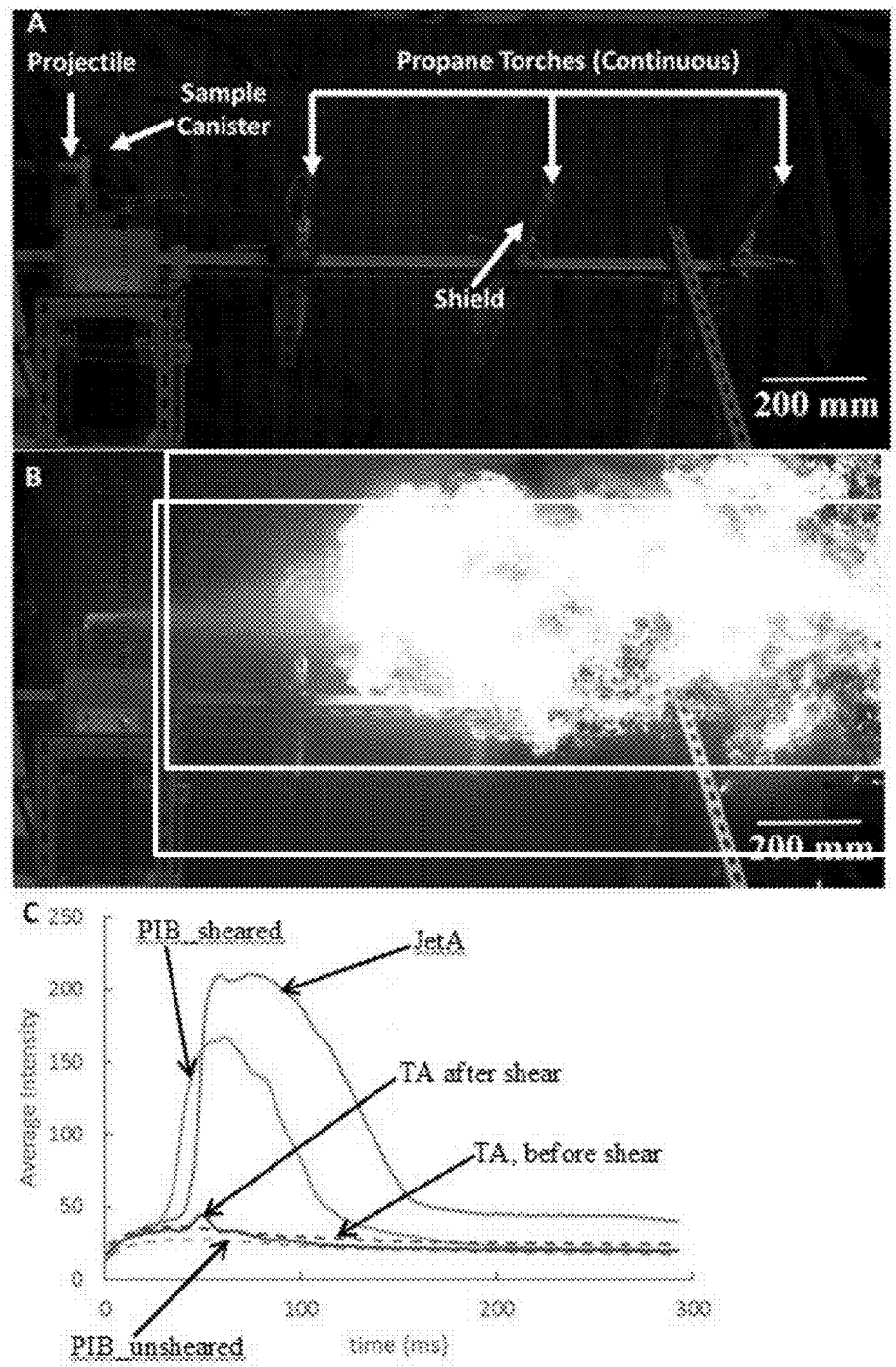

FIG. 69 shows FIG. 69, Panel A, apparatus for impact/flame propagation experiments; FIG. 69, Panel B, frame at 60.4 ms for untreated Jet-A. The rectangular box is the area within which pixels were analyzed for brightness; FIG. 69, Panel C, average brightness of the pixels in the rectangle of FIG. 69, Panel B as a function of time during the first 300 ms after impact for five compositions (untreated Jet-A, 0.35% wt 4.2M PIB unsheared, 0.35% wt 4.2M PIB sheared, 0.3% wt 430 k TA unsheared and 0.3% wt 430 k TA sheared).

Figure 70:
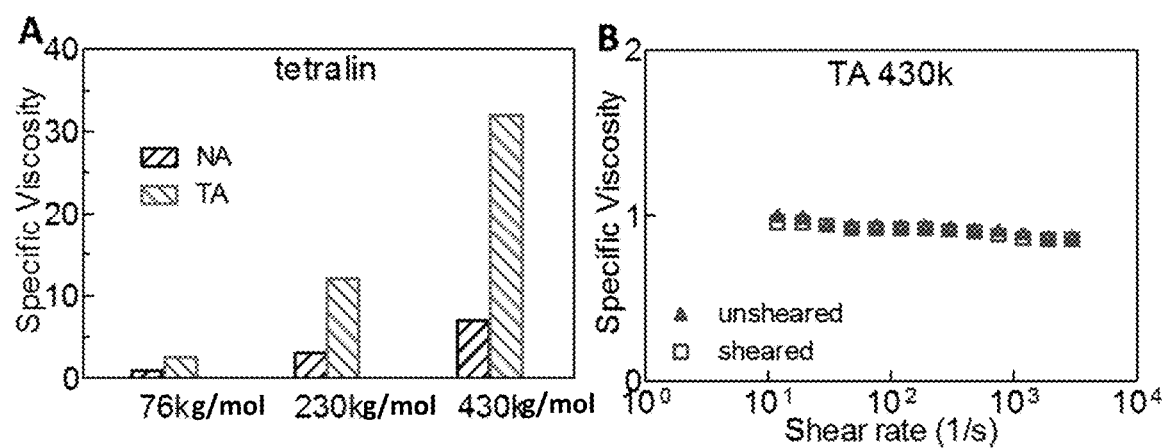

FIG. 70 shows characterization of α,ω-di(di(isophthalic acid)) (TA) polycyclooctadiene used in Impact test: FIG. 70, Panel A, Effect of chain length (k refers to kg/mol) on specific viscosity of TA in tetralin at 10 mg/ml. FIG. 70, Panel B, Specific viscosity of 2.4 mg/ml 430 k TA in Jet-A at 25° C., sheared vs unsheared.

Figure 1A:
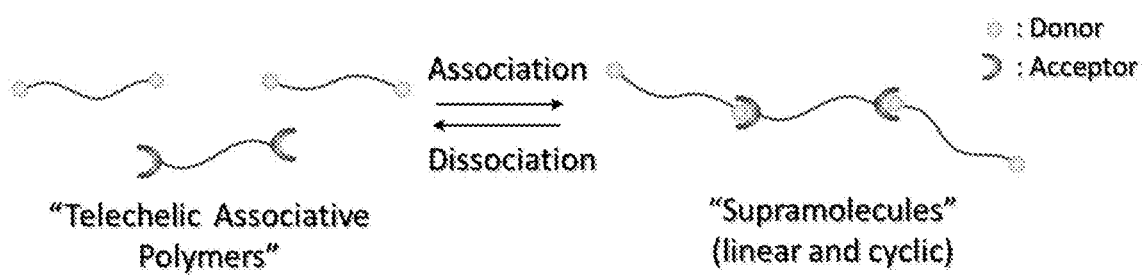
FIGS. 1A-1B show a schematic illustration of supramolecular structures of associative polymers according to embodiments herein described. In particular.
Figure 1B:
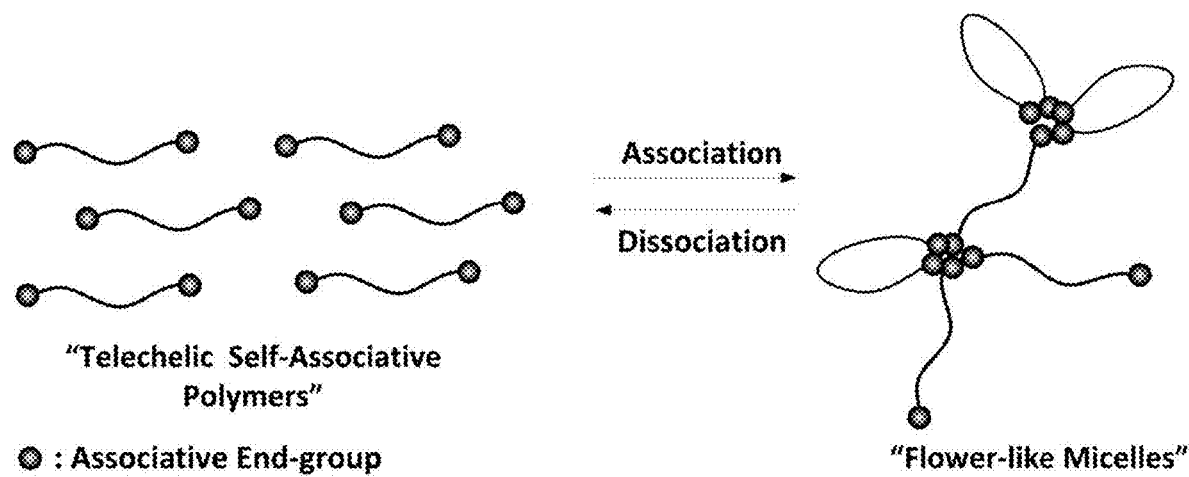
Figure 71:
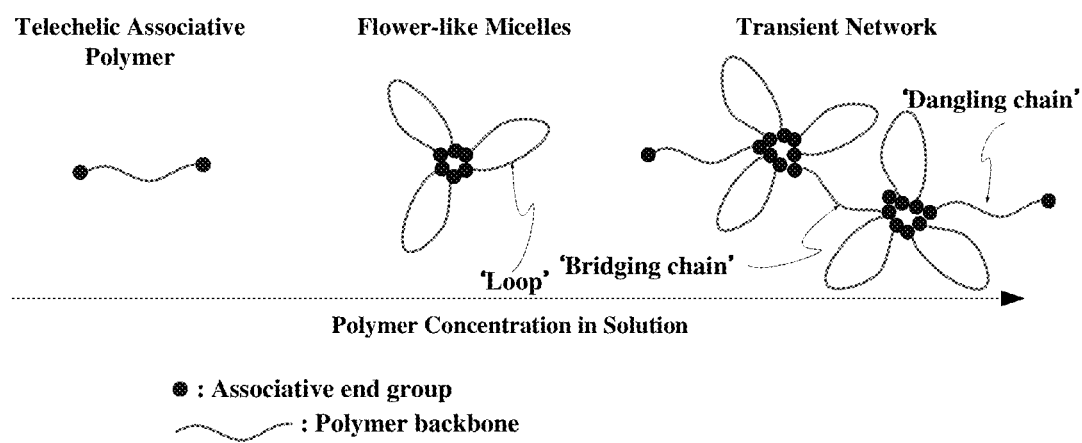

FIG. 71 shows a schematic representation of the concentration-dependent self-association of telechelic associative polymers (see FIG. 1B). Left: Telechelic associative chain at low concentration. Middle: Flower-like micelle above a critical concentration value. Right: Transient network at higher concentration.

Figure 72:
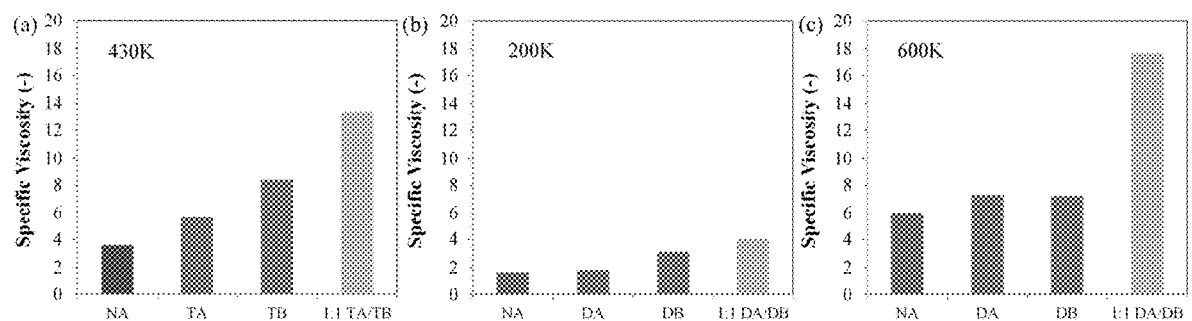

FIG. 72 shows specific viscosity of 1 wt % Jet-A solutions of LTPs at 25° C.: FIG. 72, Panel A, 430 kg/mol NA-, TA-, TB-PCODs, and 1:1 (w/w) mixture of TA- and TB-PCODs; FIG. 72, Panel B, 200 kg/mol NA-, DA-, DB-PCODs, and 1:1 (w/w) mixture of DA- and DB-PCODs; FIG. 72, Panel C, 600 kg/mol NA-, DA-, DB-PCODs, and 1:1 (w/w) mixture of DA- and DB-PCODs. Note that all data reported are averages over shear rates 10 to 100 s$^{-1}$.

Figure 73:

FIG. 73 shows representative examples of solutions of associative LTPs in Jet-A after storage at −30° C. over 13 months: 0.3 wt % Jet-A solution 1:1 (w/w) mixture of 430 kg/mol TA- and TB-PCODs. (See FIG. 15, Panel A left panel for 0.5 wt % Jet-A solution of 264 kg/mol TA-PCOD).

Figure 74:
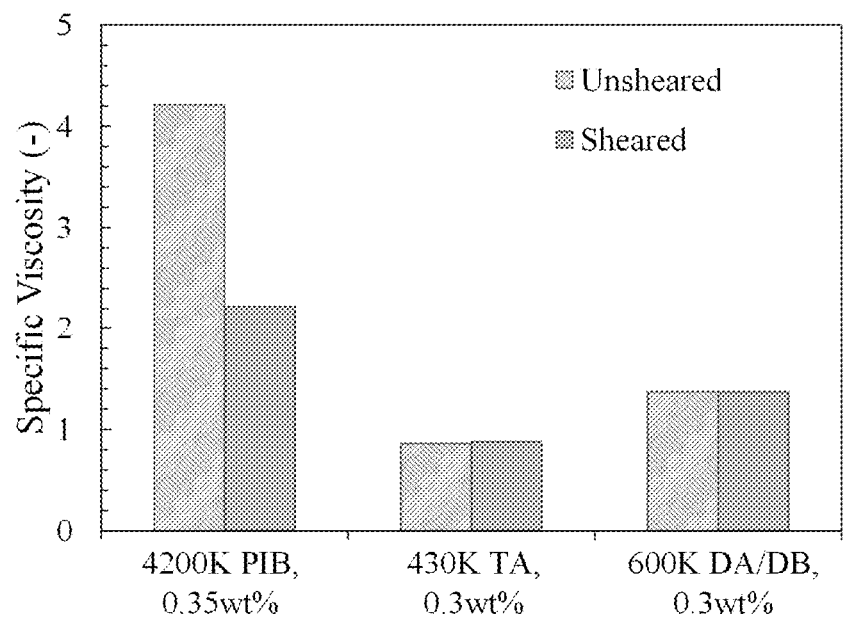

FIG. 74 shows shear viscosity of samples from shear stability test and their unsheared controls. Right: 0.35 wt % Jet-A solution of 4,200 kg/mol PIB; middle: 0.3 wt % Jet-A solution of 430 kg/mol TA-PCOD; left: 0.3 wt % Jet-A solution of 1:1 mixture of 600 kg/mol DA- and DB-PCODs.

Figure 75:
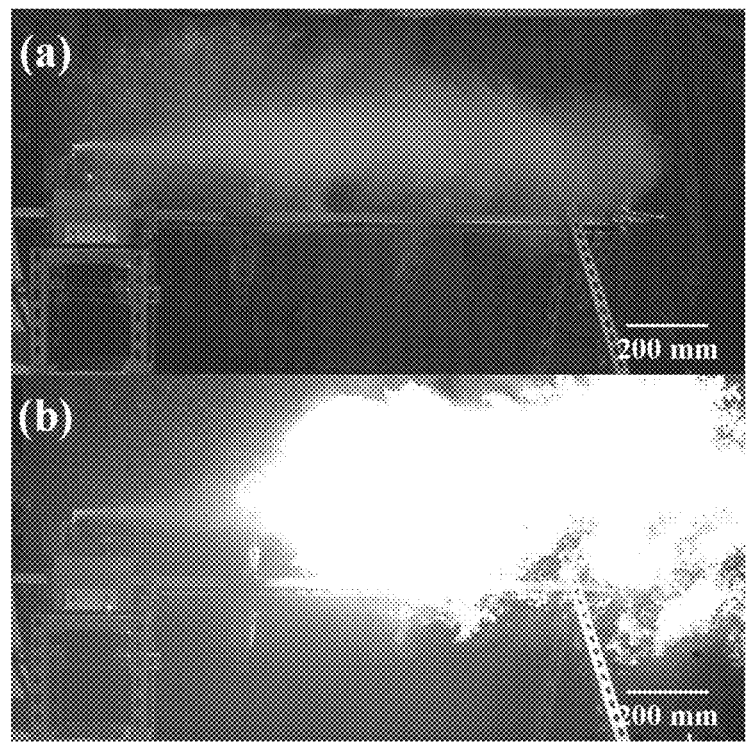

FIG. 75, Panels A-B shows results of Jet-A in impact/flame propagation test: FIG. 75, Panel A t=30 ms after impact FIG. 75, Panel B t=60 ms after impact.

Figure 76:
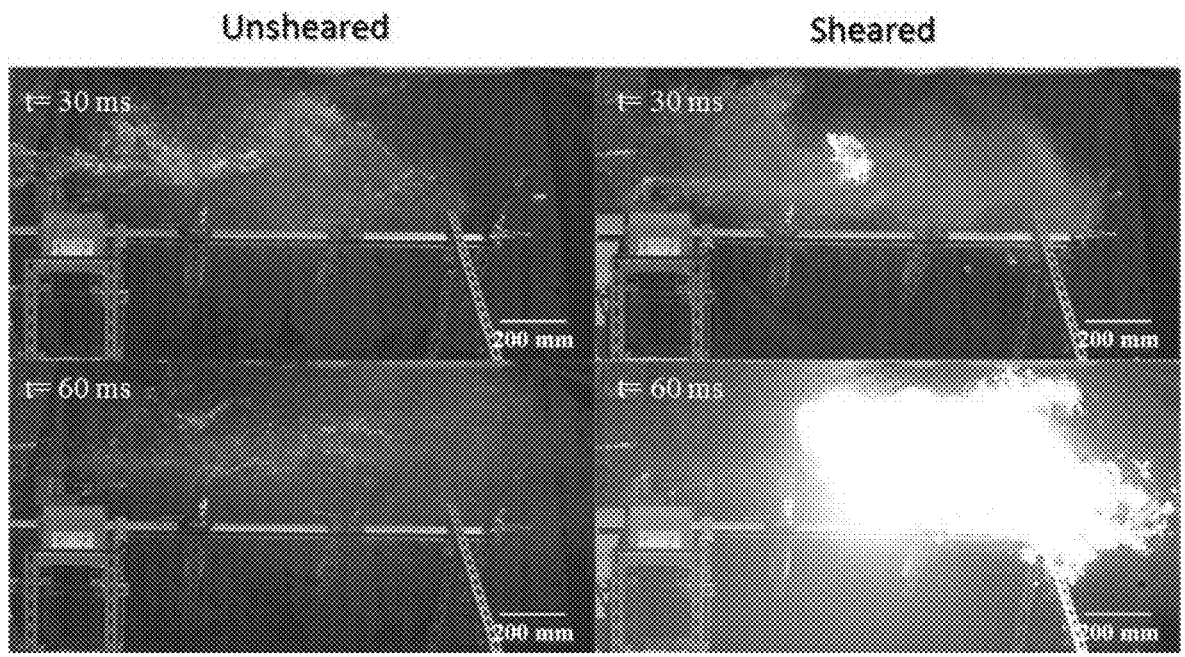

FIG. 76 shows results of 0.35 wt % Jet-A solution of 4,200 kg/mol PIB in impact/flame propagation test. Left: results of unsheared solution; right: results of sheared solution.

Figure 77:
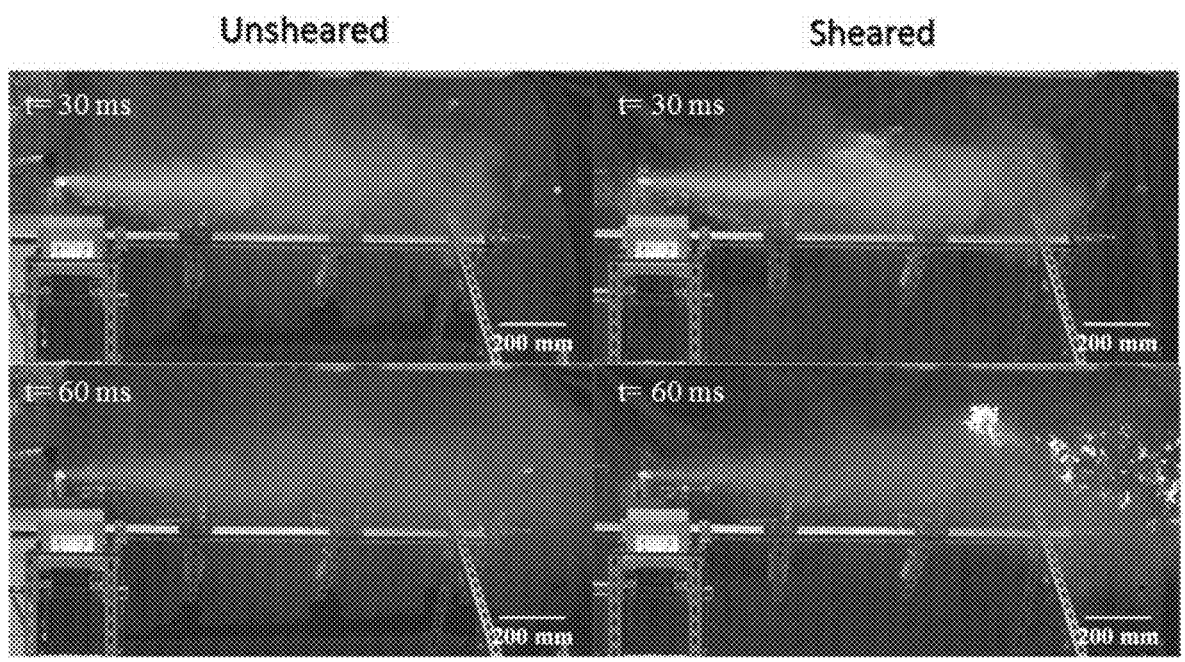

FIG. 77 shows results of 0.3 wt % Jet-A solution of 430 kg/mol TA-PCOD in flame propagation test. Left: results of unsheared solution. Right: results of sheared solution.

Figure 78:
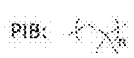
Figure 78:
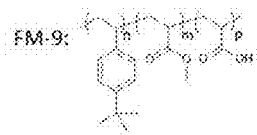

FIG. 78 shows molecular design considerations for backbone selection for solubility in fuels and resistance to chain scission. In contrast to polymers examined in prior literature ([6],[7]) on mist control and drag reduction, the present polymers use a backbone that has no tertiary or quaternary carbons nor any heteroatoms in the repeat unit. The importance of these features is illustrated by comparison with the two polymers that have received the most attention in prior literature: 4,200 kg/mol polyisobutylene (PIB) and a copolymer of acrylic and styrenic monomers known as FM-9 ($M_w$~3,000 kg/mol). Acrylate units introduce heteroatoms that interfere with fuel solubility (a problem that is exacerbated by the random incorporation of carboxylic acid side groups). Polyisobutylene has quaternary carbons in the backbone, making it particularly susceptible to chain scission ([8]). The tertiary backbone carbons in FM-9 also make the backbone more susceptible to chain scission than one that has only secondary carbons. The solubility and strength of the present polymers are enhanced by including carbon-carbon double bonds in the backbone.

FIG. 79 shows physical properties of single component solvents: Dielectric constant ($\varepsilon$) and refractive index (n). Dielectric constant serves as a measure of the polarity of solvents: it increases from for cyclohexane (CH) and tetralin. Increasing solvent polarity reduces the degree of end-association for the telechelics. The difference between the refractive index of solvents and that of PCOD (n~1.52) determines the contrast in multi-angle laser light scattering (MALLS). Tetralin is excluded from the MALLS experiment because of its low contrast with PCOD (1.54 is too close to 1.52). Cyclohexane gives desirable contrast in MALLS.

FIG. 80 shows preliminary ASTM data of untreated ("Base fuel") and treated JP-8 (with 1:1 molar mixture of 500 kg/mol α,ω-di(isophthalic acid) polycyclooctadiene and 600 kg/mol α,ω-di(di(tertiary amine)) polycyclooctadiene (DA/DB)). [a]The concentration of polymer (mass/mass) added to "Base fuel" JP-8, a military aviation fuel (specified by MIL-DTL-83133), corresponding to Jet-A with three additional additives: the Corrosion Inhibitor/Lubricity Enhancer, the Fuel System Icing Inhibitor, and the Static Dissipater Additive. [b]Flash Point (ASTM D93) is the lowest temperature at which fuel will produce enough flammable vapors to ignite when an ignition source is applied. Flash point is the most commonly used property for the evaluation of the flammability hazard of fuels. As expected, the mist-control polymers do not affect the flash point because the polymer additive affects mechanical mist formation—not the liquid-vapor equilibrium characteristics of the fuel. There is no statistically significant difference in flash point among the three samples. [c]Total Acid Number (ASTM D3242) organic acids are naturally found in hydrocarbon fuels and others are created during refining. The presence of acids in fuel is unwanted because of the potential to cause corrosions or interfere with fuels water separation. There is no statistically significant difference in total acid number among the three samples.[d] Density at −15° C. (ASTM D4052) is used to verify fuel type, calculate aircraft fuel load and range, gaging and metering and flow calculations. (e) Kinematic Viscosity at −20° C. (ASTM D445) at low temperatures is specified to be 8.0 mm$^2$/s or less to ensure adequate fuel flow and atomization under low temperature operations, particularly for engine relight at altitude. The composition at 1000 ppm obeys this criteria.

FIGS. 81A-81H show associative polymer based on 2-arm linear (e.g. FIG. 81A) and 3-arm star structure units (e.g. FIG. 81B) in which each chain is connected to a least one node "N". Within the class of molecules as described herein; in strong flow the molecule is expected to tend to break near the middle or a node "N", so one of the two resultant pieces may retain at least end functional groups and efficacy is expected to remain substantially unchanged (e.g. FIG. 81F). In an H shaped polymer as shown in the molecule (e.g. FIG. 81H) breaks near the middle; resulting in two polymers (each half of the H polymer which are themselves active for the desired rheological effect, so efficacy is not lost.

DETAILED DESCRIPTION

Associative polymers, and related materials, compositions, methods, and systems are described, which based in several embodiments, allow control of physical and/or chemical properties, of a non-polar composition.

"Chemical and/or physical properties" in the sense of the present disclosure comprise properties that are measurable whose value describes a state of a physical system and any quality that can be established only by changing a substance's chemical identity.

The term "non-polar compositions" in the sense of the present disclosure indicates compositions having a dielectric constant equal to or lower than 5 which can comprise compositions of varying chemical nature. In particular, a non-polar composition can comprise hydrocarbon compositions, fluorocarbon compositions or silicone compositions. A hydrocarbon composition is a composition in which the majority component is formed by one or more hydrocarbons. A fluorocarbon composition is a composition in which the majority component is formed by one or more fluorocarbons. A silicone composition is a composition in which the majority component is formed by one or more silicones.

In embodiments herein described, associative polymers are provided which can be added to a non-polar composition to control at least one physical and/or chemical property of the composition as illustrated in the present disclosure. In particular, chemical and/or physical properties that can be controlled by associative polymers herein described include rheological properties. The term "rheological properties" of a composition refers to properties related to the deformation and flow of the composition, in liquid or "soft" solid state, under stress, in particular, when a mechanical force is exerted on the composition. Rheological properties can be measured from bulk sample deformation using a mechanical rheometer, or on a micro-scale by using a microcapillary viscometer or an optical technique such as microrheology. Examples of rheological properties include shear viscosity, elongational viscosity, storage and loss moduli, viscoelastic properties, and lubrication properties.

Accordingly, in some embodiments herein described, associative polymers are provided which can be added to a non-polar composition to perform drag reduction, mist control, lubrication, fuel efficiency improvement and/or control of viscoelastic properties of a non-polar composition.

In particular, the term "drag reduction" as used herein refers to the reduction of the resistance to flow in turbulent flow of a fluid in a conduit (e.g. a pipe) or pipeline thereby allowing the fluid to flow more efficiently. A skilled person would realize that drag reduction can be described in terms that include, for example, a reduction in the friction factor at high Reynolds number (e.g. higher than 5000, between 5000 and 25000 and higher than 25000), a reduction in the pressure drop required to achieve a given volumetric flow rate, a reduction in hydraulic resistance, and an increase in flow rate without raising operating pressure. In particular, drag reduction can be measured by methods identifiable to a skilled person, for example measurement of the flow rate of a fluid though a conduit and/or by measurement of the change in pressure of a fluid flowing through a conduit.

In particular, the term "mist control" as used herein refers to the control of the properties of a fluid mist. In particular, the properties that can be controlled can include the sizes, and/or distribution of sizes, of the droplets of fluid. In some embodiments, control of the sizes, and/or distribution of sizes, of the droplets can control the flammability of the mist of a fluid (e.g., to reduce the propagation of a flame through the fuel mist in the event of an accident). In other embodiments, control of the sizes, and/or distribution of sizes, of the droplets can increase the deposition of a fluid on an intended surface (e.g., to reduce pesticide wasted by convection away from the field to which it is being applied). In particular, mist control can be measured by techniques identifiable to a skilled person, such as measurement of the sizes and size distribution of droplets when a fluid is converted to a mist.

In particular, the term "lubrication" as used herein refers to the reduction of wear and/or inhibition of movement between two surfaces separated by a non-polar composition as herein described. In particular, in some embodiments, the lubrication properties of a non-polar composition can be controlled to improve the wear-resistance and/or movement of the surfaces with respect to each other when the non-polar composition is introduced as a lubricant between the two surfaces (e.g. improving the wear-resistance and/or movement of ball bearings in a ball bearing structure, or improving the wear resistance and/or movement of a piston in an engine). In particular, lubrication of a fluid can be measured by techniques identifiable to a skilled person, such as rheological measurements (e.g. measuring the coefficient of friction when two surfaces with the fluid between them are slid past each other).

In particular, the term "fuel efficiency" as used herein, refers to the thermal efficiency with which the potential energy of a fuel is converted to kinetic energy and/or work in the chemical transformation undergone by the fuel (e.g. combustion of the fuel in an engine). In particular, fuel efficiency can be measured by techniques identifiable to a skilled person, such as measurement of the amount of work performed by the chemical transformation of the fuel (e.g. measuring the number of miles of travel an engine can provide when combusting a given volume of fuel).

In particular, the term "viscoelastic properties" as used herein refers to the manner in which a non-polar composition reacts to external stresses such as deformation, in which the non-polar fluid exhibits a combination of viscous response (e.g. production of a permanent strain of the non-polar composition once it has been distorted by the applied stress) and elastic response (deformation of the non-polar composition during application of the stress, and return to the original shape upon removal of the stress). In particular, viscoelastic properties can be measured by methods identifiable to a skilled person, such as rheological measurements (e.g. measurement of the storage and loss moduli of the non-polar composition).

Associative polymers herein described have a non-polar backbone and functional groups presented at ends of the non-polar backbone. In particular in the associative polymer the linear or branched backbone is substantially soluble in the non-polar composition. The term "substantially soluble" as used herein with reference to a polymer and a nonpolar composition indicates the ability of the polymer backbone to dissolve in the non-polar liquid. Accordingly, the backbone of the associative polymers as herein described can be substantially soluble in a nonpolar composition when the polymer backbone and nonpolar composition have similar Hildebrand solubility parameters ($\delta$) which is the square root of the cohesive energy density:

$$\delta = \sqrt{\frac{\Delta H_v - RT}{V_m}}$$

wherein $\Delta H_v$ is equal to the heat of vaporization, R is the ideal gas constant, T is the temperature, and $V_m$ is the molar volume. In particular, similar solubility parameters between a polymer and a nonpolar composition can be found when the absolute value of the difference between their solubility parameters is less than about 1 $(cal/cm^3)^{1/2}$ (see also Tables 3-5 herein). A skilled person will realize that the ability of the backbone to dissolve in the non-polar composition can be verified, for example, by placing an amount of the homopolymer or copolymer to be used as the backbone of the associative polymer in a host liquid as herein described, and observing whether or not it dissolves under appropriate conditions of temperature and agitation that are identifiable to a skilled person.

In some embodiments, the backbone of associative polymers as herein described can be substantially soluble in a nonpolar composition when the difference in solubility parameters gives rise to a Flory-Huggins interaction parameter ($\chi$) of about 0.5 or less. In particular, z can be determined by the following empirical relationship:

$$\chi = \chi_s + \chi_H \approx 0.34 + \frac{v_0}{RT}(\delta_1 - \delta_2)^2$$

where $\chi_s$ is the entropic part of the interaction between the associative polymer and nonpolar composition (generally assigned an empirical value of 0.34, as would be apparent to a skilled person), $\chi_H$ is the enthalpic part of the interaction, $v_0$ is the molar volume of the nonpolar composition, $\delta_1$ is the solubility parameter of the polymer, and $\delta_2$ is the solubility parameter of the host. Additional exemplary empirical solubility parameters are identifiable by a skilled person (see, e.g., [9] and other available references known or identifiable by one skilled in the art) An exemplary solubility determination of the backbone of an associative polymer according to the disclosure with an exemplary non-polar composition is reported in Example 12. Similarly, a skilled person can determine if other associative polymer backbones would be substantially soluble in other non-polar compositions by applying the same calculations using the particular solubility parameters for the particular non-polar composition.

In embodiments herein described, associative polymers are polymers having a non-polar backbone and functional groups presented at ends of the non-polar backbone and in particular at two or more ends of the non-polar backbone.

The term "functional group" as used herein indicates specific groups of atoms within a molecular structure that are responsible for the characteristic physical and/or chemical reactions of that structure and in particular to physical and/or chemical associative interactions of that structure. As used herein, the term "corresponding functional group" or "complementary functional group" refers to a functional group that can react, and in particular physically or chemically associate, to another functional group. Thus, functional groups that can react, and in particular physically or chemically associate, with each other can be referred to as corresponding functional groups. In some embodiments herein described functional end groups of polymers to be added to a same non-polar compositions are corresponding functional groups in the sense of the present disclosure.

In particular, exemplary functional groups can include such groups as carboxylic acids, amines, and alcohols, and also molecules such as, for example, diacetamidopyridine, thymine, the Hamilton Receptor (see, e.g. [10]), cyanuric acid, and others identifiable to a skilled person. In particular, some of the exemplary functional groups can form pairs of complementary functional groups, for example, carboxylic acids with other carboxylic acids, carboxylic acids with amines, alcohols with amines, alcohols with carboxylic acids, diacetamidopyridine with thymine, the Hamilton Receptor with cyanuric acid, and others identifiable to a skilled person (see, e.g., FIG. 4).

In particular, in some embodiments, functional groups as herein described can be synthesized by installation of other functional groups onto the backbone of the associative polymers at a plurality of appropriate ends as herein described and transformed according to methods identifiable to a skilled person (see, e.g. [11]). In particular, in some of those embodiments the installation can be performed in at least two ends of the associative polymers. More particularly, installation at an end of the polymer can be performed by installation of the functional group on the terminal monomer of the polymer backbone, or on an internal monomer within a range of approximately 1 to 100 monomers from the terminal monomer.

In associative polymer herein described, a number of the functional groups presented on ends of the backbone is formed by "associative functional groups" (herein also indicated as FGas) which are functional group able to associate with each other and/or with corresponding functional groups in other associative polymers in a same non-polar composition with an association constant (k) in a range $0.1 < \log_{10} k < 18$ (preferably $2 < \log_{10} k < 18$), so that the strength of each associative interaction is less than that of a covalent bond between backbone atoms.

In particular in associative polymer herein described associative functional groups are capable of undergoing an associative interaction one with another with an association constant (k)

$$k(M^{-1}) \geq \frac{\frac{4}{3}\pi(R_g^2)^{\frac{3}{2}} N_a}{n_F} \times 10^{-23}$$

in which $R_g$ is the value of the radius of gyration of the associative polymer in the non-polar composition in nanometers, $N_a$ is Avogadro's constant; and $n_F$ is the average number of associative functional groups per polymer molecule in the associative polymer.

In some embodiments, associative polymers can further comprise derivatizable functional group (herein also indicated as FGd) presented at one or more ends of the at least two ends of the backbone. The term "derivatizable functional groups" refers to functional groups that cannot form associative interactions one with another or with an associative functional group in the non-polar composition and can undergo a derivatization reaction. The term "derivatization" is commonly referred to a technique in chemistry that transforms a chemical compound into a product of similar chemical structure, also called a derivative. A derivatizable functional groups refer to a specific type of functional groups that participate in the derivatization reaction and transform a polymer to its derivative having different chemical and/or physical properties such as reactivity, solubility, boiling point, melting point, aggregate state or chemical composition. Derivatizable functional groups can be used in attach additional functional moieties (e.g. polydrugs see Example 73) of the polymer of interest. Exemplary derivatizable functional groups FGd suitable for the associative polymers described herein are typically non-polar FG that do not participate in hydrogen bonding and/or metal ligand coordination interactions, and possibly allow coupling of functional moieties to the polymer. Exemplary derivatizable functional groups comprise an azido group, an alkynyl group, a thiol group, a vinyl group, a maleimide group, and additional groups identifiable by a skilled person (see e.g. FIG. 20 and FIG. 21)

In particular, in some embodiments, the at least two ends of the associative polymers herein described presenting an associative functional group in the sense of the disclosure, identify at least two positions in the linear, branched or hyperbranched polymer backbone of the associative polymer that are separated by an internal span that has a length of at least 2,000 backbone bonds, or an internal span between functional groups with a weight average molar mass not less than 100,000 g/mol. In embodiments herein described installation is performed so that the functional groups are presented on the polymer.

The terms "present" and "presented" as used herein with reference to a compound or functional group indicates attachment performed to maintain the chemical reactivity of the compound or functional group as attached. The term "attach" or "attached" as used herein, refers to connecting or uniting by a bond, link, force or tie in order to keep two or more components together, which encompasses either direct or indirect attachment where, for example, a first molecule is directly bound to a second molecule or material, or one or more intermediate molecules are disposed between the first molecule and the second molecule or material.

In particular, groups presented "at an end" of the polymer backbone can comprise groups attached to a terminal monomer of a polymer or to a monomer less than 100 monomers from a terminal monomer of the polymer based on the specific structure and configuration of the polymer as will be understood by a skilled person upon reading of the present disclosure.

Figure 2A:
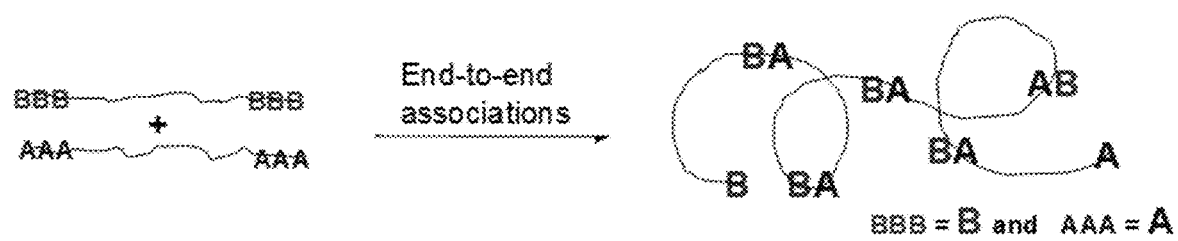
FIGS. 2A-2B show a schematic illustration of end to end association in associative polymers herein described.
Figure 2B:
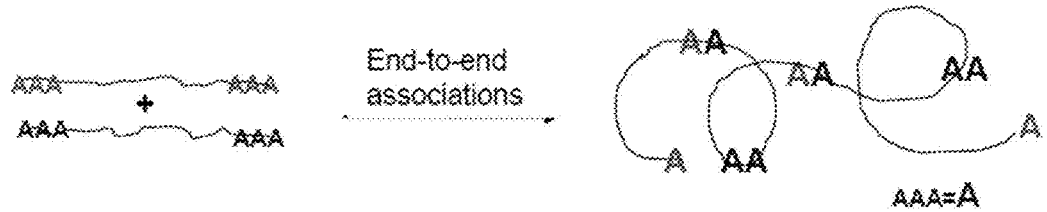

In various embodiments, functional end groups of associative polymers herein described are able to associate in a donor/acceptor association and/or in a self-association (FIG. 1 and FIG. 2). In the donor/acceptor association the donor and acceptor can be stoichiometric (e.g. equal numbers of donor and acceptor functional groups) or non-stoichiometric (e.g. more donor groups than acceptor groups or vice versa).

In various embodiments, the self-associative polymers, the backbone can be linear or branched and following association of the associative functional end groups the self-associating polymer can form various supramolecular architectures (see Example 1). In particular in some embodiments the backbone length can be such that the backbone has a weight-average molecular weight of 250,000 g/mol and more for individual chains.

More particularly, in various embodiments, the backbone can be a nonpolar linear, branched or hyperbranched polymer or copolymer (e.g. substituted or unsubstituted polydienes such as poly(butadiene) (PB) and poly(isoprene), and substituted or unsubstituted polyolefins such as polyisobutylene (PIB) and ethylene-butene copolymers, poly(norbornene), poly(octene), polystyrene (PS), poly(siloxanes), polyacrylates with alkyl side chains, polyesters, and/or polyurethanes) providing a number of flexible repeat units between associative functional end groups. In some embodiments, the weight average molar mass ($M_w$) of the associative polymer can be equal to or lower than about 2,000,000 g/mol and in particular can be between about 100,000 g/mol and about 1,000,000 g/mol.

In particular, in some embodiments, the backbone and associative functional end groups can be selected to have a ratio of carbon atoms to heteroatoms greater than about 1000:1 in the associative polymers. For example, in some embodiments, a skilled person can ensure that the heteroatom content is so low (e.g. greater than 10,000:1) as to not affect burning (e.g. the emissions produced by burning a fuel composition that contains some associative polymers). In some embodiments, the associative polymer can comprise functional groups within the backbone as shown schematically in FIG. 6 and, therefore, in a location not limited to the functional groups at one or more end of the polymer backbone while still maintaining a ratio of carbon atoms to heteroatoms greater than about 1000:1.

In some embodiments associative polymers herein described and indicated as framing associative polymer, comprise associative functional groups presented at two or more ends of at least two ends of the backbone. In some embodiments associative polymers herein described and indicated as capping associative polymer, comprise an associative functional group presented at one end of the at least two ends of the backbone.

In embodiments herein described, the framing associative polymer can be used to control physical and/or chemical properties and in particular rheological properties of a non-polar composition alone or in combination with up to about 20% capping associative polymers. In particular in embodiments where capping associative polymers are combined with framing associative polymers, the ability of the framing associative polymers to control the properties of a non-polar composition is improved with respect to a comparable composition comprising framing associative polymers only (e.g. e.g. a 10% improved drag reduction). In some of those embodiments, the use of capping associative polymers in combination with framing associative polymers allows use of a reduced amount of framing associative polymers (e.g. 10%)

In embodiments herein described framing associative polymer and capping associative polymer can be linear, branched or hyperbranched polymers with various structures as will be understood by a skilled person In particular embodiments, associative polymers herein described can comprise one or more structural units of formula [[FG-chain⫟[node]$_z$⫟(I) and optionally the structural unit of formula ⫟⫟node⫟⫟chain]⫟ (II) wherein:

FG is a functional group, which can comprise an associative functional group FGa with one or more associative moieties such that the functional group are capable of undergoing an associative interaction with each other with an the association constant (k) in a range $0.1 < \log_{10} k < 18$ (preferably $2 < \log_{10} k < 18$), so that the strength of each associative interaction is less than that of a covalent bond between backbone atoms, or FG can comprise a derivatizable functional group FGd with one or more moieties capable of undergoing derivatization;

chain is a non-polar polymer substantially soluble in a non-polar composition, the polymer having formula:

$$R_1\text{-}[A]_n R_2 \quad (III)$$

wherein:

A is a chemical and in particular an organic or silicone moiety forming the monomers of the polymer;

$R_1$ and $R_2$ are independently selected from any carbon or silicon based or organic group with one of $R_1$ and $R_2$ linked to an FG or a node and the other one of $R_1$ and $R_2$ linked to an FG or a node; and n is an integer$\geq 1$;

z is 0 or 1, depending on the nature of the chemical link between a unit of Formula (I) or Formula (II) and one or more units of Formula (I) and/or Formula (II);

node is a covalently linked moiety linking one of $R_1$ and $R_2$ of at least one first chain with one of the $R_1$ and $R_2$ of at least one second chain;

and wherein the FG, chain and node of different structural units of the polymer can be the same or different.

In particular, in associative polymers herein described including structural units of formula (I), FG groups presented "at an end" of the polymer backbone can comprise groups attached to either a terminal monomer of the chain or to a monomer less than 5% and possibly less than 1% of the total number of monomers of the chain from the terminal monomer of the chain in a structural unit of Formula I).

Associative polymers and in particular framing associative polymers and capping associative polymers in accordance with the present disclosure can comprise one or more of the structural units according to Formula (I) and/or Formula (II) in various configurations as would be apparent to a skilled person upon reading of the present disclosure.

For example in some embodiments herein described framing associative polymers comprise at least two structural units of Formula (I) wherein FG is an FGa. In some embodiments, framing polymers herein described can comprise additional structural units of Formula (I) and/or Formula (II) possibly presenting additional FGas.

In some embodiments herein described, capping associative polymers comprise one structural unit of Formula (I) wherein FG is an FGa. In some embodiments, the capping associative polymers can comprise additional structural units of Formula (II).

In some embodiments, framing associative polymers herein described can be formed by three or more structural units of Formula (I), wherein at least two of the structural units of Formula (I) are attached one to another with a structural unit of formula ⫟⫟node⫟⫟chain]⫟ (II) and wherein each [node] attaches three structural unit of Formula (I). In some of those embodiments, all the FGs are FGas. In some of those embodiments, structural unites of Formula (I) can be distanced from one another.

In some embodiments, the framing associative polymer can be formed by two structural units of Formula (I) wherein in the first structural unit z is 0 and in the second structural unit z is 1 and the node of the second structural unit links to one of R1 and R2 of the first structural unit thus forming a linear polymer. In some of those embodiments, the associative polymer is a framing associative polymer and the FGs are FGas.

In polymers comprising structural units of Formula (I) and, optionally, structural units of Formula (II), the longest span of the polymer is of the form FG-chain-node-chain-FG in the case of polymers that contain only structural units of Formula (I), or of the form FG-chain-node-[chain-node]$_n$-chain-FG for chains that include both types of units. Knowledge of the mean value of the length of the —chain— units can be used to estimate the average length of the longest span.

In the synthesis of branched polymers, the method of synthesis often controls the type and extent of branching. In the case of polymers that contain only structural units of Formula (I), the architecture is either linear or star-type. If the average degree of polymerization of the —chain— units is $N_c$, the average span of the polymer is $2N_c$ for linear and star polymers having a modest number of arms (e.g, 6 arms, or another number that results in no crowding). For a polymer that has first generation branches only (H-shaped or comb-shaped polymers), the longest span is simply related to the number of structural units of Formula (II) that separate the structural units of Formula (I) at each end of the H- or comb-shaped polymer. For example, an H-shaped polymer has an average number of monomer units in the longest span that is $3N_c$. If branch-on-branch structure is present, similar reasoning holds. For example, if the polymer has two generations of tri-functional branching, the longest span contains, on average, $4N_c$ repeat units.

An estimate of the number of monomer units in the longest span can be used to estimate the radius of gyration that a branched polymer will have, because $R_g$ of lightly branched polymers is only slightly greater than it would be for a linear chain of the same length as the longest span. In many applications of the associative polymers herein described, the polymer backbone is selected such that it dissolves substantially well in the host of interest. Therefore, good solvent conditions usually prevail. Using the scaling relationships for good solvent and the estimated degree of polymerization, useful estimates of the radius of gyration can be calculated. In turn, these can be used in preliminary design calculations. Such preliminary calculations can guide the selection of molecules to synthesize. Once the polymers have been prepared, the value of $R_g$ can simply be measured using such methods as static light scattering or viscometry.

In some embodiments herein described, FG indicates a functional group FGa that is capable of undergoing an associative interaction with another suitable functional group whereby the association constant (k) for an interaction between associating functional groups is in the range $0.1 < \log_{10} k < 18$, and in particular in the range $4 < \log_{10} k < 14$ so that the strength of each individual interaction is less than that of a covalent bond between backbone atoms. In particular, in some embodiments, the FGa can be chosen to have an association constant that is suitable for a given concentration of the associative polymer in the non-polar composition relative c*, as described herein. For example, a skilled person will realize that if the concentration of the associative polymer is high (e.g. greater than 3 c*), a lower $\log_{10} k$ value (e.g. about 4 to about 6) can be suitable, as can a higher $\log_{10} k$ value (e.g. about 6 to about 14). Additionally, a skilled person will also realize that if the concentration of associative polymer is low (e.g. less than 0.5 c*) a higher $\log_{10} k$ value (e.g. about 6 to about 14) can be suitable.

Exemplary FGaS comprise those that can associate through homonuclear hydrogen-bonding (e.g. carboxylic acids, alcohols), heteronuclear hydrogen-bonding donor-acceptor pairing (e.g. carboxylic acids-amines), Lewis-type acid-base pairing (e.g. transition metal center-electron pair donor ligand such as palladium (II) and pyridine, or iron and tetraaceticacid, or others identifiable to a skilled person as moieties that participate in metal-ligand interactions or metal-chelate interactions), electrostatic interactions between charged species (e.g. tetraalkylammonium-tetraalkylborate), pi-acid/pi-base or quadrupole interactions (e.g. arene-perfluoroarene), charge-transfer complex formation (e.g. carbazole-nitroarene), and combinations of these interactions (e.g. proteins, biotin-avidin). More than one type of FGs and in particular of FGas may be present in a given polymer structure.

In some embodiments, FGa can be selected among a diacetamidopyridine group, thymine group, Hamilton Receptor group (see, e.g. [10]), cyanuric acid group, carboxylic acid group, primary secondary or tertiary amine group, primary secondary and tertiary alcohol group, and others identifiable to a skilled person.

In some embodiments, in the structural unit of Formula (I), FG can be a derivatizable functional group (FGd). Exemplary derivatizable FGds comprise of an azido group, an alkynyl group, a thiol group, a vinyl group, a maleimide group, and additional groups identifiable by a skilled person (see e.g. FIG. 20 and FIG. 21).

In the structural unit of Formulas (I) and (II) a chain can be a polymer backbone that is substantially soluble in a liquid host that has a dielectric constant equal to or less than 5. Such chains can comprise for example polydienes such as poly(butadiene), poly(isoprene), polyolefins such as polyisobutlyene, polyethylene, polypropylene and polymers of other alpha olefins identifiable to a skilled person, poly (styrene), poly(acrylonitrile), poly(vinyl acetate), poly(siloxanes), substituted derivatives thereof, and copolymers of these.

In the structural unit of Formulas (I) and (II) a node can be a connecting unit between one or more and in particular two or more [FG-chain] units such that the total molecular structure is substantially terminated by FG species (e.g., a plurality of the chain ends have a FG less than 100 repeat units from the chain end). In some embodiments, the simplest such polymer is a linear telechelic: two [FG-chain] units with their chains connected end-to-end at a node: [FG-chain]-node-[chain-FG] or FG-chain-FG. Alternative branched, hyperbranched, star, brush, partially-cross linked or other multi-armed polymer structures can also be used, provided that ends and/or other regions of the polymer chain are functionalized according to the present disclosure. In particular, a skilled person will understand from a reading of the present disclosure the term "functionalized" according to the present disclosure can be understood to mean that the functional groups can be at the end of the polymer chains or other polymer structures, or at different regions within the polymer chain (see, e.g., FIGS. 5 and 6).

In particular, in certain cases, the nodes can comprise one or more FG units formed by FGa such that some degree of associative functionality is present in the internal polymer structure. A node is formed by any covalently bound group such as organic, siloxane, and additional group identifiable by a skilled person. In particular, a node can link two or more chains through suitable covalent bonds and more particularly form branched polymers wherein a node can link two to 10 chain ┤┤ node ┤┤ chain ┤ (II) (see e.g. FIG. 5). More than one type of nodes may be present in a given polymer structure. In some embodiments the node can be a tertiary carbon, a cycloaliphatic moiety or an aliphatic chain.

In particular in some embodiments, the chain can have a formula $R_1[A]n-R_2$ (III) in which A is a chemical moiety suitable to be used as monomer and n can indicate the degree of polymerization of the chain. In some embodiments, n can be an integer equal to or greater than 200 and, in particular, equal to or greater than 800. In some embodiments A can be an organic moiety having secondary carbon atoms, tertiary carbon atoms and/or quaternary carbon atoms, as will be understood by a skilled person. In some of those embodiments A can be an organic moiety comprising up to 10% of tertiary carbon atoms.

In some embodiments particular A can be a diene, olefin, styrene, acrylonitrile, methyl methacrylate, vinyl acetate, dichlorodimethylsilane, tetrafluoroethylene, acids, esters, amides, amines, glycidyl ethers, isocyanates and additional monomers identifiable by a skilled person. The term "olefins" as used herein indicates two carbons covalently bound to one another that contain a double bond (sp2-hybridized bond) between them. Olefins include alpha olefins and internal olefin.

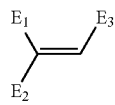

E1, E2 and E3 are selected independently from hydrogen and linear, branched or cyclic C1-C24 alkyl, preferably C1-C12 alkyl, more preferably C1-C8 alkyl including methyl, ethyl, butyl, propyl, hexyl, and ethylhexyl.

In particular, a skilled person will realize that the particular moieties used as monomers can give rise to polymer backbones that are suitable for combination with particular types of nonpolar compositions. For example, styrene monomers, olefin monomers, and in particular diene monomers can form polymers for very non-polar compositions (e.g. compositions with a dielectric constant of 1.5-2.5); amide, ester, epoxy, and urethanes can form polymers for nonpolar compositions that have somewhat greater dielectric constants (e.g., in the range 2.5-5); and fluorocarbon monomers and silicone monomers can form polymers for fluorous media. A skilled person will understand that additional types of monomers would be suitable for other types of nonpolar compositions.

In some embodiments, A in Formula (III) can be a moiety selected to provide a chain of formula (IV):

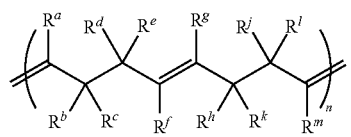

wherein $R^a$-$R^m$ are independently selected from hydrogen, $C_1$-$C_{12}$ substituted or unsubstituted alkyl, cycloalkyl, alkeneyl, cycloalkenyl, alkynyl, cycloakynyl, and aryl groups and n is in the range 200-20,000 and, in particular, in the range from 1000-10,000.

In some embodiments, A in formula (III) can be a moiety selected to provide a chain of formulas (V)-(VIII):

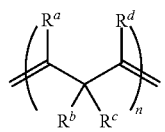

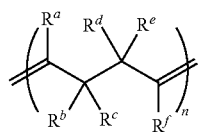

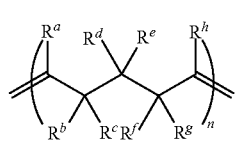

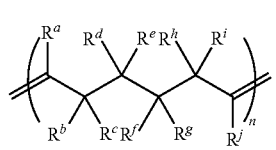

wherein $R^a$-$R^j$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-20,000.

In some embodiments, A in formula (III) can be a moiety selected to provide a chain of formula (IX):

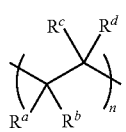

wherein $R^a$-$R^d$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-40,000.

In some embodiments, A in formula (III) can be a moiety selected to provide a chain of formula (X):

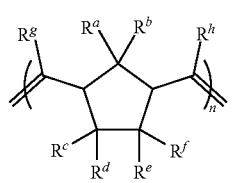

wherein $R^a$-$R^h$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-20,000.

In some embodiments, A in formula (III) can be a moiety selected to provide a chain of formula (XI):

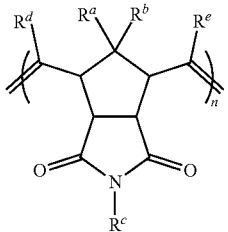

(XI)

wherein $R^a$-$R^e$ are independently selected from the group consisting of hydrogen, $C_1$-$C_{12}$ substituted or unsubstituted alkyl, cycloalkyl, alkenyl, cycloalkenyl, alkynyl, cycloakynyl, and aryl groups and n is 1000-20,000.

In embodiments of the nodes of Formula (III) $R_1$ and $R_2$ can be chemical moieties independently selected and capable of forming a covalent bond. In some embodiments, either $R_1$ or $R_2$ of at least one first chain can be linked to one of the $R_1$ and $R_2$ of at least one second chain through a node. In some embodiments, a node can comprise functional groups such as arenes, perfluoroarenes, groups containing oxygen, groups containing nitrogen and groups containing phosphorus and sulfur all identifiable by a skilled person. In particular, functional groups suitable for nodes can comprise a carboxylic acid, amine, triarylphosphine, azide, acetylene, sulfonyl azide, thio acid and aldehyde. In particular, for example, in forming covalent links between node and chain and possibly between node and functional group a first chemical moiety and a second corresponding chemical moiety can be selected to comprise the following binding partners: carboxylic acid group and amine group, sulfonyl azide and thio acid, and aldehyde and primary amine. Additional chemical moieties can be identified by a skilled person upon reading of the present disclosure. Reference is also made to the exemplary nodes of Example 11.

In some embodiments, $R_1$ and/or $R_2$ can be $R_1$ and $R_2$ are independently selected from a divalent group or atom.

In some embodiments where A is a moiety selected to provide a chain of formula (IV)-(VIII), (X), or (XI), $R_1$ and/or $R_2$ can be a moiety of formula (XII):

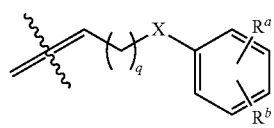

(XII)

wherein:
q is 1 to 18;
X is selected from the group consisting of $CH_2$, O, and S; and
$R^a$ and $R^b$ are independently hydrogen and/or a moiety of formula XIII-XVIII:

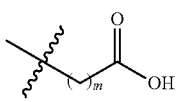

(XIII)

(XIV)

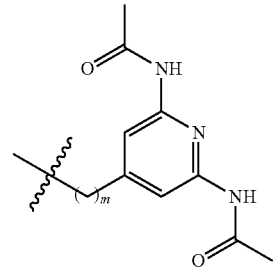

(XV)

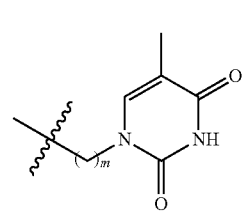

(XVI)

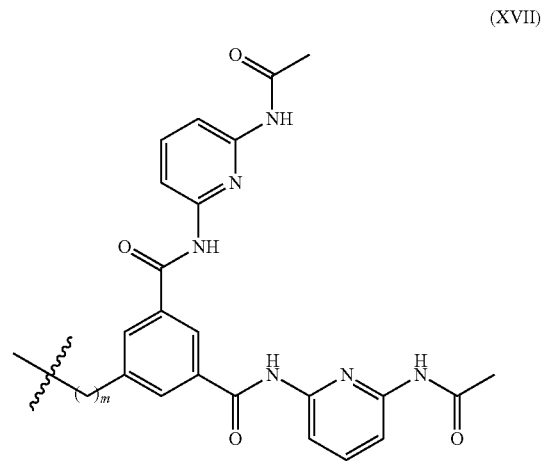

(XVII)

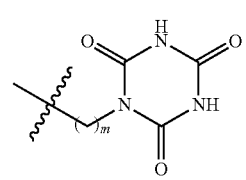

(XVIII)

provided that at least one of $R^a$ and/or $R^b$ is not hydrogen. In particular $R^a$ and $R^b$ can be FGs connected to the chain through $R_1$ or $R_2$ of Formula XII.

In some embodiments where A is a moiety selected to provide a chain of formula (IV)-(VIII), (X), or (XI), $R_1$ and/or $R_2$ can be a moiety of formula (XX):

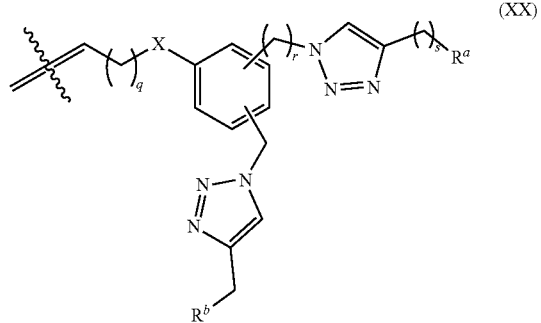

(XX)

wherein:

q is 1 to 18;

X is selected from the group consisting of $CH_2$, O, and S; and $R^a$ and $R^b$ are independently a moiety of formula (XIII)-(XVIII) as described herein. In particular $R^a$ and $R^b$ can be FGs connected to the chain through $R_1$ or $R_2$ of Formula (XX).

In some other embodiments where A is a moiety selected to provide a chain of formula (IV)-(VIII), (X), or (XI), $R_1$ and/or $R_2$ can be a moiety of formula (XX):

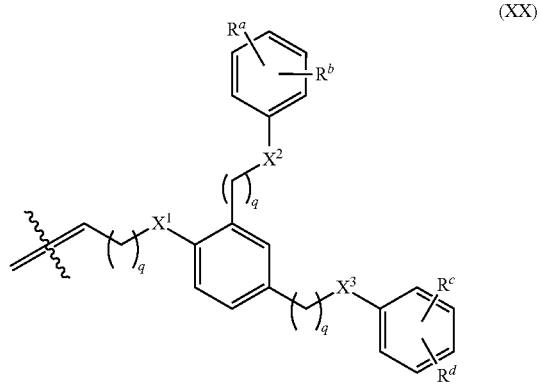

(XX)

wherein:

q is 1 to 18;

$X^1$, $X^2$, and $X^3$ are independently selected from the group consisting of $CH_2$, O, and S; and $R^a$-$R^d$ are independently hydrogen and/or a moiety of formula (XIII)-(XVIII) as described herein; provided that at least one of $R^a$, $R^d$, $R^c$, and/or $R^b$ is not hydrogen. In particular $R^a$, $R^b$, $R^c$ and $R^d$ can be FGs connected to the chain through $R_1$ or $R_2$ of Formula (XX).

In some other embodiments where A is a moiety selected to provide a chain of formula (IV)-(VIII), (X), or (XI), $R_1$ and/or $R_2$ can be a moiety of formula (XXI):

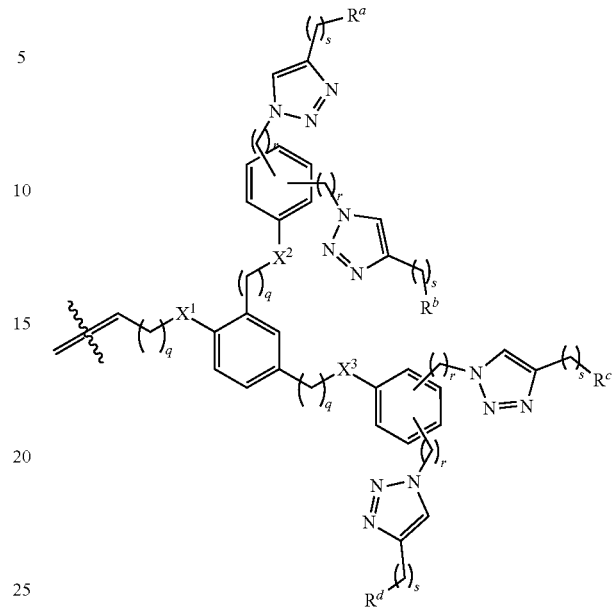

(XXI)

wherein:

q, r and s are independently 1 to 18;

$X^1$, $X^2$, and $X^3$ are independently selected from the group consisting of $CH_2$, O, and S; and $R^a$-$R^d$ are independently hydrogen and/or a moiety of formula (XIII)-(XVIII) as described herein; provided that at least one of $R^a$, $R^b$ $R^c$, and/or $R^d$ is not hydrogen. In particular $R^a$, $R^b$, $R^c$ and $R^d$ can be FGs connected to the chain through $R_1$ or $R_2$ of Formula (XXI).

In some embodiments nodes can also present additional groups for binding with FG which can be introduced at the node according to some embodiments. In some embodiments nodes comprise an organic moiety, in some embodiments nodes comprise non organic moieties such as $-\!\!-\!\!\text{Si}\!\!-\!\!\text{O}\!\!-\!\!$ and additional moieties identifiable by a skilled person.

In some embodiments where A is a moiety selected to provide a chain of formula (IX) $R_1$ and/or $R_2$ can be a moiety of formula (XXII):

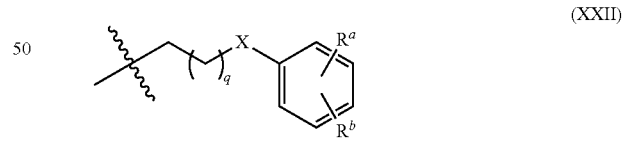

(XXII)

wherein:

q is 1 to 18;

X is selected from the group consisting of $CH_2$, O, and S; and $R^a$ and $R^b$ are independently H and/or a moiety of formula (XIII)-(XVIII) as described herein, provided that at least one of $R^a$ and/or $R^b$ is not H. In particular, $R^a$ and $R^b$ can be FGs connected to the chain through $R_1$ or $R_2$ of Formula (XXII).

In some embodiments where A is a moiety selected to provide a chain of formula (IX) $R_1$ and/or $R_2$ can be a moiety of formula (XXIII):

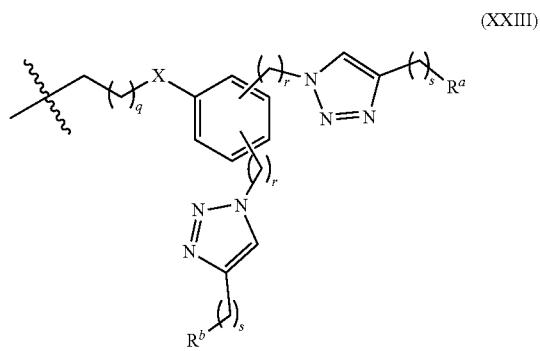

(XXIII)

wherein:

q is 1 to 18;

X is selected from the group consisting of $CH_2$, O, and S; and $R^a$ and $R^b$ are independently a moiety of formula (XIII)-(XVIII) as described herein. In particular, $R^a$ and $R^b$ can be FGs connected to the chain through $R_1$ or $R_2$ of Formula (XXIII).

In some other embodiments where A is a moiety selected to provide a chain of formula (IX) $R_1$ and/or $R_2$ can be a moiety of formula (XXIV):

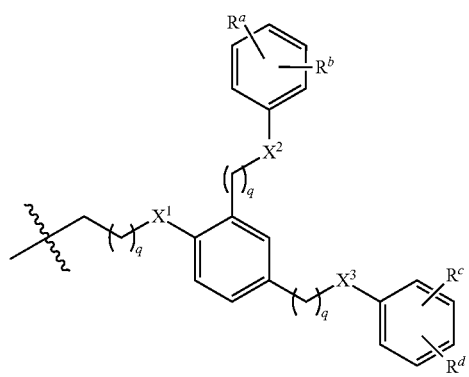

(XXIV)

wherein:

q is 1 to 18;

$X^1$, $X^2$, and $X^3$ are independently selected from the group consisting of $CH_2$, O, and S; and $R^a$-$R^d$ are independently H and/or a moiety of formula (XIII)-(XVIII) as described herein; provided that at least one of $R^a$, $R^b$, $R^c$, and/or $R^d$ is not H. In particular $R^a$, $R^b$, $R_c$ and $R^d$ can be FGs connected to the chain through $R_1$ or $R_2$ of Formula (XXIV).

In some other embodiments where A is a moiety selected to provide a chain of formula (IX) $R_1$ and/or $R_2$ can be a moiety of formula (XXV):

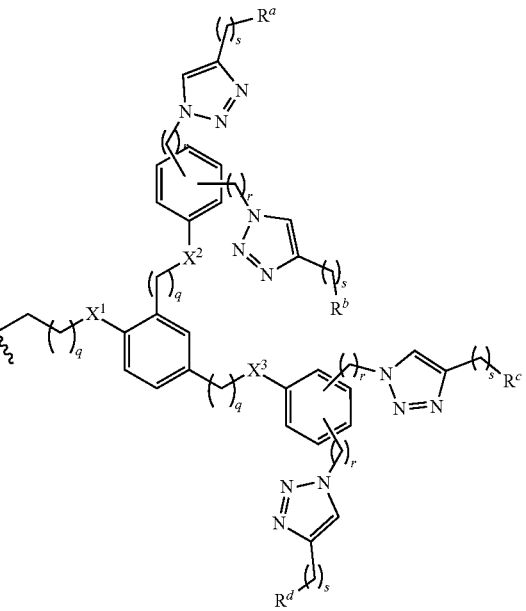

(XXV)

wherein:

q, r and s are independently 1 to 18;

$X^1$, $X^2$, and $X^3$ are independently selected from the group consisting of CH2, O, and S; and $R^a$-$R^d$ are independently H and/or a moiety of formula (XIII)-(XVIII) as described herein; provided that at least one of $R^a$, $R^b$, $R^c$, and/or $R^d$ is not H. In particular $R^a$, $R^b$, $R^c$ and $R^d$ can be FGs connected to the chain through $R_1$ or $R_2$ of Formula (XXV).

In some other embodiments where A is a moiety selected to provide a chain of formula (IX) $R_1$ and/or $R_2$ can be a moiety of formula (XXVI):

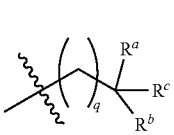

(XXVI)

wherein:

q is 1-18;

$R^a$-$R^b$ are independently H and/or a moiety of formula (XIII)-(XVIII) as described herein; and $R^c$ is hydrogen or $C_1$-$C_{12}$ substituted or unsubstituted alkyl; provided that at least one of $R^a$, $R^b$, and/or $R^c$ is not H. In particular, $R^a$, $R^b$, and $R^c$ can be FGs connected to the chain through $R_1$ or $R_2$ of Formula (XXVI).

In some other embodiments where A is a moiety selected to provide a chain of formula (IX) $R_1$ and/or $R_2$ can be a moiety of formula (XXVII):

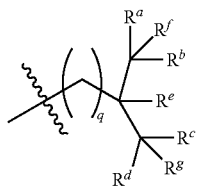

(XXVII)

wherein:

q is 1 to 18;

$R^a$-$R^d$ are independently H and/or a moiety of formula (XIII)-(XVIII) as described herein; and $R^f$-$R^g$ are independently hydrogen or $C_1$-$C_{12}$ substituted or unsubstituted alkyl; provided that at least one of $R^a$, $R^b$, $R^c$, and/or $R^d$ is not H. In particular, $R^a$, $R^b$, $R^c$ and $R^d$ can be FGs connected to the chain through $R_1$ or $R_2$ of Formula (XXVII).

In particular in some embodiments the [chain-node] segments have weight average molecular weight equal to or greater than 10,000 g/mol. In some embodiments the span of [chain-node]$_m$ between FGs has average molar mass>50,000 g/mol (in particular when dispersion in the host composition despite the "solvent-phobic" FGas is desired). In some embodiments, the largest span of the molecule can be equal to or less than 500,000 g/mol (for example, when resistance to shear degradation is desired). In some embodiments the largest span of the molecule, expressed as weight average molecular weight can be equal to or less than 1,000,000 g/mol.

In some embodiments, associative polymers herein described can be telechelic.

In some embodiments, associative polymers herein described have a total polymer molecular weight is $M_w \le 2,000,000$ g/mol and in particular can be between 100,000 g/mol and 1,000,000 g/mol. In some embodiments the largest span between nodes is less than 500,000 g/mol in particular when the associative polymers are branched polymers.

In some embodiments, selection of molecular weight for an associative polymer herein described can be performed in view of factors herein described and in particular values of the binding constant in view of available or desired FGas, and a desired concentration in view of effect to be controlled. Additional factors that can be considered comprise a desired viscosity of the host composition (e.g. high $M_w$ at low concentration to minimize impact on the shear viscosity of the host and lower $M_w$ at high concentration to increased impact on the shear viscosity of the host), a desired density of FGs and in particular FGas presented in connection with a desired effect (e.g. in order to obtain gelation, concentrations near or greater than the overlap concentration of the polymers are preferred), and duration of the control in view of the shear degradation (e.g. if a longer duration of the control is desired, the longest span of the molecules can be reduced below the threshold chain length for shear degradation in the application of interest)

In some embodiments, associative polymers herein described can have a weight averaged molecular weight equal to or higher than about 100,000 g/mol.

In some embodiments, associative polymers herein described can have a weight averaged molecular weight between 400,000 to 1,000,000 g/mol.

In some embodiments, associative polymers herein described can have a weight averaged molecular weight between 630,000 g/mol to 730,000 g/mol.

In some embodiments, associative polymers herein described can have a weight averaged molecular weight between 100,000 g/mol to 300,000 g/mol.

In some embodiments, associative polymers herein described can have a weight averaged molecular weight between 300,000 g/mol to 700,000 g/mol In some embodiments, associative polymers herein described can have a weight averaged molecular weight between 700,000 g/mol to 1,000,000 g/mol.

In some embodiments, associative polymers herein described can have a weight averaged molecular weight between 1,000,000 g/mol to 2,000,000 g/mol.

In some embodiments associative polymers herein described can have an atomic composition with heteroatoms (i.e., other than C or H) present at less than 1 heteroatom per 1000 carbons. In some embodiments, heteroatoms are placed predominantly in correspondence of the functional groups.

In some embodiments associative polymers herein described can have a significant level of unsaturation (e.g. with a ratio of H to C less than 1.8), which can improve low temperature liquid behavior. However, fully-saturated chains can also be considered effective and are included in the scope of the current disclosure.

In various embodiments herein described, the associative polymers of the disclosure can interact to form supramolecular structures following interactions of the FGa having association constant (k) of from $0.1 < \log_{10} k < 18$ and in particular from $6 < \log_{10} k < 14$, in cases drag reduction and/or flow rate enhancement are desired.

In some embodiments, selection of binding constant for an associative polymer herein described can be performed in view of factors herein described and in particular values of $M_w$ desired, available or desired FGaS, and a desired concentration in view of effect to be controlled. Additional factors that can be considered comprise the specific host composition in which the polymer is used, and additional factors identifiable by a skilled person upon reading of the present disclosure.

In some embodiments, associative polymers herein described can have an association constant $2 \le \log_{10} k \le 18$.

In some embodiments, associative polymers herein described can have an association constant $4 \le \log_{10} k \le 14$.

In some embodiments, associative polymers herein described can have an association constant $4 \le \log_{10} k \le 12$.

In some embodiments, associative polymers herein described can have an association constant $6 \le \log_{10} k \le 14$.

In some embodiments, associative polymers herein described can have an association constant $6.9 \le \log_{10} k \le 7.8$ In some embodiments, associative polymers herein described can have an association constant $\log_{10} k \le 14$ in particular when the weight averaged molecular weight equal to or lower than about 2,000,000 g/mol In some embodiments, associative polymers herein described can have an association constant $5.5 \le \log_{10} k$ in particular when the weight average molecular weight equal to or higher than about 100,000 g/mol.)

In some embodiments, associative polymers herein described can have an association constant $7 \le \log_{10} k \le 9$, in particular when the weight averaged molecular weight is between 400,000 to 1,000,000 g/mol.

In some embodiments, associative polymers herein described can have an association constant $6.9 \le \log_{10} k \le 7.8$ in particular when the weight averaged molecular weight is between 630,000 g/mol to 730,000 g/mol.

In some embodiments, associative polymers herein described can have an association constant $6 \leq \log_{10} k \leq 14$, preferably $6 \leq \log_{10} k \leq 7.5$, in particular when the weight averaged molecular weight is between 100,000 g/mol to 300,000 g/mol.

In some embodiments, associative polymers herein described can have an association constant $6.9 \leq \log_{10} k \leq 14$, preferably $6.9 \leq \log_{10} k \leq 7.8$ in particular when the weight averaged molecular weight between 300,000 g/mol to 700,000 g/mol.

In some embodiments, associative polymers herein described can have an association constant $7 \leq \log_{10} k \leq 14$, and preferably $7 \leq \log_{10} k \leq 9$ in particular when the weight averaged molecular weight between 700,000 g/mol to 1,000,000 g/mol In some embodiments, associative polymers herein described can have an association constant $7.5 \leq \log_{10} k \leq 14$, preferably $7.5 \leq \log_{10} k \leq 12$, in particular when the weight averaged molecular weight between 1,000,000 g/mol to 2,000,000 g/mol. In particular, in embodiments herein described where drag reduction is desired in flows having a Reynolds number between 5,000 and 25000, polymers and related FGs can be selected to have an FGaS with an association constant between $4 \leq \log 10 k \leq 12$, and in particular $5.5 \leq \log 10 k \leq 12$ and in flows having a Reynolds number equal to or higher than 25,000 polymers and related FGs can be selected to have an association constant between: $6 \leq \log 10 k \leq 14$.

In particular, in embodiments of supramolecular structures, FGa associations can be due to, for example reversible noncovalent interaction between the associative polymers that enables a discrete number of molecular subunits or components to be assembled, typically with an individual interaction strength less than that of a covalent bond. Exemplary interactions include, for example, self-associative hydrogen bonds (H-bonds), donor-acceptor H-bonds, Brønsted or Lewis acid-base interactions, electrostatic interactions, pi-acid/pi-base or quadrupolar interactions, charge transfer complex formation, or other supramolecular interactions.

In various embodiments herein described, the associative polymers of the present disclosure can be used in connection with a non-polar composition to control rheological properties, such as drag reduction and/or flow rate enhancement, sizes, and/or size and size distribution the droplets of a fluid mist, and viscoelastic properties of the composition alone or in combination with other physical and/or chemical properties of the composition. In particular, in some embodiments, the non-polar compositions comprise a host composition and at least one framing associative polymer herein described.

The terms "host" and "host composition," as used herein, refer to a majority component in a non-polar composition in which the physical and/or chemical properties are sought to be controlled. In particular, the host or host composition can be a single substance such as a solvent like hexane or benzene, or the host or host composition can be a substance which is a mixture such as gasoline, diesel, olive oil, or kerosene. The host or host composition can also be a mixture such as a paint or ink.

In some embodiments, the host composition can be a hydrocarbon composition, a fluorocarbon compositions or a silicone composition, In some embodiments, the host composition can be a biofuel, a mineral oil, crude oils, pentane, hexane, cyclohexane, benzene, toluene, chloroform and diethyl ether, dimethyl ether, liquefied petroleum gas, liquid methane, butane, gasoline, kerosene, jet fuel and diesel fuel.

In particular, in non-polar compositions herein described a range of hosts can have dielectric constant less than 5, with hosts having dielectric constant less than 2.5 being particularly well suited to applications herein described as will be understood by a skilled person upon reading of the disclosure. Non-polar compositions with the above mentioned dielectric constants encompasses a wide range of liquids that are relevant to applications that comprise fuels (such as gasoline, kerosene, jet fuel, diesel and additional fuels identifiable by a skilled person), foods and pharmaceuticals (such as olive oil, linseed oil, castor oil and additional foods identifiable by a skilled person), solvents used as cleaning fluids (such as turpentine, toluene and additional solvents identifiable by a skilled person), and adhesive formulations (such as pinene and additional formulations identifiable by a skilled person).

In embodiments of non-polar composition of the present disclosure, the dielectric constant of a given host will vary with temperature, which can be taken into account by one skilled in the art.

Exemplary non-polar compositions, and in particular host liquids, with a dielectric constant less than 5 are illustrated in the table below (Table 1A). The table also provides exemplary hosts that can be recognized as unfavorable for the modified non-polar compositions herein described (see Table 1B).

TABLE 1A

| Entry | Fluid | Temperature/° C. | Dielectric constant ε |
|---|---|---|---|
| | Exemplary Favorable Hosts | | |
| 1 | Benzene | 20 | 2.3 |
| 2 | Carbon disulfide | | 2.64 |
| 3 | Carbon tetrachloride | 20 | 2.23 |
| 4 | Castor oil | 15.6 | 4.7 |
| 5 | Chloroform | 20 | 4.8 |
| 6 | Cotton seed oil | | 3.1 |
| 7 | Cumene | 20 | 2.4 |
| 8 | Decane | 20 | 2 |
| 9 | Dodecane | 20 | 2 |
| 10 | Ether | 20 | 4.3 |
| 11 | Fluorine refrigerant R-12 | 25 | 2 |
| 12 | Fluorine refrigerant R-22 | 25 | 2 |
| 13 | Furan | 25 | 3 |
| 14 | Gasoline | 21.1 | 2 |
| 15 | Heptane | 20 | 1.9 |
| 16 | Hexane | −90 | 2 |
| 17 | Jet fuel | 21.1 | 1.7 |
| 18 | Kerosene | 21.1 | 1.8 |
| 19 | Linoleic acid | 0 | 2.6-2.9 |
| 20 | Linseed oil | | 3.2-2.5 |
| 21 | Naphthalene | 20 | 2.5 |
| 22 | Octane | 20 | 2 |
| 23 | Olive oil | 20 | 3.1 |
| 24 | Palmitic acid | 71.1 | 2.3 |
| 25 | Pentane | 20 | 1.8 |
| 26 | Phenol | 10 | 4.3 |
| 27 | Pinene | 20 | 2.7 |
| 28 | Styrene | 25 | 2.4 |
| 29 | Terpinene | 21.1 | 2.7 |
| 30 | Toluene | | 2.0-2.4 |
| 31 | Turpentine (wood) | 20 | 2.2 |
| 32 | Vacuum (by definition) | | 1 |
| 32.1 | Cyclohexane | | 2.0 |
| 32.2 | Liquid methane | −280 | 1.7 |
| 32.3 | Liquid Butane | −1 | 1.4 |
| 32.4 | Heavy oil | | 3 |
| 32.5 | Petroleum oil | | 2.1 |
| 32.6 | Liquid asphalt | | 2.5-3.2 |

TABLE 1B

| Entry | Fluid | Temperature/° C. | Dielectric constant ε |
|---|---|---|---|
| | Exemplary Unfavorable Hosts | | |
| 33 | Acetone | 25 | 20.7 |
| 34 | Alcohol, ethyl (ethanol) | 25 | 24.3 |
| 35 | Alcohol, methyl (methanol) | 20 | 35.1 |
| 36 | Alcohol, propyl | 20 | 21.8 |
| 37 | Ammonia (aqua) | 20 | 15.5 |
| 38 | Aniline | 20 | 7.3 |
| 39 | Cresol | 17.2 | 10.6 |
| 40 | Ethylamine | 21.1 | 6.3 |
| 41 | Ethylene glycol | 20 | 37 |
| 42 | Furfural | 20 | 42 |
| 43 | Glycerine | | 47.68 |
| 44 | Glycerol | 25 | 42.5 |
| 45 | Hexanol | 25 | 13.3 |
| 46 | Hydrazine | 20 | 52 |
| 47 | Pyridine | 20 | 12 |

In particular, in some embodiments, host composition that have dielectric constant equal to or less than about 5 are pentane, hexane, cyclohexane, benzene, toluene, chloroform and diethylether. In some embodiments, which can be used for fuel applications host composition can also have dielectric constant less than 5, including liquified petroleum gas, liquid methane, butane, gasoline, kerosene, jet fuel and diesel fuel.

In embodiments, herein described polymer dielectric constants can further provide an indication of their compatibility with a chosen non-polar composition that is in the range indicated in above. Reference is made for example to the exemplary list provided in the table below (Table 2).

TABLE 2

| Plastic Material | Dielectric Constant - ε - |
|---|---|
| Acetal | 3.7-3.9 |
| Acrylic | 2.1-3.9 |
| ABS* | 2.9-3.4 |
| Polybutadiene | approximately 2 |
| Polycarbonate | 2.9-3.8 |
| Polyester, TP | 3.0-4.5 |
| Polypropylene | 2.3-2.9 |
| Polysulfone | 2.7-3.8 |
| Polydimethylsiloxane (Silicone Rubber) | 3.0-3.2 |
| Polyphenylene sulfide | 2.9-4.5 |
| Polyacrylate | 2.6-3.1 |

*ABS is Acrylonitrile Butadiene Rubber

In particular, in some embodiments, for a given host determined to have a dielectric constant within the threshold herein disclosed, at least one framing associative polymer and optionally one or more capping associative polymers herein described are selected that are substantially soluble in the host in accordance with the present disclosure.

In particular, appropriate associative polymers for a given host can be identified by a skilled person in view of the present disclosure. For example the backbone substantially soluble in the host composition can be identified by comparison of the solubility parameters (6) of the polymer backbone and host composition, as well as by determining the Flory-Huggins interaction parameter (z) from the solubility parameters according to calculations described herein. In an exemplary embodiment, one or more polymer-solvent pairs can have silicone backbones for use in one or more fluorocarbon liquids.

In particular, an exemplary reference providing solubility parameters is the website www.sigmaaldrich.com/etc/medialib/docs/Aldrich/General_Infonnation/polymer_solutions.Par.0 001.File.tmp/polymer_solutions.pdf at the time of filing of the present disclosure (see Tables 3-5). More particularly, a skilled person will know that Sigma-Aldrich and other chemical companies provide exemplary tables showing exemplary solubility paramenter values for various non-polar compositions and polymers. A skilled person can also refer to sources such as the Polymer Handbook to find solubility parameter values [9].

TABLE 3

Table II: Solubility Parameters for Plasticizers and Solvents (Alphabetical sequence)

| Solvent | δ (cal/cm³)$^{1/2}$ | H-Bonding Strength$^3$ | Solvent | δ (cal/cm³)$^{1/2}$ | H-Bonding Strength$^3$ |
|---|---|---|---|---|---|
| Acetone | 9.9 | m | Dioctyl sebacate | 8.6 | m |
| Acetonitrile | 11.9 | p | 1,4-Dioxane | 10.0 | m |
| Amyl acetate | 8.5 | m | Di(propylene glycol) | 10.0 | s |
| Aniline | 10.3 | s | Di(propylene glycol) monomethyl ether | 9.3 | m |
| Benzene | 9.2 | p | | | |
| Butyl acetate | 8.3 | m | Dipropyl phthalate | 9.7 | m |
| Butyl alcohol | 11.4 | s | Ethyl acetate | 9.1 | m |
| Butyl butyrate | 8.1 | m | Ethyl amyl ketone | 8.2 | m |
| Carbon disulfide | 10.0 | p | Ethyl n-butyrate | 8.5 | m |
| Carbon tetrachloride | 8.6 | p | Ethylene carbonate | 14.7 | m |
| Chlorobenzene | 9.5 | p | Ethylene dichloride | 9.8 | p |
| Chloroform | 9.3 | p | Ethylene glycol | 14.6 | s |
| Cresol | 10.2 | s | Ethylene glycol diacetate | 10.0 | m |
| Cyclohexanol | 11.4 | s | Ethylene glycol diethyl ether | 8.3 | m |
| Diamyl ether | 7.3 | m | Ethylene glycol dimethyl ether | 8.6 | m |
| Diamyl phthalate | 9.1 | m | Ethylene glycol monobutyl ether (Butyl Cellosolve ®) | 9.5 | m |
| Dibenzyl ether | 9.4 | m | | | |
| Dibutyl phthalate | 9.3 | m | Ethylene glycol monoethyl ether (Cellosolve ®) | 10.5 | m |
| Dibutyl sebacate | 9.2 | m | | | |
| 1,2-Dichlorobenzene | 10.0 | p | Furfuryl alcohol | 12.5 | s |
| Diethyl carbonate | 8.8 | m | Glycerol | 16.5 | s |
| Di(ethylene glycol) | 12.1 | s | Hexane | 7.3 | p |
| Di(ethylene glycol) monobutyl ether (Butyl Carbitol ®) | 9.5 | m | Isopropyl alcohol | 8.8 | m |
| | | | Methanol | 14.5 | s |

TABLE 3-continued

Table II: Solubility Parameters for Plasticizers and Solvents (Alphabetical sequence)

| Solvent | δ (cal/cm³)^(1/2) | H-Bonding Strength[3] | Solvent | δ (cal/cm³)^(1/2) | H-Bonding Strength[3] |
|---|---|---|---|---|---|
| Di(ethylene glycol) monoethyl ether (Carbitol ®) | 10.2 | m | Methyl amyl ketone | 8.5 | m |
|  |  |  | Methylene chloride | 9.7 | p |
| Diethyl ether | 7.4 | m | Methyl ethyl ketone | 9.3 | m |
| Diethyl ketone | 8.8 | m | Methyl isobutyl ketone | 8.4 | m |
| Diethyl phthalate | 10.0 | m | Propyl acetate | 8.8 | m |
| Di-n-hexyl phthalate | 8.9 | m | 1,2-Propylenecarbonate | 13.3 | m |
| Diisodecyl phthalate | 7.2 | m | Propylene glycol | 12.6 | s |
| N,N-Dimethylacetamide | 10.8 | m | Propylene glycol methyl ether | 10.1 | m |
| Dimethyl ether | 8.8 | m | Pyridine | 10.7 | s |
| N,N-Dimethylformamide | 12.1 | m | 1,1,2,2-Tetrachloroethane | 9.7 | p |
| Dimethyl phthalate | 10.7 | m | Tetrachloroethylene (perchloroethylene) | 9.3 | p |
| Dimethylsiloxanes | 4.9-5.9 | p |  |  |  |
| Dimethyl sulfoxide | 12.0 | m | Tetrahydrofuran | 9.1 | m |
| Dioctyl adipate | 8.7 | m | Toluene | 8.9 | p |
| Dioctyl phthalate | 7.9 | m | Water | 23.4 | s |

[2]'Polymer Handbook', Eds. Brandrup, J.; Immergut, E. H.; Grulke, E. A., 4th Edition, John Wiley, New York, 1999, VII/675-711. Aldrich Catalog Number
[3]H-Bonding: p = poor; m = moderate; s = strong

TABLE 4

Table III: Solubility parameters (δ) for Plasticizers and Solvents (Increasing δ value sequence)

| Solvent | δ (cal/cm³)^(1/2) | H-Bonding Strength[4] |
|---|---|---|
| Dimethylsiloxanes | 4.9-5.9 | p |
| Diisodecyl phthalate | 7.2 | m |
| Hexane | 7.3 | p |
| Diamyl ether | 7.3 | m |
| Diethyl ether | 7.4 | m |
| Dioctyl phthalate | 7.9 | m |
| Butyl butyrate | 8.1 | m |
| Ethyl amyl ketone | 8.2 | m |
| Ethylene glycol diethyl ether | 8.3 | m |
| Butyl acetate | 8.3 | m |
| Methyl isobutyl ketone | 8.4 | m |
| Methyl amyl ketone | 8.5 | m |
| Amyl acetate | 8.5 | m |
| Ethyl n-butyrate | 8.5 | m |
| Ethylene glycol dimethyl ether | 8.6 | m |
| Carbon tetrachloride | 8.6 | p |
| Dioctyl sebacate | 8.6 | m |
| Dioctyl adipate | 8.7 | m |
| Isopropyl alcohol | 8.8 | m |
| Diethyl carbonate | 8.8 | m |
| Propyl acetate | 8.8 | m |
| Diethyl ketone | 8.8 | m |
| Dimethyl ether | 8.8 | m |
| Toluene | 8.9 | p |
| Di-n-hexyl phthalate | 8.9 | m |
| Ethyl acetate | 9.1 | m |
| Diamyl phthalate | 9.1 | m |
| Tetrahydrofuran | 9.1 | m |
| Dibutyl sebacate | 9.2 | m |
| Benzene | 9.2 | p |
| Tetrachloroethylene (perchloroethylene) | 9.3 | p |
| Di(propylene glycol) monomethyl ether | 9.3 | m |
| Chloroform | 9.3 | p |
| Dibutyl phthalate | 9.3 | m |
| Methyl ethyl ketone | 9.3 | m |
| Dibenzyl ether | 9.4 | m |
| Ethylene glycol monobutyl ether (Butyl Cellosolve ®) | 9.5 | m |
| Di(ethylene glycol) monobutyl ether (Butyl Carbitol ®) | 9.5 | m |
| Chlorobenzene | 9.5 | p |
| Methylene chloride | 9.7 | p |
| Dipropyl phthalate | 9.7 | m |
| 1,1,2,2-Tetrachloroethane | 9.7 | p |
| Ethylene dichloride | 9.8 | p |
| Acetone | 9.9 | m |
| 1,2-Dichlorobenzene | 10.0 | p |
| Diethyl phthalate | 10.0 | m |
| Ethylene glycol diacetate | 10.0 | m |
| Di(propylene glycol) | 10.0 | s |
| Carbon disulfide | 10.0 | p |
| 1,4-Dioxane | 10.0 | m |
| Propylene glycol methyl ether | 10.1 | m |
| Di(ethylene glycol) monoethyl ether (Carbitol ®) | 10.2 | m |
| Cresol | 10.2 | s |
| Aniline | 10.3 | s |
| Ethylene glycol monoethyl ether (Cellosolve ®) | 10.5 | m |
| Pyridine | 10.7 | s |
| Dimethyl phthalate | 10.7 | m |
| N,N-Dimethylacetamide | 10.8 | m |
| Cyclohexanol | 11.4 | s |
| Butyl alcohol | 11.4 | s |
| Acetonitrile | 11.9 | p |
| Dimethyl sulfoxide | 12.0 | m |
| Di(ethylene glycol) | 12.1 | s |
| N,N-Dimethylformamide | 12.1 | m |
| Furfuryl alcohol | 12.5 | s |
| Propylene glycol | 12.6 | s |
| 1,2-Propylenecarbonate | 13.3 | m |
| Methanol | 14.5 | s |
| Ethylene glycol | 14.6 | s |
| Ethylene carbonate | 14.7 | m |
| Glycerol | 16.5 | s |
| Water | 23.4 | s |

[4]H-Bonding: p = poor; m = moderate; s = strong
Carbitol and Cellosolve are registered trademarks of Union Carbide Corp.

TABLE 5

Table IV: Solubility Parameters for Homopolymers[5]

| Repeating Unit (Alphabetical Sequence) | $\delta(cal/cm^3)^{1/2}$ | Repeating Unit (Increasing $\delta$ Value Sequence) | $\delta(cal/cm^3)^{1/2}$ |
|---|---|---|---|
| Acrylonitrile | 12.5 | Tetrafluoroethylene | 6.2 |
| Butyl acrylate | 9.0 | Isobutyl methacrylate | 7.2 |
| Butyl methacrylate | 8.8 | Dimethylsiloxane | 7.5 |
| Cellulose | 15.6 | Propylene oxide | 7.5 |
| Cellulose acetate (56% Ac groups) | 27.8 | Isobutylene | 7.8 |
| Cellulose nitrate (11.8% N) | 14.8 | Stearyl methacrylate | 7.8 |
| Chloroprene | 9.4 | Ethylene | 8.0 |
| Dimethylsiloxane | 7.5 | 1,4-cis-Isoprene | 8.0 |
| Ethyl acrylate | 9.5 | Isobornyl methacrylate | 8.1 |
| Ethylene | 8.0 | Isoprene, natural rubber | 8.2 |
| Ethylene terephthalate | 10.7 | Lauryl methacrylate | 8.2 |
| Ethyl methacrylate | 9.0 | Isobornyl acrylate | 8.2 |
| Formaldehyde (Oxymethylene) | 9.9 | Octyl methacrylate | 8.4 |
| Hexamethylene adipamide (Nylon 6/6) | 13.6 | n-Hexyl methacrylate | 8.6 |
| n-Hexyl methacrylate | 8.6 | Styrene | 8.7 |
| Isobornyl acrylate | 8.2 | Propyl methacrylate | 8.8 |
| 1,4-cis-Isoprene | 8.0 | Butyl methacrylate | 8.8 |
| Isoprene, natural rubber | 8.2 | Ethyl methacrylate | 9.0 |
| Isobutylene | 7.8 | Butyl acrylate | 9.0 |
| Isobornyl methacrylate | 8.1 | Propyl acrylate | 9.0 |
| Isobutyl methacrylate | 7.2 | Propylene | 9.3 |
| Lauryl methacrylate | 8.2 | Chloroprene | 9.4 |
| Methacrylonitrile | 10.7 | Tetrahydrofuran | 9.4 |
| Methyl acrylate | 10.0 | Methyl methacrylate | 9.5 |
| Methyl methacrylate | 9.5 | Ethyl acrylate | 9.5 |
| Octyl methacrylate | 8.4 | Vinyl chloride | 9.5 |
| Propyl acrylate | 9.0 | Formaldehyde (Oxymethylene) | 9.9 |
| Propylene | 9.3 | Methyl acrylate | 10.0 |
| Propylene oxide | 7.5 | Vinyl acetate | 10.0 |
| Propyl methacrylate | 8.8 | Methacrylonitrile | 10.7 |
| Stearyl methacrylate | 7.8 | Ethylene terephthalate | 10.7 |
| Styrene | 8.7 | Vinylidene chloride | 12.2 |
| Tetrafluoroethylene | 6.2 | Acrylonitrile | 12.5 |
| Tetrahydrofuran | 9.4 | Vinyl alcohol | 12.6 |
| Vinyl acetate | 10.0 | Hexamethylene adipamide (Nylon 6/6) | 13.6 |
| Vinyl alcohol | 12.6 | Cellulose nitrate (11.8% N) | 14.8 |
| Vinyl chloride | 9.5 | Cellulose | 15.6 |
| Vinylidene chloride | 12.2 | Cellulose acetate (56% Ac groups) | 27.8 |

[5]Values reported are for homopolymers of the Repeating Unit. Reported $\delta$ values vary with the method of determination and test conditions. Averaged values are given in this table.

In some embodiments, the host composition can be formed by crude oils, refined fuel, and in particular kerosene (e.g., Jet-A, Jet-A1, and military fuel JP-8), gasoline, and diesel and other refined fuels identifiable by a skilled person.

As used herein the term "refined" can be considered to have its usual meaning in the art. Thus, a refined hydrocarbon liquid composition is one that has been subjected to at least one process that is intended to purify it from a crude petroleum (crude oils/crudes) starting material. Thus, a refined fuel is a hydrocarbon liquid composition which has undergone at least one process that can be considered to be a distillation, upgrading or conversion process, that is known to a person of skill in the art. Typically, a refined fuel is one that has undergone more than one refining procedure in a refinery, such as a combination of distillation, upgrading and conversion. Therefore, in some instances the refined fuel composition can meet known, predetermined quality parameters. In some instances, a refined hydrocarbon liquid composition can also include chemical additives that have been introduced to meet desirable fuel specifications. Exemplary refined fuels comprise Jet A and Jet A1 which are a kerosene-type aviation fuel comprising a mixture of a large number of different hydrocarbons with carbon number distribution between about 8 and 16 (carbon atoms per molecule) identifiable by a skilled person. An additional exemplary refined fuel comprise JP-8 or JP8 (for "Jet Propellant 8") which is a kerosene type jet fuel, specified by MIL-DTL-83133 and British Defence Standard 91-87 also identifiable by a skilled person. In particular, in some embodiments, the associative polymer can be selected depending on the regime of flows where drag reduction and/or flow rate enhancement is desired as well as any other particular physical and/or chemical properties of the non-polar composition to be controlled.

In some embodiments the host composition can be formed by a mineral oil. The term "mineral oil" refers to various colorless, odorless, light mixture of higher alkanes from a mineral source. In some embodiments, mineral oil can be a liquid by-product of refining crude oil to make gasoline and other petroleum products. This type of mineral oil is a transparent, colorless oil composed mainly of alkanes and cycloalkanes, related to petroleum jelly and has a density of around 0.8 g/cm³. Three basic classes of mineral oils are alkanes, based on n-alkanes, naphthenic oils, based on cycloalkanes, and aromatic oils, based on aromatic hydrocarbons. Mineral oils can be in light or heavy grades, in which heavy grades mean higher viscosity. The viscosity of a mineral oil is correlated to its temperature, specifically, the higher the temperature, the lower the viscosity.

In particular, in some embodiments, the chemical and/or physical property can be controlled by controlling concentration of one or more framing associative polymers in the host composition relative to the overlap concentration c* of the one or more framing associative polymers in the host concentration. Accordingly one or more framing associative polymers can be comprised in the host in a concentration of a fractional or integer multiple of the overlap concentration (c*).

The terms "overlap concentration", or "c*", as used herein refer to the concentration at which molecules of a non-associative form of the framing associative polymer (e.g. obtained from literature sources on the backbone of interest or from experimental methods described herein using the polymer of interest modified to inactivate the functional groups to prevent association, for example by esterifying carboxylic acids or blocking carboxylic acid with triethylamine) dissolved in the host begin to overlap each other, as opposed to being separated as they would be in a more dilute solution. In particular, c* for particular polymers in particular hosts can be identified by methods and calculations identifiable to a skilled person (see, e.g. [12]and Example 23).

In particular, the chain length of the backbone can be chosen such that the backbone is long enough to ensure that a small concentration of the polymer will suffice to produce a desired effect using relationships between chain length and the c* of the associative polymer described herein. For example, a polymer that is effective at concentrations less than 1% by weight can be obtained by choosing a backbone length that gives c* less than or approximately equal to 1% by weight. In particular, the relationship between chain length (e.g., expressed as the weight averaged molecular weight) and c* can be determined from references identifiable by a skilled person or determined by calculations as described herein.

Figure 17:
FIG. 17 shows a schematic representation of exemplary interactions between conventional linear polymers of the disclosure, in situation when the polymer concentration is equal to the overlap concentration c*. The dotted lines represent the radius of the single polymers (functional not shown). In particular the schematic of FIG. 17, show an exemplary way polymer molecules can pervade the entire solution when provided at their overlap concentration c*.

In particular, for a non-associative polymer chain, the overlap concentration is given by:

$$c^* = \frac{3M_w}{4\pi(R_g^2)^{3/2}N_a},$$

wherein $M_w$ is the weight averaged molecular weight, $R_g$ is the radius of gyration, and $N_a$ is Avogadro's constant. The overlap concentration represents a concentration equal to one polymer molecule per spherical volume of radius $R_g$, as illustrated for example in the exemplary schematic of FIG. 17. Throughout this disclosure, reference is made to c* when describing the concentration of associative polymer required to achieve each type of desired chemical or physical property. Generally the pairings of polymer and host represent good solvent (e.g. a solvent in which the polymer-solvent interactions are more thermodynamically favorable than polymer-polymer interactions; see e.g. [13]) conditions for the polymer backbone. In good solvent conditions, $R_g$ increases approximately as the ⅔ power of $M_w$, so the expression for c* above shows that c* decreases as $M_w$ increases. For a specific choice of polymer backbone and host liquid, c* scales approximately as $1/M_w$. For example, doubling the length of the polymer backbone approximately reduces by half the concentration of associative polymer required to achieve a given effect.

In several exemplary embodiments, many polymers' data relating $R_g$ to $M_w$ are available for commonly used solvents [14]. When experimental values are not available, an indicative estimate can be made using a theoretical chain model as herein described. For example, the estimate of $R_g$ using the ideal chain model provides a conservative estimate c* of the concentration of polymer required to achieve a desired effect. A skilled person will realize upon a reading of the present disclosure that the polymer backbone is in a good solvent condition when dissolved in the host, so the actual c* of the polymer in the host can be less than the value of c* estimated using the ideal chain model.

For the purpose of selecting the degree of polymerization to use for the span of the polymer (which is the backbone length in the simple case of a linear telechelic structure), an equivalent expression can be written that refers to tabulated parameters, including e.g. parameters available for many polymers. In particular, tabulated values of the characteristic ratio, $c_\infty$, and the length and equivalent mass of a "Kuhn segment" (b and $M_o$) can be used to estimate the chain length that will confer a desired effect with a selected concentration. For example, for mist control, the polymer can be present at its overlap concentration. In applications in which a polymer concentration is desired to be at most $c_{max}$, a chain can be used that has sufficiently many Kuhn segments, N, so that the polymer begins to overlap when its concentration is approximately $c_{max}$ or less. Such chain can be given by:

$$N^{3/2} = \frac{9\sqrt{6}}{2\pi b^3 c_{max}}$$

where N is the number of Kuhn segments and corresponds to a linear polymer (or span of a branched polymer) having molar mass $NM_o$, where $M_o$ is the mass per Kuhn segment. Therefore, one can synthesize for example a polymer that has a span of molar mass $NM_o$ (and functional groups, selected with guidance below) and introduce the synthesized polymer to a composition at a concentration c* to provide mist control. A skilled person will realize that when using approximate expressions for c*, mist control is expected to improve by increasing or decreasing the concentration relative to the estimated value of c*. In particular, in experiments that examine the extent of mist control with associative polymer, concentrations of associative polymer of 0.5 c* and 2 c* can be suitable. Similar reasoning can be applied for other effects herein described as will be understood by a skilled person.

A list of exemplary tabulated parameters is indicated below (Table 6; [15], p. 53):

TABLE 6

Characteristic ratios, Kuhn lengths, and molar masses of Kuhn monomers for common polymers at 413 K

| Polymer | Structure | $C_\infty$ | b (Å) | ρ (g $cm^{-3}$) | $M_0$ (g $mol^{-1}$) |
|---|---|---|---|---|---|
| 1,4-Polyisoprene (PI) | —($CH_2CH$═$CHCH(CH_3)$)— | 4.6 | 8.2 | 0.830 | 113 |
| 1,4-Polybutadiene (PB) | —($CH_2CH$═$CHCH_2$)— | 5.3 | 9.6 | 0.826 | 105 |
| Polypropylene (PP) | —($CH_2CH_2(CH_3)$)— | 5.9 | 11 | 0.791 | 180 |
| Poly(ethylene oxide) (PEO) | —($CH_2CH_2O$)— | 6.7 | 11 | 1.064 | 137 |

TABLE 6-continued Characteristic ratios, Kuhn lengths, and molar masses
of Kuhn monomers for common polymers at 413 K

| Polymer | Structure | $C_x$ | b (Å) | ρ (g cm$^{-3}$) | $M_0$ (g mol$^{-1}$) |
|---|---|---|---|---|---|
| Poly(dimethyl siloxane) (PDMS) | —(OSi(CH$_3$)$_2$)— | 6.8 | 13 | 0.895 | 381 |
| Polyethylene (PE) | —(CH$_2$CH$_2$)— | 7.4 | 14 | 0.784 | 150 |
| Poly(methyl methacrylate) (PMMA) | —(CH$_2$C(CH$_3$)(COOCH$_3$))— | 9.0 | 17 | 1.13 | 655 |
| Atactic polystyrene (PS) | —(CH$_2$CHC$_6$H$_5$)— | 9.5 | 18 | 0.969 | 720 |

In addition, a skilled person can also identify the relationship between chain length and c* by experimental measurement, e.g. by measuring the shear viscosity of the host composition including the non-associative form of the polymer as a function of the concentration of the polymer.

In particular, the overlap concentration of the backbone can be determined from conventional shear viscosity measurements of solutions containing various concentrations of the non-associative form of the polymer. Alternatively, it can be evaluated using the weight average molecular weight of the longest span of the polymer, which is often characterized as part of the synthesis and purification of a synthetic polymer.

Figure 38:
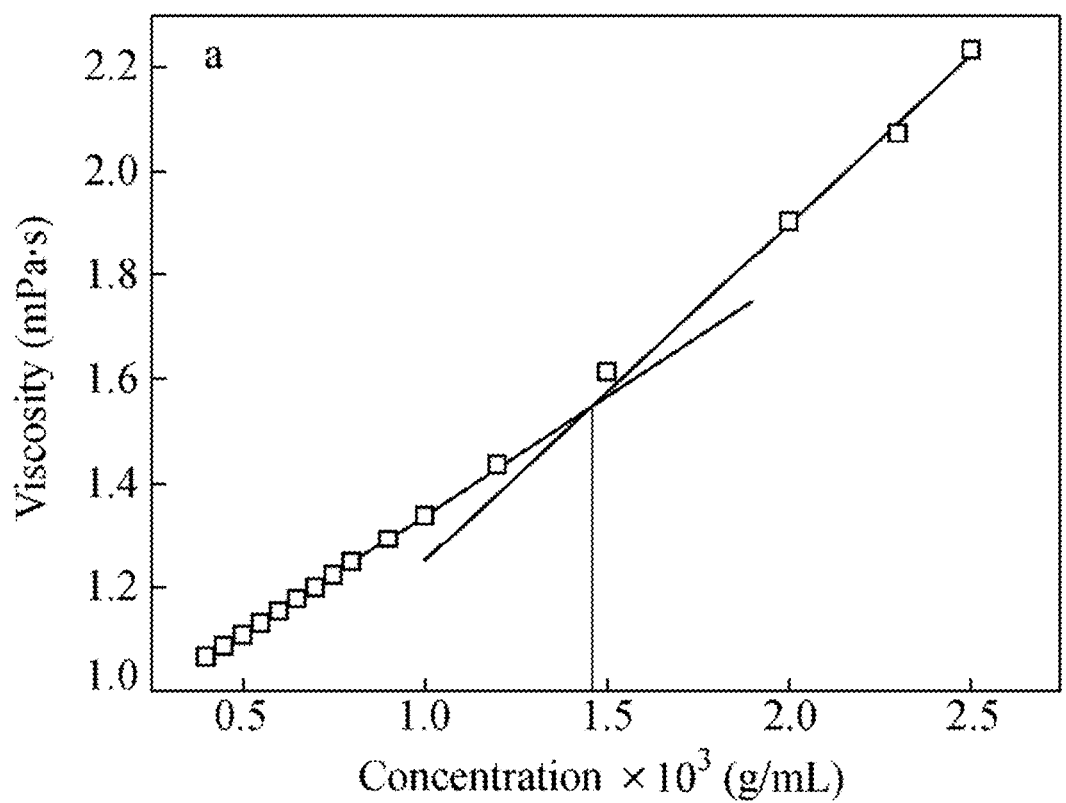
FIG. 38 shows a plot of the viscosities of a non-associative polymer in an appropriate host at varying concentrations using a rheometer wherein at c* a deviation from linearity is observed in the plot of viscosity versus polymer concentration. Linear regression is performed on the data from both dilute and concentrated regimes, and the crossover of the two linear fits represents the overlap concentration, c*.

In particular, c* can be determined at a given temperature by measuring the viscosities of a non-associative polymer in an appropriate host at varying concentrations using a rheometer wherein at c* a deviation from linearity is observed in the plot of viscosity versus polymer concentration. Linear regression is performed on the data from both dilute and concentrated regimes, and the crossover of the two linear fits represents the overlap concentration, c* (see, e.g. [15, 16] and FIG. 38).

In particular, in some embodiments, a way to identify a "desired overlap concentration" is to consider the type of beneficial effect that is needed. For example, for a desired effect of mist control, a concentration of polymer can be used that is approximately equal to the overlap concentration. In particular, in embodiments herein described where control of drag reduction and/or flow rate enhancement and related duration is desired, a concentration range of the associative polymer can be selected between from about 0.001 c* to 1 c*, depending on the extent drag reduction desired alone or in combination with another physical and/or chemical property to be controlled.

In embodiments where control of additional physical or chemical property is desired the specific c* value can be selected taking into account the c* values associated with the control of the additional physical and/or chemical property.

For example a concentration range suitable for mist control can be between 0.5 c* to 2 c*. In embodiments in which a desired effect is enhancing fuel efficiency, a polymer concentration can be used in the non-polar compositions herein described that is less than c*, and in particular can be between 0.1 c* and 0.5 c*. In embodiments in which the desired effects are drag reduction and enhanced lubrication, a polymer concentration can be a concentration below or approximately equal c*, and in particular can be between 0.05 c* to c*. In embodiments in which a desired effect is converting a liquid into a gel, a concentration greater than c* can be provided and in particular a concentration from 2 c* to 10 c*.

Selection of one or more specific associative polymers that can be comprised within the composition at a concentration relative to the c* selected to control a set of one or more chemical and/or physical properties can be performed in view of the characteristics of functional groups, chain structures, and weight average molecular weight of associative polymers herein described In some embodiments, the functional groups described herein at the ends of the backbone of the associative polymer can be selected to ensure association occurs with the range of the polymer concentrations selected. In conjunction with the selection of functional groups, the synthetic chemistry is selected to be appropriate for introduction of such groups.

A skilled person will realize that characteristics of the host that influence the selection of functional groups include, for example, its dielectric constant and whether or not it contains protic species or species that offer a lone pair of electrons. Non-polar liquids generally contain molecules made mainly of atoms with similar electronegativities, such as carbon and hydrogen (for example, hydrocarbons that dominate fuels and many lubricants). Bonds between atoms with similar electronegativities lack partial charges, making the molecules non-polar. A common way of quantifying this polarity is the dielectric constant. A skilled person will also realize that another characteristic of components in the host liquid is whether or not they have O—H or N—H bonds that can participate in hydrogen bonding. A skilled person would recognize these as protic molecules. Examples of protic species that may be present in host liquids in the disclosed ranges of dielectric constants include, for example secondary amines with substantial hydrocarbon content (e.g., Diisobutylamine, which has dielectric constant 2.7; dipropylamine, which has dielectric constant 2.9; Methylbenzylamine, which has dielectric constant 4.4), carboxylic acids with substantial hydrocarbon content (e.g., palmitic acid, which has dielectric constant 2.3; linoleic acid, which has dielectric constant 2.6; oleic acid, which has dielectric constant 2.5), and alcohols with substantial hydrocarbon content (e.g., hexadecanol, which has dielectric constant 3.8). In addition, a skilled person will also realize that other protic species (e.g., protic species that in their pure state can have a dielectric constant greater than 5, such as aniline and phenol) can be present as minor species in a host liquid that has dielectric constant less than 5.

A skilled person will realize that another relevant characteristic of components in the host liquid is whether or not they present a lone pair of electrons that can participate in hydrogen bonding. Examples of species with lone pairs that may be present in host liquids in the disclosed ranges of dielectric constants include alkyl-quinoxalines (e.g., 2,3-Dimethylquinoxaline, which has dielectric constant 2.3), tertiary amines (e.g., triethylamine, which has dielectric constant 2.4) and nonconjugated esters (e.g., isoamylvalerate, which has dielectric constant 3.6). In addition, a skilled person will also realize that other lone-pair species (that in their pure state might have a dielectric constant greater than 5, such as pyridine and methylethylketone) can be present as minor species in a host liquid that has dielectric constant less than 5. In addition, a skilled person will realize that components that are used as additives when the host liquid is formulated can also be present. For example, metal chelating agents (e.g., N,N-Disalicylidene-1,2-propanediamine) can be present in a host liquid that is a fuel. A skilled person will realize that the presence of these constituents influences the selection of functional groups depending on the presence of protic species or species that offer a lone pair of electrons as described herein.

A skilled person will also realize the presence of protic species can, in some circumstances, interfere with FG, and in particular with FGa, association mediated by hydrogen bonding. The skilled person will realize that one way to overcome the interference is to increase the number of hydrogen bond moieties at the chain ends. The skilled person will also realize that another way to overcome the interference is to reduce the concentration of protic species in the host. A skilled person would recognize that these two approaches can be used together. In addition, a skilled person will also realize that, all other factors being equal, increasing the dielectric constant of the host weakens the interaction (e.g., conventional hydrogen bonds, charge-assisted hydrogen bonds, charge transfer interaction, metal-ligand interactions). For example, increasing the dielectric constant from 2.4 (toluene) to 4.8 (chloroform) decreases the association constant for the Hamilton receptor and cyanuric acid by an order of magnitude. Accordingly, FGas that provide a stronger association (e.g., charge-assisted hydrogen bonding or a metal-ligand interaction) are expected to be beneficial when the dielectric constant is greater than 2.5. A skilled person would realize that the selection of FGas that provide strong association can be used together with increasing the number of associative groups at the chain ends and with reducing the concentration of host components that have high dielectric constants.

In particular, in some embodiments, the value of the concentration of the associative polymer relative to overlap concentration c* can be governed by the selection of chain-host pair and can be insensitive to the specific choice of FGa. A skilled person will understand that the overlap concentration can vary with temperature, in a manner that is particular to a specific chain-host pair. For example, the selection of polymer backbone and host governs the solvent quality; and, for a given solvent quality, the degree of polymerization is chosen to adjust c* once the chain-host pair is selected. In this connection selecting a greater degree of polymerization, provides a greater $R_g$ and, consequently, a reduced c* as will be understood by a skilled person.

Figure 16:
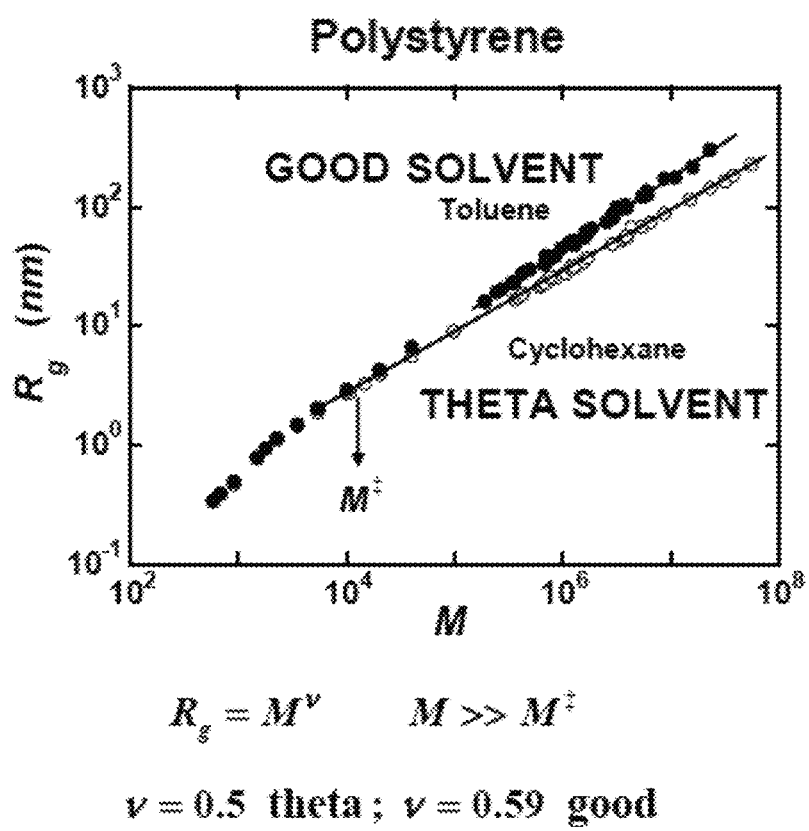
FIG. 16 shows is a diagram illustrating the radius of gyration of an exemplary backbone polymer (polystyrene) as a function of its weight-average molecular weight ($M_w$ in g/mol) in a representative theta solvent (cyclohexane) and in a representative good solvent (toluene). In particular.

In some embodiments herein described, the chain structure between the nodes (e.g. the chain being a polyolefin, polydiene, or other structure identifiable to a skilled person upon a reading of the present disclosure) can be chosen such that it interacts favorably with the host, the state of the backbone can be estimated using good solvent (e.g. a solvent in which the polymer-solvent interactions are more thermodynamically favorable than polymer-polymer interactions; see e.g. [13]) scaling for its pervaded volume. Over most of the molecular weight range of interest, the ideal chain approximation (e.g. approximation of the polymer chain as a random walk and neglecting any kind of interactions among monomers; see e.g. [15]) can also be useful: it provides a lower bound on $R_g$ that is usually within a factor of 2 of the good solvent chain dimensions, as shown in FIG. 16 for the case of polystyrene for a good solvent such as toluene, and a theta solvent (e.g. a solvent in which the polymer-solvent interactions are approximately as equally thermodynamically favorable as polymer-polymer interactions; see e.g. [13]) such as cyclohexane. In particular, the value of the radius of gyration can be used to estimate the concentration at which polymer molecules would begin to overlap one another: the overlap concentration c* corresponds to the value that gives approximately one polymer molecular per $(R_g^2)^{3/2}$.

Additional factors related to applications of the resulting compositions (e.g. distribution through a pipeline, storage for a certain time period and other factors identifiable by a skilled person), can also be taken into account in the selection of the specific associative polymer or combination thereof and/or in the selection of the related concentration in the host composition relative to c* within a range associated to control of one or more chemical and/or physical properties.

In embodiments in which a low concentration of polymer is desired, a reduction in the concentration of the associative polymer relative to c* can be obtained by selecting a polymer with high degree of polymerization. In some of those embodiments, the degree of polymerization of the polymer is low enough that the polymers do not degrade during necessary handling. For example, in embodiments in which the non-polar compositions are fuel or other liquid and the liquid is intended to travel through a distribution system, minimization of the degradation of the polymer upon passage through pumps and filters, and/or minimization of degradation during turbulent flow in transport pipelines or hoses can be desirable. In this connection, in exemplary embodiments in which the polymers comprise linear chains, keeping the weight-average molar mass below 1,000,000 g/mol can give adequate stability with respect to shear degradation. In exemplary embodiments in which the polymer comprises lightly branched molecules, having node-chain-node segments that are individually greater than 10,000 g/mol, the longest span of the molecule can be kept below the threshold for shear degradation (typically less than 1,000,000 g/mol).

In embodiments wherein conversion of liquid to gel is desired, a solution or gel that has dielectric constant less than 5 and comprises a polymer that has weight average molar mass between 100,000 g/mol and 1,000,000 g/mol, can comprise the polymer at a concentration that is between 0.1 c* and 10 c*. The specific concentration can be determined based on the measured length and backbone composition of the polymer, and the polymer molecules manifestly associate with one another as evidenced by shear viscosity that is anomalously enhanced relative to a non-associative polymer of the same molar mass and backbone structure or by light scattering showing structures that are much larger than a non-associative polymer of the same molar mass and backbone structure. The latter measurements can be performed for example by removing the polymer from the composition and reconstituting them in a solvent that has a dielectric constant that is close to that of the composition (±20%) at a concentration of c* based on the weight-average molecular weight determined by GPC equipped with multi-angle static light scattering.

In some embodiments when the concentration of the framing associative polymer is equal to or lower than 0.02 c* the associative polymer can have a weight averaged molecular weight equal to or higher than 10,000,000 g/mol. In some of those embodiments, the associative polymer can be used for drag reduction in the non-polar composition.

In some embodiments when the concentration of the framing associative polymer is between than 0.05 c* to 0.1 c*, the associative polymer can have a weight averaged molecular weight equal to or higher than 10,000,000 g/mol In some of those embodiments, the associative polymer can be used for mist control in the non-polar composition.

In some embodiments when the concentration of the framing associative polymer is between 0.02 c* and 0.05 c*, the associative polymer can have a weight averaged molecular weight between 2,000,000 g/mol to 10,000,000 g/mol In some of those embodiments, the associative polymer can be used for drag reduction in the non-polar composition.

In some embodiments when the concentration of the framing associative polymer is between 0.05 c* and 0.1 c*, the associative polymer can have a weight averaged molecular weight between 500,000 g/mol to 2,000,000 g/mol, and in particular 1,000,000 g/mol to 2,000,000 g/mol. In some of those embodiments, the associative polymer can be used for drag reduction and/or mist control in the non-polar composition.

In some embodiments when the concentration of the framing associative polymer is between 0.1 c* and c*, the associative polymer can have a weight averaged molecular weight between 400,000 g/mol to 1,000,000 g/mol In some of those embodiments, the associative polymer can be used for drag reduction and/or mist control in the non-polar composition. In particular, when the weight averaged molecular weight is at least 400,000 g/mol the associative polymer can be used at concentration is between 0.1 c* and 0.5 c* for drag reduction of the host composition; at a concentration of about 0.5 c* for drag reduction and possibly for mist control of the host composition depending on the molecular weight of the polymer, and at a concentration of less than approximately c* for drag reduction and mist control of the host composition.

In some embodiments when the concentration of the framing associative polymer is between 0.5 c* and c*, the associative polymer can have a weight averaged molecular weight between 400,000 g/mol to 1,000,000 g/mol. In some of those embodiments, the associative polymer can be used for drag reduction, mist control and/or lubrication in the non-polar composition.

In some embodiments when the concentration of the framing associative polymer is between c* and 2 c*, the associative polymer can have a weight averaged molecular weight between 400,000 g/mol to 1,000,000 g/mol. In some of those embodiments, the associative polymer can be used for mist control, lubrication, and/or viscoelastic properties of the non-polar composition.

In some embodiments when the concentration of the framing associative polymer is between c* and 2 c*, he associative polymer can have a weight averaged molecular weight between 100,000 g/mol to 400,000 g/mol. In some of those embodiments, the associative polymer can be used for drag reduction, lubrication and/or viscoelastic properties of the non-polar composition.

In some embodiments when the concentration of the framing associative polymer is between c* and 3 c*, the associative polymer can have a weight averaged molecular weight between 400,000 g/mol to 1,000,000 g/mol. In some of those embodiments, the associative polymer can be used for mist control, lubrication and/or control of viscoelastic properties in the non-polar composition.

In some embodiments when the concentration of the framing associative polymer is between c* and 3 c*, the associative polymer can have a weight averaged molecular weight between 100,000 g/mol to 400,000 g/mol In some of those embodiments, the associative polymer can be used for lubrication, and/or control of viscoelastic properties in the non-polar composition.

In some embodiments when the concentration of the framing associative polymer is between 2 c* to 10 c*, the associative polymer can have a weight averaged molecular weight between 100,000 g/mol to 400,000 g/mol In some of those embodiments, the associative polymer can be used for lubrication, and/or viscoelastic properties of the non-polar composition.

In some embodiments when the concentration of the framing associative polymer is between 2 c* to 10 c*, the associative polymer can have a weight averaged molecular weight between 100,000 g/mol to 1,000,000 g/mol In some of those embodiments, the associative polymer can be used for lubrication, and/or viscoelastic properties and in particular gelification of the non-polar composition.

In some embodiments when the concentration of the framing associative polymer is between 3 c* and 10 c*, the associative polymer can have a weight averaged molecular weight between 100,000 g/mol to 1,000,000 g/mol In some of those embodiments, the associative polymer can be used for lubrication, and/or control of viscoelastic properties and in particular gelification in the non-polar composition.

In embodiments in which the composition comprise liquid fuels, such as gasolines, diesel fuels, kerosene and jet fuels, such compositions can comprise polymers with molar mass between 100,000 g/mol and 1,000,000 g/mol having backbones that, as bulk polymers, have dielectric constant less than 3 and are present in the composition at a concentration that is between 0.1 c* and 10 c*, based on the measured weight averaged molar mass and backbone composition of the polymer, and the polymer molecules manifestly associate with one another as evidenced by shear viscosity that is enhanced relative to a non-associative polymer of the same molar mass and backbone structure or by light scattering showing structures that are much larger than a non-associative polymer of the same molar mass and backbone structure. The latter measurements can be performed for example by removing the polymer from the composition and reconstituting them in toluene at a concentration of c* based on the weight-average molar mass determined by GPC equipped with light scattering. In several examples of the current disclosure toluene is indicated as a reference host because it has a dielectric constant of approximately 2.2, which is at the upper range of diverse fuels and, therefore, gives a conservative diagnostic of association. That is, a polymer that forms intermolecular associations in toluene will form intermolecular associations in gasoline, diesel, kerosene and jet fuel, among others.

In some embodiments, polymer for improving fuel efficiency can be effective at 10000 ppm or less with weight average molecular weight below 1,000,000 g/mol, possibly after more than 10 passages of the fuel through a fuel pump. In some embodiments, associative polymers can remain uniformly dissolved for at least 2 weeks or even months even at −30° C.

In some embodiments, with weight average molecular weight 400,000 g/mol chains, droplet behavior of non-polar composition comprising associative polymers herein described is expected to match 4,200,000 g/mol (weight average) polyisobutylene, a commonly used standard material to achieve mist control effect using high molecular weight polymer, compared at the same, concentration of 0.3%.

In some embodiments, if for a particular application the polymer concentration is desired to be kept low, this can be achieved by increasing the length of the polymer chain between associative groups. The reason for this is that polymers tend to adopt compact conformations in isolated clusters when the concentration is far below their overlap concentration; increasing the length of the polymer between associative groups decreases the overlap concentration, thereby allowing desired properties to be achieved with a lower concentration of polymer.

In some embodiments, if for a particular application the polymer additive is desired to survive passage through pumps and turbulent pipe flow, this can be achieved by keeping the length of the polymer below the threshold at which chain scission occurs in intense flows. For a number of polymers, the literature provides values of the chain length above which chains scission occurs (e.g. polyisobutylene) For any choice of polymer backbone structure, the threshold length (or equivalently, degree of polymerization or molar mass) above which chain scission occurs upon passage through pumps or turbulent pipe flow can be determined as will be understood by a skilled person.

In some embodiments, for the purpose of creating additives that deliver valuable effects at low polymer concentration, use of chain segments having molar mass between 100,000 g/mol and 500,000 g/mol between FG, and in particular FGa, and node can be desired. This range of structures can associate at low concentrations to give desired properties. For example, in the context of fuels, the resulting polymers can inhibit misting in order to reduce the risk of post-crash fires; can control atomization to increase fuel efficiency and/or reduce emissions; can confer drag reduction that reduces pumping costs and improves throughput through existing pipelines; and improve lubrication. In particular, polymers of the present disclosure can survive prolonged, severe shear with little degradation; the polymers do not interfere with filtering fuel; the polymers do not interfere with dewatering fuel.

According to the above indication and to the additional indication provided in the disclosure, in some embodiments, one skilled in the art can identify whether or not a host of interest (e.g., a particular lubricant oil) is suitable for application of the associative polymers based on the dielectric constant of the host, and the skilled person can identify suitable monomer structures using knowledge of the dielectric constant or solubility parameter of the resulting polymer, and thus select the degree of polymerization (e.g. by synthesizing a polymer backbone of a particular weight-averaged molecular weight) to achieve a desired $c^*$.

In some embodiments herein described once the suitability of a potential host is determined, as well as the selection of the monomer and the selection of the degree of polymerization are made, functional groups can be selected that are able to associate according to the indicated association constant. In particular, in some embodiments when the host has a relatively low dielectric constant (e.g. $\varepsilon < 2$) and little or no participation in hydrogen bonds, there are many associative groups that are effective as will be understood by a skilled person. Therefore, secondary considerations can be applied to narrow down the selection (such as cost, sensitivity to ionic species, nature of combustion products, and other considerations identifiable to a skilled person). For example, in some instances, with increasing dielectric constant of the host, many of the useful interactions (hydrogen bonding, charge transfer, acid-base, and others identifiable to a skilled person) become progressively weaker. Therefore, clusters of functional groups may be required to confer adequate association. Consequently, for solvents that have dielectric constant greater than 2.5, dendrimeric FG can be used that include multiple associative groups (examples are shown for FG that each present four or eight copies of a chosen associative group).

For example, in embodiments herein described where drag reduction (e.g. the flow resistance of a non-polar composition through a conduit such as an oil pipeline or fuel line in a vehicle) is the property sought to be controlled, a skilled person can identify the solubility parameter of the fluid, and then can identify polymer backbones that are substantially soluble in the fluid (e.g. by comparing the solubility parameters and/or using the solubility parameters to determine the Flory-Huggins interaction parameter as described herein). The selection of particular polymers for the backbone of the associative polymer suitable to be included at a concentration relative to $c^*$ below $c^*$ can be further refined based on, for example, on the cost of the polymers, or the ease and/or expense of the polymerization chemistry, as would be identifiable to a skilled person.

In particular, for drag reduction, a skilled person would realize it can be desirable to minimize the amount of polymer used for two reasons: to minimize cost and to avoid undue increase in the shear viscosity of the mixture. Accordingly, the length (expressed as the weight-averaged molecular weight) of the backbone of the associative polymer can be near the threshold imposed by shear degradation, which a skilled person would understand to be in the range of approximately 500,000 g/mol for hydrocarbon polymers such as polyisobutylene, polybutadiene, polyolefins, and others identifiable to a skilled person.

In particular, a skilled person can verify that the chain length selected resists shear degradation by performing analyses known to the skilled person. For example, the viscosity of a non-polar composition comprising the associative polymers described herein can be measured before and after recirculation through a conduit (e.g. by using a fuel pump to recirculate a sample of the non-polar composition) and determining if there is a difference in viscosity between the two time points (e.g., if the viscosity decreases after recirculation, the associative polymer can be considered to have undergone shear degradation).

As another example, if mist control is among the properties of the nonpolar composition desired to be controlled, the polymer backbone selection among the possible polymers to be included at a concentration relative to $c^*$ between 0.5 $c^*$ to 2 $c^*$ can be based on solubility of the in nonpolar composition as described herein (e.g. solubility parameters and/or Flory-Huggins interaction parameter), with the additional consideration of the associative polymer having negligible effect on the calorific value of the nonpolar composition in which mist control is desired, as would be identifiable to a skilled person (e.g. by using the calorimetric method ASTM D240-09). The functional groups described herein at the ends of the backbone of the associative polymer can be chosen to ensure that association occurs at desired concentration such that heteroatom content is so low as to not affect burning. For example, association can be measured using titration techniques identifiable to a skilled person (see, e.g., [17]). Using the titration methods, the skilled person can identify a concentration at which the particular associative polymers (with a given number of end groups containing heteroatoms) associate; if the concentration is suitable based on $c^*$ considerations (e.g. the particular concentration of the associative polymer relative to $c^*$ to control a particular property such as mist control) the skilled person can then measure the calorific value using ASTM D240-09. If the concentration is not suitable, the number of end groups can be changed accordingly (e.g. by increasing the number for greater association at a given concentration, or by decreasing the number for lesser association), the titration re-performed, and the calorific value re-measured.

In various embodiments, associative polymers herein described can be made with methods in which a backbone polymer is provided which is then functionalized with suitable FGs and in particular with FGas.

In some embodiments, in which the backbone has a structural unit of formula ┤—┤node┤—┤chain]—┤ (II), wherein
chain is a non-polar polymer substantially soluble in a non-polar composition, the polymer having formula $$R_1\text{-}[A]_n R_2 \quad (III)$$

in which
A is an organic moiety forming the monomer of the polymer;
$R_1$ and $R_2$ are independently selected from any carbon based or organic group; and
n is an integer≥1; and
node is a chemical moiety covalently linking one of $R_1$ and $R_2$ of at least one first chain with one of the $R_1$ and $R_2$ of at least one second chain;
and wherein the chain and node of different structural units of the polymer can be the same or different and the polymer presents two or more terminal $R_1$ and $R_2$ groups
the method can comprise: providing the polymer having structural unit of formula ┤—┤node┤—┤chain]—┤ (II) and attaching functional groups FG herein described to terminal $R_1$ and/or $R_2$ groups of the polymer.

In some embodiments, an associative polymer can be provided by forming a polymer chain through a method of polymerization of a suitable monomer such as those described in [9], so that the desired architecture (linear, branched, star, and other architectures identifiable to a skilled person) is generated and individual polymer chains are substantially terminated by chemical groups that are amenable to functionalization. The end groups can already be functionalized by FGs and in particular FGas or formed by precursors that are converted to FGs, and in particular FGas (e.g., by deprotection or functional groups that are suitable for covalent attachment of FGs). This prepolymer can then be reacted with a molecule containing the desired FG, so that FGs are introduced to the polymer chain through chemical transformations commonly described as functional group interconversions. Thus, in some embodiments the desired polymer composition can be achieved in a two-step process, in which after the first step reaction of the monomer gives a polymer that does not substantially include the desired FG or FGs, which are introduced in the second step. For example, the prepolymer may be synthesized as substantially terminated with functional groups known in the art to be "leaving groups" such as halide, triflate or tosylate, and the desired FG or FGs introduced to the polymer chain through nucleophilic substitution reaction.

In some embodiments, suitable monomers comprise dienes, olefins, styrene, acrylonitrile, methyl methacrylate, vinyl acetate, dichlorodimethylsilane, tetrafluoroethylene, acids, esters, amides, amines, glycidyl ethers, isocyanates, and mixtures of these.

In some embodiments, the associative polymer suitable for drag reduction can be selected based on the Reynolds number of the host composition in the flow pattern where the control is desired, wherein when the Reynolds number of the host composition is in the range of about 5,000≤Re≤25,000 or possibly up to 1,000,000 Re, the association constant (k) is in the range of 4≤$\log_{10}$ k≤12; and when the Reynolds number is in the range of about Re≥25,000, the association constant (k) is in the range of 6≤$\log_{10}$ k≤14.

In some embodiments, associative polymers that can be used for drag reduction in flow having Reynolds numbers equal to or higher than 5000 comprise one or more of a telechelic 1,4-PB polymer with each end-group having one tertiary amine group (Di-MB), a telechelic 1,4-PB polymer with each end-group having two tertiary amine groups (Di-DB) a telechelic 1,4-PB polymer with each end-group having four tertiary amine groups (Di-TB), a telechelic 1,4-PB polymer with each end-group having eight tertiary amine groups (Di-OB), a telechelic 1,4-PB polymer with each end-group having one carboxyl groups (Di-MA), a telechelic 1,4-PB polymer with each end-group having two carboxyl groups (Di-DA), a telechelic 1,4-PB polymer with each end-group having four carboxyl groups (Di-TA), a telechelic 1,4-PB polymer with each end-group having eight carboxyl groups (Di-OA), a telechelic 1,4-PB polymer with each end-group having one tert-butyl ester groups (Di-ME), a telechelic 1,4-PB polymer with each end-group having two tert-butyl ester groups (Di-DE), a telechelic 1,4-PB polymer with each end-group having four tert-butyl ester groups (Di-TE), and/or a telechelic 1,4-PB polymer with each end-group having eight tert-butyl ester groups (Di-OE). In particular in those embodiments the molecular weight of the polybutene can have any values among the ones described, e.g. an overall weight average molecular weight, $M_w$, equal to or lower than about 2,000,000 g/mol, and/or a Mw equal to or higher than about 100,000 g/mol.

In some embodiments, associative polymers that can be used for drag reduction in flow having Reynolds numbers equal to or higher than 5000 comprise the following pairs: Di-TA/Di-MB (1 tertiary amine), Di-TA/Di-DB, Di-TA/Di-TB; Di-TB (4 tertiary amines)/Di-MA, Di-TB/Di-DA; Di-OB(8 tertiary amines)/Di-MA, Di-OB/Di-DA, and Di-OB/Di-TA.

The association polymers described herein can be synthesized by methods known to a skilled person. For example, the backbone can be synthesized by Ring-Opening Metathesis Polymerization (ROMP) chemistry and functionalized at the ends of the backbone using appropriate chain transfer agents (see, e.g., Examples section herein and [18]). In addition, anionic polymerization, Atom-transfer Radical-Polymerization (ATRP), Reversible Addition-Fragmentation chain Transfer polymerization (RAFT) and other polymerization techniques identifiable to a skilled person (including an alternative overview of metathesis techniques) can be used to synthesize several types of backbones (e.g. block, star, branched and other architectures) and introduce of many different types of functional groups at the ends of the polymer chain (or elsewhere if desired) (see, e.g. [19, 20]).

In certain embodiments, an associative polymer in accordance with the present disclosure can be provided by forming a polymer chain such that the desired architecture is generated, and individual polymer chains are substantially terminated by the desired FG, in situ. Thus, in some embodiments the desired polymer composition can be achieved in a single step process, and reaction of the monomer affords a polymer that includes the desired FG or FGs. In yet other embodiments, the desired FGs can be introduced to the polymer chain in a form such that the ultimate function of such FGs is masked by a chemical substitution (e.g. the FGs feature one or more "protecting groups"), and the desired functionality of the FGs can then be enabled for example through removal of such a "protecting group" through chemical transformation in subsequent steps. However, in some embodiments, the desired polymer composition can still be achieved in a single step process, and the polymer as synthesized includes the desired FG or FGs in protected form. In some of those embodiments, suitable monomers include cyclic olefins and acyclic α,ω-dienes.

Suitable methods of polymerization in accordance with some embodiments herein described, comprise ring-opening metathesis polymerization (ROMP) and acyclic diene metathesis polymerization (ADMET), in the presence of suitable chain transfer agent (CTA) typically consisting of the FG suitably disposed about a reactive olefinic functionality (e.g. cis-double bond). The FG or FGs can be in their ultimate functional form in this CTA, or can be in "protected" form such that unmasking of the ultimate functional form may be achieved through removal of this "protecting group" through chemical transformation.

Suitable "protecting groups" in accordance with some embodiments herein described, comprise those described in "[21]".

For example, in some embodiments where the polymer backbone is made by a ROMP polymerization (e.g. using cyclooctadiene to synthesize a backbone of repeating =CHCH$_2$CH$_2$CH=CHCH$_2$CH$_2$CH=units), the ends of the polymer backbone can be functionalized with appropriate chain transfer agents to provide functionalized ends of the backbone which can be further transformed to provide functional groups capable of being corresponding functional groups, as shown for example in Examples 1-3 where carboxylic acid functional groups are installed. A skilled person will realize upon a reading of the present disclosure that analogous reactions can be performed to synthesize other backbones such as poly(vinylacetate) (e.g. RAFT polymerization as shown, for example in [22]; or free radical polymerization of vinyl acetate using a free radical initiator comprising FG groups as shown, for example, in [23]).

In particular, as exemplified in Example 3, chain transfer agents can be used to attach moieties substituted with chloro groups, which can then be displaced with azide groups (e.g. using trimethylsilyl (TMS) azide by methods identifiable to a skilled person). A moiety comprising attached alkyne groups can then be reacted with the azide groups via reactions such as the azide-alkyne Huisgen cycloaddition (e.g. click reaction) to attach the moiety to thereby attach the FG to the backbone (see, e.g. Example 3).

In yet further embodiments, an associative polymer in accordance with the present disclosure can be provided by metathesis applied to a high molecular weight ($M_w$>5,000,000 g/mol) poly(diene) such as poly(butadiene) in the presence of suitable CTA and metathesis catalyst to give a shorter poly(diene) substantially terminated by an FG and in particular FGas, with the diene:CTA ratio chosen to afford the desired molecular weight for the product telechelic polymer. In particular methods of these particular embodiments, the starting high molecular weight poly(diene) can be linear and substantially free of 1,2-vinyl groups in the polymer backbone.

Figure 10:
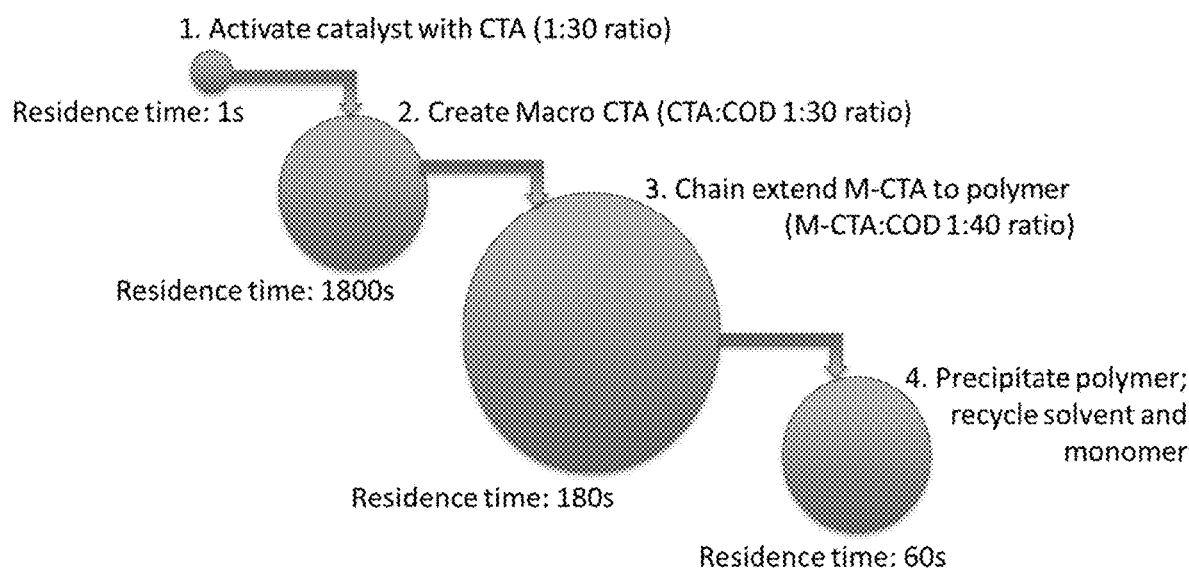
FIG. 10 shows a schematic representation of an exemplary method to produce associative polymers herein described using chain transfer agents according to embodiments herein described.

In exemplary methods to make a polymer of the present disclosure, the polymer can be made by ROMP in a continuous process. In particular, methods of these particular embodiments the continuous process can use reactions in series (FIG. 10). In relation to compositions that are used as liquid fuels the continuous production of the associative polymers herein described can be performed near or inside a petrochemical refinery and incorporated into a product continuously.

In exemplary methods to make a polymer of the present disclosure, the polymer can be made by ring-opening metathesis polymerization (ROMP) to obtain desired end-functional telechelic polymers of weight averaged molecular weight 100,000 to 1,000,000 g/mol.

In exemplary methods to make a polymer of the present disclosure, the polymer can be made by related polymerization and/or functionalization methods to make functional telechelics of molecular weight 100,000 to 1,000,000 g/mol.

In some embodiments, a mixture of framing associative polymers and capping associative polymers are produced simultaneously.

In various embodiments, associative polymers herein described can be used in methods and systems to control physical and/or chemical properties of a non-polar composition herein described, in particular to obtain a controlled drag reduction and/or flow rate enhancement effect alone or in combination with other physical and/or chemical properties as herein described.

The method comprises providing a host composition having a dielectric constant equal to or less than about 5; and providing at least one framing associative polymer substantially soluble in the host composition; and combining the host composition and the at least one framing associative polymer herein described at a concentration c between from about 0.001 c* to about 10 c* selected based on the molecular weight of the at least one framing associative polymer (and/or radius of gyration) and on a physical and/or chemical property and in particular rheological property to be controlled.

In some embodiments, the method can further comprise selecting a concentration c of the at least one framing associative polymer in the host composition, the concentration depending on the averaged molecular weight and/or radius of gyration of the at least one framing associative polymer and on a physical and/or chemical property to be controlled based on the factors herein described before the combining. A skilled person will be able to select the specific Mw, Radius of gyration and concentration of the at least one framing associative polymer in the host composition in view of the present disclosure.

In particular in exemplary embodiments, framing associative polymer can be used, alone or in combination with capping associative polymers, in a method to control resistance to flow and/or flow rate enhancement of a non-polar composition In some of those embodiments additional physical and/or chemical property of the non-polar composition can also be controlled. The method comprises providing a host composition having a dielectric constant equal to or less than about 5; and providing at least one framing associative polymer substantially soluble in the host composition and having a weight averaged molecular weight equal to or higher to 200,000 g/mol. The method comprises combining the host composition and the at least one framing associative polymer herein described at a concentration c between from about 0.001 c* to about 1 c* selected based on the molecular weight of the at least one framing associative polymer and on a physical and/or chemical property and in particular rheological property to be controlled.

In some embodiments, the method can further comprise selecting a concentration c of the at least one associative polymer in the host composition between from about 0.001 c* to about 1 c* depending on the averaged molecular weight of the at least one associative polymer and on a physical and/or chemical property to be controlled based on the factors herein described before the combining.

In some embodiments, the method can further comprise determining an overlap concentration c* for the at least one framing associative polymer before performing the selecting.

In some embodiments, the non polar composition resulting from the method to control resistance to flow and/or flow rate enhancement herein described is capable of maintaining substantially constant flow rate enhancement. In some of those embodiments, the at least one framing associative polymer has a weight averaged molecular weight of 650,000 g/mol to 750,000 g/mol and can be comprised at a concentration of about 0.5 c*. In some of those embodiments the flow rate enhancement can be about 28%.

In some embodiments, in the non polar composition resulting from the method to control resistance to flow and/or flow rate enhancement herein described the flow rate enhancement is at least 20%. In some of those embodiments, the at least one framing associative polymer can have a weight averaged molecular weight of 650,000 g/mol to 750,000 g/mol and can be comprised at a concentration greater than 0.2 c*.

In some embodiments, the non polar composition resulting from the method to control resistance to flow and/or flow rate enhancement herein described is capable of maintaining a substantially constant flow rate enhancement in a pipeline of at least 8 kilometers. In some of those embodiments, the at least one framing associative polymer has a weight averaged molecular weight greater than 650,000 g/mol and can be comprised at a concentration greater than 0.1 c* possible 0.05 c*. In some of those embodiments the composition can be in a flow having Reynolds number equal to or higher than 5000, In some of those embodiments, if minimization of shear degradation is desired the at least one framing associative polymer can be provided at a weight averaged molecular weight 650,000 g/mol to 750,000 g/mol.

In some embodiments, the association constant of the at least one framing associative polymer used in the method to control resistance to flow and/or flow rate enhancement of a non-polar composition is between $7 \leq \log_{10} k \leq 14$.

In some embodiments, the method to control resistance to flow and/or flow rate enhancement herein described can be applied to compositions in a flow having Reynolds number between about $5{,}000 \leq Re$, and in particular greater than 25,000 Re and the at least framing associative polymer as an association constant (k) in the range of $7 \leq \log_{10} k \leq 14$.

In some embodiments the method to control resistance to flow and/or flow rate enhancement herein described can be applied to compositions in a flow having Reynolds number $Re \geq 25{,}000$ and the at last one framing associative polymer has an association constant (k) in the range of $7 \leq \log_{10} k \leq 14$.

In some embodiments, of the method to control resistance to flow and/or flow rate enhancement herein described, the concentration c is about 0.5 c* or between about 0.5 c* to 1 c* and the another physical and/or chemical property is mist control.

In some embodiments, of the method to control resistance to flow and/or flow rate enhancement herein described, the concentration c is less than approximately c* and the another physical and/or chemical property is fuel efficiency.

In some embodiments, of the method to control resistance to flow and/or flow rate enhancement herein described, the concentration c is between 0.1 c* and 0.5 c* and the another physical and/or chemical property is fuel efficiency.

In some embodiments, of the method to control resistance to flow and/or flow rate enhancement herein described, the concentration c is below or approximately equal c* and the another physical and/or chemical property is enhanced lubrication.

In some embodiments, of the method to control resistance to flow and/or flow rate enhancement herein described, the concentration c is between 0.05 c* to c* and the another physical and/or chemical property is enhanced lubrication.

In some embodiments of the method to control resistance to flow and/or flow rate enhancement herein described, one or more capping associative polymers having a weight averaged molecular weight equal to or higher than 200,000 g/mol can be comprised in an amount up to 20 wt % of a total polymer concentration in the composition. In some of those embodiments, the one or more capping associative polymers can be provided at 5 wt % of the total polymer concentration in the composition. In some of those embodiments, the one or more capping associative polymers can be provided at 10 wt % of the total polymer concentration in the composition.

In some embodiments, framing associative polymer can be used, alone or in combination with capping associative polymers, in a method to control sizes, and/or distribution of sizes, of the droplets of fluid (e.g. to control fluid mist) in a non-polar composition. In some of those embodiments one or more additional physical and/or chemical properties of the non-polar composition can also be controlled. The method comprises providing a host composition having a dielectric constant equal to or less than about 5 and providing at least one framing associative polymer substantially soluble in the host composition and having a weight averaged molecular weight equal to or higher to 400,000 g/mol. The method further comprises combining the host composition and the at least one associative polymer herein described at a concentration c selected between from about 0.05 c* to about 3 c* based on the averaged molecular weight of the at least one associative polymer and on a physical and/or chemical property to be controlled.

In some embodiments, the method can further comprise selecting a concentration c of the at least one associative polymer in the host composition, the concentration c selected between from about 0.05 c* to about 3 c* depending on the averaged molecular weight and/or radius of gyration of the at least one framing associative polymer and on a physical and/or chemical property to be controlled based on the factors herein described before the combining.

In some embodiments, the method can further comprise determining an overlap concentration c* for the at least one associative polymer before performing the selecting.

In some embodiments, in the method to control sizes, and/or distribution of sizes, of the droplets of a fluid herein described, the at least one framing associative polymer has a weight averaged molecular weight equal to or higher than 1,000,000 g/mol, possible about 10,000,000 g/mol and can be comprised at a concentration from 0.05 c* to 0.1 c*. in some of those embodiments, the at least one framing associative polymer provided in the has a weight averaged molecular weight between 1,000,000 g/mol to 4,000,000 g/mol, or preferably 2,000,000 g/mol to 4,000,000 g/mol, or between 1,000,000 and 2,000,000 g/mol if a longer lasting effect is desired.

In some embodiments, in the method to control sizes, and/or distribution of sizes, of the droplets of a fluid herein described, the at least one framing associative polymer has a weight averaged molecular weight between 400,000 g/mol to 1,000,000 g/mol and can be comprised at a concentration between 0.5 c* and c*.

In some embodiments, in the method to control sizes, and/or distribution of sizes, of the droplets of a fluid herein described, the at least one framing associative polymer has a weight averaged molecular weight between 400,000 g/mol to 1,000,000 g/mol, and can be comprised at a concentration between c* and 3 c*.

In some embodiments, the association constant of the at least one framing associative polymer used in the method to control sizes, and/or distribution of sizes, of the droplets of the fluid mist herein described is between $7 \leq \log_{10} k \leq 14$.

In some embodiments, of the method to control sizes, and/or distribution of sizes, of the droplets of a fluid herein described, the concentration c is about 0.5 c* or between about 0.5 c* to 1 c* and the another physical and/or chemical property is drag reduction.

In some embodiments, of the method to control sizes, and/or distribution of sizes, of the droplets of a fluid herein described, the concentration c is less than approximately c* and the another physical and/or chemical property is fuel efficiency.

In some embodiments, of the method to control sizes, and/or distribution of sizes, of the droplets of a fluid herein described, the concentration c is between 0.1 c* and 0.5 c* and the another physical and/or chemical property is fuel efficiency.

In some embodiments, of the method to control sizes, and/or distribution of sizes, of the droplets of a fluid herein described, the concentration c is below or approximately equal c* and the another physical and/or chemical property is enhanced lubrication.

In some embodiments, of the method to control sizes, and/or distribution of sizes, of the droplets of a fluid herein described, the concentration c is between 0.05 c* to c* and the another physical and/or chemical property is enhanced lubrication.

In some embodiments of the method to control sizes, and/or distribution of sizes, of the droplets of a fluid herein described, one or more capping associative polymers having a weight averaged molecular weight equal to or higher to 400,000 g/mol can be comprised in an amount up to 20 wt % of a total polymer concentration in the composition. In some of those embodiments, the one or more capping associative polymers can be provided in a 5 wt % of the total polymer concentration in the composition. In some of those embodiments, the one or more capping associative polymers can be provided in a 10 wt % of the total polymer concentration in the composition.

In some embodiments of the associative polymers, and related compositions, methods and systems herein described any one of the associative polymers herein described and in particular any one of framing associative polymers and/or capping associative polymers herein described can have a weight averaged molecular weight equal to or lower than 1,000,000 g/mol. In those embodiments, shear resistant associative polymers can be provided. The wording "shear resistant" as used herein in connection with a polymer indicates a polymer that, under a mechanical stress sufficient to break a carbon-carbon covalent bond, shows a decrease in its weight averaged molecular weight Mw equal to or lower than 5% and can be detected by techniques identifiable by a skilled person. When a polymer is in a composition the mechanical stress applied to different portions of the polymer are transmitted within the polymer backbone and differently apply to different carbon-carbon covalent bonds of the chain based on the structure and configuration of the polymer as well as characteristics of flow as will be understood by a skilled person.

In embodiments where shear resistant associative polymers are desired, selection of one or more desired weight averaged molecular weight can be performed based on the structure of the backbone and presence, number and location of secondary, tertiary and quaternary carbon atoms in backbone as will be understood by a skilled person.

In some embodiments, framing associative polymers and/or capping associative polymers herein described can have a weight averaged molecular weight the equal to or lower than 750,000 g/mol. In some embodiments, framing associative polymers and/or capping associative polymers herein described can have a weight averaged molecular weight between 400,000 g/mol and 1,000,000 g/mol. In particular in some of those embodiments shear resistant associative polymers can be a linear polymer.

In some embodiments, shear resistant associative polymers herein described can substantially maintain (±10%) control of one or more physical and/or chemical properties in a non-polar composition after application of a mechanical stress that is sufficient to break a carbon-carbon covalent bond (e.g. 150 kT where k is Boltzmann constant). For example such mechanical stress can be applied when a fluid passes through liquid handling operations, including pumping, turbulent pipeline flow, filters and the like as will be understood by a skilled person. Accordingly, shear resistant associative polymers herein described, and in particular shear resistant framing associative polymers herein described can be used to provide non-polar composition where a long lasting control of one or more properties is desired, and in particular where control of one or more desired effect is maintained after repeated exposure of the non-polar composition comprising the associative polymer to the mechanical stress sufficient to break a carbon-carbon covalent bond. In particular the mechanical stress sufficient to break a carbon-carbon covalent bond depends on various factors such as the chemical nature of the chain, the concentration and longest span of a polymer and additional factors identifiable by a skilled person.

In particular in some embodiments, in which associative polymers herein described are resistant to shear degradation (e.g. chain scission upon passage through pumps, during prolonged turbulent flow in pipelines, tubes or hoses, during passage through filters), the associative polymer of the present disclosure can be introduced at early steps in the preparation of non-polar host compositions. In many applications the host composition can be itself a mixture.

In particular in exemplary embodiments in which a modified non polar composition comprising associative polymers herein described is provided in connection with production of inks or paints that can comprise a carrier liquid, pigments, stabilizers and other components, the associative polymer can be added to the carrier liquid prior to incorporation of the remaining components, with the possibility that a central depot of carrier liquid can feed production lines for diverse colors or grades of ink or paint. In some of these embodiments, the efficacy of the polymer can be retained after pumping, filtering, mixing and other processing steps.

Similarly, in exemplary embodiments in which a modified non polar composition comprising associative polymers herein described is provided in connection with lubricant applications, the associative polymers herein described can be incorporated into the base oil that is subsequently combined with diverse additive packages. At concentrations up to c*, the associative polymers are expected to survive and are expected to not interfere with processes that include but are not limited to filtering, dewatering, pumping and mixing operations.

In exemplary embodiments in which a modified non polar composition comprising associative polymers herein described is provided in connection with fuel applications (e.g. use as drag reducing agents, enhancers of fuel efficiency, emission reducing agents, or mist control agents), the ability to incorporate the associative polymer herein described at any point along the distribution system allows for example incorporation at the refinery; or in the intake line of a storage tank; or in the intake line of a tanker ship, railway tank car, tank of a tanker truck; or in the intake line to a major site of use, such as an airport or a military depot; or in the transfer line from a storage tank into a vehicle; or as a solution added to the tank of a vehicle at the time of fueling.

In exemplary embodiments in which a modified non polar composition comprising associative polymers herein described is provided in connection with drag reducing agents in the transport of petrochemicals (especially crude oil) through very long pipelines, the present polymers resist shear degradation upon passage through pumps; therefore, fewer injection stations are required. In some cases, introduction of the associative polymer at a single location prior to the intake of the pipeline will provide drag reduction throughout the entire length of the pipeline.

In some embodiments herein described associative polymers are not interfacial agents, so that such polymers can be added prior to dewatering operations (including but not limited to fuel handling) and defoaming operations (including but not limited to production of paints and inks); at concentrations up to c*, the associative polymers do not interfere with these essential processing steps and the processing steps have a minimal effect on the associative polymers.

In some embodiments, associative polymers herein described can be used as a fuel additive with one or more of the following features: i) effective at low concentrations (acceptable viscosity), ii) introduced at the refinery; iii) resistant to non-intentional degradation; iv) soluble over wide temperature range (−50° C. to 50° C.); v) permit dewatering and filtering, vi) permit optimization in engine combustion chamber; vii) clean burning, and viii) affordable.

In some embodiments, the associative polymers and related compositions herein described can be used in connection with application where passage of a fluid in a pipeline is performed. A turbulent drag, which is usually expressed in terms of frictional pressure drop, plays a crucial role in pipeline transportation of non-polar liquids as will be understood by a skilled person: it increases the energy cost for moving the liquid through the pipeline and thus limits the capacity of the system. Introducing a drag reducing agent (DRA) to the fluid, which dampens turbulent regions near the pipe wall and consequently decreases turbulent flow and increases laminar flow, provides a reduction in the frictional pressure drop along the pipeline length. The benefits provided by DRAs include maintaining the same flow rate with a significantly lower energy cost, and alternatively resulting in a much higher flow rate using the same amount of energy as will be understood by a skilled person.

In some embodiments, the associative polymers here described can be designed to provide drag reduction to non-polar liquid in turbulent pipeline flow. In some of those embodiments when exposed to high shear flow in pump, aggregates of FGs serve as sacrificial weak links that can reversibly respond to the high shear by dissociation so as to protect the backbone from degradation. Once the polymer chains leave the pump, they can re-form supramolecules via association of FGs and continue to provide drag reduction to the pipeline flow. In some instances identifiable by a skilled person, associative polymers herein described can greatly simplify the practice of reducing energy cost for pipeline transportation of non-polar hosts and/or increasing the capacity of existing pipeline system using drag reducing additives.

As disclosed herein, the associative polymers and non-polar composition herein described can be provided as a part of systems to control at least one rheological property of the drag reduction and/or flow rate enhancement alone or in combination with another physical and/or chemical properties herein described, including any of the methods described herein.

The systems can be provided in the form of kits of parts. In a kit of parts, polymers (e.g. backbone polymers, associative polymers or precursor thereof), compositions and other reagents to perform the methods can be comprised in the kit independently. One or more polymers, precursors, compositions and other reagents can be included in one or more compositions alone or in mixtures identifiable by a skilled person. Each of the one or more polymers, precursors, compositions and other reagents can be in a composition alone or together with a suitable vehicle.

Additional reagents can include molecules suitable to enhance reactions (e.g. association of one or more associative polymers herein described with a related host composition) according to any embodiments herein described and/or molecules standards and/or equipment to facilitate or regulate the reaction (e.g. introduction of the associative polymer to the host)

In particular, the components of the kit can be provided, with suitable instructions and other necessary reagents, in order to perform the methods here described. The kit can contain the compositions in separate containers. Instructions, for example written or audio instructions, on paper or electronic support such as tapes or CD-ROMs, for carrying out reactions according to embodiments herein described (e.g. introduction of associative polymer in a host composition), can also be included in the kit. The kit can also contain, depending on the particular method used, other packaged reagents and materials.

Further advantages and characteristics of the present disclosure will become more apparent hereinafter from the following detailed disclosure by way of illustration only with reference to an experimental section.

EXAMPLES

The associative polymers, materials, compositions, methods system herein described are further illustrated in the following examples, which are provided by way of illustration and are not intended to be limiting.

In particular, the following examples illustrate exemplary associative polymers and related methods and systems. A person skilled in the art will appreciate the applicability and the necessary modifications to adapt the features described in detail in the present section, to additional associative polymers, compositions, methods and systems according to embodiments of the present disclosure.

Example 1: Exemplary Associative Polymer and Architectures

Exemplary associative polymers and related exemplary architectures are illustrated in FIGS. 3 to 6.

Figure 3:
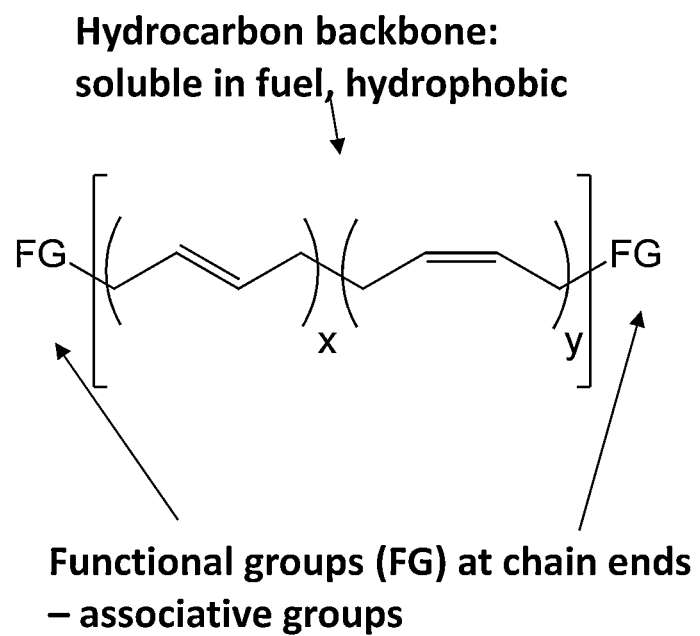
FIG. 3 shows an exemplary associative polymer according to an embodiment herein described. In the illustration of FIG. 3 x and y can be independently selected between any integer≥1. The sum of x and y can be between 1,000 and 10,000.

In particular in the illustration of FIG. 3 a linear polymer backbone of 1,4-polybutadiene is illustrated in which end groups are <1 wt % of the polymer and contain <0.2 wt % heteroatoms. When added to fuel, polymers of this type burn cleanly and maintain the caloric content of the fuel.

Figure 4:
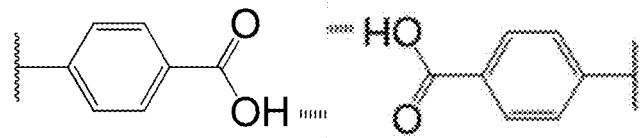
FIG. 4 shows exemplary functional groups and related exemplary associative interactions according to embodiments herein described.
Figure 4:
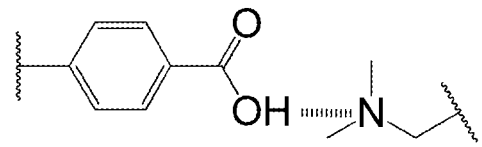
Figure 4:
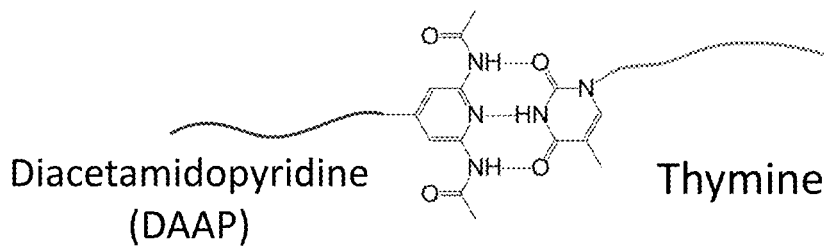
Figure 4:
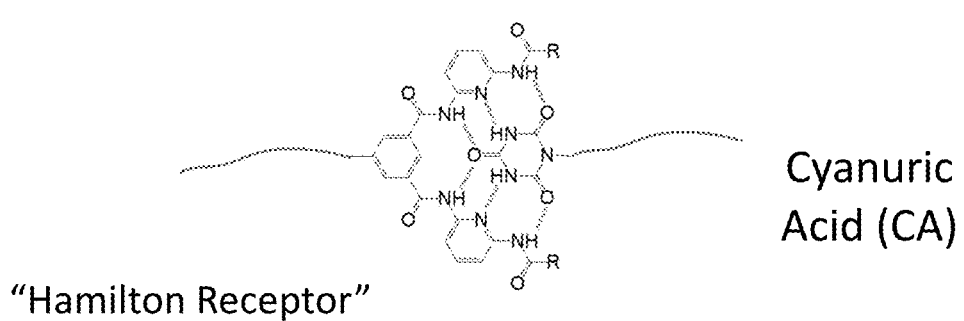
Figure 5:
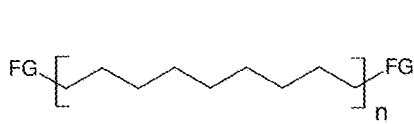
FIG. 5 shows exemplary architectures of associative polymers herein described. In particular in the illustration of FIG. 5, a, b, c, d, n, and e are independently integers≥1.
Figure 5:
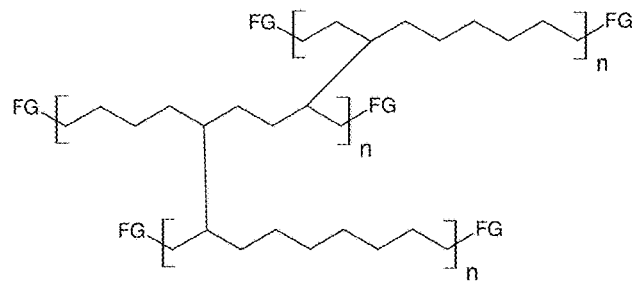
Figure 5:
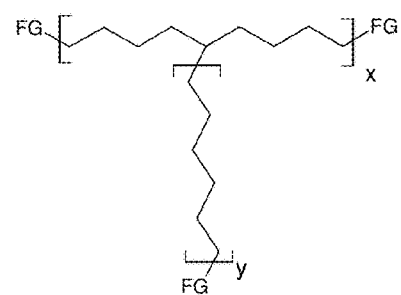
Figure 5:
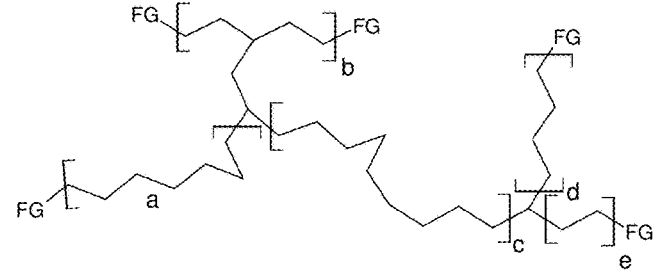
Figure 5:
Figure 6:
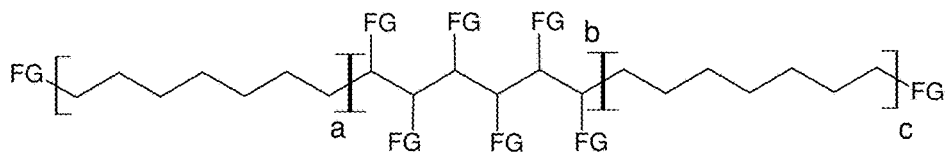
FIG. 6 shows exemplary block architectures of associative polymers herein described and of an exemplary chain or backbone moiety. In particular in the illustration of FIG. 6, a, b, c, d, n, x, and y are independently integers≥1.
Figure 6:
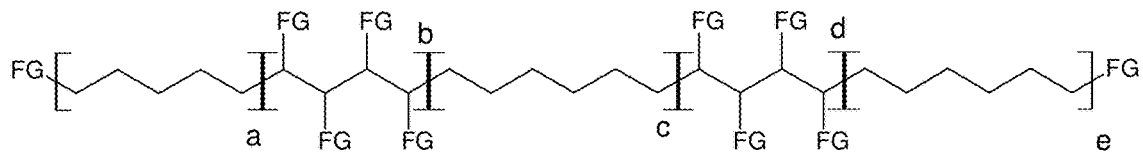
Figure 6:

The illustration of FIG. 4 provides exemplary functional groups which can be used with the backbone of FIG. 3 or other backbones as will be understood by a skilled person. The illustration of FIGS. 5 and 6 shows exemplary branched architectures (FIG. 5) and exemplary block-polymer architecture (FIG. 6) which can be created with the backbone of and/or other backbones as will be understood by a skilled person. When the associative polymer is added to a host composition the FGs form physical associations according to their nature (e.g. self to self, donor-acceptor, pairwise, or multidentate). The illustration of FIGS. 1 and 2 show exemplary types of supramolecular structures thus formed.

Example 2: Methods of Making Associative Polymers and Related Architectures

A schematic illustration of exemplary reactions and methods suitable to make associative polymers herein described is provided in FIGS. 7 to 10.

Figure 7:
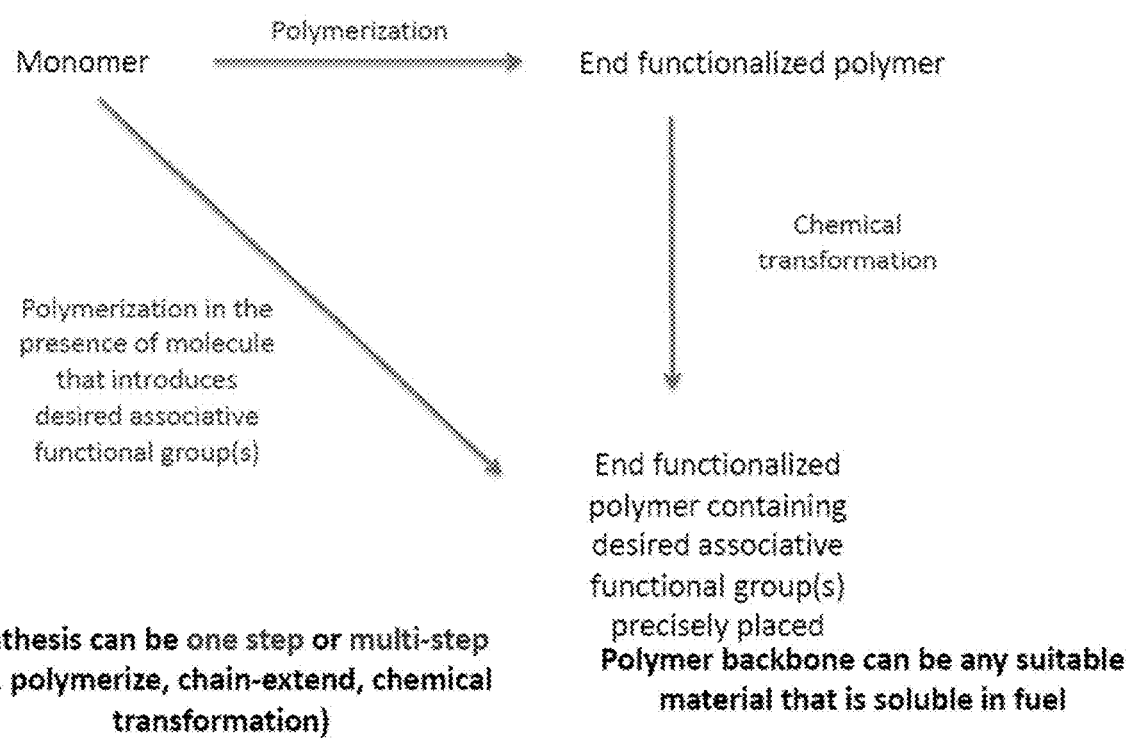
FIG. 7 shows a schematic representation of a method to provide an associative polymer of the disclosure according to embodiments herein described.

In particular FIG. 7 shows a schematic of an exemplary method to provide an associative polymer herein described illustrated making specific reference to embodiments where a corresponding non-polar composition is a fuel.

Figure 8:
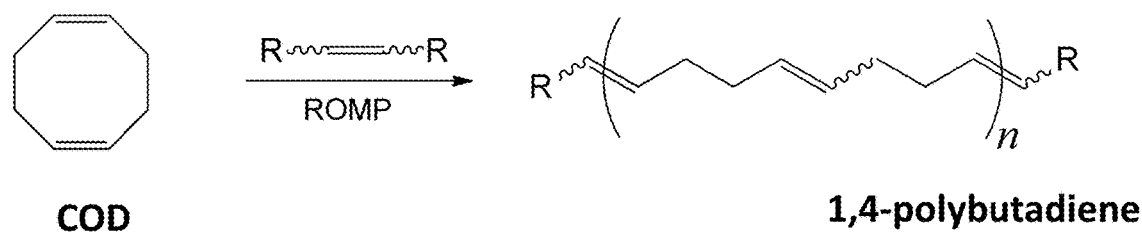
FIG. 8 shows a schematic representation of a reaction suitable to provide an associative polymer of the disclosure using chain transfer agents according to embodiments herein described.
Figure 9:
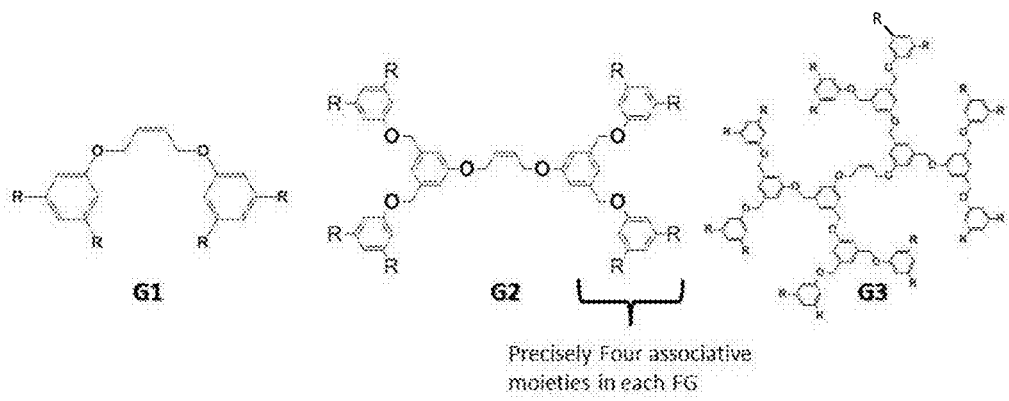
FIG. 9 shows exemplary chain transfer agents suitable to be used in the reaction illustrated in FIG. 8 according to embodiments herein described, and in particular, chain transfer agents with internal olefins based on benzyl ether dendrons.

FIGS. 8 and 9 show an exemplary ROMP+Chain Transfer Agent (CTA) reaction (FIG. 8) and exemplary chain transfer agents (FIG. 9). This exemplary reaction allows in several cases precise control of the number of associating groups. It will be appreciated by a skilled person that it can be straightforward to synthesize and purify at large scale associative polymers compatible with non-polar compositions, with the backbone and associative groups chosen for a particular application as described in the specification (see, e.g., [18-20]).

FIG. 10 shows a schematic of an exemplary method to synthesize an associative polymer using CTAs.

Example 3: Synthesis of High Molecular Weight Di-TE PB by ROMP 6.7 mg of octa-functional tert-butyl ester CTA is loaded into a 50 ml Schlenk flask (charged with a magnetic stir bar). The flask is later sealed with a septum. The content is then deoxygenated by 5 times of pulling vacuum/filling argon. 0.5 ml of deoxygenated DCM is added to dissolve the CTA. 0.13 ml of 1 mg/ml DCM solution of Grubbs II catalyst is injected into the flask, and then 0.03 ml of freshly vacuum distilled, purified COD (≡50 eq. w.r.t. CTA) is immediately injected.

The mixture is stirred at 40° C. for 33 minutes to allow complete incorporation of CTA into the polymer. Another 0.13 ml of freshly prepared 1 mg/ml DCM solution of Grubbs II catalyst is then injected, followed by 5.6 ml of freshly vacuum distilled, purified COD (≡10,000 eq.) in 12 ml of deoxygenated DCM. The reaction is stopped by adding 30 ml of oxygen-containing DCM as the mixture turns viscous enough to completely stop the motion of magnetic stir bar. The diluted mixture is precipitated into 400 ml of acetone at room temperature. The resulting polymer is collected and dried in vacuo at room temperature overnight. GPC results of the polymer: $M_w$=430,000 g/mol, PDI=1.46.

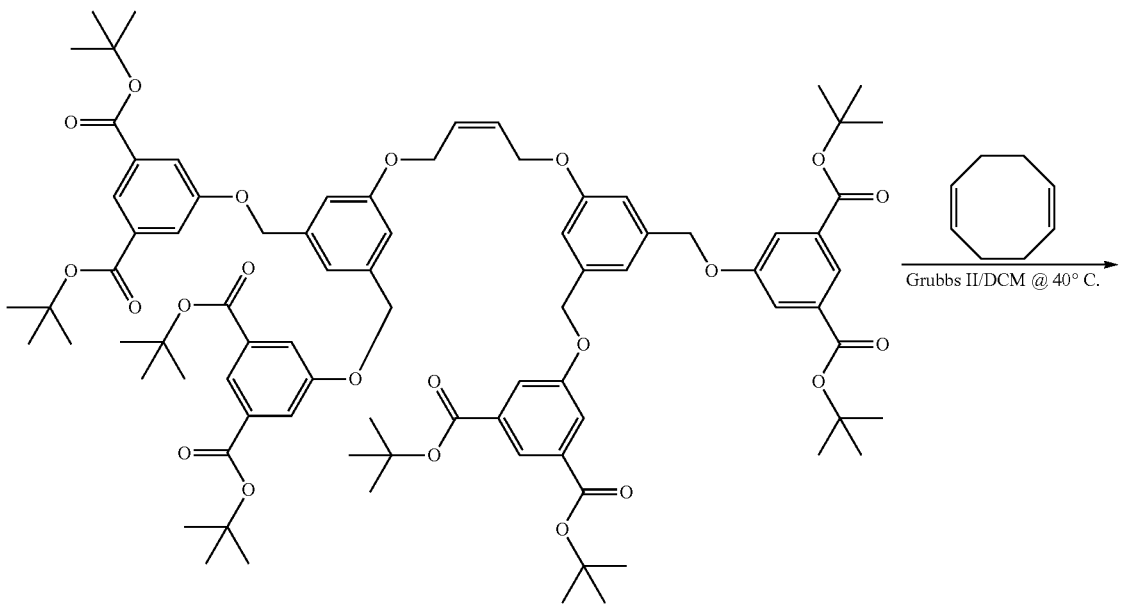

-continued

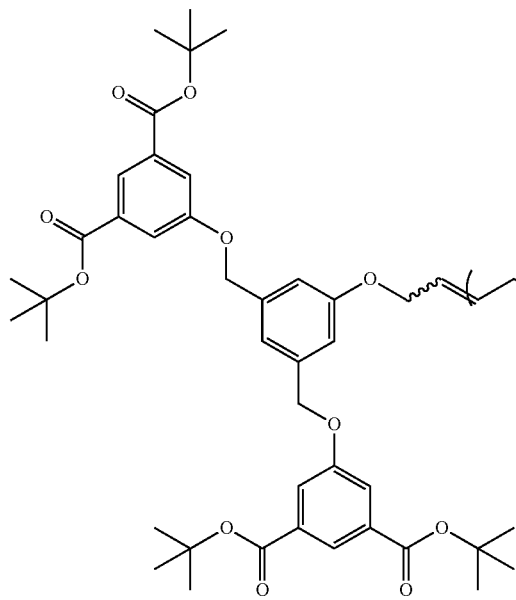
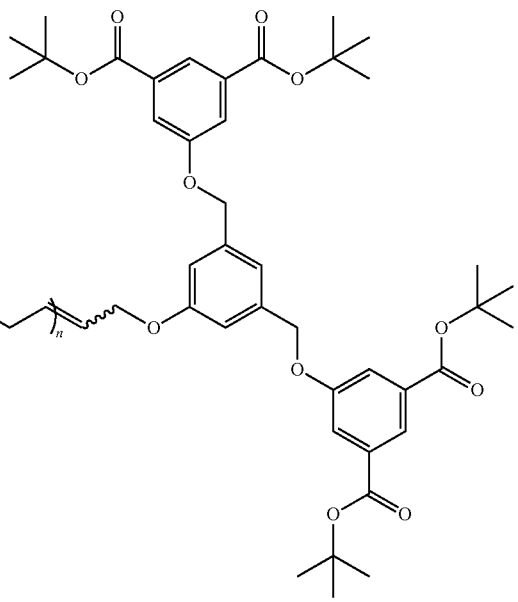

Example 4: Deprotection of the Acid End Groups 1 g of the aforementioned polymer is loaded into a 50 ml Schlenk flash (charged with a magnetic stir bar), and degassed by 5 times of pulling vacuum/filling argon). 30 ml of deoxygenated is then syringe-transferred into the flask. The mixture is homogenized at room temperature. Once complete homogenization is achieved, 1.25 ml of deoxygenated trifluoroacetic acid (TFA) is syringe-transferred into the flask. The mixture is then stirred at room temperature overnight.

Upon the completion of TFA hydrolysis, the mixture is diluted with 20 ml of DCM, and the resulting solution is precipitated into 400 ml of acetone at room temperature. The resulting polymer is further purified by 2 times of re-precipitation from THF into acetone.

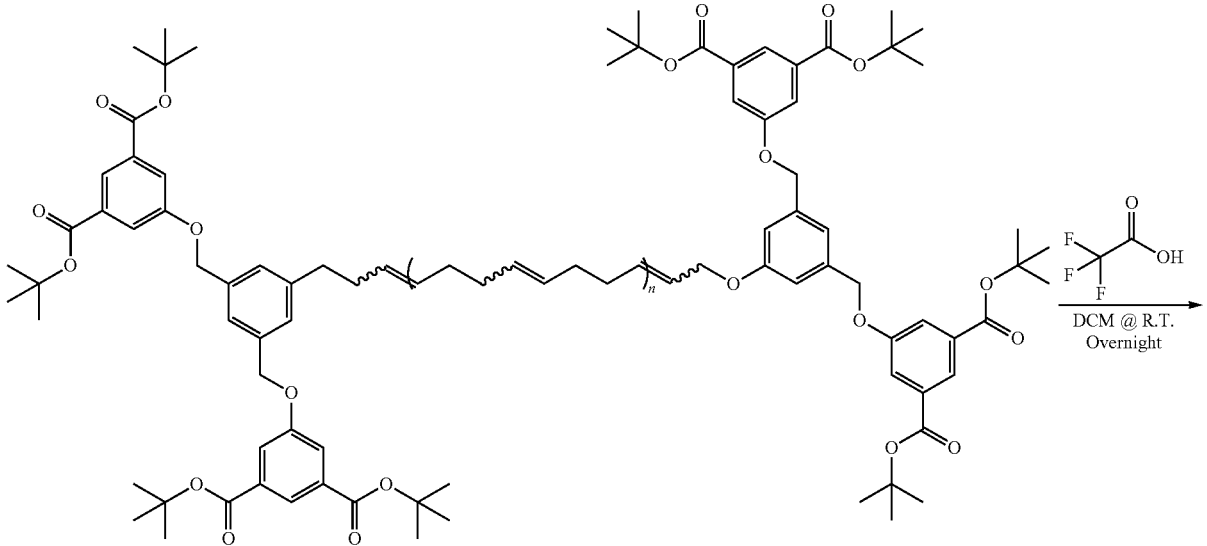

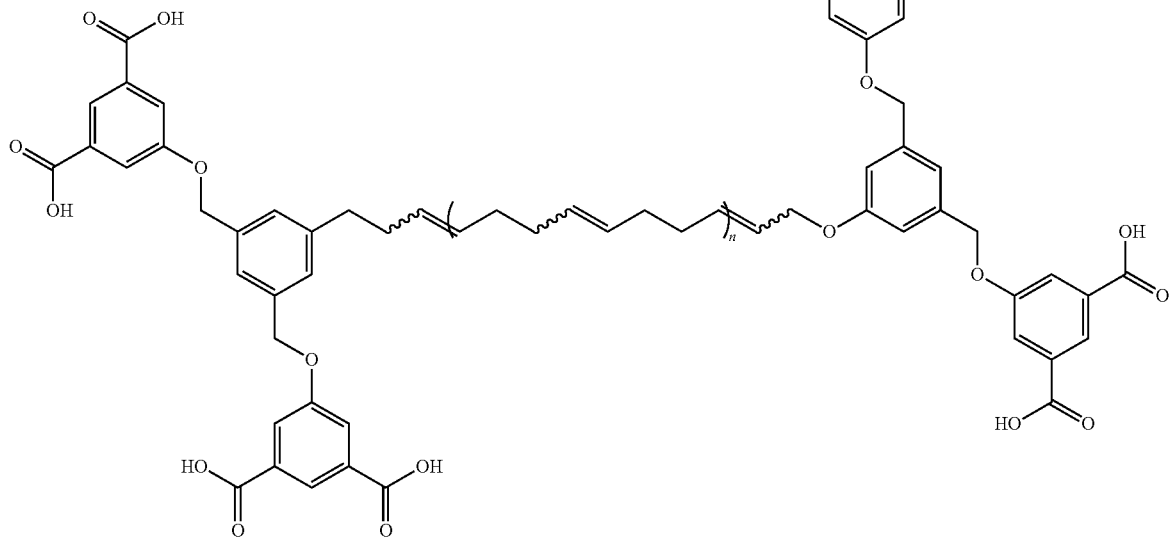

Example 5: Synthesis of High Molecular Weight Di-TB PB by ROMP

Synthesis of high M.W di-TB PB by ROMP is performed according to the following steps:

Step 1: Prepolymer Synthesis 5 mg of octa-functional chloro CTA is loaded into a 50 ml Schlenk flask (charged with a magnetic stir bar). The flask is later sealed with a septum. The content is then deoxygenated by 5 times of pulling vacuum/filling argon. 0.5 ml of deoxygenated DCM is added to dissolve the CTA. 0.13 ml of 1 mg/ml DCM solution of Grubbs II catalyst is injected into the flask, and then 0.03 ml of freshly vacuum distilled, purified COD (≡50 eq. w.r.t. CTA) is immediately injected. The mixture is stirred at 40° C. for 33 minutes to allow complete incorporation of CTA into the polymer. Another 0.13 ml of freshly prepared 1 mg/ml DCM solution of Grubbs II catalyst is then injected, followed by 5.6 ml of freshly vacuum distilled, purified COD (≡10,000 eq.) in 12 ml of deoxygenated DCM. The reaction is stopped by adding 30 ml of oxygen-containing DCM as the mixture turns viscous enough to completely stop the motion of magnetic stir bar. The diluted mixture is then precipitated into 400 ml of acetone at room temperature. The resulting polymer is collected and dried in vacuo at room temperature overnight. GPC results of the polymer: $M_w$=430,000 g/mol, PDI=1.46.

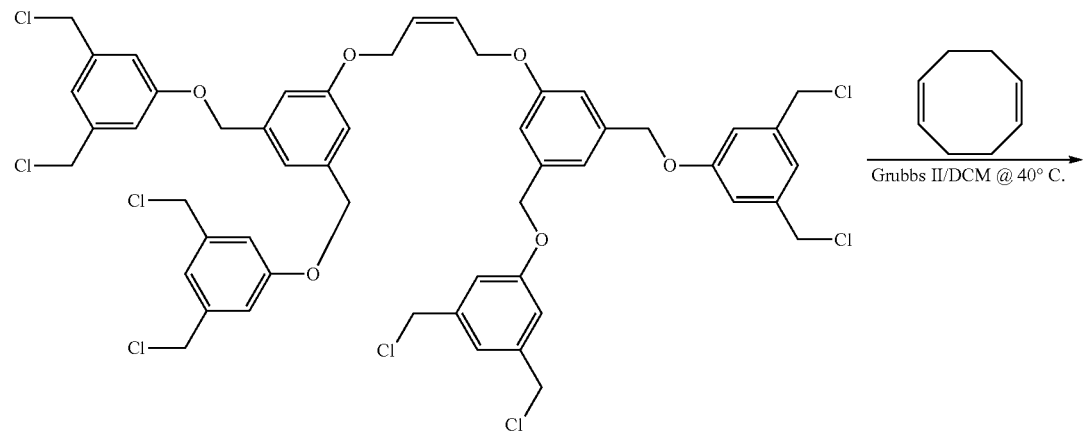

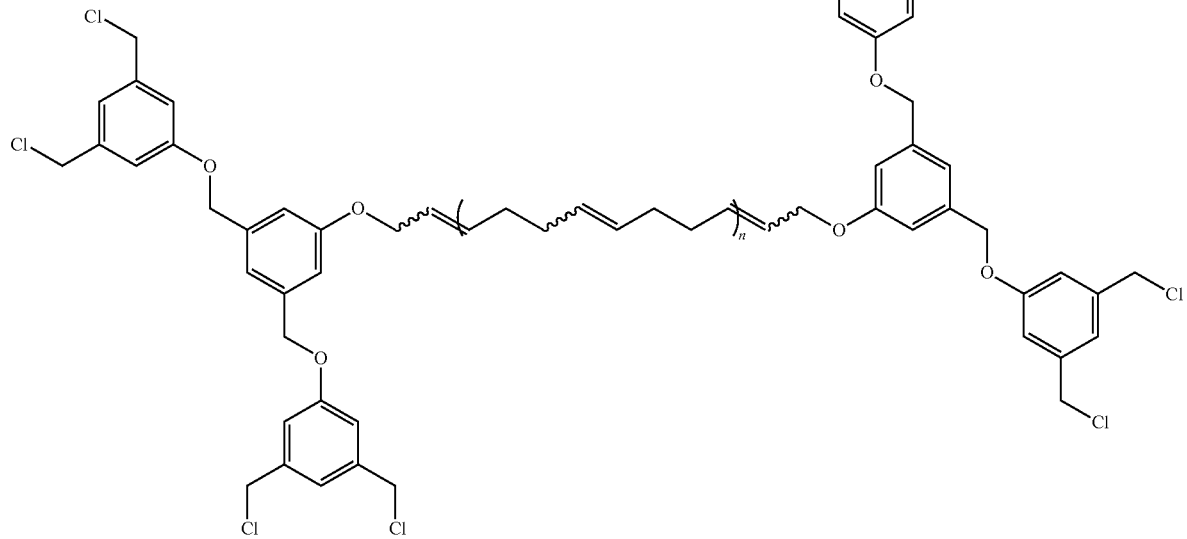

Step 2: End-Azidation of Prepolymer 1 g of the aforementioned chloro-terminated prepolymer is loaded into a 50 ml Schlenk flask, and dissolved into 30 ml of anhydrous THF. Upon complete homogenization, 0.73 g of azidotrimethylsilane (≡1200 eq w.r.t. polymer) and 1.57 g of tetrabutylammonium fluoride (≡1200 eq w.r.t. polymer) are added into the flask. The resulting mixture is degassed by 2 freeze-pump-thaw cycles to prevent crosslinking by dissolved oxygen. Then, the mixture is stirred at 60° C. overnight. The mixture is precipitated into 300 ml of methanol at room temperature. The resulting polymer is further purified by 2 more times of reprecipitation from THF into acetone. The resulting polymer is dried in vacuo at room temperature overnight.

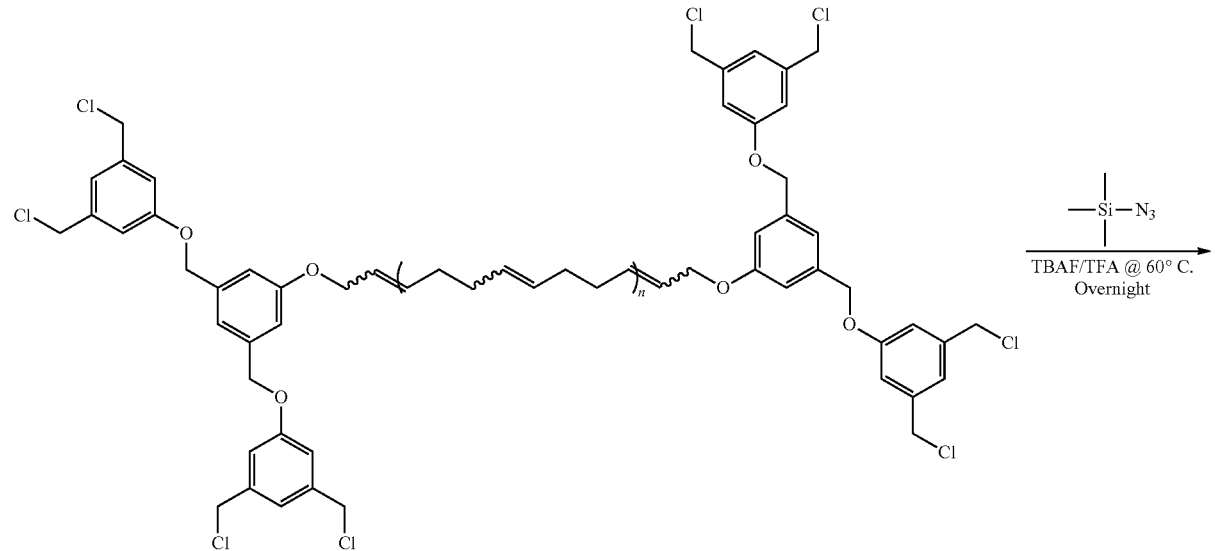

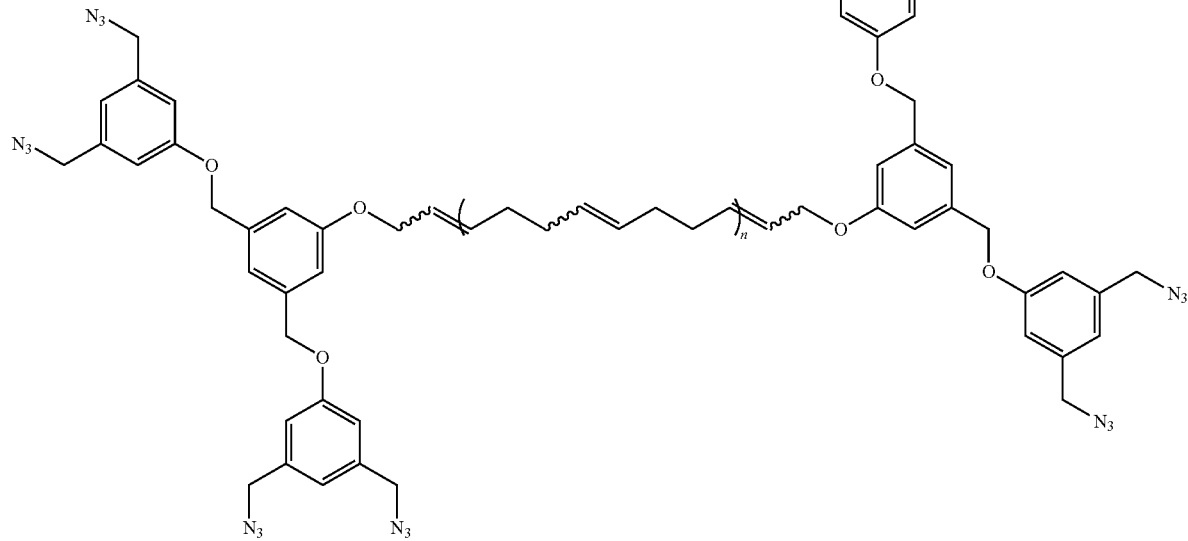

Step 3: Attachment of Tertiary Amine Groups to Polymer Chain Ends 0.68 g of the aforementioned azido-terminated prepolymer is loaded into a 50 ml Schlenk flask, and dissolved into 25 ml of anhydrous THF. Once homogenization is complete, 0.23 g of 3-Dimethylamino-1-propyne (≡1,200 eq. w.r.t. the polymer), along with 0.02 g of N,N,N',N',N''-pentamethyl-diethylenetriamine (PMDETA, ≡50 eq. w.r.t. the polymer) are added into the flask. The mixture is then deoxygenated by 2 freeze-pump-thaw cycles. Later it is frozen and pumped again, and then 0.016 g of copper (I) bromide (≡50 eq. w.r.t. the polymer)) is added into the flask under the protection of argon flow when the mixture is still frozen. After thawing the mixture and filling the flask with argon, the mixture is stirred at room temperature for 20 minutes in order to homogenize the copper (I) catalyst. The mixture is stirred at 50° C. overnight. 2 ml of methanol is slowly injected into the mixture in order to remove copper from the amine end groups. The mixture is precipitated into 300 ml of methanol at room temperature. The resulting polymer is further purified by 2 more times of reprecipitation from THF into methanol. It is later dried in vacuo at room temperature overnight.

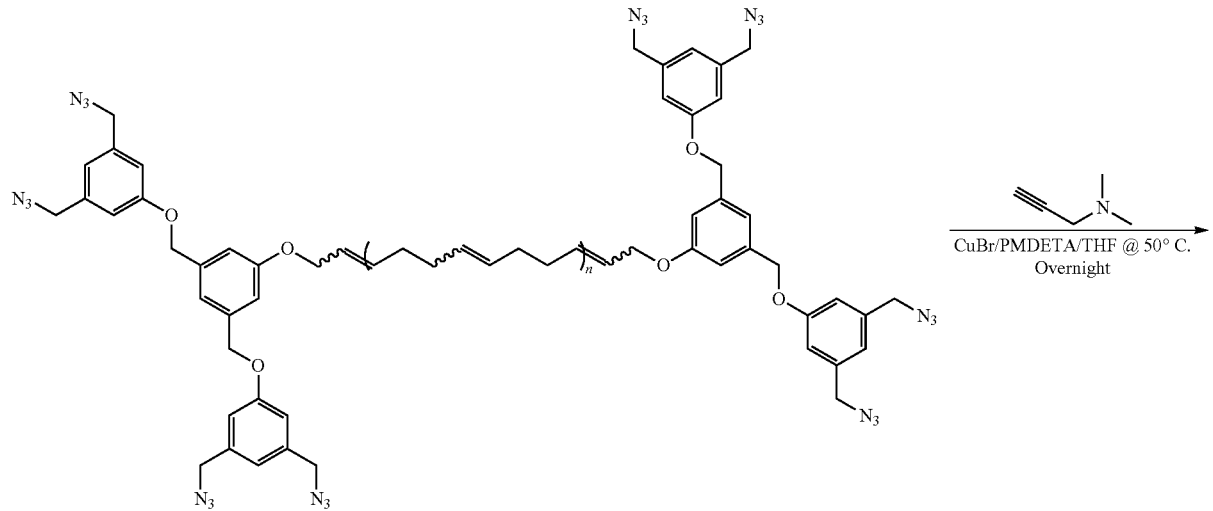

-continued

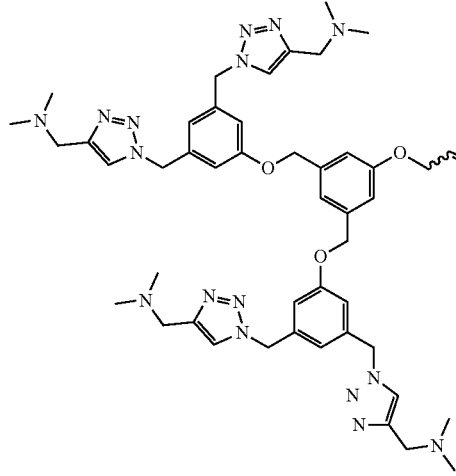
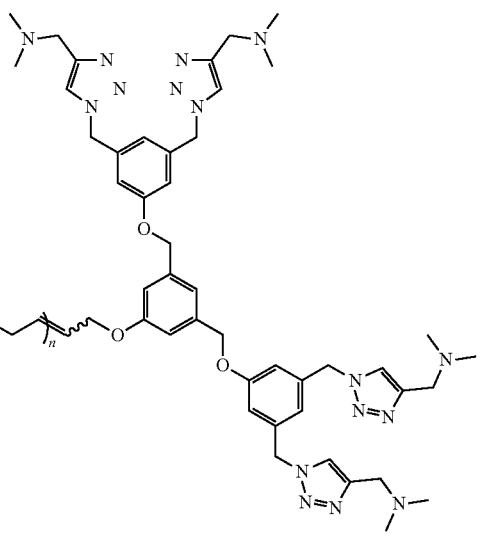

Example 6: Effect of Self-Association in Exemplary Associative Polymers

Figure 11:
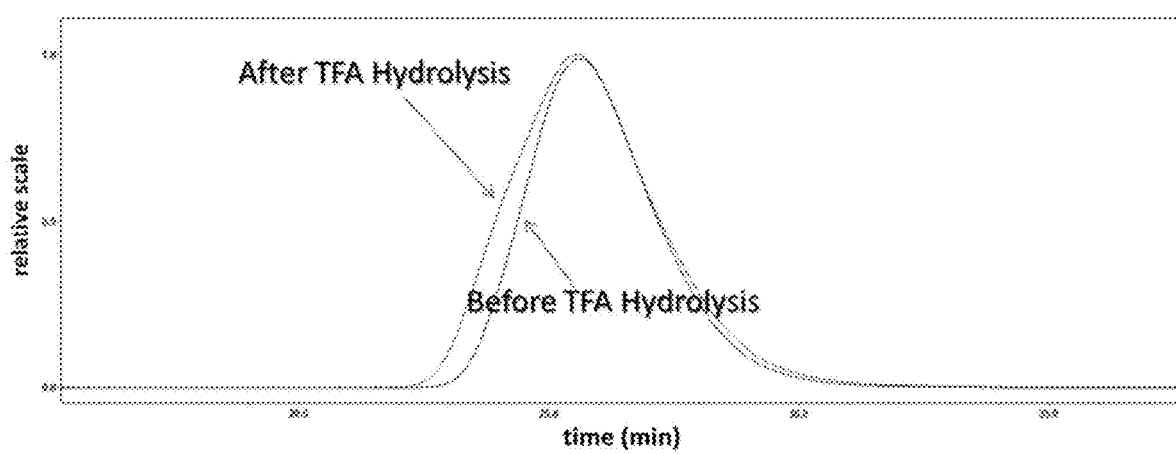
FIG. 11 shows a diagram illustrating GPC traces of 430K di-TE PB (di-TE PB also called octa tBu ester PB herein) and the resulting polymer of its hydrolysis reaction (in THF). In particular.
Figure 12:
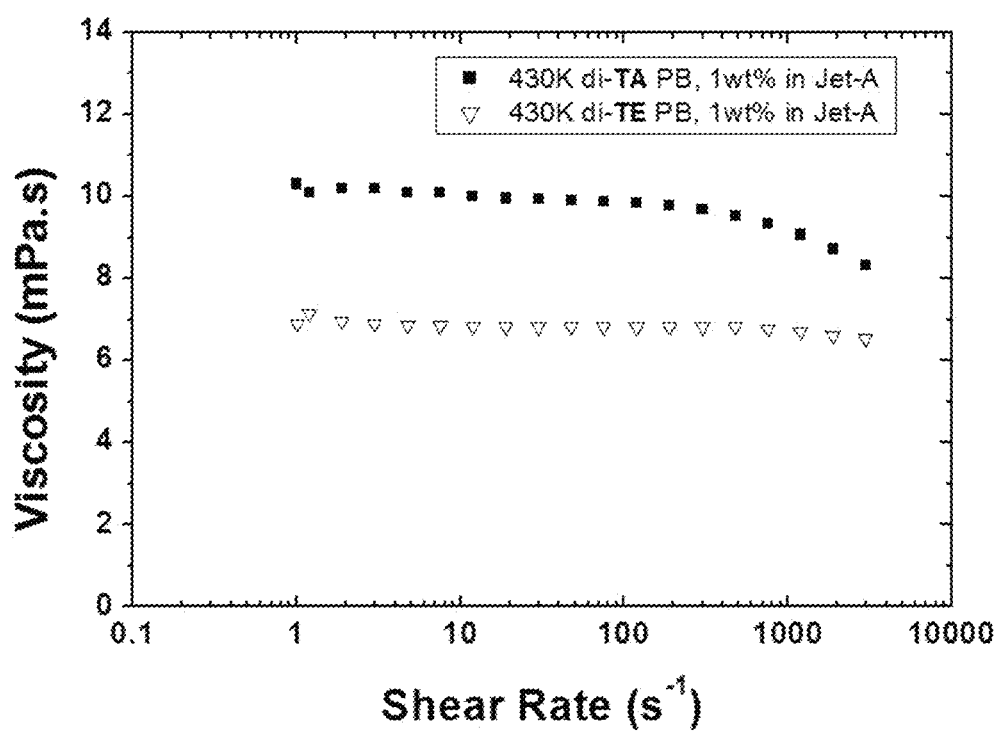
FIG. 12 shows a diagram illustrating viscosity in function of shear rate of the 1 wt % Jet-A solutions of the 430K di-TE PB and 430K diTA PB herein also indicated as di-TE PB and (430K di-TA PB).

Proof of effect of self-association in exemplary associative polymers herein described is illustrated in FIG. 11 and FIG. 12. In the exemplary associative of Example 5 the aforementioned method of recovering the end acid groups does not crosslink the polybutadiene backbone, as proved in the superposition of GPC traces of 430K di-TE PB and the resulting polymer of its hydrolysis reaction (in THF) illustrated in FIG. 11.

In the illustration of FIG. 11, the slight increase in the population of high molecular weight species is due to the weak self-association of chain-end acid clusters. The apparent $M_w$ increases by 20% after TFA hydrolysis.

A further confirmation is provided by the illustration of FIG. 12. In particular, FIG. 12 shows the rheology data of the 1 wt % Jet-A solutions of the 430K di-TE PB and 430K di-TA PB respectively. The viscosities of 1 wt % Jet-A solution of 430K di-TA PB are significantly higher than those of the ester prepolymer. Since the GPC results show the extent of backbone crosslinking during removal of tert-butyl groups is negligible, it is reasonable to say that the self-association of acid clusters accounts for the increase in viscosities.

Example 7: Effect of End-to-End Donor Acceptor Association in Exemplary Associative Polymers A proof of the effect of end-to-end donor/acceptor association is provided in FIG. 13 and FIG. 14. In particular FIG. 13, shows the superposition of GPC traces of the 430K octa chloro PB and the corresponding octa tertiary amine PB.

Figure 13:
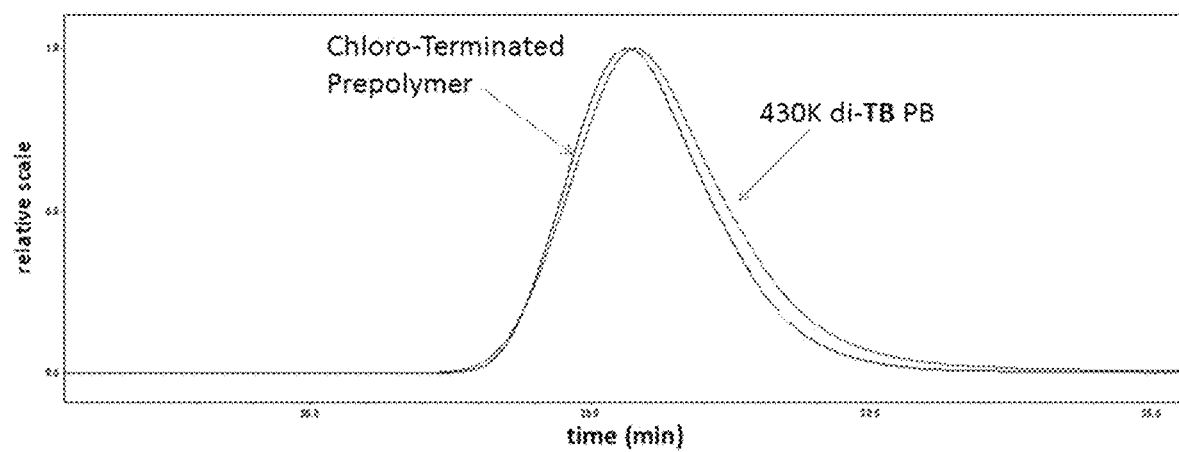
FIG. 13 shows a diagram illustrating GPC traces of the 430K octa chloro PB and the corresponding octa tertiary amine PB. In particular.

In the illustration of FIG. 13, the polybutadiene backbone is mainly intact after two end-functionalization reactions.

Figure 14:
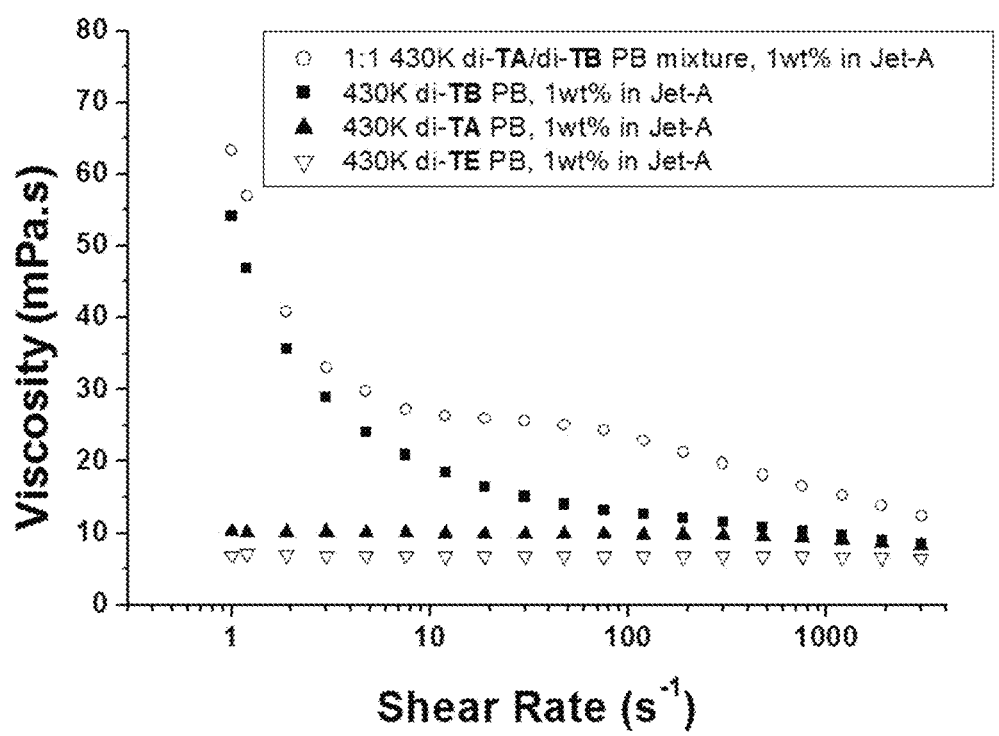
FIG. 14 shows a diagram illustrating viscosity in function of shear rate of 1 wt % Jet-A solutions of 430K di-TE PB, di-TA PB, di-TA PB, and 1:1 w/w di-TA PB/di-TB PB mixture herein also indicated as 430K di-TE PB, di-TA PB, di-TB PB, and 1:1 w/w-di-TA PB/di-TB PB mixture.

FIG. 14 shows the rheology data of 1 wt % Jet-A solutions of 430K di-TE PB, di-TA PB, di-TB PB, and 1:1 w/w di-TA PB/di-TB PB mixture. In the illustration of FIG. 14, the 1:1 mixture shows significantly higher viscosities than the other solutions. Since none of the two polymer components are crosslinked, it suggests that the end-to-end acid/base interaction results in the formation of supramolecular species.

Example 8: Effect of an Exemplary Associative Polymer on Fuel Compositions

Effect of di-TA PB synthesized according to Example 5, was tested in Jet A fuel. In particular a composition comprising 0.5% of di-TA PB with a backbone length of 264,000 g/mol (denoted 264K di-TA PB) in jet A fuel has been provided as illustrated in FIG. 15.

Figure 15:
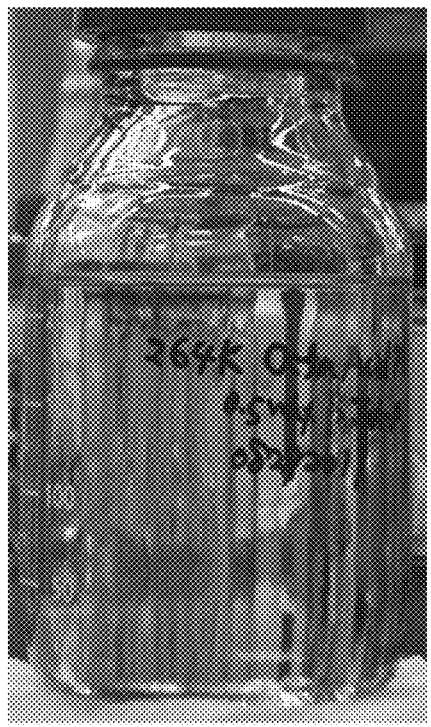
FIG. 15 illustrates properties of an exemplary hydrocarbon composition according to the disclosure. In particular, FIG. 15, Panel A shows that the exemplary composition remains stable for months at −30° C.
Figure 15:
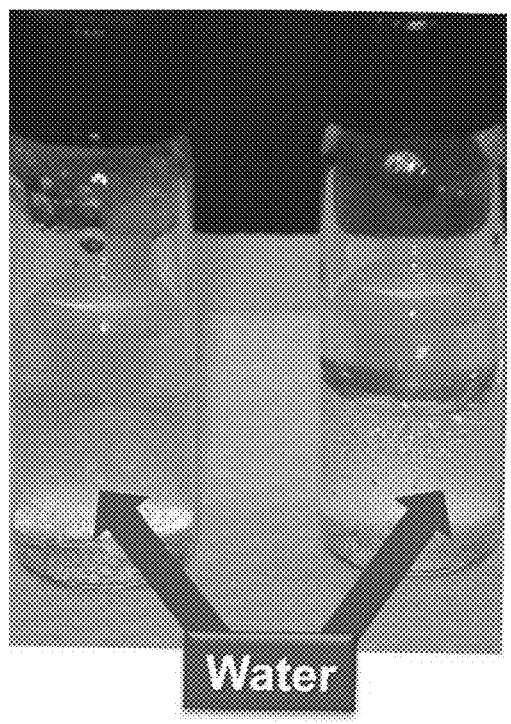

In the illustration of FIG. 15 is shown that the exemplary associative di-TA PB of Example 5 showed no phase separation and was able to stay in solution (crystal clear) even at −30° C. for months (see FIG. 15, Panel A).

Additionally, dewatering operations appeared to occur as quickly and completely in the composition with associative di-TA PB of Example 5, as in the untreated host Jet A (see FIG. 15, Panel B left vial v. right vial).

Example 9: High-Speed Impact/Flammability Test

To demonstrate the effect of exemplary polymers on the mist-control of kerosene, a series of high-speed impact/flammability test were conducted at California Institute of Technology. The high-speed impact test is designed to simulate a scenario in which fuels can be atomized into droplets due to impact, whereas the continuously provided ignition sources are used to obtain an indication of the flammability of resulting droplets. The following samples were loaded into 50 ml aluminum cans, fixed on a stage, and impacted by a 5 cm×3 cm steel cylinder travelling at 200 km/hr (three continuously burning propane torches were set up along the path of splashed samples): Jet-A, 0.35 wt % Jet-A solutions of 4.2 M polyisobutylene (PIB) with and without recirculation by a Bosch 69100 In-line turbine fuel pump for 1 minutes, 0.3 wt % of Jet-A solutions of 430K di-TA PB with and without recirculation by a Bosch 69100 In-line turbine fuel pump for 1 minutes. The results for each sample are described below: Jet-A: Significant amount of fine droplets was generated upon impact. The fine droplets travelling along the path of the projectile were ignited by the burning torches within 50 milliseconds, and then evolved into a propagating fire ball.

0.35 wt % Jet-A solution of 4.2M PIB, without shear: Large droplets and filaments were generated by the impact. Sparkles were observed as the fluid elements passed over the torches, but they failed to propagate.

0.35 wt % Jet-A solution of 4.2M PIB, with 1 min. of shear: Fine droplets were generated by the impact. The fine droplets travelling along the path of the projectile were ignited by the burning torches within 50 milliseconds, and then evolved into a propagating fire ball.

0.3 wt % Jet-A solution of 430K di-TA PB, without shear: Droplets were generated by the impact. Sparkles were observed as the fluid elements passed over the torches, but they failed to propagate.

0.3 wt % Jet-A solution of 430K di-TA PB, with 1 min. of shear: Droplets were generated by the impact. Sparkles were observed as the fluid elements passed over the torches, but they failed to propagate.

Example 10: Synthesis of Octa Functional CTAs

Figure 18:
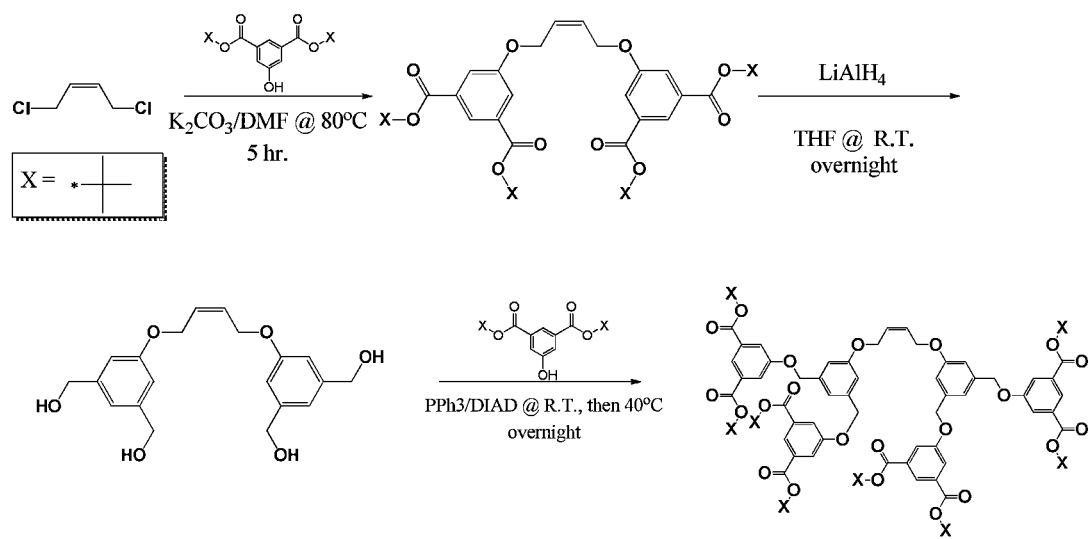
FIGS. 18 and 19 show exemplary synthesis reactions for exemplary CTAs suitable to make associative polymers in accordance with embodiments herein described.
Figure 19:
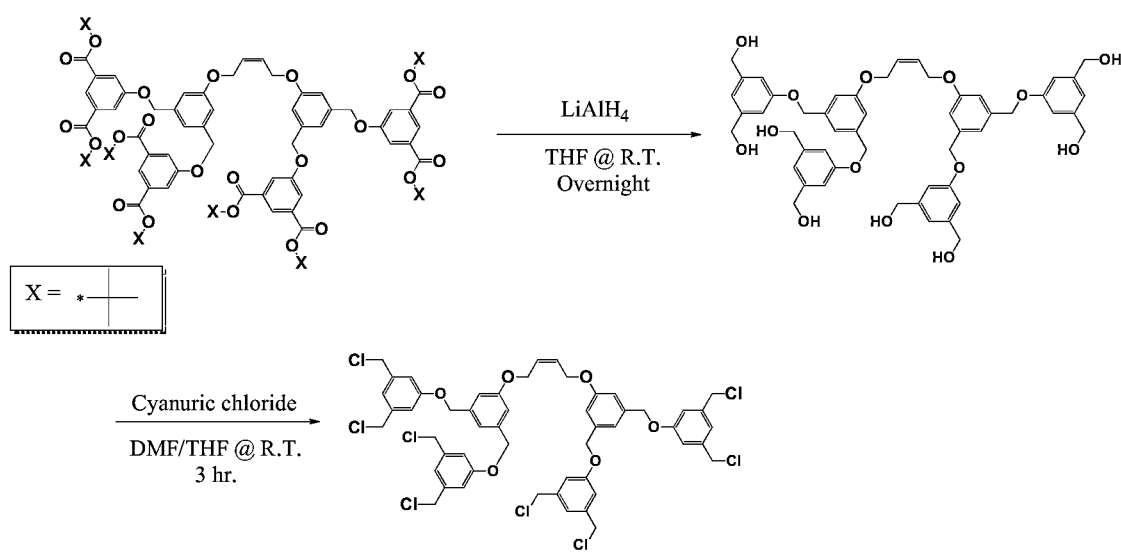

Reaction schemes for exemplary Octa functional CTAs in accordance with the present disclosure are shown in the illustration of FIG. 18 and FIG. 19.

Example 11: Exemplary Node to Chain and Node to FG Interactions

Figure 20:
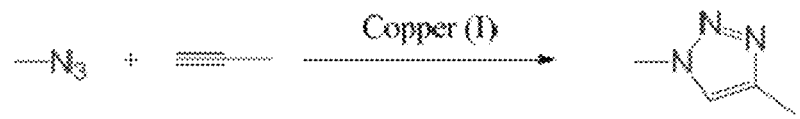
FIGS. 20 and 21 show exemplary covalent links linking node to chain and node to FG according to embodiments herein described.
Figure 20:
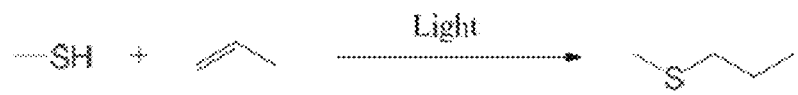
Figure 20:
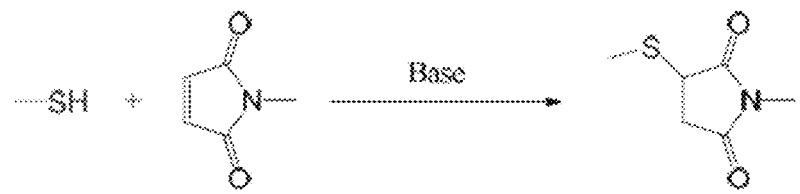
Figure 20:
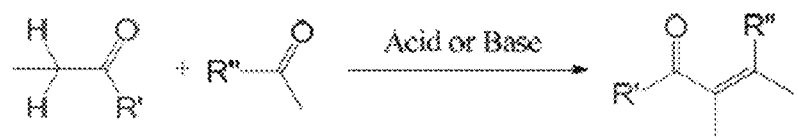
Figure 20:
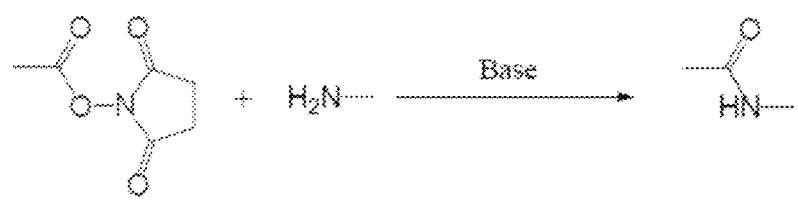
Figure 21:
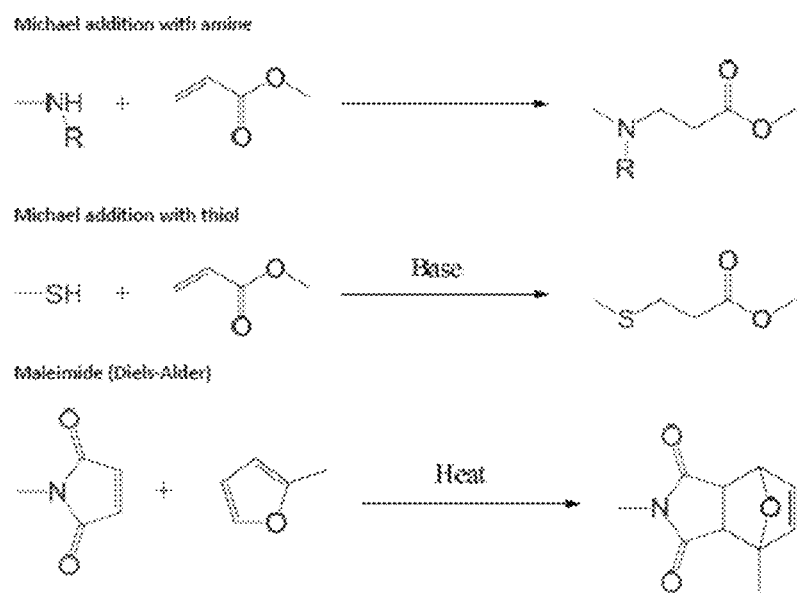

Exemplary pairs of reactive groups that are useful at end positions such as $R_1$ or $R_2$ in the structure of formula (III) or in di- or multi-valent crosslinkers and the product of their reaction, which can be used for covalently linking a chain and a FG, or linking chains to a node or attaching FG to a node in accordance with the present disclosure, are shown in the illustration of FIG. 20 and FIG. 21.

Example 12: Polymer-Composition Solubility Determination

Solubility of an exemplary polymer 1,4-polybutadiene (PB) in a non-polar composition has been determined. The nonpolar composition is kerosene, which can be considered to be a mixture of hydrocarbons that contain 6-16 carbon atoms per molecule, the $v_0$ of octane (160 cm$^3$/mol) can be chosen as a representative value for kerosene.

Accordingly, when 1,4-polybutadiene (PB) is used as the backbone of invented associative polymers, the value of $\delta_1$ is ~8 (cal/cm$^3$)$^{0.5}$ (see, e.g. [9, 24]). To evaluate $\delta_2$ for kerosene, the following relationship (dispersive Hansen parameter) can be used:

$$\delta = 9.55 n_D - 5.55$$

where $n_D$ is the refractive index of the host, and $n_D$ can be well-approximated by the square root of the dielectric constant (F) of the host. Given $\varepsilon_{kerosene}$ is 1.8 at 20° C., $\delta_2$ is ~9.55×(1.8)$^{0.5}$−5.55=7.26.

Accordingly, the interaction parameter for the associative polymer with a 1,4-polybutadiene backbone in kerosene at ambient temperature can be estimated as follows:

$$\chi \approx 0.34 + \frac{160}{1.987 \times 298.15} \times (8 - 7.26)^2 = 0.49.$$

The calculated value of x of 0.49 indicates that the PB associative polymer with a 1,4-polybutadiene backbone would be expected to be substantially soluble in a non-polar composition of kerosene.

A skilled person can determine based on the above Example if other associative polymer backbones would be substantially soluble in other non-polar compositions by applying the same calculations using the particular solubility parameters for the particular non-polar composition.

Example 13A: Drag Reduction Test 0.2 grams of telechelic 1,4-PB of $M_w$ 630,000 g/mol, terminated by 2 acid groups (denoted 630K di-DA PB) and 0.2 grams of telechelic 1,4-PB of $M_w$ 540,000 g/mol, terminated by 2 tertiary amine groups (denoted 540K di-DB PB) were dissolved in 39.6 grams of Jet-A at room temperature over 16 hours.

Figure 39A:
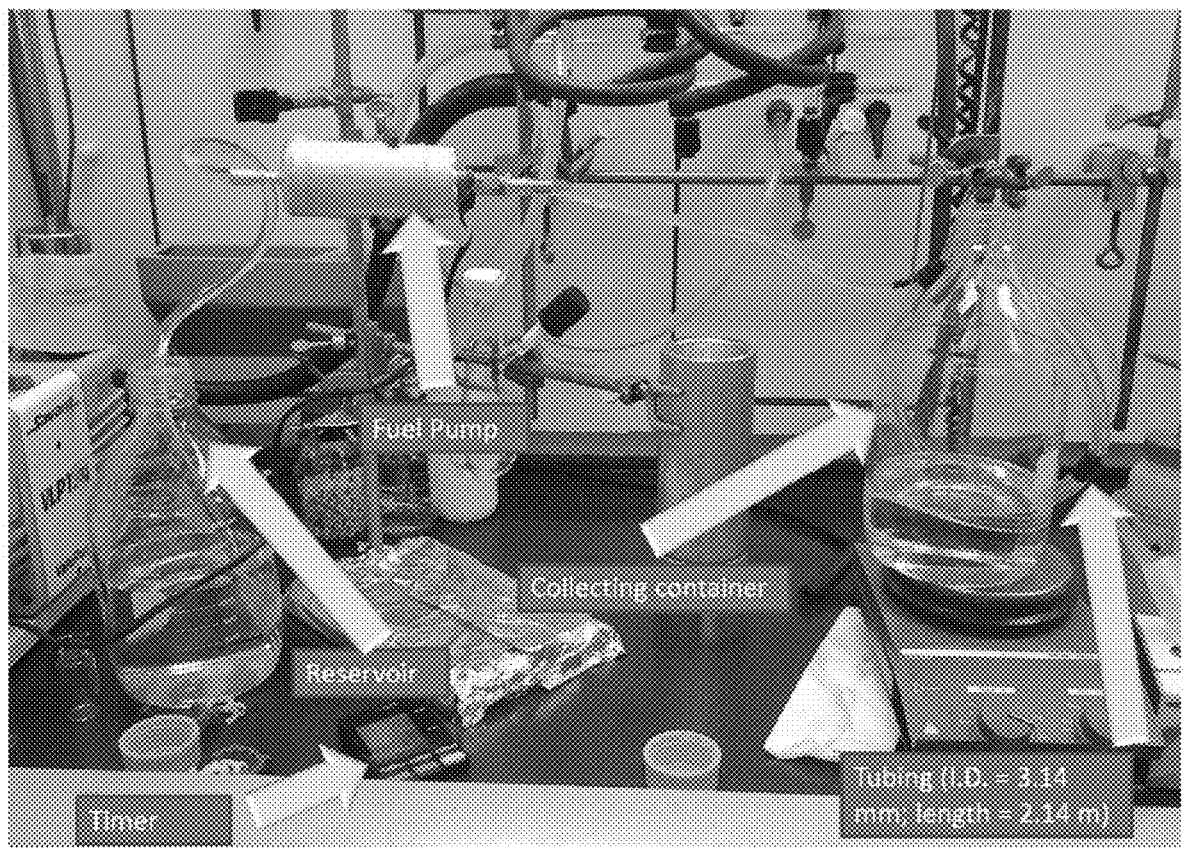
FIG. 39A shows an image of an experimental setup to test the associative polymers herein described in the control of drag reduction in compositions (see, e.g. Example 13A).

The resulting 1 wt % Jet-A solution of 1:1 w/w 630K di-DA PB/540K di-DB PB was further diluted with 1293 grams of Jet-A to a concentration of 300 ppm (~0.1 c* of the non-associative backbone). A Bosch 69100 In-line turbine fuel pump with its outlet connected to a piece of TYGON® tubing (inner diameter=6.34 mm; length=40 cm) and inlet outlet connected to a piece of TYGON® tubing (inner diameter=3.17 mm; length=2.14 m) was used to transfer the fuel sample from its reservoir to a collecting jar over a period of 20 seconds (FIG. 39A).

The pump was primed with ~200 mL of the sample before the test. The collecting jar was weighed before and after the transfer in order to determine the amount of fuel collected. The same procedure was also performed on the unmodified host Jet-A. The measured mass flow rate of unmodified Jet-A was 24.17 g/s, which corresponded to a Reynolds number of 6458. As for the Jet-A sample with 300 ppm of 1:1 donor/acceptor polymer pair, the measured mass flow rate was 24.92 g/s. Hence, an increase of 3.2% in mass flow rate was achieved, indicating that the presence of 1:1 (w/w) mixture of 630K di-DA PB and 540K di-DB PB at 300 ppm in Jet-A reduced the effect of turbulent drag on flow rate.

A skilled person will realize that the above test can be applied to other associative polymers in order to determine the extent of drag reduction.

Example 13B: Long Lasting Drag Reduction Test 0.7 grams of telechelic 1,4-PB of Mw 670,000 g/mol, terminated by two acid groups (denoted 670K di-DA PB) and 0.7 grams of telechelic 1,4-PB of Mw 630,000 g/mol, terminated by 2 tertiary amine groups (denoted 630K di-DB PB) were dissolved in 139 grams of Jet-A at room temperature over 16 hours. The resulting 1 wt % Jet-A solution of 1:1 w/w 670K di-DA PB/630K di-DB PB was further diluted with 1133 grams of Jet-A to a concentration of 1,100 ppm (~0.37 c* of the nonassociative backbone).

3.2 grams of polyisobutylene of Mw 4,200,000 g/mol (denoted 4.2M PIB) were dissolved in 637 grams of Jet-A at room temperature over 48 hours. 52 grams of the resulting 0.5 wt % Jet-A solution was further diluted with 1133 grams of Jet-A to a concentration of 217 ppm.

Figure 39B:
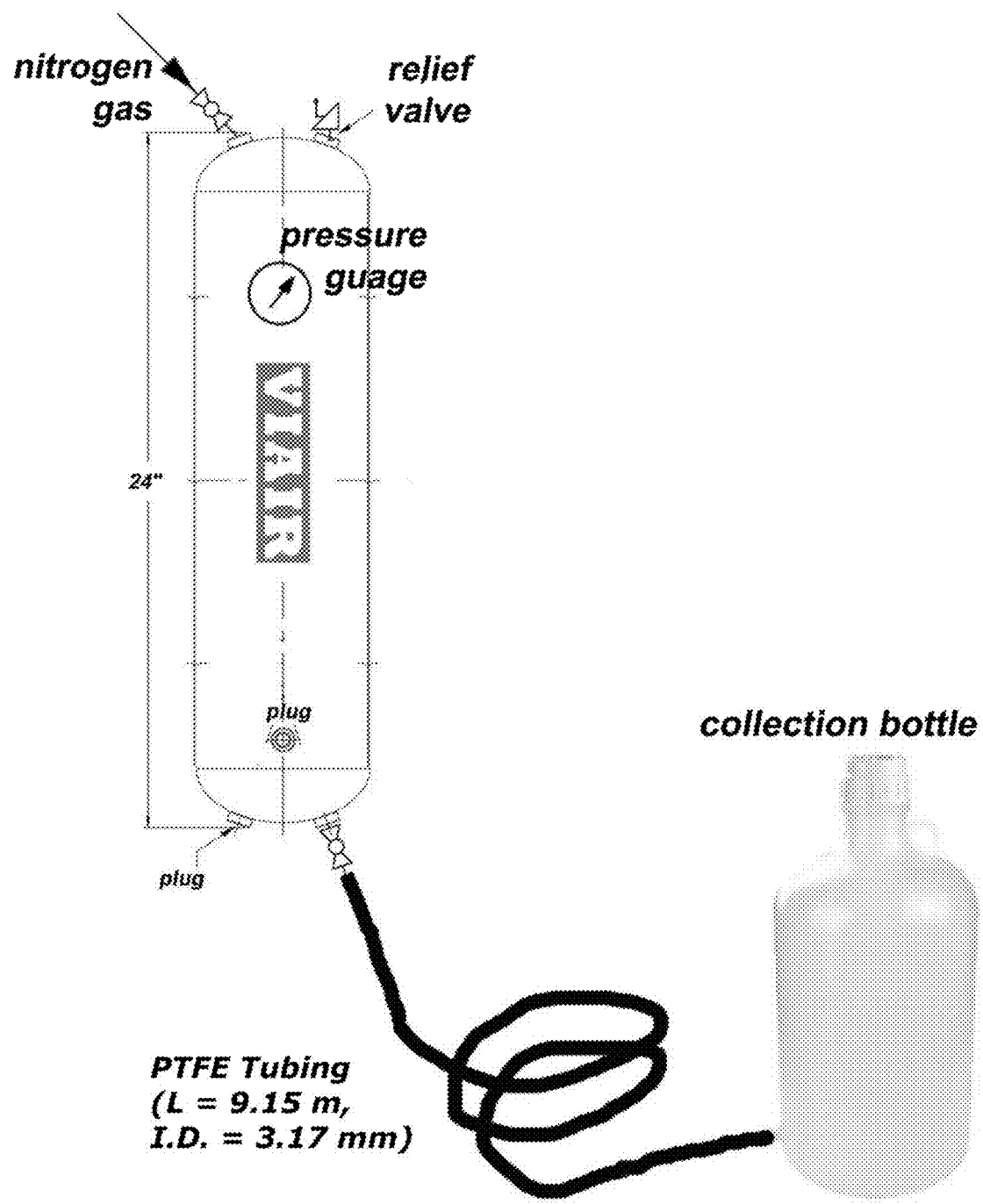
FIG. 39B shows an image of an experimental setup to test the associative polymers herein described in the control of long lasting drag reduction in compositions (see, e.g. Example 13B).

The apparatus for drag reduction study is shown in FIG. 39B. A 2.5-gallon cylindrical steel air tank (Viair 91208, 200 psi rated) was used as a pressurizable sample reservoir, which was fitted with a pressure gauge, a high-pressure gas inlet, a 200-psi safety relief valve, and a ball valve as the sample outlet. A 10-liter polyethylene (PE) bottle with a tubulation connector at the bottom was used as the sample receiving container. A 9.15-meter long piece of PTFE tubing (I.D.=3.17 mm) connecting the outlet valve of the air tank and the tubulation connector of the PE bottle was used as a miniature pipeline where turbulent drag took place.

Figure 39C:
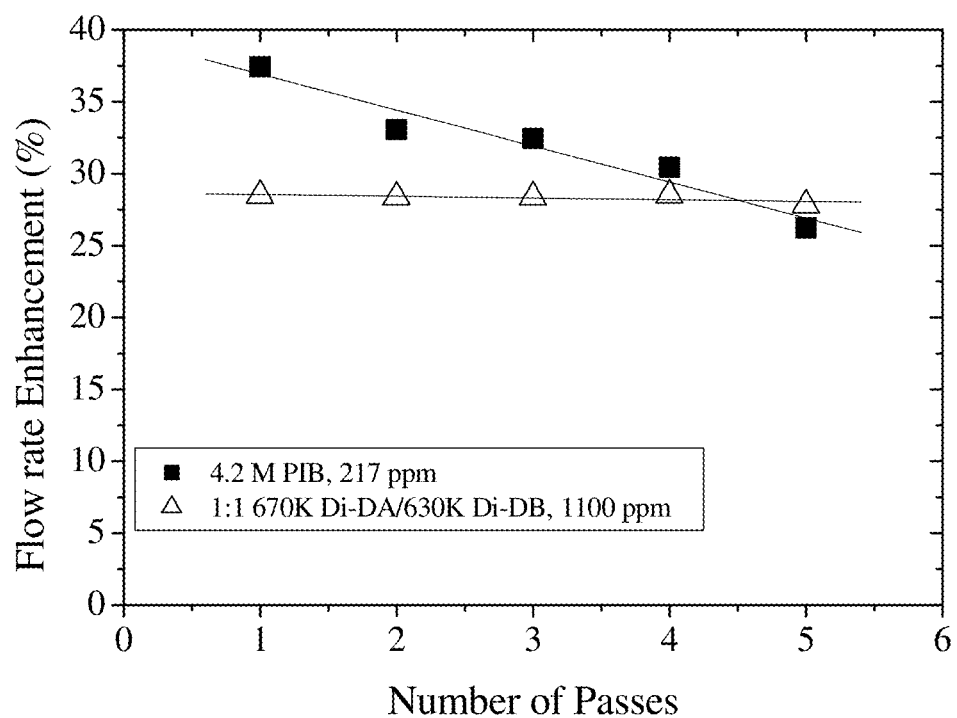
FIG. 39C shows that 1:1 (w/w) 670K Di-DA PB/630K Di-DB PB provides long-lasting drag reduction.

Test samples include untreated Jet-A as the reference, Jet-A solution of 4.2M PIB at 217 ppm as the control, and Jet-A solution of 1:1 (w/w) 670K Di-DA PB/630K Di-DB PB at 1,100 ppm. Gravity flow was used to transfer the test sample from the 10-liter PE bottle into the air tank over a period of 35 min. The test fluid was pressurized to 200 psi by means of high-pressure nitrogen. Flow rates were determined via a catch-and-weigh technique: The test fluid was driven through the PTFE tubing over a period of 21 s to the 10-liter PE bottle, which was weighed before and after the test to determine the average mass flow rate and the corresponding Reynolds number (Re). Five passes were performed on each sample. When untreated Jet-A was tested, a Re of 10,770 was achieved, which indicates the apparatus was able to generate turbulent flow. Results are expressed as % flow enhancement defined as 100* (Jet-A solution flow rate—Jet-A flow rate)/(Jet-A flow rate) with all flow rates compared at common initial pressure (200 psi) and final pressure (192 psi). The results are shown in FIG. 39C and FIG. 68.

Compared to untreated Jet-A, the presence of 4.2 M PIB at 217 ppm in Jet-A initially helped improve the flow rate by 37.4%. The flow rate enhancement steadily decreased as the number of passes through the system increased: at the 5th pass, the flow rate enhancement by 4.2M PIB at 217 ppm in Jet-A was reduced to 26.2%, indicating shear degradation of 4.2 M PIB in turbulent flow.

The flow rate enhancement by 1:1 (w/w) 670K Di-DA PB/630K Di-DB PB at 1,100 ppm in Jet-A was found long-lasting throughout the five passes: no measurable decrease in flow rate enhancement was observed (average=28.2%, standard deviation=0.27%). The results show that at 1,100 ppm in Jet-A, 1:1 (w/w) 670K Di-DA PB/630K Di-DB PB resist shear degradation in turbulent flow and thus provide long-lasting drag reduction thus supporting the conclusion that the flow rate enhancement can be maintained constant with flow having a high Reynolds number (e.g. higher than 5000 or 25000) and/or along a long pipeline (e.g. 8 Km or more)

Example 14: Detection of Rehological Properties of Solutions

Figure 22:
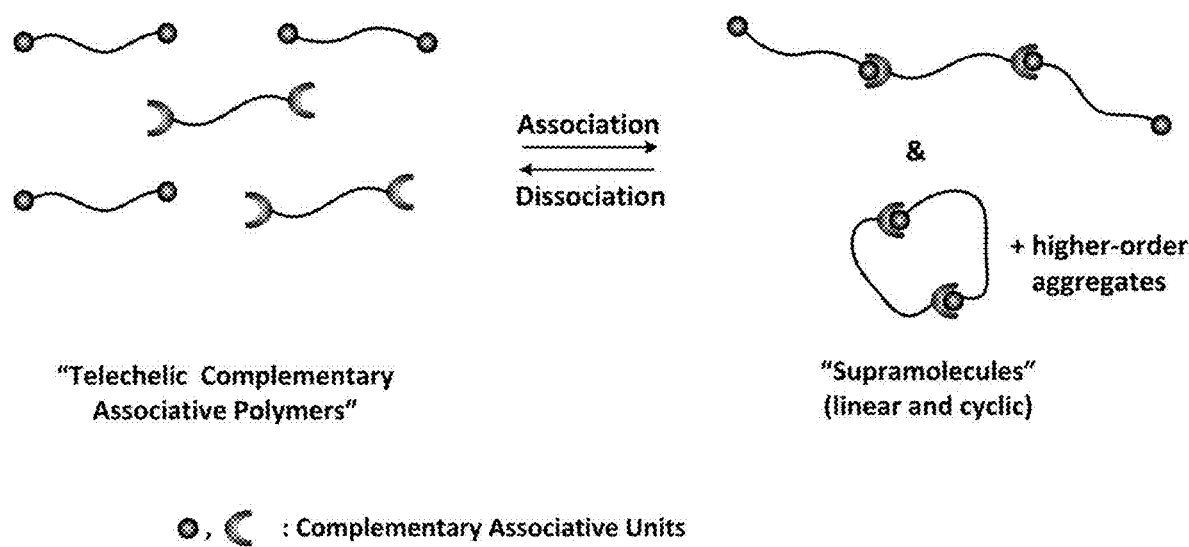
FIG. 22 Shows a schematic illustration of the self-association behavior of carboxyl-terminated telechelic 1,4-PBs according to some embodiments herein described.
Figure 41:
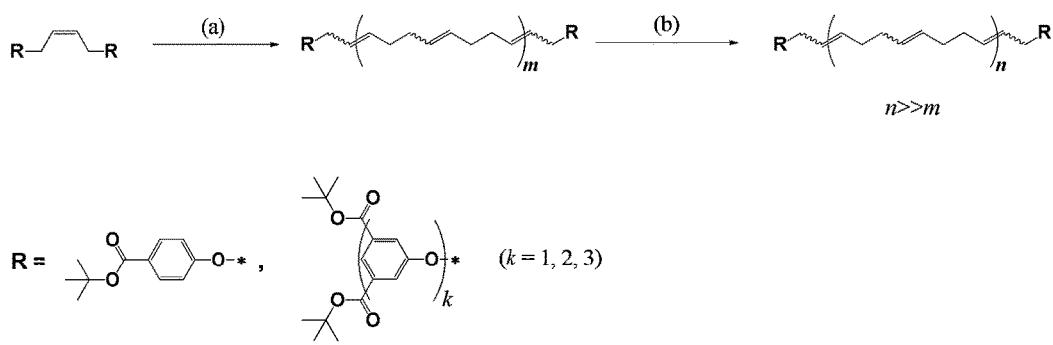
FIG. 41 shows a schematic illustration of a two-stage synthesis of tert-butyl ester-terminated telechelic 1,4-PBs. Step (a): 50-100 equiv of COD, ⅓₀ equiv of second-generation of Grubbs Catalyst, anhydrous dichloromethane (DCM), 40° C., 30-60 min. Step (b): 1000-2000 equiv of COD for target Mw<300,000 g/mol, anhydrous dichloromethane (DCM), 40° C., 16 h; 10000 equiv of COD for target Mw>400,000 g/mol, anhydrous dichloromethane (DCM), 40° C., <10 min.
Figure 42:
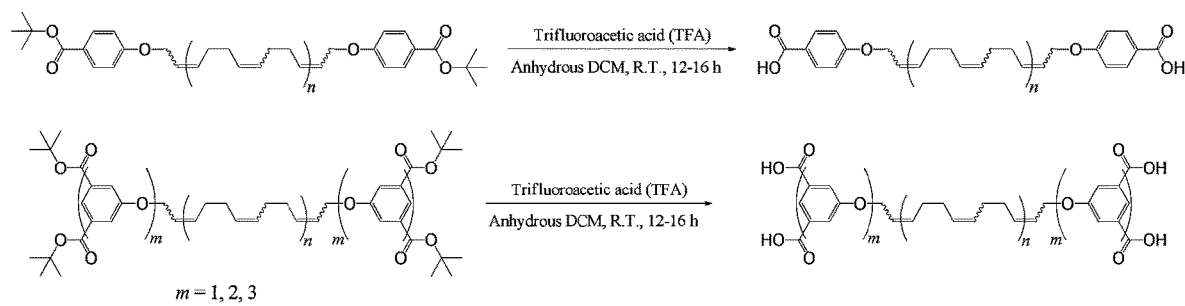
FIG. 42 shows a schematic illustration of TFA hydrolysis of tert-butyl ester polymer end groups.

The methods presented in Examples 2-5 to synthesize telechelic 1,4-PBs with $M_w$ up to 430,000 g/mol capped at each end with well-defined tert-butyl ester-terminated dendrons (FIG. 41) provides facile access to matched pairs of non-associative and associative telechelic 1,4-PBs (FIG. 42). In this example, these model polymers were used to study the relationship between molecular properties (e.g., polymer molecular weight and the number of carboxyl groups on chain ends) and association behavior, particularly its effects on the rheological properties in solution. The present study of the self-association behavior of carboxyl-terminated telechelic 1,4-PBs provides a foundation for comparative studies of complementary association illustrated in FIG. 22.

The following materials and methods were used: Solvents 1-chlorododecane (CDD) and tetralin (TL) were both obtained from Aldrich in 97% and 99% purity, respectively. All tert-butyl ester-terminated telechelic 1,4-PBs and their corresponding carboxyl-terminated telechelic 1,4-PBs were prepared as described herein. Four values of the number of functional groups on polymer chain ends, N, and three polymer backbone lengths (in terms of $M_w$ by GPC-LS) were selected for the present study: A series of polymers with approximately matched backbone length (nominally 220,000 g/mol) were prepared with N=1, 2, 4 and 8; and a series of polymers with N=4 was prepared with three backbone lengths of 76,000, 230,000, and 430,000 g/mol. (Table 3.1). To simplify the nomenclature of materials, polymer end-groups with N=1, 2, 4, and 8 tert-butyl ester groups are denoted ME, DE, TE, and OE (for mono-, di-, tetra-, octa-ester end groups, respectively), respectively. Similarly, polymer end-groups with N=1, 2, 4, and 8 carboxyl groups are denoted MA, DA, TA, and OA (for mono-, di-, tetra-, octa-acid end groups, respectively), respectively Procedure for Sample Preparation: Solutions of tert-butyl ester terminated polymers for viscosity measurements were prepared by combining polymer and solvent in clean 20 mL scintillation vials or larger 50 mL glass jars which were placed on a Wrist-Action Shaker (Burrell Scientific) for up to 24 h to allow complete homogenization.

Solutions of carboxyl-terminated polymers were prepared as follows: To 150 to 200 mg of carboxyl-terminated polymer in a 50-mL Schlenk flask was added necessary amount of solvent for 1 wt % stock. The contents of the Schlenk flask were degassed by 3 freeze-pump-thaw cycles, and then stirred overnight at 70° C.

Viscosity Measurements: Steady shear viscosity was measured in a cone-plate geometry (60 mm diameter aluminum, 1° cone, 29 m truncation) using an AR1000 rheometer from TA Instruments (temperature controlled at 25° C.). Solutions of tert-butyl ester terminated polymers were probed in the shear rate range 1-200 s$^{-1}$ logarithmically (5 shear rates per decade). The range was extended to 3000 s$^{-1}$ for carboxyl-terminated polymers to better capture shear-thinning behavior. All viscosity data were reported in terms of specific viscosity ($\eta_{sp} \equiv (\eta_{solution} - \eta_{solvent})/\eta_{solvent}$, where $\eta_{solvent}$=2.72 mPa·s for CDD and 2.02 mPa·s for TL at 25° C.) which reflects the contribution of the polymer to the viscosity [25].

Example 15: Dissolution Behavior

All six tert-butyl ester-terminated 1,4-PBs (Table 7) were found readily soluble in both CDD and TL. With increasing carboxyl content, it became more difficult to dissolve carboxyl-terminated polymers: For N=1, the corresponding polymer (226K di-MA 1,4-PB) was found soluble in both CDD and TL at room temperature; at N=2 and 4, the corresponding polymers (230K di-DA 1,4-PB; 76K, 230K, and 430K di-TA 1,4-PBs) were not soluble in either model solvent at room temperature, but they dissolved into CDD and TL when heated at 70° C. and remained in solution thereafter. At N=8, the polymer 207K di-OA 1,4-PB did not dissolve completely into either solvent even when heated at elevated temperatures (>110° C.) overnight. The difficulty of dissolving 207K di-OA 1,4-PB is not due to crosslinking: The polymer dissolves readily in THF, it passes easily through filters, and GPC-LS analysis showed that 207K di-OA 1,4-PB has a unimodal distribution similar to the other polymers in the series of similar $M_w$ (near 220,000 g/mol; see Table 7, which shows molecular weight ($M_w$) and number of chain-end functional groups (N) of tert-butyl ester- and carboxyl-terminated telechelic 1,4-PBs).

TABLE 7[a]

| | Nominal $M_w$ | | |
|---|---|---|---|
| N | 76 | 220 | 430 |
| 1 | | 226 (1.4) | |
| 2 | | 230 (1.5) | |
| 4 | 76 (1.5) | 230 (1.4) | 430 (1.5) |
| 8 | | 207 (1.5) | |

[a]GPC was performed for in THF for 35° C. for the tert-butyl ester form; results are shown for $M_w$ in kg/mol followed by PDI in parentheses.

Example 16: Steady-Flow Shear Viscosity of 1 wt % Polymer Solutions

Figure 23:
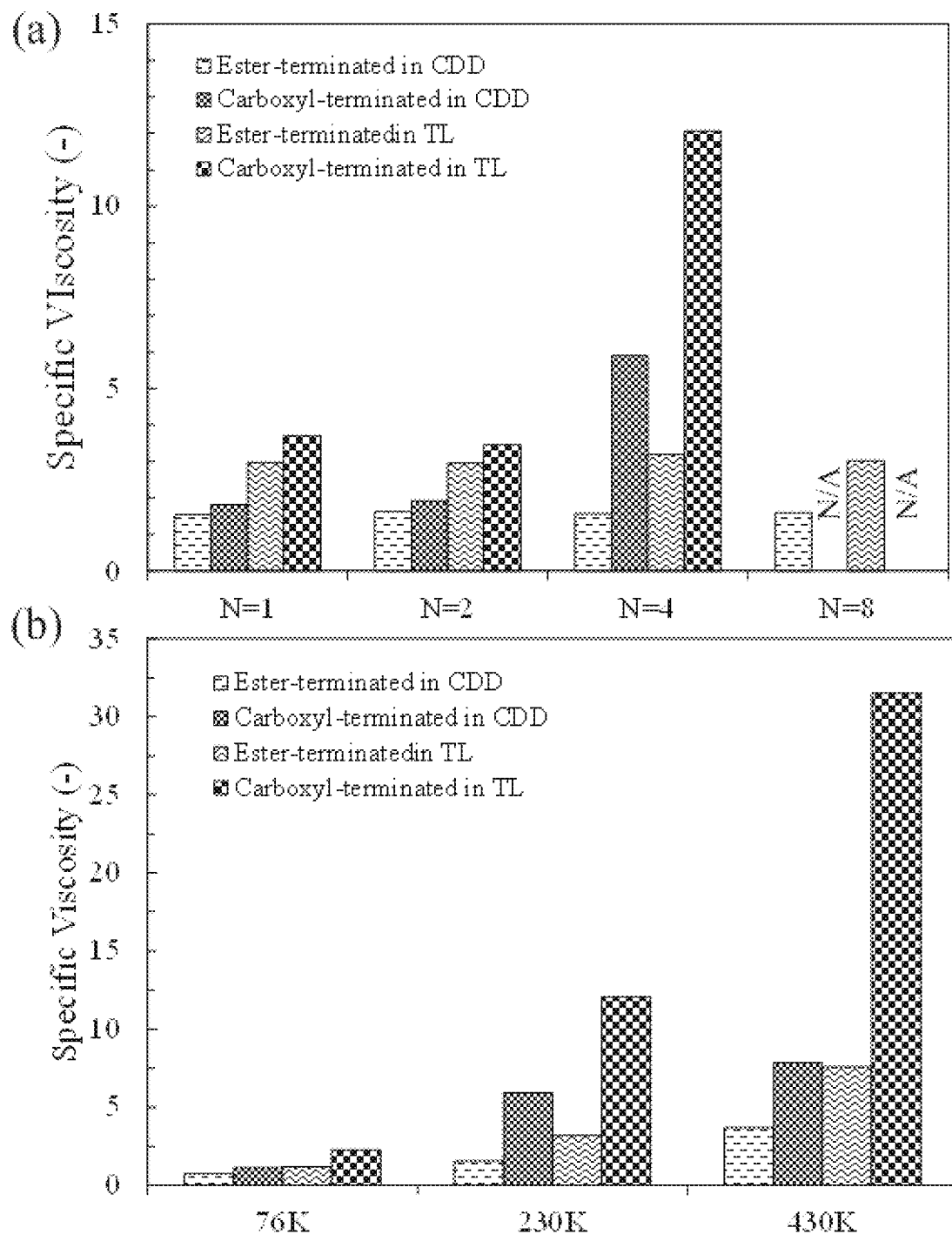
FIG. 23 shows a graph Specific viscosity of 1 wt % solutions of test polymers in 1-chlorododecane (CDD) and tetralin (TL).

Specific viscosity ($\eta_{sp}$) of 1 wt % polymer solutions averaged over shear rates from 10-100 s$^{-1}$ show that all solutions of carboxyl-terminated 1,4-PBs had higher $\eta_{sp}$ than their tert-butyl ester-terminated (i.e., protected) counterparts, but the highest increase was observed in the case of N=4 (FIG. 23). The lack of $\eta_{sp}$ data for carboxyl-terminated 1,4-PB with N=8 is due to the poor solubility of the polymer in both solvents. While $\eta_{sp}$ for all of the non-associative ~230K tert-butyl ester-terminated polymers was the same, the deprotection of carboxyl groups on polymer chain ends produced a threefold increase in specific viscosity in both CDD and tetralin for N=4, whereas at N=1 and 2 only marginal increases were observed after deprotection of carboxyl groups (FIG. 23). Thus, there appears to be a minimum number of carboxyl groups on polymer chain ends to achieve the intermolecular association suitable for viscosity modification (N>2) and a maximum number imposed by the solubility limit (N<8). The effect of solvent quality on $\eta_{sp}$ was also observed in FIG. 23. Increasing the length of 1,4-PB backbone, for identical TA end groups (N=4) increases the specific viscosity strongly (FIG. 23): In tetralin, for the 76,000 g/mol polymer, deprotection of carboxyl groups only increases the specific viscosity by 90%, whereas the increase is more than 320% for the 430,000 g/mol polymer. For each polymer, $\eta_{sp}$ of its 1 wt % tetralin solution was found nearly twice as high as that of its 1 wt % 1-chlorododecane solution.

Example 17: Concentration Dependence of Specific Viscosity

Figure 24:
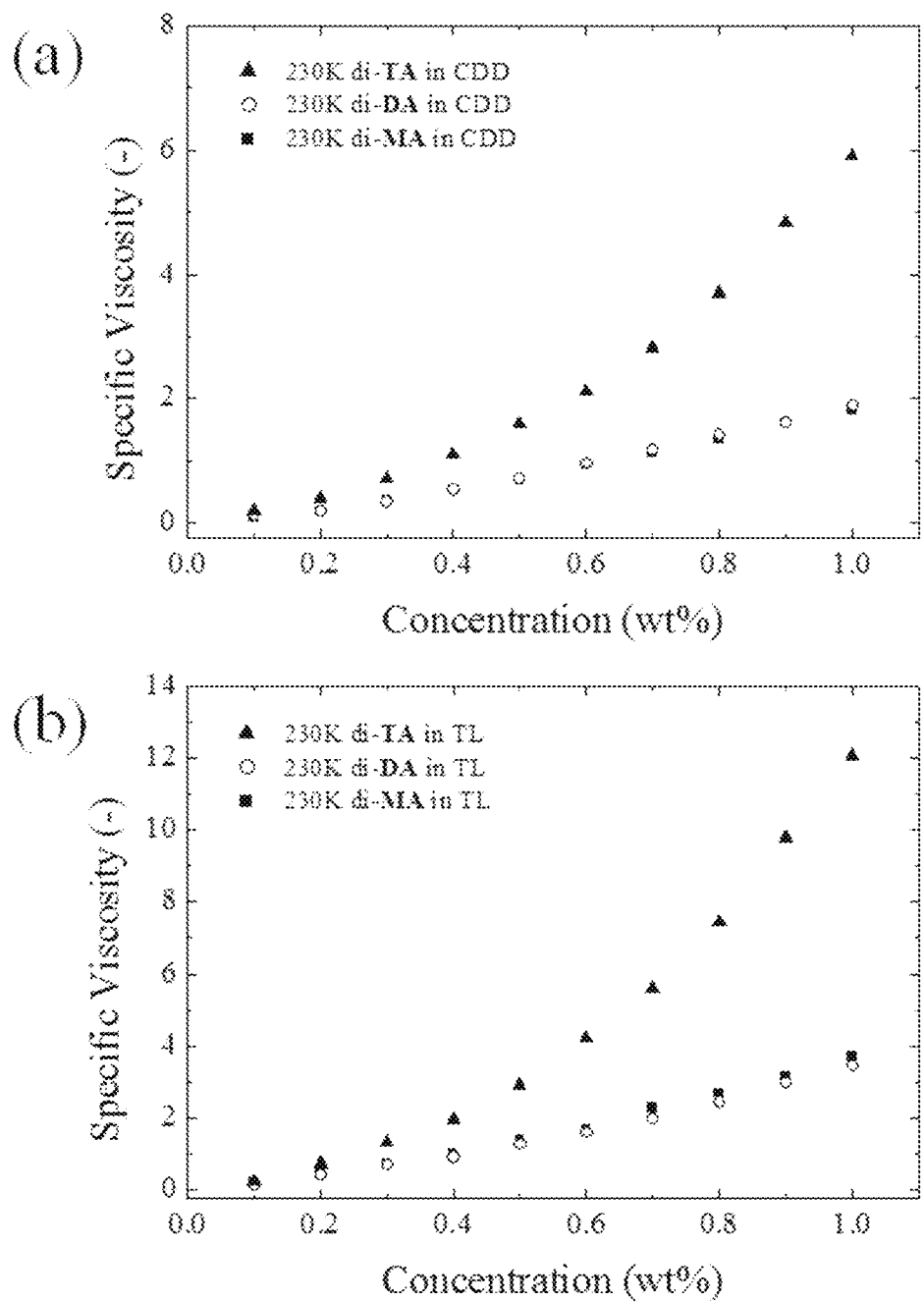
FIG. 24 shows the effect of number of chain-end functional groups (N) on the concentration dependence of the specific viscosity of solutions of telechelic associative polymers with Mw~230,000 g/mol.
Figure 25:
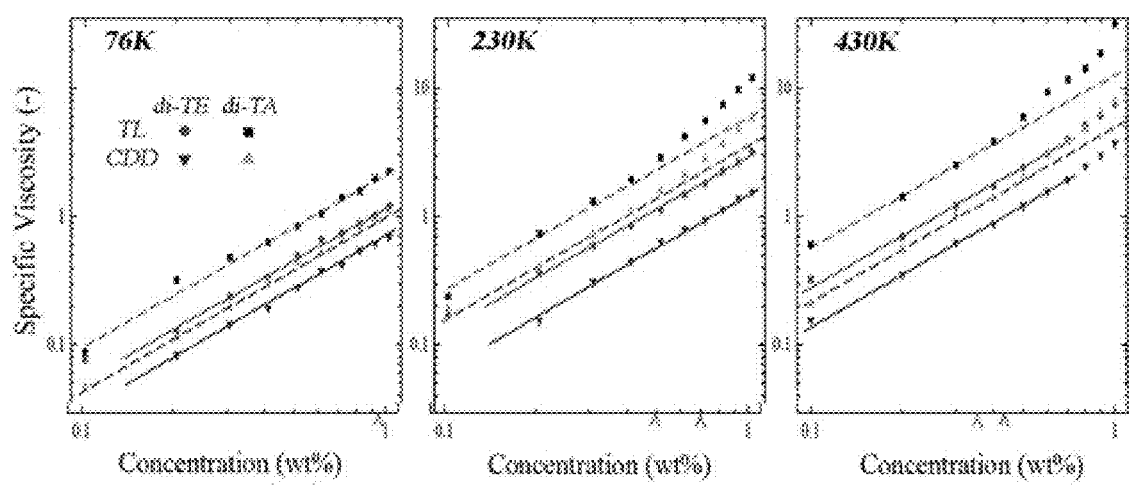
FIG. 25 shows the concentration dependence of specific viscosity of solutions of telechelic 1,4-PBs with non-associative and associative chain ends (N=4) as a function of Mw: from left to right, 76,000 g/mol, 230,000 g/mol, and 430,000 g/mol. The overlap concentration of the tertbutyl ester form of each polymer is indicated by the marks on the concentration axis, circles and squares for tetralin (TL) and triangles for 1-chlorododecane (CDD); for 76K di-TE in CDD c*=1.4 wt % (offscale). Solid lines indicate linear regression from 0.2 wt % to 1.5 c* for di-TE; dashed lines correspond to the solid line vertically shifted to the linear portion of the di-TA data: red for TL and blue for CDD.

While the values of $\eta_{sp}$ of three tert-butyl ester-terminated polymers in both CDD and TL showed a nearly linear dependence on polymer concentration, the CDD and TL solutions of the three carboxyl-terminated polymers (76K, 230K and 430K di-TA 1,4-PBs) exhibited nonlinear increases of $\eta_{sp}$ with concentration, and the extent of such non-linearity was found positively correlated with the $M_w$ of polymer backbone (FIG. 24). In accord with the observation that associative polymers with 1 and 2 carboxyl groups at their ends have less effect on viscosity, comparison of the three 230K carboxyl-terminated 1,4-PBs with N=1, 2 and 4 shows that the non-linear increase of q$_{sp}$ with polymer concentration was obvious only in the case of N=4 (FIG. 25).

Figure 33:
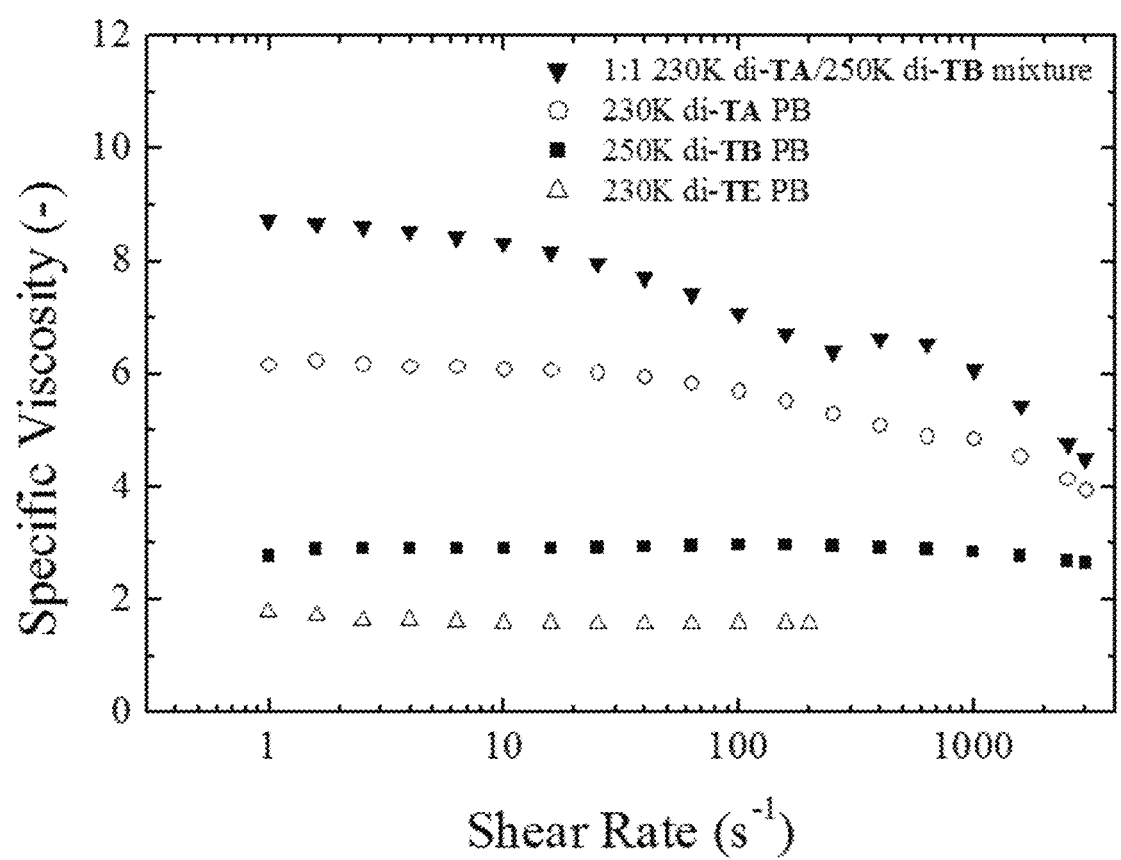
FIG. 33 shows a plot of specific viscosity (25° C.) of 1 wt % CDD solutions of 230K di-TE 1,4-PB, 230K di-TA 1,4-PB, 250K di-TB 1,4-PB, and the 1:1 (w/w) mixture of 230K di-TA 1,4-PB and 250K di-TB 1,4-PB at shear rates 1-3000 $s^{-1}$.
Figure 34:
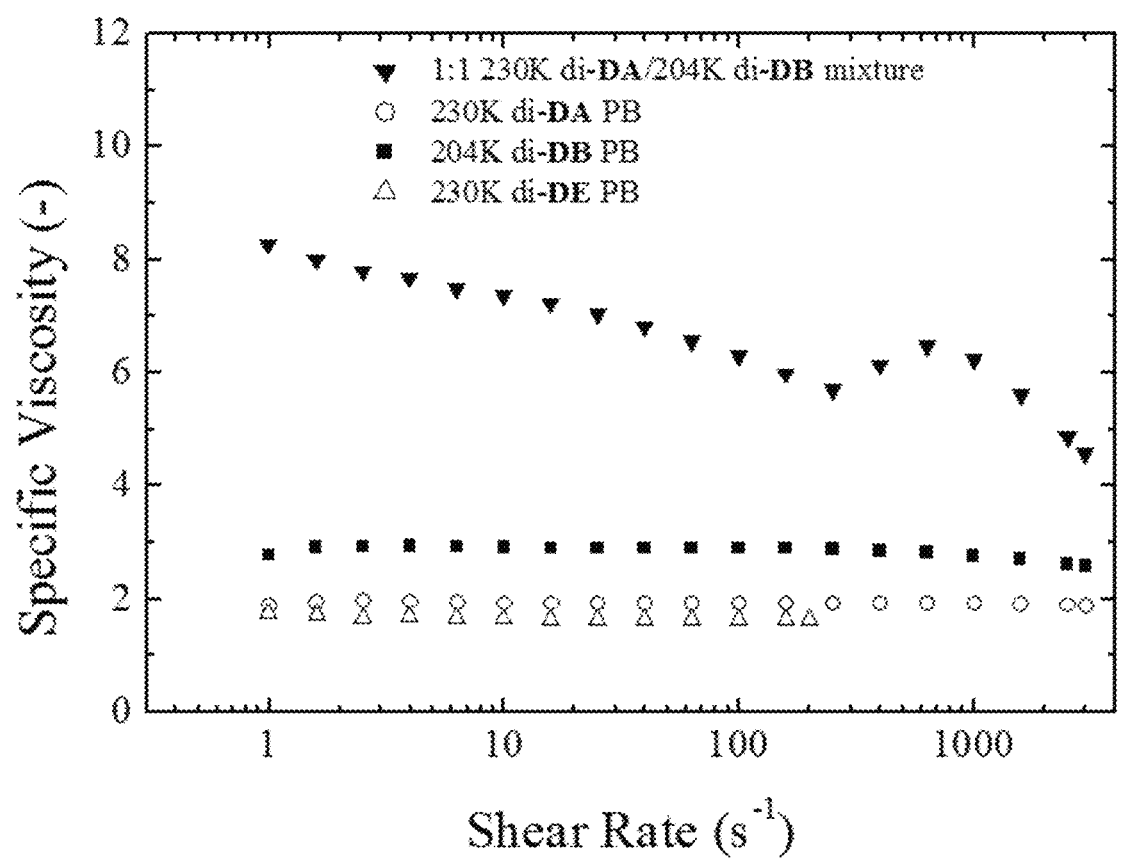
FIG. 34 shows a plot of specific viscosity (25° C.) of 1 wt % CDD solutions of 230K di-DE 1,4-PB, 230K di-DA 1,4-PB, 250K di-DB 1,4-PB, and the 1:1 (w/w) mixture of 230K di-DA 1,4-PB and 250K di-DB 1,4-PB at shear rates 1-3000 $s^{-1}$.

Example 18: Shear-Thinning Behavior of Solutions of Carboxyl-Terminated Polymers The onset and magnitude of shear-thinning can depend on the molecular weight and concentration of polymer. Solutions of 76K di-TA 1,4-PB showed negligible shear-thinning (up to 3000 s$^{-1}$) (in either CDD or TL, FIGS. 33 and 34, respectively). In the case of 230K di-TA 1,4-PB, its CDD and TL solutions showed shear-thinning at 1 wt %, with onsets in the range 10-100 s$^{-1}$. With decreasing concentration, the magnitude of shear thinning decreased and the shear rate required to elicit it increased (e.g., relative to the 1 wt % solution, at 0.7 wt %, the extent of shear-thinning observed in both CDD and TL was less significant and the onset shifted to >100 s$^{-1}$) (FIGS. 33 and 34). Similar trends were observed for solutions of 430K di-TA 1,4-PBs, with greater extent of shear-thinning and onset of shear-thinning at lower shear rates compared to their 76K and 230K counterparts (in both CDD and TL, FIGS. 33 and 34, respectively).

Figure 26A:
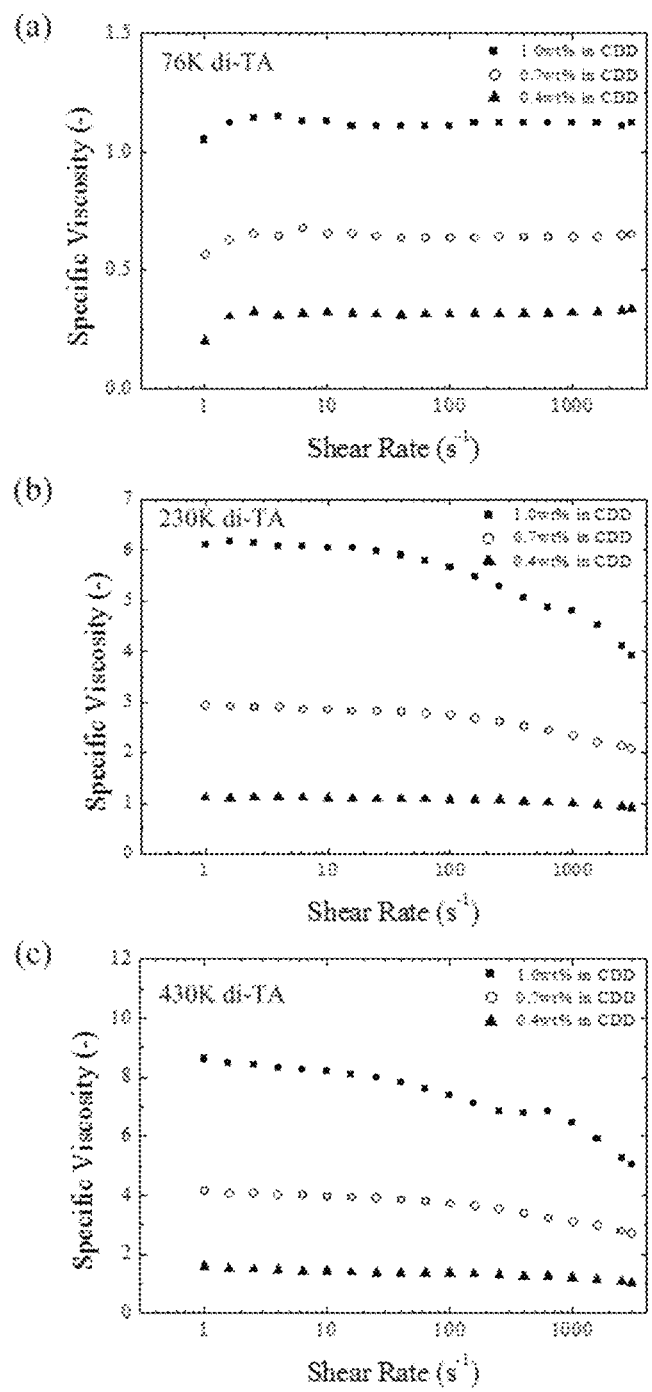
FIGS. 26A-26B show graphs depicting shear-thinning behavior of CDD solutions and TL solutions.
Figure 26B:
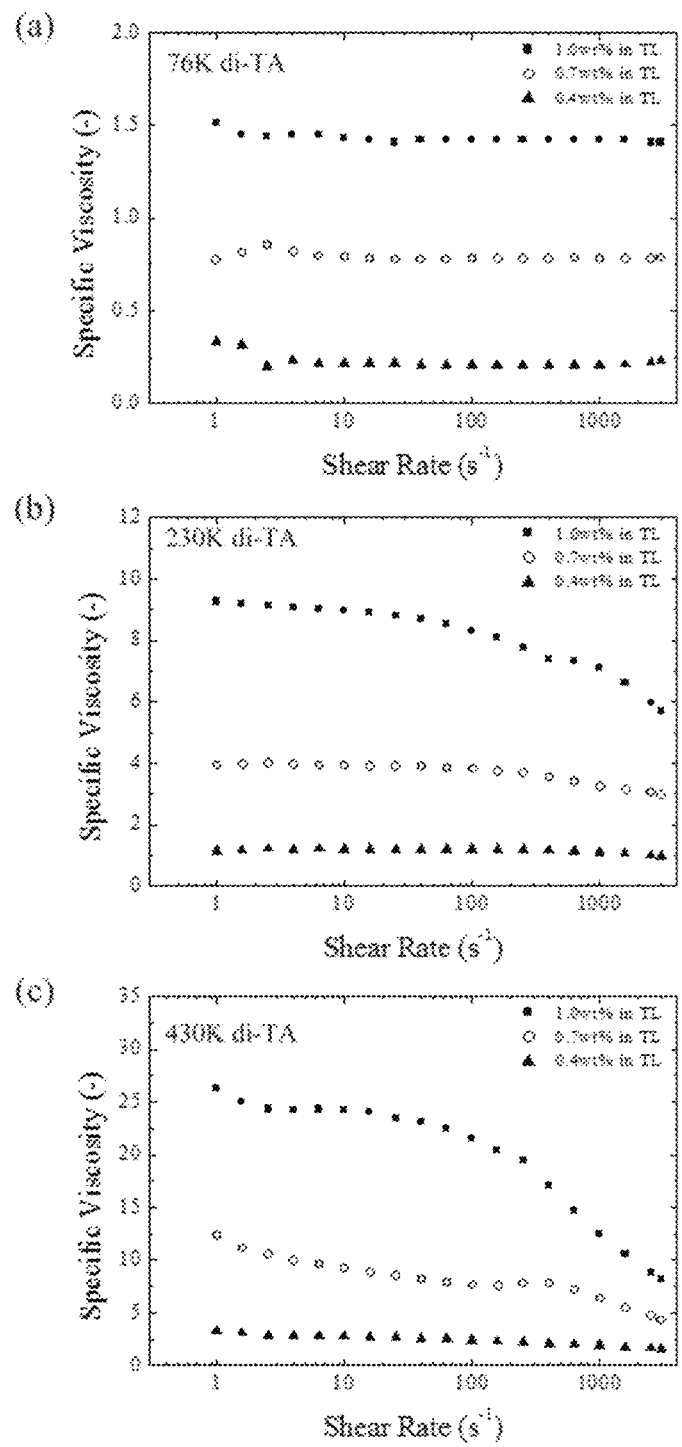

An interesting shear-thickening feature followed by further shear-thinning was observed for 430K di-TA 1,4-PB at 1 wt % in CDD and 0.7 wt % in TL (see FIGS. 26A and 26B). The shear-thickening appeared at a higher shear rate in CDD than in TL (shear rates between 250 and 1000 s$^{-1}$ in FIG. 26, compared to 160 and 630 s$^{-1}$ in FIG. 26B).

Example 19: $^1$H NMR Study on Complementary End-Association in Deuterated Chloroform $^1$H NMR spectroscopy has been widely used to study the association of hydrogen-bonding-based hetero-complementary associative motifs in non-polar deuterated solvents (e.g., CDCl$_3$) because the resultant hydrogen bonds can cause significant changes in electron environments surrounding protons participating complementary associations; consequently, measurable changes in chemical shifts of those protons can be observed as the results of such complementary associations [26-32]. This technique was adopted to investigate if the three pairs of hetero-complementary associative groups (THY/DAAP, HR/CA, and TA/TB) can perform complementary association in CDCl$_3$ at room temperature when attached to chain ends of 1,4-PB of $M_w$~10,000-50,000 g/mol, which was chosen to keep signals of end-groups recognizable.

$^1$H NMR Study of Hetero-Complementary End-Association. $^1$H NMR study of hetero-complementary end-association of telechelic 1,4-PB chains was carried out at a total polymer concentration of ~1 wt % in deuterated chloroform (CDCl$_3$) at room temperature. $^1$H NMR samples of individual telechelic associative polymers were prepared by combining polymer and CDCl$_3$ at a polymer concentration~1 wt % in 20 mL scintillation vials, which were placed on a Wrist-Action Shaker (Burrell Scientific) for up to 16 h to allow the polymer to completely dissolve. $^1$H NMR samples of complementary polymer pairs were prepared by mixing~1 wt % CDCl$_3$ solutions of their corresponding polymers in 20 mL scintillation vials in desired end-group ratios, except for the 1:1 (w/w) mixture of 24K di-TA/22K di-TB 1,4-PBs, of which the $^1$H NMR sample was prepared by combining the two polymers at a 1:1 weight ratio and CDCl$_3$ at a total polymer concentration~1 wt % in a 20 mL scintillation vial that was placed on a Wrist-Action Shaker (Burrell Scientific) for 16 h at room temperature.

The investigation of hetero-complementary end-association by $^1$H NMR spectroscopy was carried out by measuring the $^1$H NMR spectra of individual telechelic associative polymers and those of complementary polymer pairs, followed by comparing signals of protons participating hetero-complementary end-association in $^1$H NMR spectra of individual polymer solutions to those of the same protons in the spectra of corresponding polymer mixtures. Due to the inherent detection limit of $^1$H NMR spectroscopy, either changes in chemical shifts or the disappearance of the signals of protons participating hetero-complementary association of polymer end-groups were followed as the evidence of end-association, depending on the sizes of polymer backbones. For telechelic associative polymers of $M_w \le 50,000$ g/mol, characteristic shifts of signals of associative end-groups were followed; for those of $M_w \ge 200,000$ g/mol, the focus was whether the mixing of complementary partners caused the disappearance of the signals of protons participating hetero-complementary association of polymer end-groups.

$^1$H NMR spectra were obtained using a Varian Inova 500 spectrometer (500 MHz); all spectra were recorded in CDCl$_3$, acetone-d$_6$, and DMSO-d$_6$ at ambient temperature. Chemical shifts were reported in parts per million (ppm, δ) and were referenced to residual solvent resonances. Polymer molecular weight measurements were carried out in tetrahydrofuran (THF) at 35° C. eluting at 0.9 mL/min (pump: Shimadzu LC-20AD Prominence HPLC Pump) through four PLgel 10-µm analytical columns (Polymer Labs, 10$^6$ to 10$^3$ Å in pore size) connected in series to a DAWN EOS multi-angle laser light scattering (MALLS) detector (Wyatt Technology, Ar laser, λ=690 nm) and a Waters 410 differential refractometer detector (λ=930 nm).

Figure 27:
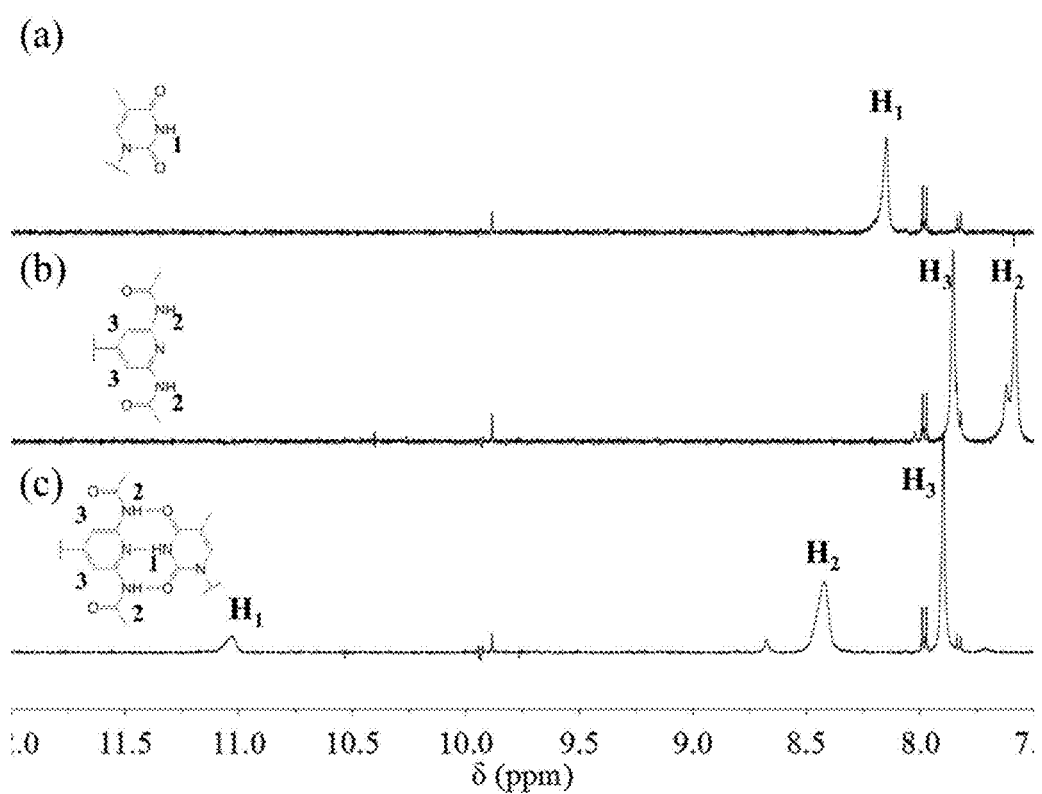
FIG. 27 shows expanded $^1$H NMR (500 MHz) spectra of $CDCl_3$ solutions of telechelic polymers that have a 10,000 g/mol 1,4-PB backbone with end groups.

The results of each pair are described as follows:

THY (thymine)/DAAP (diacetamidopyridine): FIG. 27 shows the expanded $^1$H NMR spectra (500 MHz, CDCl$_3$) of 10K di-THY 1,4-PB 5, 10K di-DAAP 1,4-PB 14, and the mixture of 5 and 14 in a 1:2 wt ratio. In the absence of its complementary unit, the signal of the imide proton of THY end groups was observed at 8.05 ppm (FIG. 27). Upon addition of ~2 eq of DAAP end groups, a large downfield shift to 11.05 ppm accompanied by signal broadening was observed (FIG. 27). Similar shift was also observed for the signal of the amide protons of DAAP end groups (from 7.58 to 8.42 ppm, in FIG. 27, panels B and C). The observed association-induced shift (~2.9 ppm) of the imide proton signal of THY end groups is in good agreement with the literature [27, 28, 30], and it indicates that THY and DAAP end groups could find and associate with each other in CDCl$_3$.

Figure 28:
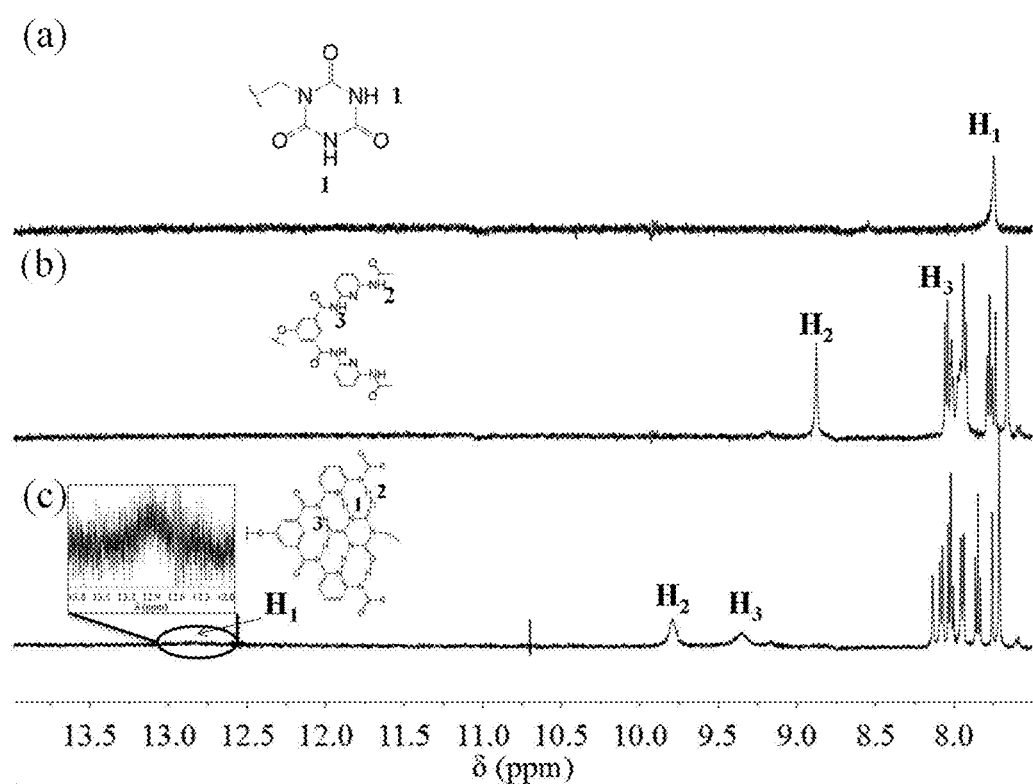
FIG. 28 shows expanded $^1$H NMR (500 MHz) spectra of $CDCl_3$ solutions of telechelic polymers.

HR (Hamilton receptor)/CA (cyanuric acid): FIG. 28 shows the expanded $^1$H NMR spectra (500 MHz, CDCl$_3$) of 50K di-CA 1,4-PB, 24K di-HR 1,4-PB, and the mixture of 50K di-CA 1,4-PB and 24K di-HR 1,4-PB in a 1:1.4 wt ratio. In the absence of its complementary unit, the signal of the imide protons of the CA end group was observed at 7.75 ppm (FIG. 28). A very large downfield shift to 12.90 ppm accompanied by peak broadening was observed (FIG. 28) as ~2 eq of HR end groups were added. Similar to the case of THY/DAAP pair, the observed association-induced shift (~5.2 ppm) of the signal of the imide protons of CA units indicates that CA and HR end groups could also find and associate with each other in CDCl$_3$. The magnitude of the observed shift is in good agreement with the literature [33-38].

Figure 29:
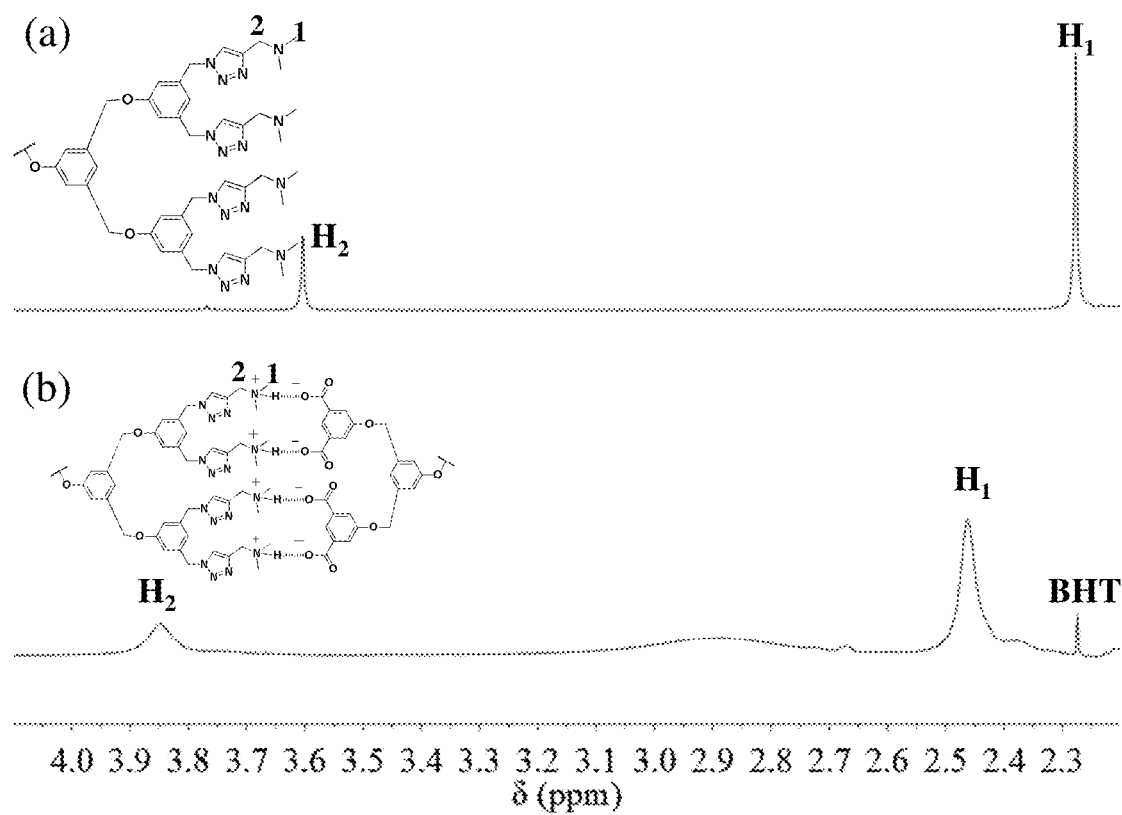
FIG. 29 shows expanded $^1$H NMR (500 MHz) spectra of $CDCl_3$ solutions of telechelic polymers.

TA/TB: Due to the fact that 24K di-TA 1,4-PB is not soluble in CDCl$_3$, $^1$H NMR study was only performed on 22K di-TB 1,4-PB and its 1:1 (w/w) mixture with 24K di-TA 1,4-PB and monitored the association by tracking the shifts of the signals of the tertiary amine end group (H$_1$ and H$_2$, see FIG. 29). The results are shown in FIG. 29. It was found that the presence of 22K di-TB 1,4-PB assisted the dissolution of 24K di-TA 1,4-PB in CDCl$_3$ and thus rendered the $^1$H NMR experiment possible. The signals of H$_1$ and H$_2$ were observed at 2.28 and 3.60 ppm respectively in the absence of 24K di-TA 1,4-PB (FIG. 29). The addition of 24K di-TA 1,4-PB resulted in shifts of both signals: The signals of H$_1$ and H$_2$ shifted from 2.28 and 3.60 to 2.46 and 3.85 ppm, respectively. The observed shifts indicate the association of TA and TB end groups.

Figure 30:
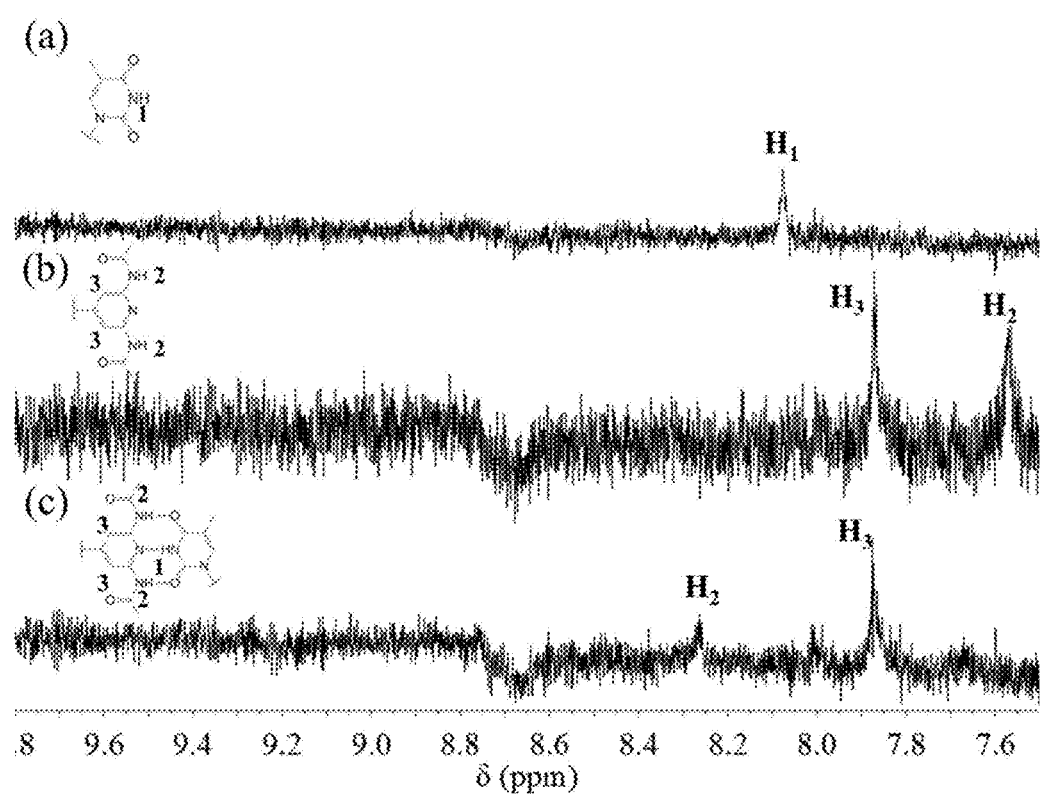
FIG. 30 shows expanded $^1$H NMR (500 MHz) spectra of $CDCl_3$ solutions of telechelic polymers.
Figure 31:
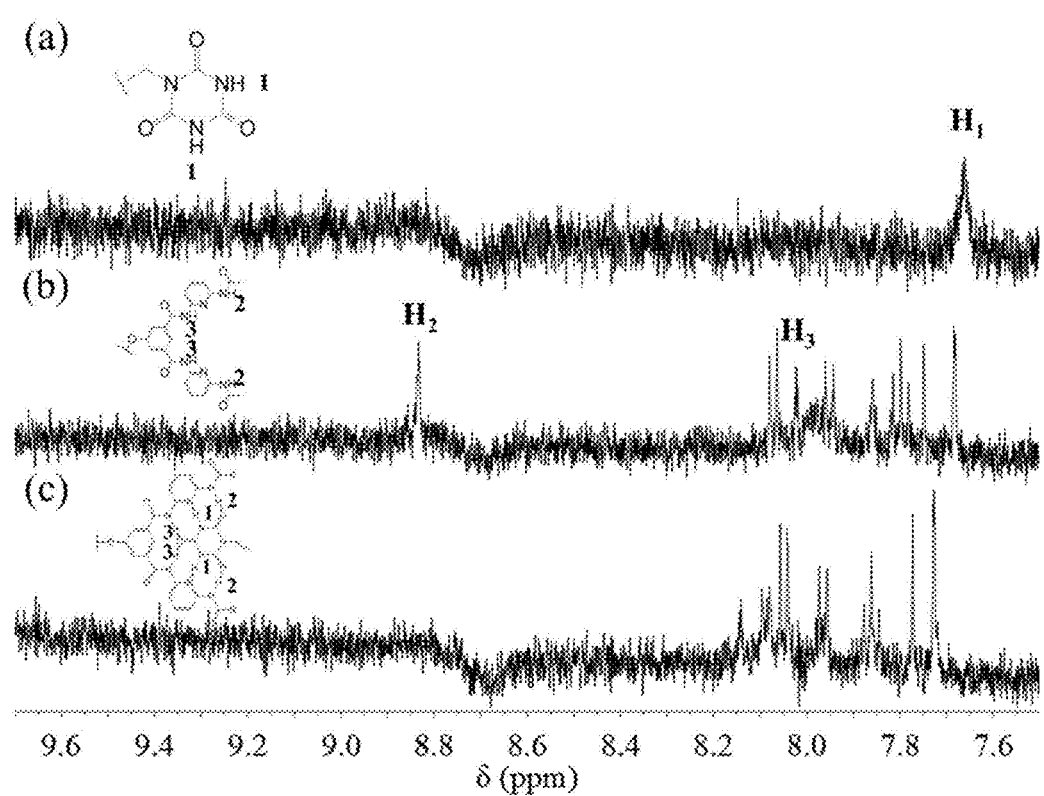
FIG. 31 shows expanded $^1$H NMR (500 MHz) spectra of $CDCl_3$ solutions of telechelic polymers.
Figure 32:
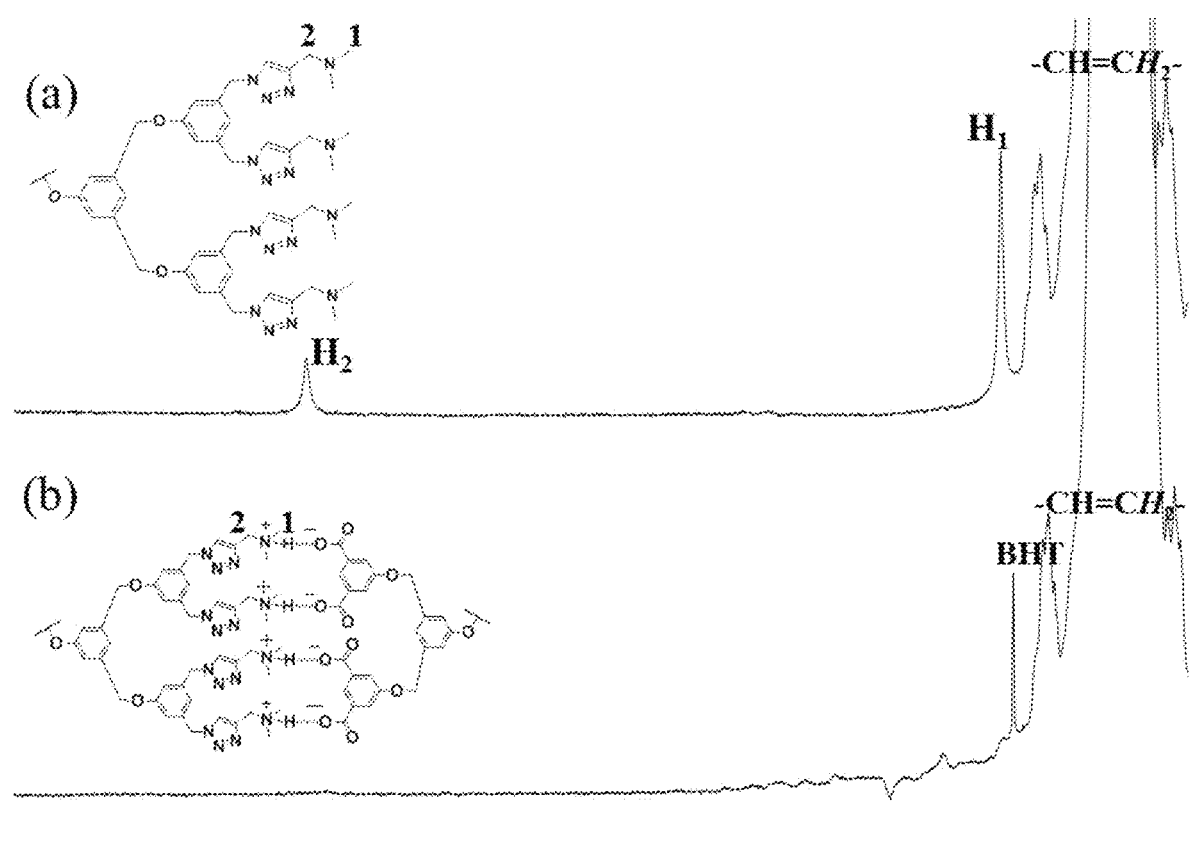
FIG. 32 shows expanded $^1$H NMR (500 MHz) spectra of $CDCl_3$ solutions of telechelic polymers.

In order to determine if the three pairs of complementary associative groups were still effective when attached to chain ends of 1,4-PBs of $M_w$~200,000-300,000 g/mol, $^1$H NMR analysis of the corresponding polymers and the complementary pairs was performed at ~1 wt % in CDCl$_3$ at room temperature. It was found that in this case, signals of polymer end groups were barely recognizable due to their low contents in the test samples. In addition, association-induced signal broadening could cause signals of protons involved in complementary association to appear vanished. Nevertheless, evidence of end-association was observed in all three pairs of telechelic associative polymers of $M_w$~200,000 g/mol. In the case of the THY/DAAP pair, the signal of the imide proton of THY end group of 288K di-THY 1,4-PB was observed at 8.05 ppm with a very low intensity (FIG. 30), and it was found disappeared in the $^1$H NMR spectrum of the 1:2 (w/w) mixture of 288K di-THY and 219K di-DAAP 1,4-PBs. The disappearance of the signal indicates that THY and DAAP end groups could find and bind with each other in CDCl$_3$, even when attached to chain ends of polymers of $M_w$~200,000 g/mol. Likewise, the signal of imide protons of the CA end groups of 200K di-CA 1,4-PB, along with those of the amide protons of the HR end groups of 240K di-HR 1,4-PB, were not observable in the $^1$H NMR spectrum of the 1:1 (w/w) mixture of 200K di-CA and 240K di-HR 1,4-PBs (FIG. 31). Signals of the TB end groups of 250K di-TB 1,4-PB were also found disappeared after the polymer was mixed with 230K di-TA 1,4-PB in a 1:1 wt ratio (FIG. 32). These results suggest that all three complementary associative pairs can provide sufficient strength of end-association for telechelic 1,4-PB chains of $M_w$~200,000 g/mol to form supramolecular aggregates stable at least on the time scale of $^1$H NMR spectroscopy.

Example 20: Shear Viscometric Study of Complementary End-Association

Shear viscometry was used as a complementary measure of $^1$H NMR study to evaluate the strength of hetero-complementary pairs. 1-Chlorododecane (CDD) was chosen as the solvent due to its low interference with hydrogen bonding, low volatility at room temperature, high solvency for 1,4-PB backbones, and being a pure solvent. For all of the four hetero-complementary pairs (THY/DAAP, HR/CA, DA/DB, and TA/TB), telechelic polymers of $M_w$~200,000 g/mol were used. In addition to CDD, dodecane and Jet-A were also used in shear viscometric study of THY/DAAP and HR/CA pairs, respectively. Except for di-DA and di-TA 1,4-PBs, polymer solutions in 1-chlorododecane were prepared by combining polymer and solvent at a weight fraction of polymer=1 wt % in clean 20 mL scintillation vials, which were placed on a Wrist-Action Shaker (Burrell Scientific) at room temperature for up to 16 h to allow complete dissolution of polymers. 1 wt % CDD solutions of di-DA and di-TA 1,4-PBs of $M_w$~200,000 g/mol were prepared according to the procedure described in Examples 2-5. For each hetero-complementary associative pair, 1 wt % solutions of polymer mixture were prepared by mixing 1 wt % solutions of the individual polymers in desired weight ratios in 20 mL scintillation vials at room temperature. Shear viscosity of polymer solutions was measured according to the procedure described herein (see, e.g. Examples 16-17).

Figure 43:
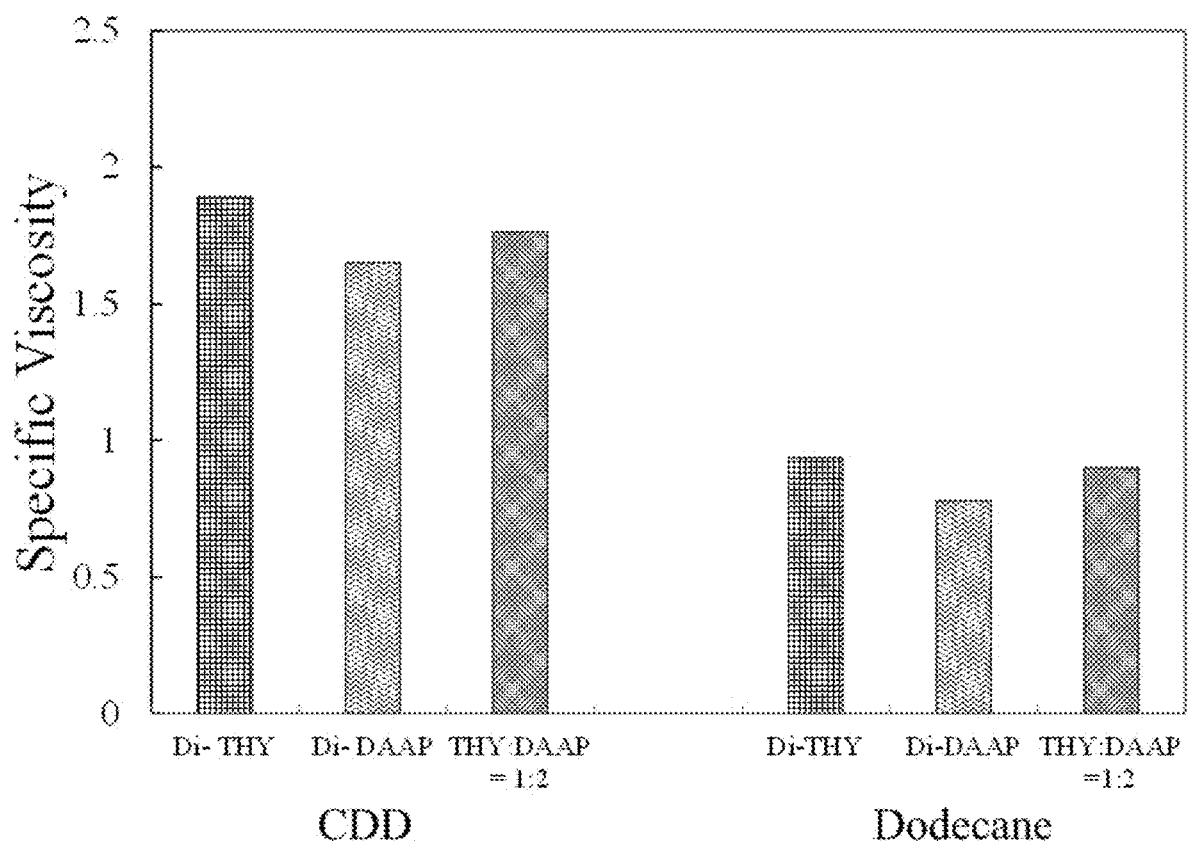
FIG. 43 shows graphs of specific viscosity (25° C.) of 1 wt % 1-chlorododecane (CDD) and dodecane solutions of 288K di-THY 1,4-PB, 219K di-DAAP 1,4-PB, and 1:2 (w/w) mixture of 288K di-THY 1,4-PB and 219K di-DAAP 1,4-PB.
Figure 44:
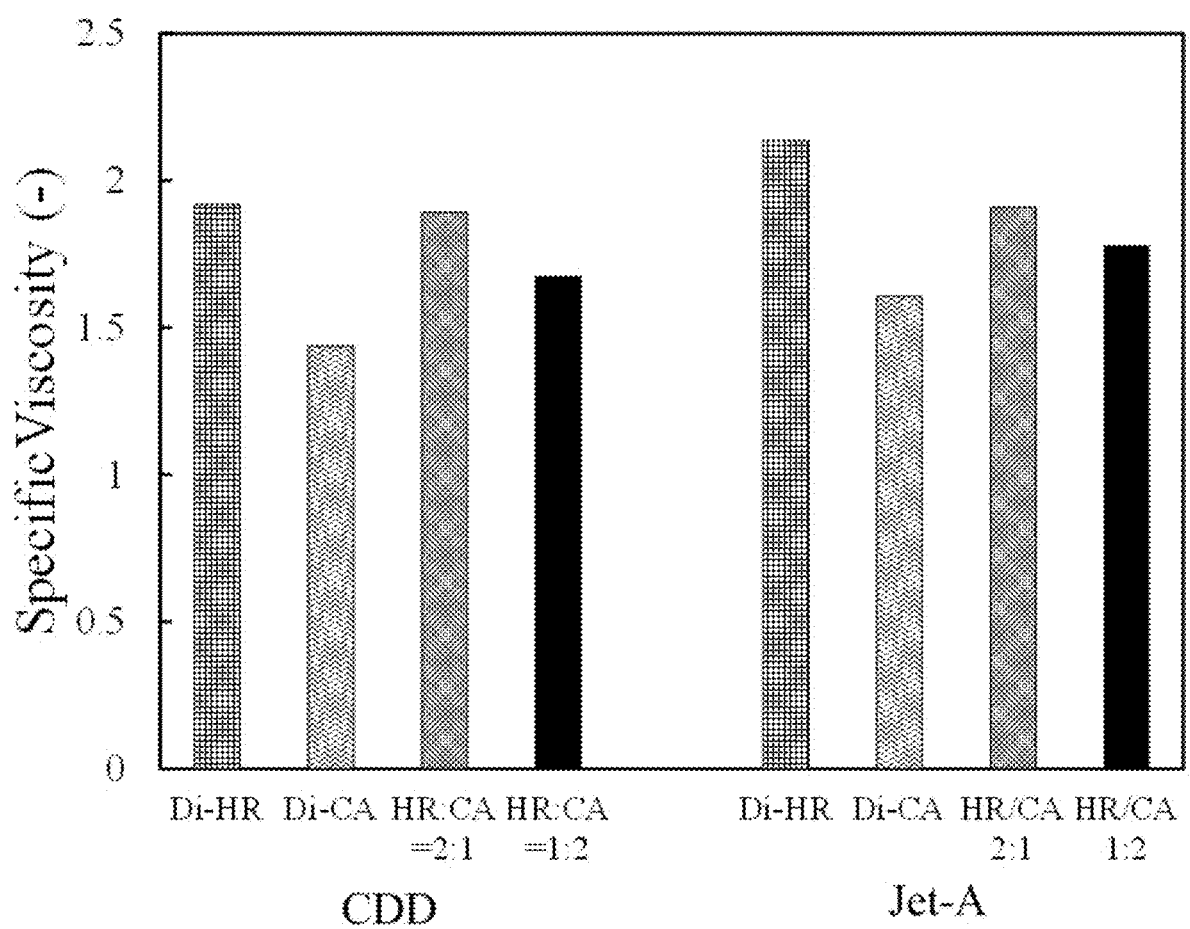
FIG. 44 shows a graph of Specific viscosity (25° C.) of 1 wt % 1-chlorododecane (CDD) and Jet-A solutions of 240K di-HR 1,4-PB, 200K di-CA 1,4-PB, and 1:2 and 2:1 (w/w) mixtures of 240K di-HR 1,4-PB and 200K di-CA 1,4-PB.

Steady-flow shear viscometry at 25° C. was used in parallel with $^1$H NMR spectroscopy to investigate the ability of OHB-based and CAHB-based hetero-complementary associative pairs to afford supramolecular aggregates of telechelic 1,4-PBs of $M_w \geq 200,000$ g/mol that are stable enough at low-moderate shear rates to provide modulation of rheological properties. In other words, it is expected that at the same concentrations, the solution of complementary polymer pair would be more viscous than those of individual components. To avoid possible complications arising from the multi-component nature of fuels, 1-chlorododecane (CDD) was chose as the model solvent, and prepared all polymer solutions at 1 wt % in CDD. In both THY/DAAP and HR/CA complementary polymer pairs, none of them showed the expected enhancement in shear viscosity due to complementary end-association (FIGS. 43 and 44). To find out if the comparatively polar CDD (dielectric constant=4.2 at 25° C.) interferes with THY/DAAP and HR/CA complementary interactions, the experiments were repeated in less polar solvents: Dodecane (dielectric constant=2.0 at 20° C.) and Jet-A (dielectric constant=1.8 at 20° C.) were used for THY/DAAP pair and HR/CA pair, respectively. As shown in FIGS. 43 and 44, the expected enhancement in shear viscosity was still absent in both cases when less polar solvents were used.

Different results were observed in the case of TA/TB pair. The 1:1 (w/w) mixture of 1 wt % CDD solutions of 230K di-TA and 250K di-TB 1,4-PBs was found considerably more viscous than both solutions (FIG. 33), and the observed enhancement in viscosity illustrated that the strength of TA/TB complementary end-association was sufficient to drive the formation of supramolecules stable at shear rates investigated in the present study. As discussed in above, strong self-association of 230K di-TA 1,4-PB resulted in significant difference in shear viscosity between the 1 wt % CDD solution of 230K di-TA 1,4-PB and that of the non-associative prepolymer 230K di-TE 1,4-PB (FIG. 33). It was observed that the addition of equal amount (by weight) of 250K di-TB 1,4-PB further enhanced the shear viscosity. What is also worth noting is the shear-thinning behavior observed in the 1 wt % CDD solution of 1:1 mixture of 230K di-TA and 250K di-TB 1,4-PBs, which is a feature shared by aqueous solutions of water-soluble telechelic associative polymers [39-42]. As for the 1 wt % CDD solution of 250K di-TB 1,4-PB, even though GPC-LS analysis confirmed no crosslinking of polymer backbone took place during end-functionalization with tertiary amine groups, it was found that it was more viscous than that of the non-associative 230K di-TE 1,4-PB. Aggregation of triazole units resulting from the end-functionalization reaction (FIG. 45) may contribute to the above difference in shear viscosity [43].

With the positive results of the pair of 230K di-TA/250K di-TB 1,4-PBs, the viscometric study was extended further to the complementary DA/DB association as an attempt to approach the limit of the strength of carboxyl/tertiary amine association. FIG. 34 shows the results of 1 wt % CDD solutions of the corresponding polymers (230K di-DE, 230K di-DA, and 250K di-DB 1,4-PBs) and the 1:1 (w/w) DA/DB mixture. Surprisingly, strong enhancement in shear viscosity induced by complementary DA/DB association was still observed in the 1:1 mixture. While only insignificant difference in shear viscosity was observed between the 1 wt % CDD solution of 230K di-DA 1,4-PB and that of the non-associative 230K di-DE 1,4-PB, the considerable increase in viscosity due to DA/DB complementary end-association reaffirmed the promising strength of carboxyl/tertiary amine interaction.

Figure 35:
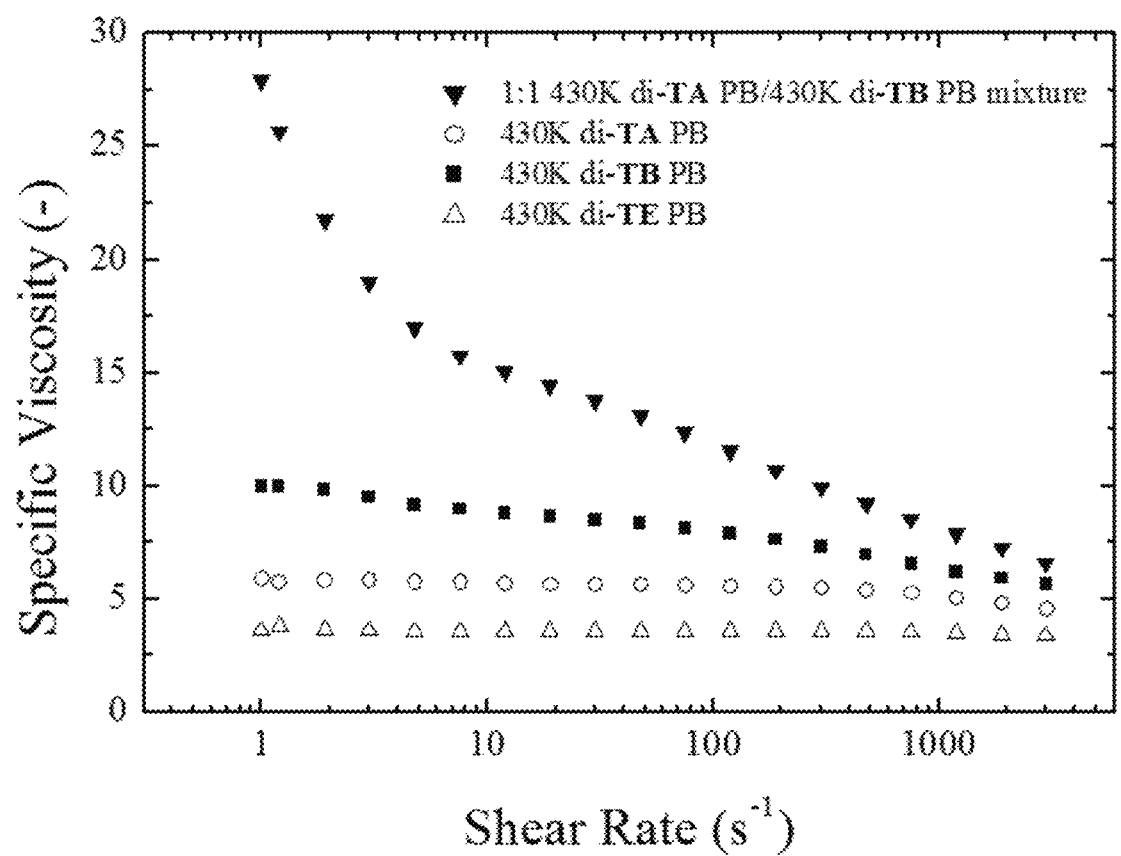
FIG. 35 shows a plot of specific viscosity (25° C.) of 1 wt % Jet-A solutions of 430K di-TE 1,4-PB, 430K di-TA 1,4-PB, 430K di-TB 1,4-PB, and the 1:1 (w/w) mixture of 430K di-TA 1,4-PB and 430K di-TB 1,4-PB at shear rates 1-3000 $s^{-1}$.

The final part of the shear viscometric study of carboxyl/tertiary amine pairs was to investigate if the TA/TB complementary end-association was effective in Jet-A when the $M_w$ of the 1,4-PB backbone increased to 430,000 g/mol, and the results are shown in FIG. 35. Strong enhancement in shear viscosity due to TA/TB complementary association was observed: At 1 wt %, the 1:1 mixture of 430K di-TA and 430K di-TB 1,4-PBs in Jet-A was found significantly more viscous than the Jet-A solutions of the individual polymers. These results indicate that when used in dendritic configurations, carboxyl/tertiary amine pair is suitable for building complementary pairs of telechelic associative polymers as mist-control additives for fuels.

Example 21: A.1 Measurements of Polymer Molecular Weights

The determination of molecular weight and molecular weight distribution is of central interest in polymer analysis, as the molecular weight of a polymer directly relates to its physical properties.[44] Take telechelic associative polymers as mist-control additives for kerosene for example, their efficacy in providing fire protection and resistance to shear degradation rely on proper choice of backbone length, which falls in the range $M_w=5\times10^5$-$10^6$ g/mol. Table 8, which shows molecular weight measurement methods, summarizes common characterization methods for determining different average molecular weights (MWs) and molecular weight distributions (MWDs) of polymers [25, 44, 45].

TABLE 8

| Method | Absolute | Relative | $M_n$ | $M_w$ Range (g/mol) |
|---|---|---|---|---|
| Proton NMR end-group analysis | x | | x | $M_n < 2.5 \times 10^4$ |
| Vapor pressure osmometry | x | | x | $M_n < 3 \times 10^4$ |
| Ebulliometry | x | | x | $M_n < 3 \times 10^4$ |
| Light Scattering (LS) | x | | | x $10^4 < M_w < 10^7$ |
| Intrinsic Viscosity | | x | | $M < 10^6$ |
| GPC$^a$ with concentration detectors | | x | x | x $10^3 < M_w < 10^7$ |
| GPC$^a$ with concentration and LS detectors | x | | x | x $10^4 < M_w < 10^7$ |
| MALDI-TOF-MS$^b$ | x | | x | x $M < 3 \times 10^4$ |

$^a$GPC, gel permeation chromatography.
$^b$MALDI-TOF-MS, matrix-assisted laser desorption/ionization time-of-flight mass spectroscopy Among the methods in Table 8, GPC with concentration and LS (light scattering) detectors (referred to as "GPC-LS" herein) was chosen in the present study for determining MW and the MWD of telechelic associative 1,4-PBs due to the following reasons: (1) it allows measurements of absolute weight-average MWs and corresponding MWDs; (2) it has a wide applicable range (104-107 g/mol) which covers the MW range of interest ($5\times10^5$-$10^6$ g/mol) for mist-control applications; (3) it is comparatively easy to implement. Although MALDI-TOF-MS is capable of measuring absolute MWs and MWDs of polymers with more accuracy than GPC-LS, it is not as useful in analyzing polymers of MW>30,000 g/mol [46]; selection of matrix compounds, sample preparation and interpretation of the mass spectra become difficult in the case of synthetic polymers of MW>30,000 g/mol and thus detract from the benefits associated with the unrivalled accuracy provided by MALDI-TOF-MS [44, 45, 47]. Given that many associative polymers as herein described are telechelic 1,4-PBs of MW>30,000 g/mol, it is clear that GPC-LS can be a better option to measure MWs than MALDI-TOF-MS in the present study. The same rationale also applies to the other competing method, proton NMR end-group analysis, which has been widely used in determining number-average MWs (i.e., $M_n$) of synthetic polymers via comparing the integration values of signals of backbone protons to those of the end-group protons [44, 48, 49]. The implementation of proton NMR end-group analysis can be straightforward: the $M_n$ value of a polymer can be derived from its $^1H$ NMR spectrum without any additional experimental work. However, the determination of $M_n$ by proton NMR end-group analysis for polymers of MW>25,000 g/mol loses its accuracy due to a diminished resolution resulting from the inherent detection limit of proton NMR spectroscopy, and the uncertainty in the $M_n$ values becomes greater for polymers of higher MWs [44]. The other issue of this method is that it lacks the ability to measure molecular weight distributions (MWDs) of polymers. These shortcomings render proton NMR end-group analysis a less effective method to characterize high-MW (i.e., MW>100,000 g/mol) telechelic 1,4-PBs as potential mist-control additives for kerosene.

In the case that associative groups are attached onto the chain ends of telechelic 1,4-PBs, measuring of MWs and MWDs of such polymers by GPC-LS becomes challenging, since the associative chain ends could possibly interact with the column packing, or drive the formation of supramolecular aggregates in THF, leading to false reading of MWs and MWDs. It was found that compared to the non-associative 230K di-TE 1,4-PB, the apparent $M_w$ of 230K di-TA 1,4-PB was found to be higher by 63% (see Table 9, which shows molecular weight and PDI (polydispersity index) data of tert-butyl ester- and carboxyl-terminated telechelic 1,4-PBs, and FIG. 23).

TABLE 9

| | | N = 1 | N = 2 | N = 4 | N = 8 | N = 4 |
|---|---|---|---|---|---|---|
| Before TFA Hydrolysis | $M_w$ (kg/mol)$^a$ | 226 | 230 | 230 | 207 | 430 |
| | PDI$^b$ | 1.43 | 1.53 | 1.50 | 1.43 | 1.49 |
| After TFA Hydrolysis | $M_w$ (kg/mol)$^a$ | 276 | 299 | 375 | 304 | 510 |
| | PDI | 1.56 | 1.73 | 1.72 | 1.51 | 1.61 |
| Increase in $M_w$ (%) | | 22.12 | 30.00 | 63.04 | 46.86 | 18.60 |

$^{a,b}$determined by GPC-LS

Figure 36:
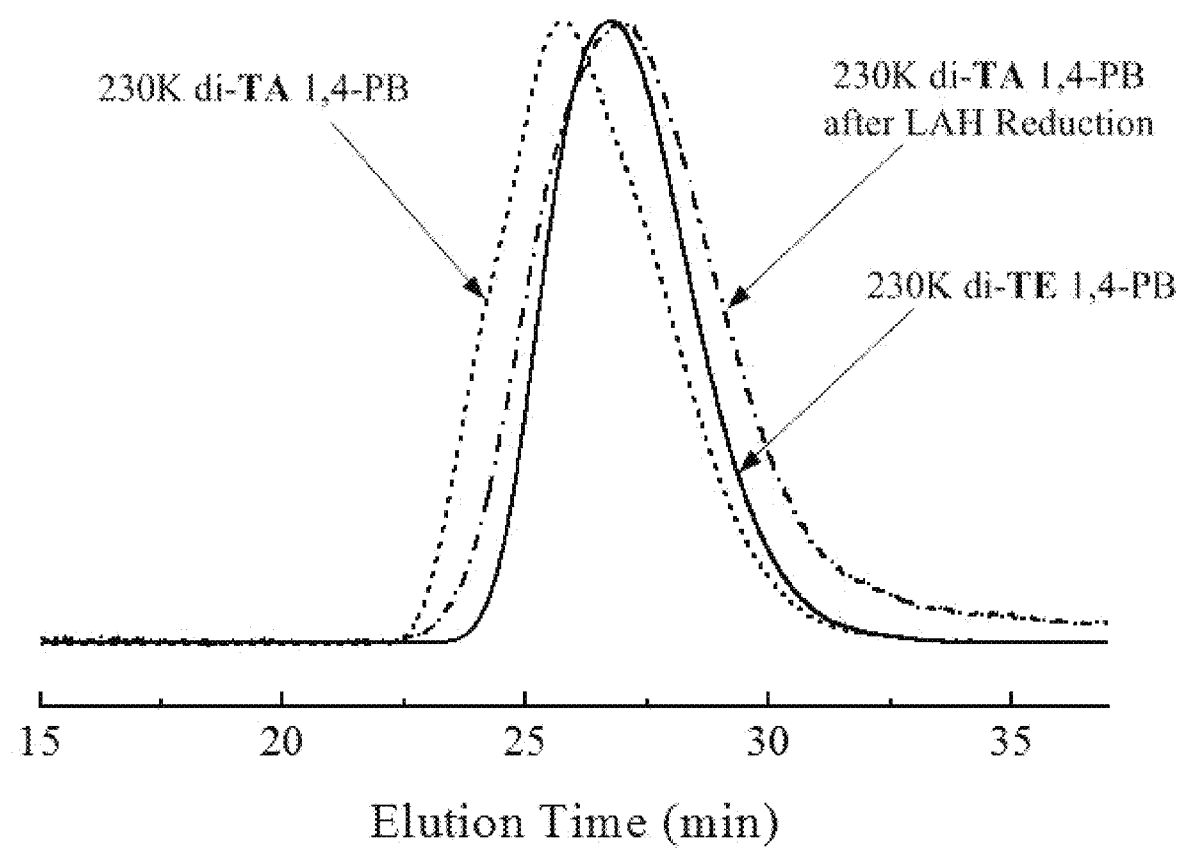
FIG. 36 shows GPC-LS (THF, 35° C.) traces of 230K di-TE 1,4-PB, 230K di-TA 1,4-PB and the resultant polymer of LAH reduction of 230K di-TA 1,4-PB.

It was hypothesized that the apparent increase in $M_w$ resulted from the aggregate of associative TA end groups in THF, rather than crosslinking of 1,4-PB backbone during TFA hydrolysis of tert-butyl ester groups. To test the hypothesis, 230K di-TA 1,4-PB was treated with LiAlH$_4$ in THF so as to reduce the highly associative carboxyl groups to less associative hydroxyl groups. The GPC-LS result of the resultant hydroxyl-terminated 230K telechelic 1,4-PB, as shown in FIG. 36, virtually overlaps with that of 230K di-TE 1,4-PB, although the former seems slightly broadened compared to the latter. Comparison of the three GPC-LS traces in FIG. 36 verified the hypothesis: the apparent increase in $M_w$ after TFA hydrolysis of 230K di-TE 1,4-PB was due to aggregation of associative TA end groups, since the increase in $M_w$ disappeared after the carboxyl groups on polymer chain ends were reduced to hydroxyl groups. It also suggests that the mild condition of TFA hydrolysis does not cause appreciable amount of crosslinking of 1,4-PB backbone. As for the broadening of GPC-LS trace of hydroxyl-terminated 230K telechelic 1,4-PB, it is thought to result from interaction of hydroxyl-terminated chain ends with column packing. The results in FIG. 36 also reveal the importance of interpreting GPC-LS results of telechelic associative polymers with scrutiny, since association of chain ends and chain-end/column interaction can both result in false reading of MWs and MWDs. In other words, using the non-associative forms of telechelic associative polymers in GPC-LS analysis yields more accurate information concerning the MWs and MWDs of polymer backbones on the condition that the transformation of associative chain ends to non-associative counterparts does not damage the backbones.

Example 22: Effect of COD Purity on the Proceeding of ROMP with CTAs

It was found that the purity of VCH (4-vinylcyclohexene)-free COD has a profound effect on the synthesis of telechelic 1,4-1,4-PBs via ROMP of COD using Grubbs II: peroxides and n-butanol (introduced during $BH_3 \cdot THF$ treatment of COD according to the Macosko protocol) can also adversely affect the metathetical activity of Grubbs II by reacting with it and irreversibly transforming it into inactive species. In response to the issues associated with peroxides and n-butanol, a multi-stage process (Section 2.2.3) was developed to rigorously purify COD.

In particular, in an exemplary purification procedure, redistilled cis,cis-1,5-cyclooctadiene (COD, 72.3 g, 0.67 mol) was syringe-transferred to a 250 ml Schlenk flask in an ice bath at 0° C. under argon atmosphere. Under argon flow, 1M borane-THF complex in THF ($BH_3 \cdot THF$, 108 mL, 0.11 mol) was then slowly added into the flask over a 10-min period. The flask was taken out of the ice bath, and left to stir under argon atmosphere at room temperature for 2 h. THF was evaporated under reduced pressure at room temperature to an extent that the concentration of residual THF in the mixture was below 300 ppm (verified by $^1H$ NMR analysis). The monomer was vacuum distilled from the mixture at 40° C., 100 mTorr into a 100 mL Schlenk flask (loaded with 9 g of MAGNESOL® xl and a magnetic stir bar) in a dry-ice tub. The mixture was stirred under argon atmosphere at room temperature overnight. The monomer was vacuum distilled again at 45° C. and 100 mTorr from the mixture into a 100 mL Schlenk flask (loaded with 10 g of calcium hydride ($CaH_2$) and a stir bar) in a dry-ice tub in order to remove moisture introduced by MAGNESOL® xl. After stirring at room temperature for 3 h under argon flow, the monomer was once again vacuum distilled (45° C., 100 mTorr) from the mixture into a 100 mL Schlenk flask in a dry-ice tub. After warmed to ambient temperature, the flask was sealed with a SUBA-SEAL® rubber septum while argon stream was flowing, and placed in a freezer at −30° C. for storage of purified COD (40.0 g, 55.3% yield). The purified monomer was vacuum-distilled again at 35° C. prior to use.

Figure 37:
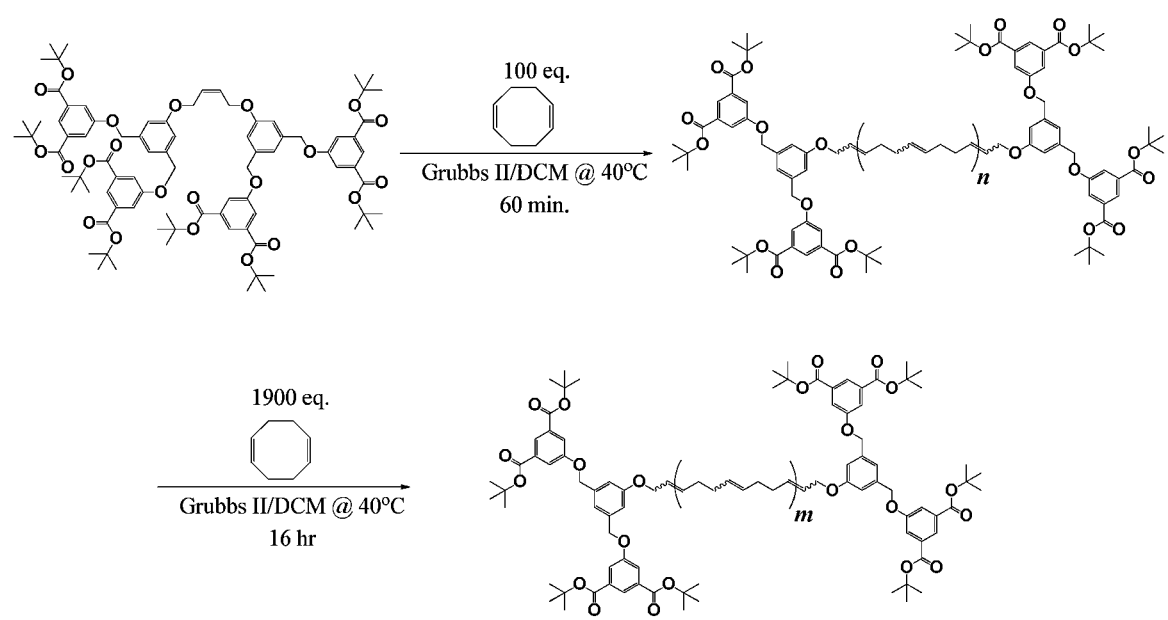
FIG. 37 shows a schematic illustration of a synthesis of di-TE 1,4-PB via two-stage ROMP of COD as the benchmark reaction for the influence of the purity of VCH-free COD.
Figure 46A:
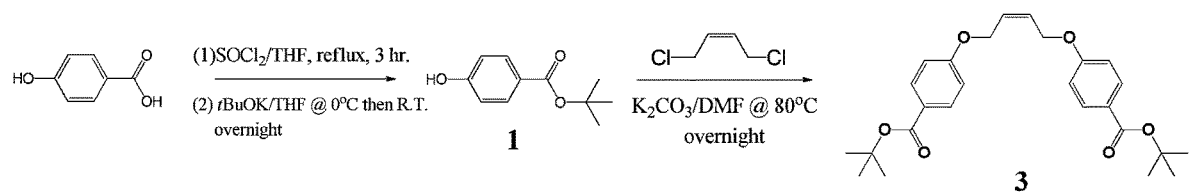
FIGS. 46A-46B show a schematic representation of a synthesis of bis-dendritic, tert-butyl ester-terminated chain transfer agents (CTA).
Figure 46B:
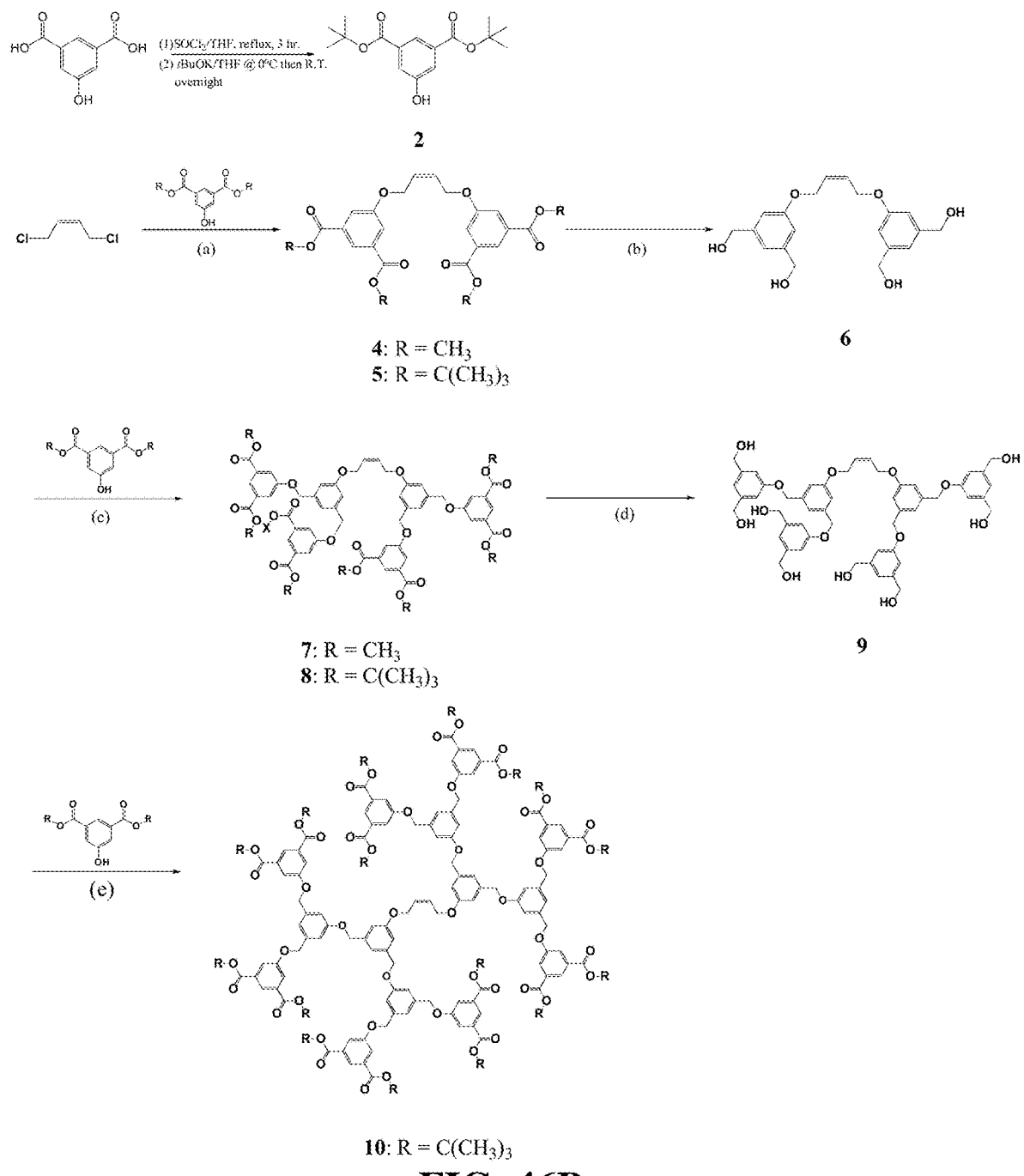

To illustrate the influence of the purity of VCH-free COD on the preparation of telechelic 1,4-PBs via ROMP of COD, the synthesis of di-TE 1,4-PB via the two-stage ROMP of COD with octa-functional tert-butyl ester-terminated bis-dendritic CTA (compound 8 in FIG. 46B) was chosen as the benchmark reaction (FIG. 37). Two different batches of VCH-free COD were prepared: the first (i.e., the control, COD I) was afforded via purification according to only the Macosko protocol, whereas the second one (COD II) was prepared according to the purification procedure described above. The implementation of two-stage ROMP using both batches of COD was the same as the purification procedure described above, in which the total monomer:CTA ratio was 2000:1, and 100 eq of COD was used in the first stage of ROMP; the load of Grubbs II was 1/30 eq of the CTA. Here the following properties to quantitate the effect of the purity of COD were chosen: (1) the period of time during which the reaction mixture develops enough viscosity to stop the magnetic stir bar from moving after the addition of 1900 eq of COD ($t_v$) (2) the overall conversion of COD ($X_f$, measured by $^1$H NMR analysis of the aliquot of reaction mixture) (3) the cis/trans ratio of the polymeric species in the aliquot (measure by $^1$H NMR analysis) (4) $M_w$ of the resultant polymer (measured by GPC-LS). The results for COD I and COD II were summarized in Table 10, which shows the results of synthesis of di-TE 1,4-PB via ROMP of batch 1 and batch 2 VCH-free COD.

TABLE 10

|  | COD I | COD II |
|---|---|---|
| $t_v$ (min) | 40.0 | 1.5 |
| $X_f$ (mol %) | 85.0 | 97.6 |
| cis/trans ratio | 2.20 | 1.73 |
| $M_w$ (kg/mol) | 264 | 142 |
| PDI | 1.58 | 1.43 |

Table 10 shows that the second stage of ROMP of COD II proceeded significantly faster ($t_v$=1.5 min) compared to that of COD I ($t_v$=40 min); the conversion of COD II was nearly quantitative ($X_f$=97.6%), whereas the reaction stopped at $X_f$=85% in the case of COD I. In addition, $^1$H NMR analysis of aliquots taken in the end of polymerization reactions also revealed that the use of COD II led to a lower cis/trans ratio (1.73) compared to the case of COD I (2.20). The $M_w$ of the resultant polymer of ROMP of COD II (142,000 g/mol), as revealed by GPC-LS analysis, was found significantly lower than that of ROMP of COD I (264,000 g/mol). When considered as a whole, these results indicate that Grubbs II possesses a higher metathetical activity (or a higher turnover number) when impurities in VCH-free COD that can interfere with Grubbs II are removed. This explains the much faster reaction rate of the second stage of ROMP of COD II. Similarly, Grubbs II in the presence of COD II can perform more cycles of metathesis reactions compared to in COD I, and thus a nearly quantitative $X_f$=97.6% was achieved in the case of COD II. The low cis/trans ratio (1.73) and $M_w$ (142,000 g/mol) resulting from ROMP of COD II suggest that a considerable fraction of ruthenium complexes on polymer chain ends remained metathetically active when COD II was mostly consumed, and as a result they continued to react with available C=C bonds present in the reaction mixture (in this case, C=C on polymer backbones) till they reached their maximum turnover number. The consumption of backbone by active ruthenium centers on chain ends (i.e., back-biting) led to the decreases in cis/trans ratio and $M_w$.

In sum, the enhanced activity of Grubbs II observed above validates the multi-stage purification procedure of COD described above.

Example 23: Example of Controlling Drag Reduction

In some embodiments, the associative polymers described herein can be used to provide a composition in which the property controlled is drag reduction. In particular, using the methods described herein, the composition can have a more than 10% reduction in the pressure drop required to drive a given volumetric flow rate through a given pipeline.

In particular, a skilled person can identify the non-polar host to be transported in which the drag is desired to be reduced.

The skilled person can then use published solubility parameters to estimate the solubility parameter of the identified non-polar host, or in the alternative, the skilled person can use literature on polymer solubility in similar liquids, and use this information to identify polymers that would be expected to dissolve in the non-polar host, for use as backbones of the associative polymers. The solubility can be confirmed by the skilled person by using techniques identifiable to the skilled person, for example by dissolving a sample of the polymer in the host and determining if it is homogeneous (e.g., by performing light-scattering measurements).

The skilled person can then use published dielectric constants to estimate the dielectric constant of the host liquid, and determine the kind of associative interaction of the FGs would be most suitable. For example, if the dielectric constant is less than or approximately 2, there are a wide range of suitable associative groups, including ordinary hydrogen bonding moieties (e.g. Hamilton receptor/cyanuric acid pairs, thymine/diacetamidopyridine pairs, and other identifiable to a skilled person) and charge transfer complexing moieties (e.g. dinitrophenyl/carbazole pairs and other identifiable to a skilled person). As the dielectric constant increases, the range of viable associative moieties decreases. For example, in chlorododecane (dielectric constant of 4.2 at 25° C.), charge-assisted hydrogen bonding moieties perform better than ordinary hydrogen-bond moieties. If there are organic acids (such as, Butyric acid, isobutyric acid, valeric acid, isovaleric acid, Heptanoic acid, and others identifiable to a skilled person) or organic bases (trimethylamine, diethylamine, diisopropylamine, Triethylamine, Diisobutylamine, diisoamylamine, diphenylamine, and others identifiable to a skilled person) present in the host composition, ionic interactions or ligand-metal interactions (a type of Brønsted/Lewis acid/base interaction) can be more suitable than charge-assisted hydrogen bond association. Therefore, some additional optimization can be performed as described below.

The additional optimization can be performed by preparing several telechelic polymers with backbone degree of polymerization of at least 200 and with candidate associative groups at their ends (e.g. ordinary hydrogen bonding moieties and/or charge transfer complexing moieties), and dissolving them in the host liquid using polymer concentration approximately equal to the overlap concentration for the backbone polymer and length used in the trial polymers (e.g., by calculating c* as described herein). The polymers that do not dissolve can be identified, and their corresponding associative end groups can be designated as being unsuitable, to thereby identify the suitable associative groups. If the viscosity of the non-polar composition is not greater than it would be for a solution of a non-associative polymer of the same backbone, length and concentration, the associative end groups can be modified by increasing the number of associative moieties in each group (i.e., increase the strength of association using polyvalent interactions).

Figure 40:
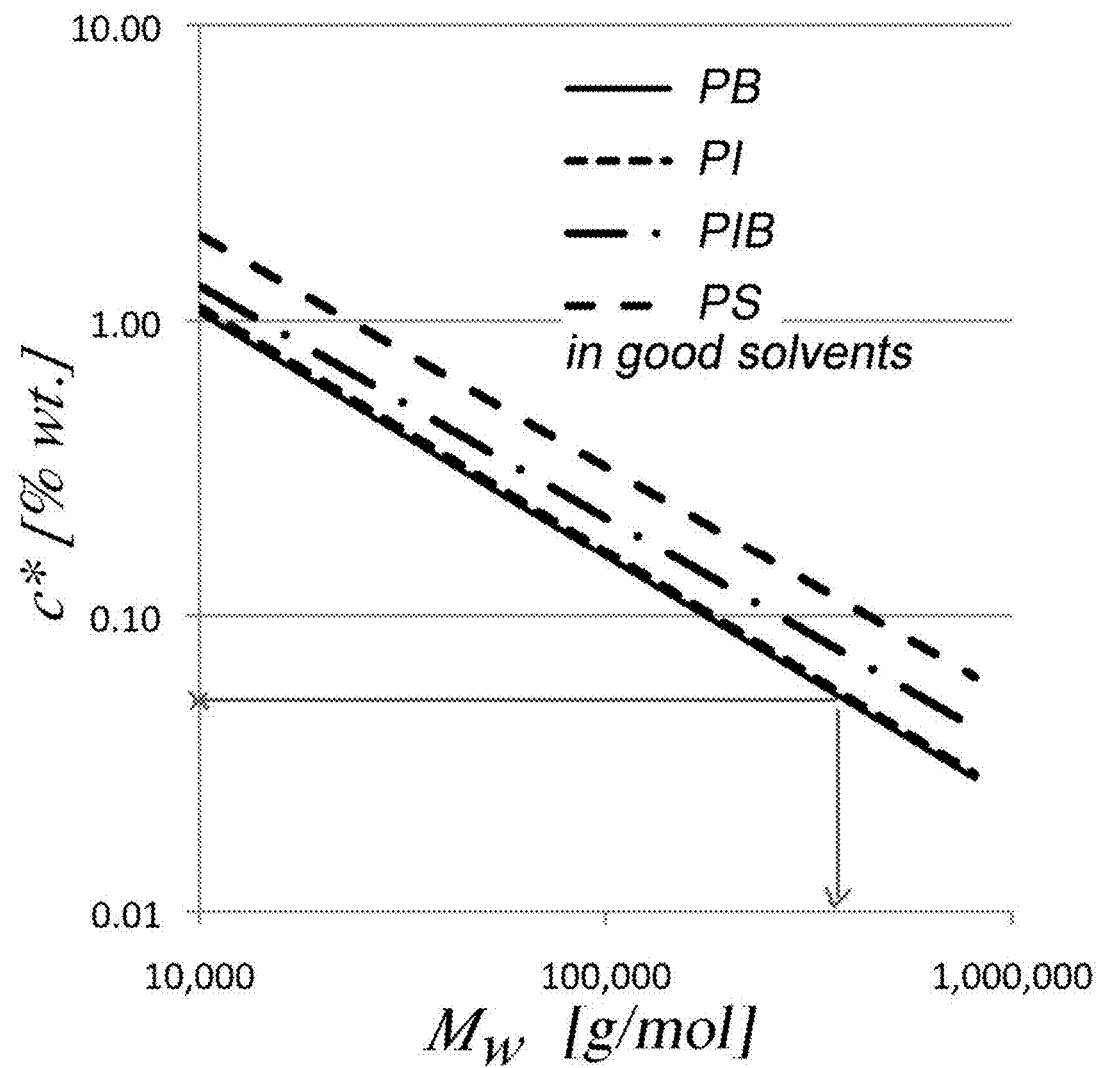
FIG. 40 shows a plot of an exemplary relationship between c* and $M_w$ that can be generalized to be used to select a desired $M_w$ of a backbone in an associative polymer as herein described based on the desired concentration of the associative polymer relative to c*.

Using one or more of the combinations of polymer backbone structure and end-group structure identified above, the skilled person can then estimate the backbone length that is compatible with a desirable or acceptable polymer concentration in the host. For example, if the backbone is determined to be polybutadiene, and the associative polymer concentration needs to be kept down to 0.8% or less (the "x" marked on the vertical axis of FIG. 40), then the minimum polybutadiene backbone can be read off a graph of the relationship between the overlap concentration and the weight-average molecular weight (as shown by the horizontal line from the "x" on the vertical axis to the corresponding point on the c* vs $M_w$ relationship for polybutadiene and the vertical line from that point down to the horizontal axis in FIG. 40), leading to a value of $M_w$ of about 400,000 g/mol.

A skilled person can then use experiments to refine the choice of backbone, backbone length, and FGs by preparing candidate polymers with the most promising backbone, backbone length, and FGs, then subjecting them to a limited set of experiments to validate their performance in both reducing turbulent drag (e.g., measuring the flow rate of the non-polar composition though a conduit, or measuring the change in pressure of the non-polar composition flowing through a conduit) and, if desired, resisting degradation due to turbulent flow (e.g. by measuring changes in viscosity of the non-polar composition after transportation through a conduit). If the required concentration is found by the skilled person to be too high (e.g. the amount of polymer required would be too costly), then the skilled person can prepare another polymer with the same, but longer, backbone and repeat the process until the polymer shows efficacy at an acceptably low concentration. This exemplary procedure is expected to give a drag reduction in turbulent pipe flow of at least 10%. If the extent of drag reduction is less than 30%, the skilled person can improve drag reduction up to 30% by increasing the strength of association, for example by increasing the number of associative moieties per associative group (e.g., using end groups with four carboxyl groups rather than two) or by using a stronger type of association (e.g., using charge-assisted hydrogen bonding—that is, a hydrogen bond formed between a hydrogen bond donor and hydrogen bond acceptor where the hydrogen bond donor is more acidic than the conjugate acid of the hydrogen bond acceptor by at least about 4 pKa units-rather than ordinary hydrogen bonding—that is, a hydrogen bond formed between a hydrogen bond donor and hydrogen bond acceptor where the hydrogen bond donor is less acidic than the conjugate acid of the hydrogen bond acceptor).

Example 24: Use of Associative Polymers in a Fuel in an Engine while Maintaining Engine Performance In this example, an exemplary self-associative polymers were incorporated in fuel at a level that is appropriate for drag reduction and/or mist control for improved fire safety. 430K di-TA PB was selected as the test polymer along with diesel as the base fuel; a polymer concentration of 0.1 wt % in diesel was subsequently chosen. A concentrated 1 wt % stock solution of the exemplary associative polymer was prepared by mixing the polymer with diesel under oxygen-free condition at 120° C. for 12 hours, and two identical 0.1 wt % diesel solutions of the polymer with a volume of 1.3 liters were prepared by diluting the 1 wt % stock solution with the same base fuel at room temperature. Test samples comprised the two 0.1 wt % solutions and two 1.3-liter bottles of unmodified base fuel as controls. A 3.75 kW diesel generator connected to a Simplex Swift-e load bank and a Fluke 434 Series II Energy Analyzer was used as the test apparatus, and the tests were performed at the Vehicle Emission Research Laboratory (VERL) of the Center for Environmental Research & Technology (CE-CERT), University of California at Riverside. A sequence of generator load/operating time comprising the following stages was used to carry out the tests: 2000 Watts (~53% of its rated power)/9 min, 3000 Watts (~80% of the rated power)/9 min, 3500 Watts (~93% of the rated power)/6 min, 3000 Watts/9 min, and 2000 Watts/9 min. Between samples the fuel supply to the engine was switched to a reservoir filled with the reference fuel (the same diesel fuel that was used to prepare the samples with associative polymers herein described) to keep the generator operating. The AC output from the generator was recorded continuously by the Energy Analyzer, and the emissions were analyzed using gas analysis of an isothermal stream of precisely calibrated dilution of the exhaust gas; quantitative values for carbon dioxide ($CO_2$), carbon monoxide (CO), mono-nitrogen oxide ($NO_x$), methane ($CH_4$) and total hydrocarbons (THC) were continuously monitored. Samples were run in a blind randomized sequence and the results were quantitatively analyzed prior to unmasking the sample identification. The results show no decrease in power output at any of the three loads to within the uncertainty of the power measurement. The results showed no adverse effects on engine emissions (Table 11). For the composition used in this example, it was not possible to identify the time at which the fuel supply to the engine was switched between the reference fuel, since none of the measured quantities changed at or near the time the valve was switched. The emissions of CO and THC were reduced (11), while the power output was the same (to within the uncertainty of the measurement) as for untreated diesel.

TABLE 11

| Condition | % change A #29[a] |
|---|---|
| $CO_2$ | |
| Sample-Diesel 2 kW | 2.03 |
| Sample-Diesel 3 kW | −0.09 |
| Sample-Diesel 3.5 kW | 0.43 |
| Sample-Diesel 3 kW | 1.56 |
| Sample-Diesel 2 kW | 1.46 |
| CO | |
| Sample-Diesel 2 kW | 5.63 |
| Sample-Diesel 3 kW | −4.34 |
| Sample-Diesel 3.5 kW | −10.20 |
| Sample-Diesel 3 kW | −1.93 |
| Sample-Diesel 2 kW | 8.87 |
| THC | |
| Sample-Diesel 2 kW | −15.54 |
| Sample-Diesel 3 kW | −13.04 |
| Sample-Diesel 3.5 kW | −11.54 |
| Sample-Diesel 3 kW | −8.73 |
| Sample-Diesel 2 kW | −0.68 |
| $NO_x$ | |
| Sample-Diesel 2 kW | 4.30 |
| Sample-Diesel 3 kW | 2.81 |
| Sample-Diesel 3.5 kW | 3.76 |
| Sample-Diesel 3 kW | 4.13 |
| Sample-Diesel 2 kW | 5.96 |

[a]A#29 is diesel treated with 0.1 wt % di-TA PB

Example 25: Reduction of Emissions in Fuels Comprising Associative Polymers

In this example, exemplary donor-acceptor polymers are incorporated in fuel at a level that is appropriate for drag reduction and/or mist control for improved fire safety, with the additional benefit that emissions from the engine are reduced. A 1:1 (w/w) mixture of 630K di-DA PB and 540K di-DB PB was selected as an exemplary donor-acceptor polymer pair along with diesel as the base fuel; a total polymer concentration of 0.1 wt % in diesel was subsequently chosen. A concentrated 1 wt % stock solution of the donor-acceptor pair was prepared by mixing the pair with diesel at room temperature for 12 hours and at 70° C. for 7 hours, and two identical 0.1 wt % diesel solutions of the pair with a volume of 1.3 liters were prepared by diluting the 1 wt % stock solution with the same base fuel at room temperature. Test samples comprised the two 0.1 wt % solutions and two 1.3-liter bottles of unmodified base fuel as controls. The Same apparatuses, procedures, and characterizations described in Example 24 were used in this example. Samples were run in a blind randomized sequence and the results were quantitatively analyzed prior to unmasking the sample identification. The results showed no decrease in power output at any of the three loads to within the uncertainty of the power measurement. For the composition used in this example, the emissions of CO and THC were reduced (Table 12), while the power output was the same (to within the uncertainty of the measurement) as for untreated diesel.

TABLE 12

| Condition | % change | | |
|---|---|---|---|
| | AB #90[a] | AB #8[a] | AB averaged |
| $CO_2$ | | | |
| Sample-Diesel 2 kW | 0.68 | 0.95 | 0.81 |
| Sample-Diesel 3 kW | −1.74 | 1.40 | −0.17 |
| Sample-Diesel 3.5 kW | 0.71 | 0.92 | 0.82 |
| Sample-Diesel 3 kW | 0.19 | −0.43 | −0.12 |
| Sample-Diesel 2 kW | 0.09 | 1.09 | 0.59 |
| CO | | | |
| Sample-Diesel 2 kW | −13.89 | −10.99 | −12.44 |
| Sample-Diesel 3 kW | −15.81 | −12.52 | −14.16 |
| Sample-Diesel 3.5 kW | −14.36 | −16.31 | −15.33 |
| Sample-Diesel 3 kW | −10.79 | −14.91 | −12.85 |
| Sample-Diesel 2 kW | −11.79 | −12.49 | −12.14 |
| THC | | | |
| Sample-Diesel 2 kW | −25.12 | −23.83 | −24.47 |
| Sample-Diesel 3 kW | −14.39 | −16.65 | −15.52 |
| Sample-Diesel 3.5 kW | −10.13 | −12.63 | −11.38 |
| Sample-Diesel 3 kW | −11.75 | −12.50 | −12.12 |
| Sample-Diesel 2 kW | −12.27 | −13.37 | −12.82 |
| $NO_x$ | | | |
| Sample-Diesel 2 kW | −1.29 | 0.77 | −0.26 |
| Sample-Diesel 3 kW | −3.16 | −0.35 | −1.76 |
| Sample-Diesel 3.5 kW | −2.17 | −0.59 | −1.38 |
| Sample-Diesel 3 kW | −1.95 | −0.43 | −1.19 |
| Sample-Diesel 2 kW | 0.77 | 2.70 | 1.73 |

[a]AB #90 is a first sample of 0.1 wt % 1:1 di-DA PB/di-DB PB; AB #90 is a second sample of 0.1 wt % 1:1 di-DA PB/di-DB PB Based on the observed reductions of THC and CO, a corresponding increase in fuel efficiency occurred.

Example 26: Improvement of Fuel Efficiency with Self-Associative Polymers

The emissions data discussed for Example 24 (0.1 wt % diesel solution of 430K di-TA PB) show a reduction in THC and CO emissions compared to the diesel reference sample, indicating a more efficient burning of the fuel.

Example 27: Improvement of Fuel Efficiency with Donor-Acceptor Associative Polymers The emissions data discussed for example 25 (0.1 wt % diesel solution of 630K di-DA PB/540K di-DB PB 1:1 mixture) show a reduction in THC and CO emissions compared to the diesel reference sample, indicating a more efficient burning of the fuel.

Example 28: Additional Improvement of Fuel Efficiency with Donor-Acceptor Associative Polymers The exhaust gas temperatures for untreated diesel and the sample described in Example 25 (0.1 wt % diesel solution of 630K di-DA PB/540K di-DB PB 1:1 mixture) were measured by a thermal couple immediately after the exhaust was diluted with an isothermal stream of carrier gas (hence, the temperature of the actual exhaust gas was considerably higher that reported here after dilution). The results revealed a 5° C. reduction for the exhaust corresponding to example 25, indicating a more efficient burning and conversion of fuel energy to useful power in the engine for this example.

Example 29: Materials

All chemical reagents were obtained at 99% purity from Sigma-Aldrich, Alfa Aesar, or Mallinckrodt Chemicals. Magnesol® XL was purchased from The Dallas Group of America, Inc. $^1$H-NMR spectra were obtained using a Varian Inova 500 spectrometer (500 MHz); all spectra were recorded in $CDCl_3$. Chemical shifts were reported in parts per million (ppm) and were referenced to residual protio-solvent resonances. Deuterated solvents used for $^1$H-NMR and SANS experiments ($CDCl_3$ and $d_{12}$-cyclohexane) were purchased from Cambridge Isotope Laboratories. Cylindrical quartz "banjo" cells used in scattering experiments were purchased from Hellma Analytics.

Example 30: Representative Procedure for Purification of Cyclooctadiene (COD)

Trace impurities introduced when purifying COD to remove its constitutional isomer 4-vinylcyclohexene using borane-tetrahydrofuran complex ($BH_3 \cdot THF$) were found to affect the procedure to prepare long telechelic polycyclooctadienes (PCODs).

Redistilled-grade COD (72.3 g, 0.67 mol) was syringe-transferred to a 250 ml Schlenk flask in an ice bath under argon. 1 M $BH_3 \cdot THF$ complex in THF (108 ml, 0.11 mol) was slowly added into the flask over 10 min. The flask was taken out of the ice bath, and left to stir under argon at room temperature for 2 h. THF was evaporated under reduced pressure at room temperature to an extent that the concentration of residual THF in the mixture was below 300 ppm (verified by $^1$H NMR analysis). The monomer was vacuum distilled from the mixture at 40° C. into a 100 ml Schlenk flask (loaded with 9 g of Magnesol® XL and a stir bar) in a dry-ice tub. The mixture was stirred under argon atmosphere at room temperature overnight. The monomer was vacuum distilled from the mixture into a 100 ml Schlenk flask (loaded with 10 g of calcium hydride ($CaH_2$) and a stir bar) in a dry-ice tub. After stirring at room temperature for 3 h under argon flow, the monomer was vacuum distilled from the mixture into a 100 ml Schlenk flask in a dry-ice tub. After being warmed to ambient temperature, the flask was sealed with a Suba-Seal rubber septum while argon was flowing through the flask, and placed in a freezer at −30° C. for storage of the rigorously purified COD (40.0 g, 55.3% yield). The rigorously purified monomer was vacuum distilled again prior to use.

FIG. 60 shows $^1$H NMR spectra of increasingly purified COD in the range from 3.4 to 5.9 ppm. FIG. 60, Panel A, COD after BH$_3$·THF treatment and vacuum distillation (containing ~330 ppm of butanol based on integration). FIG. 60, Panel B, Alternatively, COD further purified with magnesium silicate/CaH$_2$ treatments (to show removal of butanol and the resulting purity of COD used as monomer).

Example 31: GPC-MALLS for Characterization of Polymers

MALLS, i.e. Multi-angle Laser Light Scattering, was used in conjunction with GPC to determine the molecular weights and polydispersity of the polymers. The system used a Wyatt DAWN EOS multi-angle laser light scattering detector ($\lambda$=690 nm) with a Waters 410 differential refractometer (RI) ($\lambda$=930 nm) connected in series. Chromatographic separation by the size exclusion principle (largest comes out first) was achieved by using four Agilent PLgel columns (pore sizes 10$^3$, 10$^4$, 10$^5$, and 10$^6$ Å) connected in series. Degassed THF was used as the mobile phase with a temperature of 35° C. and a flow rate of 0.9 ml/min. The time for complete elution through the system was 50 min, and MALLS and RI data were recorded at 5 Hz.

Samples were prepared by dissolving 5 mg of polymer in 1 ml of THF and filtering the solution through 0.45 m PTFE membrane syringe filters immediately before injection. An injection volume of 20 µl was used. The data were analyzed by Wyatt Astra Software (version 5.3.4) using the Zimm fitting formula with dn/dc=0.125 for PCOD in THF to obtain weight-average molecular weight ($M_w$) for each polymer reported. Polymers are described in the Table 13.

TABLE 13

Characterization of polymers in this application.

| Polymer | $M_w^a$ (kg/mol) | $M_n^a$ (kg/mol) | PDI$^a$ | $M_w^b$ (kg/mol) |
|---|---|---|---|---|
| 45 kNA | 48.5 | 31.3 | 1.55 | |
| 45 kDA | 44.7 | 28.6 | 1.56 | |
| 45 kDB | 48.8 | 36.7 | 1.33 | |
| 140 kNA | 138.5 | 89.8 | 1.54 | |
| 140 kDA | 143.1 | 90.2 | 1.59 | |
| 140 kDB | 148.0 | 100.0 | 1.48 | |
| 300 kNA | 318.4 | 213.5 | 1.49 | |
| 300 kDA | 304.3 | 201.3 | 1.51 | |
| 300 kDB | 290.1 | 198.3 | 1.46 | 320 ± 20 |
| 670 kNA | 637.5 | 441.0 | 1.45 | |
| 670 kDA | 671.4 | 445.5 | 1.51 | |
| 670 kDB | 629.2 | 436.2 | 1.44 | 600 ± 50 |
| 76 kNA | 76.2 | 52.3 | 1.46 | |
| 76 kTA | 91.2 | 57.0 | 1.60 | |
| 230 kNA | 232.8 | 155.4 | 1.50 | |
| 230 kTA | 374.5 | 218.7 | 1.71 | |
| 430 kNA | 430.0 | 288.6 | 1.49 | |
| 430 kTA | 510.0 | 316.8 | 1.61 | |

($^a$determined by GPC-MALLS in THF;
$^b$determined by batch-mode MALLS in cyclohexane.)

Example 32: Rheology

Polymers were dissolved by shaking with tetralin, cyclohexane or Jet-A. To confirm that the end-association among telechelics is responsible for the changes in fluid properties, additional controls were prepared by treating some associative telechelic solutions (1.76 mg/ml) with 2.5 µl/ml triethylamine (TEA) to block their end association. Shear-flow rheology data were obtained at 25° C. with stress-controlled rheometer TA AR1000, equipped with a cone-plate geometry (angle 1°, diameter 60 mm) for polymer solutions in tetralin and Jet-A, and a strain-controlled rheometer TA ARES-RFS, equipped with a cone-plate geometry (angle 2°, diameter 50 mm) and a solvent trap for polymer solutions in cyclohexane, with shear rate ranging from 1000 s$^{-1}$ to 10 s$^{-1}$. For polymer solutions in tetralin, the viscosities measured by AR1000 and ARES-RFS were checked to be agreed with each other well. The specific viscosity values shown in FIG. 48 were averaged over data points taken from the range that doesn't have shear rate dependence (e.g., the range is 300 to 10 s$^{-1}$ in FIG. 49A 'DA/DB'). Three replicates with freshly prepared solutions were measured to obtain the error bars (SD values).

Example 33: Stead-Flow Shear Viscometry

Polymers were dissolved by shaking with solvents of interest (tetralin and Jet-A). Steady shear viscosity was measured in a cone-plate geometry (60 mm diameter aluminum, 1° cone, 29 m truncation) at 25° C. using an AR1000 rheometer from TA Instruments (temperature controlled at 25° C.). Test solutions were probed in the shear rate range 1-3000 s$^{-1}$ logarithmically (5 shear rates per decade). All viscosity data were reported in terms of specific viscosity ($\eta_{sp} \equiv (\eta_{solution}-\eta_{solvent})/\eta_{solvent}$, where $\eta_{solvent}$=2.02 mPa·s for tetralin and 1.50 mPa·s for Jet-A at 25° C.) which reflects the contribution of the polymer to the viscosity.[25]

Example 34: Shear Stability Test

A recirculation setup consisting of a Bosch 69100 In-line Electric Fuel Pump and a MW122A 2AMP Regulated DC Power Supply (LKD Ind.) at 12 V (shown in FIG. 66 Panel A) was used to subject polymer solutions to a flow history that mimics, for example, recirculation of fuel through an engine's heat transfer system. Test samples were recirculated through the setup at room temperature for 60 s (approximately 60 passes through the pump using 50-60 mL of solution and a flow rate of 3 L/min). After recirculation, samples were collected in 100 mL glass jars and stored at −30° C. for further tests. Between tests, the pump was rinsed 4 times with approximately 200 mL of hexanes, followed by drying in vacuo at 40° C. overnight to prevent cross-contamination among samples or dilution by hexanes. Shear stability was evaluated by comparing shear viscosities of recirculated samples to those of the corresponding unsheared controls.

Example 35: Small-Angle Neutron Scattering (SANS)

$d_{12}$-Cyclohexane solutions of polymers were prepared by weighing out polymer on a Mettler precision balance (±0.01 mg) into new glass scintillation vials with PTFE lined caps and subsequently adding the appropriate amount of solvent using a precision syringe (±1%). These were subsequently placed on a wrist action shaker at room temperature overnight.

SANS data in the present application were obtained at the National Institute of Standards and Technology (NIST) on beamline NG-3, preliminary experiments (data not shown) were conducted at Oak Ridge National Laboratory (ORNL) on beamline CG-2 at the High Flux Isotope Reactor (HFIR). Samples were placed in Hellma quartz cylindrical cells with 5 mm path length. Temperature was controlled by a recirculating water bath at NIST and by Peltier at ORNL. All scattering experiments were conducted at 25° C. Twodimensional scattering patterns were taken for each sample using three detector distances (1.3-13 m at NIST and 0.3-18.5 m at ORNL). The overall scattering vector ranges were $0.003 < q(Å^{-1}) < 0.4$ at NIST and $0.002 < q(Å^{-1}) < 0.8$ at ORNL with the effective limits for a given sample determined by the signal to noise ratio.

Example 36: Multi-Angle Laser Light Scattering MALLS ("Batch Mode")

MALLS (not connected to GPC) was used to characterize the supramolecular assembly behavior of complementary associative telechelic polymers (DA/DB mixtures) in cyclohexane. Cyclohexane solutions of polymers were prepared by weighing out polymer on a Mettler precision balance (±0.01 mg) into new glass scintillation vials (20 ml) with metal foil lined caps and subsequently adding the appropriate amount of solvent using a precision syringe (±1%). These were subsequently placed on a wrist action shaker at room temperature overnight. All solutions were filtered through 0.45 m PTFE filters into clean glass scintillation vials (20 ml) and allowed to equilibrate for at least 24 hours prior to characterization. MALLS measurements were carried out using a Wyatt DAWN EOS laser light scattering instrument in "batch mode" with 18 detectors in the angular range from 22.5 to 1470 using a solid-state laser ($\lambda$=690 nm).

Data were acquired at 35° C. three times (rotating the vial to average out heterogeneities) for at least 2 minutes and analyzed using Wyatt Astra Software (version 5.3.4). The associative supramolecules conformed to the Zimm fitting formula, which was used to evaluate the apparent weight-average molecular weight (app $M_w$) and apparent radius of gyration (app $R_g$) for each polymer composition at each concentration, with dn/dc=0.11 for PCOD in cyclohexane.

Example 37: Modeling: a Theoretical Model of Ring-Chain Equilibrium

Statistical mechanics were used to design polymers that defy conventional wisdom by self-assembling "mega-supramolecules" (≥5,000 kg/mol) at low concentration (≤0.3% wt). Theoretical treatment of the distribution of individual subunits-end-functional polymers among cyclic and linear supramolecules (ring-chain equilibrium) predicts that mega-supramolecules can form at low total polymer concentration—if, and only if, the backbones are long (>400 kg/mol) and end-association strength is optimal (16-18 kT wherein k as used herein indicates Boltzmann constant). Viscometry and scattering measurements of long telechelic polymers (LTPs, $M_w \geq 400$ kg/mol) having polycyclooctadiene backbones and acid or amine end groups verify formation of mega-supramolecules. They control misting and reduce drag like ultra-long covalent polymers. With individual building blocks short enough to avoid hydrodynamic chain scission (400<$M_w$ [kg/mol]≤1,000) and reversible linkages that protect covalent bonds, these mega-supramolecules overcome the obstacles of shear degradation and engine incompatibility.

Ultra-long polymers ($M_w \geq 5,000$ kg/mol) exhibit dramatic effects on fluid dynamics even at low concentration (e.g., ≤100 ppm confers mist control ([50], [6]) and drag reduction ([51]). The key to both mist control and drag reduction is the ability of polymers to store energy as they stretch, such that the fluid as a whole resists elongation. The high potency of ultra-long linear polymers is due to the onset of chain stretching at low elongation rates and their high ultimate conformational elongation ([52]). For example, increasing $M_w$ from 50 kg/mol to 5,000 kg/mol (below, kg/mol values refer to weight-average molecular weight, $M_w$) decreases the critical elongation rate by more than three orders of magnitude, and increases the ultimate molecular elongation by two orders of magnitude.

Here a set of parameter values is identified for which the equilibrium distribution of the supramolecular species is suitable for mist-control applications. Based on prior literature on ultra-long polymers (which themselves are not acceptable due to shear degradation during routine handling of fuel and incompatibility with engine systems), polyisobutylene chains having weight-average molecular weight~$5\times10^6$ g/mol are satisfactory mist-suppressing agents at concentrations as low as 50 ppm in kerosene [6]. Therefore, a theoretical model of ring-chain equilibrium is used to identify choices of the molecular weight of telechelic chains ($MW_p$), the strength of end-association (εkT) and concentration ($\phi_{total}$) that would provide 50 ppm of "mega-supramolecules" (linear supramolecules of $M_w \geq 5\times10^6$ g/mol and cycles of $M_w \geq 10\times10^6$ g/mol). Initial results provide motivations to synthesize exceptionally long telechelics and guided the selection of associative end groups: the model indicates that chains of approximately $5\times10^5$ g/mol to $1\times10^6$ g/mol with ends that associate with strength 16 kT-18 kT at approximately 800-1400 ppm concentration could provide the necessary concentration of mega-supramolecules. Details of the particular theoretical formulation were developed and described herein.

Example 38: Parameter Space for Ring-Chain Equilibrium of Long, End-Associative Telechelics Results are presented for complementary pairs of telechelic polymers (A----A, B----B) that have similar backbone lengths ($MW_A=MW_B=MW_p$) in stoichiometric solutions ($\phi_{Atotal}=\phi_{Btotal}=\phi_{total}/2$). When the A and B end-groups meet, they form a physical association with energy ε. In the resulting parameter space of $\{MW_p, \varepsilon, \phi_{total}\}$, the equilibrium distribution of supramolecules are optimized for mist-control applications, within the constraints on $MW_p$ ($M_w \leq 1\times10^6$ g/mol) and $\phi_{total}$ (<5,000 ppm) in the context of fuel additives.

The challenge associated with using end-to-end association at the low concentrations relevant to fuel is the tendency to form small cyclic species that, in effect, consume most of the telechelic building blocks without contributing to mist control. To reduce the fraction of telechelic chains incorporated into cyclic species, very long telechelics are used, which reduce the fraction of polymer "wasted" in small rings because the loop closure probability scales as $N^{-3/2}$ for Gaussian chains and $N^{-1.66}$ for swollen chains (see Example 45). Based on prior literature on shear degradation, $MW_p=1\times10^6$ g/mol is considered as an upper bound and it is compared to chains that are half that length $MW_p=0.5\times10^6$ g/mol to quantify sensitivity to $MW_p$. As a further step to mitigate formation of small rings, complementary association of A----A and B----B telechelics is used, for which the smallest ring is a dimer. This reduces the amount of telechelic wasted in small cyclics due to two effects: i) the entropy penalty for ring closure for the smallest possible ring is much greater than the penalty for closing a ring of size a single telechelic because the loop is twice as long as a single telechelic; and ii) the odd rings (cycles of 1, 3, 5, . . . telechelics) are eliminated, greatly reducing the fraction of building blocks partitioned in cyclic species.

Another challenge in the context of fuel additives is the need to maintain low viscosity. The longer a polymer is, the lower the concentration $\phi^*$ at which the chains begin to overlap and viscosity begins to increase strongly. Therefore, the total polymer concentration $\phi_{total}$ needs to be less than the overlap concentration of the individual telechelic building blocks, $\phi^*(MW_p)$. Further, the model shows that a concentration of $\phi_{total}=\frac{1}{4}\phi^*(MW_p)$ is low enough that all supramolecules in the equilibrium distribution are below their respective overlap concentrations. For the two chain lengths selected above, results are presented for $\phi_{total}=\frac{1}{4}\phi^*(MW_p)$, which is 800 ppm for $MW_p=1\times10^6$ g/mol, and 1400 ppm for $MW_p=0.5\times10^6$ g/mol. In addition, results are presented for $1\times10^6$ g/mol at 1400 ppm, both to illustrate the change in the distribution of supramolecular species with increasing concentration (from $\phi_{total}=800$ ppm to 1400 ppm for $MW_p=1\times10^6$ g/mol) and to illustrate the effect of the size of the telechelic building blocks at matched total concentration (comparing both chain lengths at $\phi_{total}=1400$ ppm). With the above choices for $MW_p$ and $\phi_{total}$, the problem is reduced to a single dimension, E, which is examined over its physically relevant range: it is much greater than kT to drive association and it is much less than 150 kT (approximate strength of a covalent bond) so that the reversible links can function as tension relief links that protect against chain scission in strong flows.

were chosen based on their solubility (remaining in solution down to the freezing point of fuel) and strength (FIG. 76 see [8]). In addition to the Kuhn segment volume, two additional attributes of the polymer backbone enter into the entropy cost of ring closure: the Kuhn segment length (how close ends are for a ring to close) and the excluded volume parameter (how expanded the chain is in solution). The end-association strength (i.e., energy penalty for unpaired ends) enters through the chemical potential of the linear species.

To guide the design of an experimental system, the relationship of model parameters to polymers having unsaturated hydrocarbon backbones—1,4-polyisoprene (PI), 1,4-polybutadiene (PB) and polycyclooctadiene (PCOD)—in Jet-A solvent is considered. The model is formulated with sites of volume $a^3$ on a lattice with coordination number c=6. The lattice size $a^3=v_K$, where $v_K=MW_K/(N_A\rho)$ is the volume of a Kuhn segment (with $N_A$ denoting Avogadro's number and $\rho$, the polymer density) for a specific polymer of interest. A chain of molecular weight $MW_p$ maps onto $M=MW_p/MW_K$ connected lattice sites. To model a solution at volume fraction $\phi_p$, a system of $N_p$ polymer molecules in a volume $V=(MN_p+N_s)a^3$ is treated, the number of solvent lattice sites adjusted to give the specified concentration, i.e., $N_s=MN_p(1-\phi_p)/\phi_p$. To quantify the entropic cost of loop closure (Example 47), numerical values are needed for the

TABLE 14

Literature Values for Parameters in the Model

| Polydiene | backbone double | | non-1,4- | $\rho$ | | b | M_K | |
|---|---|---|---|---|---|---|---|---|
| 1,4-rich | cis | trans | units (b) | [g/ml] | C∞ | [nm] | [g/mol] | References |
| Polyisoprene | 100% (a) | 0 (a) | 0 (a) | 0.910 | 5.2 | 0.93 | 128.6 | [1] |
| | 70% | 23% | 7% | 0.900 | 4.7 | 0.84 | 119.6 | [2] |
| | 19% | 45% | 36% | 0.895 | 5.3 | 0.96 | 156.9 | [1], [4] |
| Polybutadiene | 98% | 1% | 1% | 0.900 | 4.6 | 0.83 | 90.5 | [1], [3] |
| | 29% | 53% | 18% | 0.895 | 5.6 | 1.01 | 119.8 | [1], [5] |
| | 44% | 59% | 7% | 0.895 | 5.5 | 0.99 | 112.5 | [1], [5] |

Properties measured at temperature of 25° C.
$\rho$ density in the melt state
C∞ characteristic ratio
b Kuhn step length
M_K molar mass of a Kuhn segment
Shaded cells: most similar to the polycyclooctadiene in this study, which has 75% cis units, 25% trans units and no 1,4-units.
Notes:
(a) natural rubber
(b) for polyisoprene, these are mainly 3,4-units and trace amounts of 1,2-units; and for polybutadiene, these are 1,2-units (c) shaded cells refers to cells in the top row of the Polybutadiene portion in Table 14.

Example 39: Modeling: Computation and Experiment

Despite prior reports indicating that end association becomes difficult as chain length increases ([53], [54], [55]), the regime of long telechelic polymers (LTPs, FIG. 47A, right; see Table 13 for list of polymers) at concentrations below 1% was ventured into, theory was used to guide the selection of molecular structures. To aid material design, a lattice model was used in which the polymer molecular weight simply maps onto the corresponding number of connected lattice sites, each site with a volume equal to that of an effectively freely-jointed segment ("Kuhn segment")—a well-established property, tabulated for many polymers (Table 14). Unsaturated hydrocarbon backbones small end-to-end distance x required to close a loop and for the number of monomers in a thermal blob $g_T \approx b^6/v^2$. For simplicity x/b=1 is chosen.

All three backbones of interest here, PI, PB and PCOD, can be represented to good approximation by a single set of parameters, because the differences among them are relatively small (Table 14). For these unsaturated hydrocarbon backbones, variations in molecular parameters result from differences in cis/trans ratio of the backbone double bonds and the fraction of monomer insertions that create short side chains (3,4- and 1,2-units in PI and PB). If all six chain microstructures in Table 14 are considered, the lattice size is a=0.61±0.03 nm. Focus is placed on polymers that have very few side chains (PCOD does not have any); if only microstructures with ≤7% 3,4- and 1,2-units, the lattice size shifts very slightly to a=0.59±0.03 nm. Similarly, the molecular weight of a Kuhn segment is $MW_K$=121±22 g/mol if all six microstructures are included and shifts slightly to $MW_K$=113±16 g/mol if microstructures with 18% or more 3,4- and 1,2-units are excluded. The Kuhn step length is roughly 50% greater than the lattice size a: if all six microstructures are included b=0.93±0.07 nm (with ≤7% 3,4- and 1,2-units, b=0.90±0.08 nm). The excluded volume parameter v was estimated as $v/b^3$≈0.10 for PI in Jet-A, consistent with $g_T$≈100. [15] Based on literature results in cyclohexane, the expanded conformations of PI and PB are very similar when they are dissolved in a good solvent that is similar to Jet-A ($R_g$ [nm]=A(MW)$^v$, with A=0.0129 for PB and 0.0126 for PI, and with v=0.609 for PB and 0.610 for PI). Thus, theoretical predictions with a single set of parameters are expected to provide equally good guidance for molecular design with PI, PB and PCOD backbones. Results are shown for $MW_K$=113 g/mol, a=0.61 nm, b=0.90 nm, x/b=1 and $g_T$=100

The model predicts the equilibrium distribution of aggregates in terms of concentrations of supramolecular species with various sizes as functions of polymer concentration, length of the telechelic building blocks and binding energy. The model provides a guideline to achieve the desired rheological benefits (mist control and drag reduction).

To overcome the problem of chain collapse that occurs when stickers are distributed along a chain, a model of ring-chain equilibrium is used to test the hypothesis that clustering stickers at the ends of polymer chains can be used to generate a sufficient population of mega-supramolecules to exert mist control. It is shown that lin

Example 44: Model to Determine Lifetime of Equilibrium Distribution

The model assumes that under conditions of practical importance, equilibrium is restored as fast as it is disturbed. Therefore, the time taken by a polymer to reach the equilibrium partitioning of the polymer into aggregates of all sizes was investigated The average lifetime of a donor-acceptor physical bond is estimated using $\tau_b \sim \tau_0 \exp(\varepsilon)$, where $\tau_0 \sim \eta b^3/kT$ describes a typical motional time for a monomer in solvent with shear viscosity $\eta$. For solvents like fuel, $\eta \sim 1$ mPa·s, giving $\tau_0 \sim 10^{-10}$ s, so the lifetime is on the order of $\tau_b \sim 1$ ms for $\varepsilon = 17$. Therefore, if equilibrium can be reached with roughly $10^3$ bond-breaking and bond-forming events and for end-groups with 16-18 kT energy of association, that time is on the order of 1s.

Example 45: Theoretical Treatment of Equilibrium Distribution of Cyclic and Linear Supramolecules The inventory of all cyclic and linear supramolecules was computed with the modeling of Example 43, as a function of concentration, backbone length and end-association strength by solving the system of equilibrium relationships in a population balance model (FIG. 47B). The resulting predictions indicate that an adequate concentration of mega-supramolecules (e.g., >50 ppm of supramolecules with $M_w \geq 5,000$ kg/mol ([6])) form if the concentration of LTPs is 1,400 ppm, their backbone has approximately 6,000 Kuhn segments ($M_w = 500$ kg/mol for polycyclooctadiene, PCOD) and their ends associate pairwise with an energy of 16-18 kT (modeling, after Goldstein([56]), FIGS. 51-56). Furthermore, theory shows that the favorable window of chain lengths and association strengths is relatively narrow. If the backbone is too short (e.g., 200 kg/mol PCOD), the fraction of material that is "lost" to the formation of small cyclics increases and, consequently, the concentration of telechelics can be increased. If the backbone is too long (e.g., 1,000 kg/mol PCOD), the individual telechelics become susceptible to degradation in strong flows (below). If the association energy is too low (e.g., 14 kT), formation of supramolecules is inadequate. If the association energy is too high (e.g., 20 kT), dangling ends are overly penalized and too few linear species form.

While there are already many studies of the theory of ring-chain equilibrium, of interest is formulating the problem so that problem of equilibrium population as a function of the length, concentration and association energy could be readily solved. In the present construction, terms arising from microscopic interactions, as well as terms arising from the center-of-mass and configurational entropy (except loop closure) of polymer components and solvent in solution are carried out explicitly. Whereas terms arising from (i) the energy of association of the end-groups within a polymer aggregate, and (ii) the entropic cost of loop closure for cyclic supramolecular aggregates are absorbed into the standard chemical potentials of the polymeric species.

As a first step in modeling the equilibrium distribution of cyclic and linear supramolecules from telechelic polymers A----A and B----B (FIG. 52), the case of association of telechelic polymers $A_1$----$A_2$ and $B_1$----$B_2$ is started with. Subsequently, it is shown that the predicted distributions hold for A----A and B----B as well (Example 48). It is assumed that the end-groups $A_1$ and $A_2$, and likewise $B_1$ and $B_2$, are distinguishable but of identical reactivity (as though one end were isotopically labeled).

Example 46: Model Description: Equilibrium Using a Lattice Model

This equilibrium is approximated using a lattice model following Goldstein [56]. A solution of $N_s$ solvent molecules and $N_{Atotal}$ and $N_{Btotal}$ telechelic $A_1$----$A_2$ and $B_1$----$B_2$ chains of $M_A$ and $M_B$ repeat units, respectively, occupies a volume V that is partitioned into lattice sites of volume $a^3$, which is the volume of a solvent molecule and also the volume of a monomer. There is negligible volume change upon mixing, so $V = a^3(N_s + N_{Atotal}/M_A + N_{Btotal}M_B) = \Lambda a^3$, where $\Lambda$ is the total number of "sites." Subscripts i (or j) refer to polymeric components. Component i is composed of $n_i$ $A_1$----$A_2$ building blocks and $m_i$ $B_1$----$B_2$ building blocks, and has $M_i = n_i M_A + m_i M_B$ repeat units. The volume fraction of solvent is $\phi_s = N_s/\Lambda$ and that of component i is $\phi_i = N_i M_i/\Lambda$. Unless otherwise specified, sums $\Sigma_i$ are over all polymer components in solution, e.g., the sum of the volume fractions of all polymeric species are equal the total polymer volume fraction $\phi = \Sigma_i M_i N_i/\Lambda = 1 - \phi_s$.

The total free energy F of the solution is the sum of entropic and enthalpic contributions, $F_S$ and $F_{int}$, and of contributions from the internal free energy of solvent and polymer components:

$$F = F_{int} + F_S + N_s \mu_s^0 + \sum_j N_j \mu_j^0 \quad (1)$$

where $\mu_j^0$ is the standard chemical potential of polymeric component j. The first term is due to solvent-solvent, polymer-solvent, and polymer-polymer interactions, which are estimated by the random mixing approximation:

$$F_{int} = \Lambda \delta[(1-\phi)^2 h_{ss} + \phi^2 h_{pp} + 2\phi(1-\phi)h_{ps}] \quad (2)$$

where $\delta$ is one-half the local coordination number, and hi; are the microscopic interaction energies of the polymer and solvent species. The second term is due to configurational and center-of-mass entropy, S:

$$S = k \sum_j \ln \Omega(0, N_j) + \Delta S_{mix} \quad (3)$$

where $\Omega(0, N_j)$ is the number of possible configurations of $N_j$ molecules of polymer component j each having $M_j$ repeat units, onto $M_j N_j$ sites (i.e., pure component j before mixing with other polymer species or solvent). Following the notation of Hill [57] for the entropy of a melt of $N_i$ linear polymer chains of length $M_i$:

$$\ln \Omega(0, N_i) = \quad (4)$$
$$-N_i \ln N_i + N_i + M_i N_i \ln(M_i N_i) - M_i N_i + N_i(M_i - 1)\ln\left(\frac{c-1}{M_i N_i}\right)$$

where c is the coordination number. The entropy of mixing of the solvent and all polymer components, $\Delta S_{mix}$, is approximated using the Flory-Huggins expression:

$$\Delta S_{mix} = -k\left(N_s \ln\phi_s + \sum_j N_j \ln\phi_j\right). \quad (5)$$

The entropic contribution to the free energy of the mixture is therefore:

$$F_S = -T\Delta S_{mix} - kT\sum_j \ln\Omega(0, N_j) \quad (6)$$

$$= kT\left[N_s \ln\left(\frac{N_s}{\Lambda}\right) + \sum_j N_j \ln\left(\frac{N_j}{\Lambda}\right)\right] +$$

$$kT\sum_j N_j \ln(M_j) - kT\sum_j \ln\Omega(0, N_j)$$

where $\phi_s$ and $\phi_j$ are replaced by $N_s/\Lambda$ and $N_j M_j/\Lambda$ respectively.

The equilibrium distribution of species is readily analyzed in terms of the chemical potentials of the solvent $\mu_s$ and the polymeric species $\mu_i$. For example, at equilibrium, the chemical potential of a supramolecular component i made up of $n_i$ $A_1$----$A_2$ and $m_i$ $B_1$----$B_2$ satisfy the equilibrium condition:

$$\mu_i = n_i\mu_A + m_i\mu_B \quad (7)$$

where $\mu_A$ and $\mu_B$ are the chemical potentials of building blocks $A_1$----$A_2$ and $B_1$----$B_2$, respectively. The chemical potential of polymer component i involves both interactions (solvent-solvent, polymer-solvent and polymer-polymer) and entropic contributions. The contribution to the chemical potential of component i due to interactions is:

$$\mu_{int,i} = \frac{\partial F_{int}}{\partial N_i}\bigg|_{N_{j\neq i}} = -\omega M_i \phi_s^2 + \omega_{pp} M_i \quad (8)$$

where $\phi = (M_i N_i + \sum_{j\neq i} M_j N_j)/\Lambda$ with $\Lambda = N_s + M_i N_i + \sum_{j\neq i} M_j N_j$ and $\phi_s = 1 - \phi$ are used and, for convenience, $\omega_{mn} = \delta h_{mn}$ and $\omega = \omega_{pp} + \omega_{ss} - 2\omega_{ps}$ are introduced. The entropic contribution to the chemical potential of component i is:

$$\frac{\mu_{S,i}}{kT} = \frac{1}{kT}\frac{\partial F_s}{\partial N_i}\bigg|_{N_{j\neq i}} = \ln\left(\frac{\phi_i}{M_i}\right) + 1 - \phi_i - \quad (9)$$

$$M_i\left[\phi_s + \sum_{j\neq i}\frac{\phi_j}{M_j}\right] + \ln M_i - 1 - M_i[\ln(c-1)-1] - \ln M_i + \ln(c-1).$$

Differentiation of Equation 6 and substitution of Equations 7 and 9 give the following expression for the chemical potential of component i, valid for the single-chain building blocks and all supramolecules:

$$\mu_i = \frac{\partial F}{\partial N_i}\bigg|_{N_{j\neq i}} = \quad (10)$$

$$\mu_i^0 + kT\left\{\ln\left(\frac{\phi_i}{M_i}\right) - M_i\left[\phi_s + \sum_j \frac{\phi_j}{M_j}\right] + f_i\right\} - \omega M_j \phi_s^2 + \omega_{pp} M_i$$

where $f_i = \ln(c-1) + M_i[1-\ln(c-1)]$. Substituting the expressions for $\mu_i$, $\mu_A$, and $\mu_B$ from Equation 10 into Equation 7 above, after rearrangement, the following mass-action relation for component I is obtained:

$$\mu_i^0 + kT\left[\ln\left(\frac{\phi_i}{M_i}\right) + f_i\right] = \quad (11)$$

$$n_i\mu_A^0 + m_i\mu_B^0 + kT\left[n_i\ln\left(\frac{\phi_A}{M_A}\right) + m_i\ln\left(\frac{\phi_B}{M_B}\right) + n_i f_A + m_i f_B\right]$$

where $\phi_A$ and $\phi_B$ are the equilibrium volume fractions of the free telechelics $A_1$----$A_2$ and $B_1$----$B_2$, respectively. It is convenient to rewrite Equation 11 as follows:

$$\left(\frac{\phi_i}{n_i M_A + m_i M_B}\right) = \left(\frac{\phi_A}{M_A}\right)^{n_i}\left(\frac{\phi_B}{M_B}\right)^{m_i}\exp(\Gamma_i), \quad (12)$$

where $$\Gamma_i = \frac{1}{kT}\left(n_i\mu_A^0 + m_i\mu_B^0 - \mu_i^0\right) + (n_i + m_i - 1)\ln(c-1). \quad (13)$$

The conservation equations are then:

$$\phi_{Atotal} = \sum_j \phi_j\left(\frac{n_j M_A}{n_j M_A + m_j M_B}\right) = \sum_j n_j M_A\left(\frac{\phi_A}{M_A}\right)^{n_j}\left(\frac{\phi_B}{M_B}\right)^{m_j}\exp(\Gamma_j) \quad (14)$$

$$\phi_{Btotal} = \sum_j \phi_j\left(\frac{m_j M_B}{n_j M_A + m_j M_B}\right) = \sum_j m_j M_B\left(\frac{\phi_A}{M_A}\right)^{n_j}\left(\frac{\phi_B}{M_B}\right)^{m_j}\exp(\Gamma_j).$$

To this point, the formulation has treated terms arising from microscopic interactions, as well as center-of-mass and configurational entropy (except loop closure) of polymer components and solvent. Next (i) the energy of association of the paired end-groups within a supramolecule and (ii) the entropic cost of loop closure for cyclic supramolecules are accounted for, which are incorporated into the standard chemical potentials $\mu_j^0$.

Figure 53:
FIG. 53 shows grouping of polymer components, where A and B generically refer to A1 or A2 and B1 or B2 end-groups. Each group is composed of all the different possible aggregates obtained by the assembly of the A1----A2 and B1----B2 building blocks.

For this purpose, it is useful to identify "groups" of polymer species, each assigned an index g, that are topologically similar and have the same values of $M_j = M_g$, $n_j = n_g$, $m_j = m_g$, and $\Gamma_j = \Gamma_g$. In identifying "groups" of polymer species, A and B are used to refer to A1 or A2 and B1 or B2, respectively (FIG. 53). In counting number of distinct species in group g ($\Omega_g$) the two ends of an A-telechelic or a B-telechelic are treated as distinguishable. Thus, group g is composed of all the different possible aggregates obtained by the assembly of the A1----A2 and B1----B2 building blocks. For example, group g=3 has $\Omega_g=4$ distinct aggregates (FIG. 53): A1----A2-B1----B2, A1----A2-B2----B1, A2----A1-B1----B2, and A2----A1-B2----B1.

How many components belong to each group? For linear aggregates there are two possibilities: (i) for $n_g + m_g$ even (i.e., $n_g = m_g$), no sequence read from left to right will be the same as a sequence read from right to left, so the number of ways to arrange the molecules is $\Omega g = 2^{n_g + m_g}$; (ii) for $n_g + m_g$ odd, every sequence read from left to right will have a matching sequence read from right to left, so the number of ways to arrange the molecules is $\Omega_g = 2^{n_g+m_g-1}$. Supramolecular cycles always have $n_g = m_g$. The number of ways to form such a loop is derived in Example 48 below; to good approximation it is $\Omega_{cyc,g} = 2 + (2^{2n_g-1} - 2)/n_g$.

The fact that (by construction) all of the components j in any particular group g have the same value of $\mu_j^0 = \mu_g^0$ allows the equilibrium condition and the conservation equations to be rewritten in terms of $\phi_g$, the cumulative volume fraction of all polymer components in group g:

$$\left(\frac{\phi_g}{n_g M_g + m_g M_g}\right) = \Omega_g \left(\frac{\phi_A}{M_A}\right)^{n_g} \left(\frac{\phi_B}{M_B}\right)^{m_g} \exp(\Gamma_g) \quad (15)$$

$$\phi_{Atotal} = \sum_g n_g M_A \Omega_g \left(\frac{\phi_A}{M_A}\right)^{n_g} \left(\frac{\phi_B}{M_B}\right)^{m_g} \exp(\Gamma_g) \quad (16)$$

$$\phi_{Btotal} = \sum_g m_g M_B \Omega_g \left(\frac{\phi_A}{M_A}\right)^{n_g} \left(\frac{\phi_B}{M_B}\right)^{m_g} \exp(\Gamma_g)$$

The standard chemical potentials $\mu_g^0$ include the appropriate multiples of the standard chemical potentials of the A----A and B----B building blocks and the appropriate multiple of the association energy $\varepsilon kT$. For a cyclic group, there is an additional term due to the entropy cost of ring closure, $\Delta S_{loop} = -k \ln G_{cyc}$, where $G_{cyc}$ is the probability density (treated in Example 47 below) for closure of a group g ring:

$$\mu_g^0 = \begin{cases} n_g \mu_A^0 + m_g \mu_B^0 - \varepsilon kT(n_g + m_g) - kT \ln G_{cyc,g} & \text{if cyclic} \\ n_g \mu_A^0 + m_g \mu_B^0 - \varepsilon kT(n_g + m_g - 1) & \text{if linear,} \end{cases} \quad (17)$$

so that $\Gamma_g$ in the equilibrium and conservation relationships (Equations 15 and 16) is:

$$\Gamma_g = \begin{cases} \varepsilon(n_g + m_i) + (n_i + m_i - 1)\ln(c - 1) + \ln G_{cyc,g} & \text{if cyclic} \\ \varepsilon(n_g + m_g - 1) + (n_g + m_g - 1)\ln(c - 1) & \text{if linear.} \end{cases} \quad (18)$$

Example 47: Entropic Cost of Loop Closure

The entropic cost of loop closure is determined by calculating the probability of loop closure, as follows: For Gaussian linear chains of N Kuhn monomers of length b, the probability density function for the end-to-end vector r is [15]:

$$G_{Gaussian}(r, N) = \left(\frac{3}{2\pi Nb^2}\right)^{\frac{3}{2}} \exp\left\{-\frac{3r^2}{2Nb^2}\right\}. \quad (19)$$

The argument within the exponential $-3r^2/(2Nb^2) \cong 0$ for $\|r\| \ll \langle r^2 \rangle^{1/2}$, so the probability that the chain ends he within a small distance x of each other, where $x/b \sim O(1)$, is:

$$G_{cyc,Gaussian} = \left(\frac{3}{2\pi Nb^2}\right)^{\frac{3}{2}} \int_0^{2\pi} d\phi \int_0^{\pi} d\theta \sin\theta \int_0^{x/b} dr \cdot r^2 \exp(0) = \quad (20)$$

$$4\pi \left(\frac{3}{2\pi Nb^2}\right)^{\frac{3}{2}} \int_0^{x/b} dr \cdot r^2 \exp(0) = \left(\frac{6}{\pi N^3}\right)^{\frac{1}{2}} \left(\frac{x}{b}\right)^3.$$

For real chains, excluded volume interactions of the monomers at chain ends reduce the probability density function G(r,N) by the factor $$\frac{G_{real}(r, N)}{G_{Gaussian}(r, N)} \sim \left(\frac{\|r\|}{\sqrt{\langle r^2 \rangle}}\right)^{\gamma} \text{ for } \frac{\|r\|}{\sqrt{\langle r^2 \rangle}} \ll 1 \quad (21)$$

where the exponent $\gamma \cong 0.28$ [15], so that the probability of cyclization becomes $$G_{cyc,real} \approx 4\pi \left(\frac{3}{2\pi NB^2}\right)^{\frac{3}{2}} \left(\frac{1}{bN^{\nu}}\right)^{\gamma} \int_0^{x/b} dr \cdot r^{2+g} (\exp(0) \sim N)^{-3/2 - \gamma\nu} \quad (22)$$

where the fractal exponent v is 0.588 in good solvent. The loop closure probability thus scales as $N^{-3/2}$ for Gaussian chains and $N^{-1.66}$ or swollen chains. The entropic cost of loop closure is simply $\Delta S_{loop} = -k \ln G_{cyc}$.

In dilute or semi-dilute solutions, all chain segments smaller than the thermal blob $g_T \approx b^6/V^2$ (where v is the excluded volume parameter) have Gaussian statistics because excluded volume interactions are weaker than the thermal energy. At the concentrations of interest, the total polymer volume fraction $\phi = \Sigma_j \phi j$ is low enough to ignore polymer-polymer overlap, so the following expression is appropriate for the entropic cost of loop closure $\Delta S_{loop} = -k \ln G_{cyc}$ for any cyclic aggregate j:

$$G_{cyc,j} \approx \left(\frac{6}{\pi g_T^3}\right)^{\frac{1}{2}} \left(\frac{x}{b}\right)^3 \left(\frac{M_j}{g_T}\right)^{-1.66}. \quad (23)$$

That is, all chain segments larger than gr are fully swollen.

Example 48: Number of Ways to Form Loops

Figure 54:
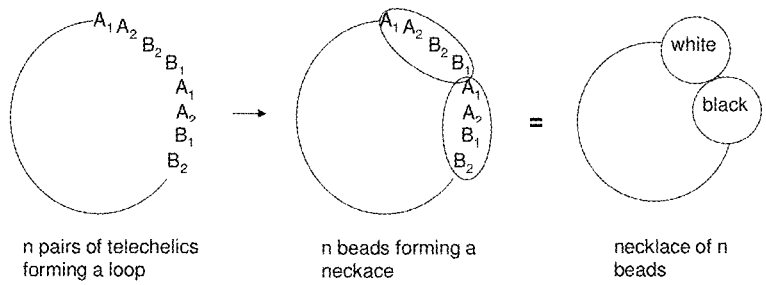
FIG. 54 shows mapping of polymer loops into necklaces of 4 colors. The 4 colors correspond to: A1A2B1B2, A1A2B2B1, A2A1B1B2, A2A1B2B1.

To determine the number of different loops that can be formed by linking n A----A and n B----B telechelic chains end-to-end via association of A and B end-groups (FIG. 53 left), telechelics are started to be treated with distinguishable ends (i.e., n $A_1$----$A_2$ molecules that are indistinguishable from each other, and likewise n $B_1$----$B_2$ molecules). This way of treatment maps onto the combinatorial problem of counting necklaces formed using beads of different colors, in which two necklaces are considered equivalent if one can be rotated to give the other. By viewing each supramolecular loop in terms of adjacent pairs of telechelics (with one $A_1$----$A_2$ and one $B_1$----$B_2$ molecule per pair), they correspond to necklaces made up of n "beads" of 4 "colors" (FIG. 54). For example, A1A2B1B2=black, A1A2B2B1=white, A2A1B1B2=blue, and A2A1B2B1=green can be chosen. The formula for the number of different necklaces is [58]:

$$m(n) = \frac{1}{n} \sum_{d|n} [\varphi(d) \cdot 4^{n/d}] \quad (24)$$

where the sum is over all numbers d that divide n, and $\varphi(d)$ is the Euler phi function.

Figure 55:
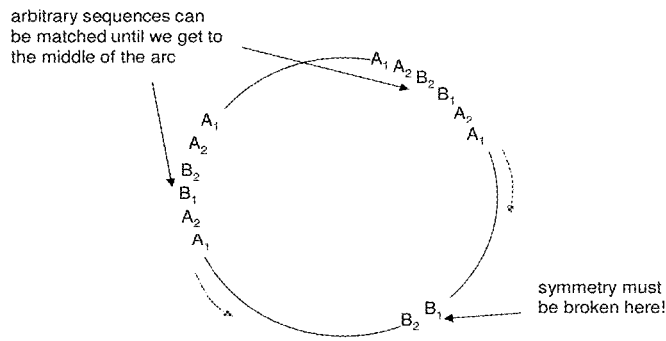
FIG. 55 shows that it is not possible to create a loop that "reads" the same clockwise and counterclockwise, so every loop maps into exactly two distinct necklaces. (Color assignments are given in FIG. 54).
Figure 55:
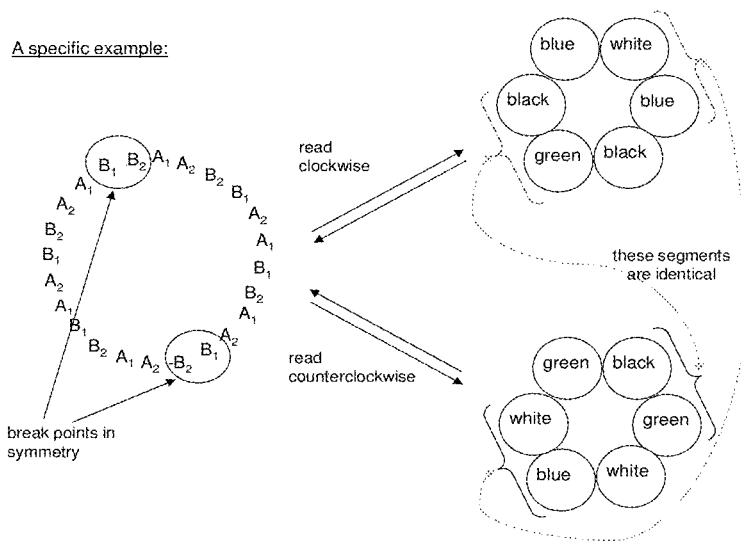

In reality, the above formula overcounts the number of ways to form supramolecular loops by a factor of 2. The number of distinct cyclic supramolecules s(n) in the set obtained from n A₁----A₂ and n B₁----B₂ telechelic chains, {loops$_n$}, can be seen to be half the number of distinct necklaces of n beads of four colors {necklaces$_n$} because any supramolecular loop "reads" as a distinct necklace clockwise vs. counter-clockwise (FIG. 55). While each necklace in {necklaces$_n$} uniquely maps onto a supramolecular loop in {loops$_n$}, every loop in {loops$_n$} maps back to two different necklaces, which belong to {necklaces$_n$}. The elements of {necklaces$_n$}, can be arranged pairwise, revealing that there are twice as many elements in {necklaces$_n$} as in {loops$_n$}. Therefore, the number of distinct supramolecular loops s(n) is:

$$s(n) = \frac{1}{2n}\sum_{d|n}[\varphi(d) \cdot 4^{n/d}] \quad (25)$$

Figure 56:
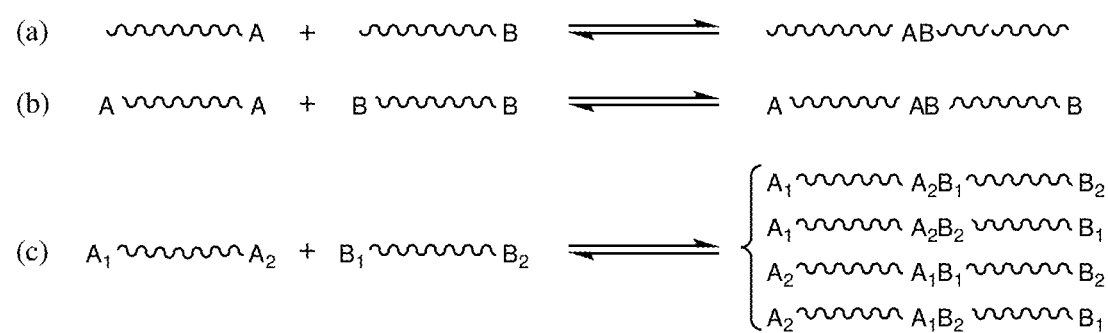
FIG. 56, Panels A-C show contact probabilities and equilibria

To see that the result obtained by treating the end groups as distinguishable gives the correct result for the actual case in which A-ends are indistinguishable and likewise for B-ends, the reversible association reactions are considered in FIG. 56. The reverse reaction rates are all identical. However, the forward reaction for case a (monotelechelic chains) is clearly one-fourth that of case b (telechelics with indistinguishable end-groups). In case c, there are four identical intramolecular scission reactions that give the starting products, so the forward reaction in case c can be 4-fold faster than that of the forward reaction in case a. Thus, the difference in the number of ways to form dimers ($\Omega_c$=4 compared to $\Omega_a$=1) can be used to evaluate the increased contact probability of the end-groups to form the product. If the end-groups A, A₁, and A₂ have precisely the same reactivity, and likewise the end-groups B, B₁, and B₂, there cannot be any difference in the equilibrium partitioning of the molecules in cases b and c. This argument is generalized to conclude that the solution to the equilibrium problem presented in FIG. 52, where end-groups are indistinguishable, is the solution which is developed for telechelics A₁----A₂ and B₁----B₂, where end-groups are distinguishable. A less careful modeling of the association of telechelic polymers A----A and B----B might miscalculate the cumulative equilibrium volume fraction of polymer aggregates that fall within any group g by omitting the factor $\Omega_g$ in Equation 15.

Example 49: Computation of Volume Fraction at Equilibrium

The following procedure was used to calculate the volume fraction of all polymer components (i.e., single-chain starting materials and aggregates of all sizes) at equilibrium, for polymer solutions of A₁----A₂ and B₁----B₂ telechelics of specified molecular weights at specified initial concentrations $\phi_{Atotal}$ and $\phi_{Btotal}$, (polymer components were grouped as shown in FIG. 53).

First, a number of groups T$_{groups}$ is chosen to include in the analysis (even though there is an infinite number of possible polymer components, it is expected that above a certain size, polymer aggregates will have negligible equilibrium volume fraction and can therefore be ignored).

Calculate $n_g$, $m_g$, $M_g$, $\Omega_g$, $\Omega_{cyc,g}$ (if appropriate), and $\Gamma_g$ for polymer group g, for g=1 . . . T$_{groups}$.

Solve the conservation equations, Equations 16, for ($\phi_A$, $\phi_B$).

Calculate $\phi_g$ for g=1 . . . T$_{groups}$ using Equation 15.

Repeat with a new value of T$_{groups}$ twice that of the previous one until changes in the calculated values of $\phi_g$ from one value of T$_{groups}$ to the next are negligible.

Example 50: Selection of End-Groups

Figure 47A:
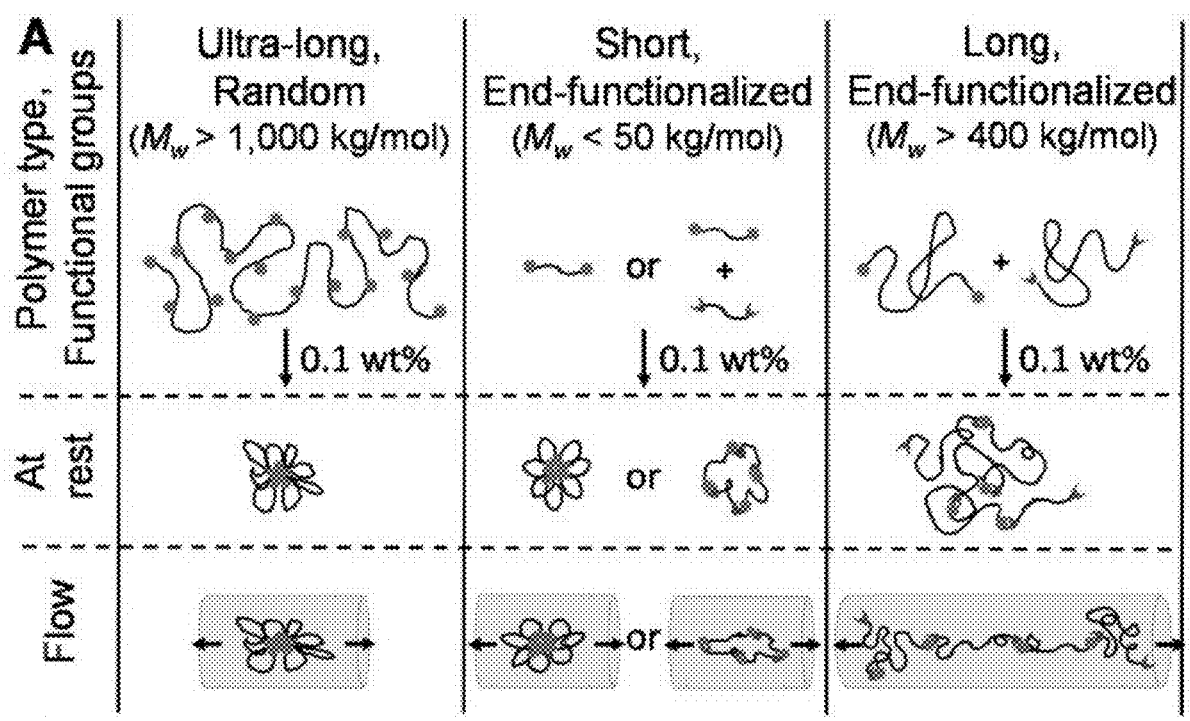
FIGS. 47A-47C show FIG. 47A assembly of long telechelic polymers (LTPs) into mega-supramolecules (right; linear and cyclic (not shown)) compared to that of randomly functionalized associative polymers (left) and prior end-associative telechelics (middle) in terms of degree of polymerization (DP) and conformations at rest and in elongational flow.
Figure 47B:
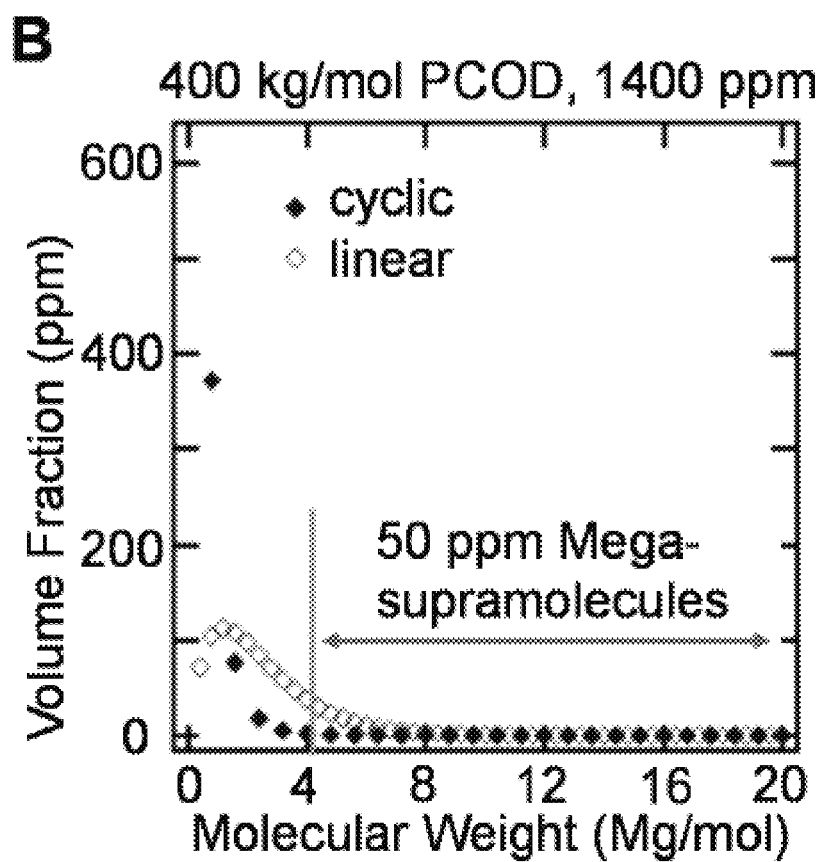
Figure 47C:
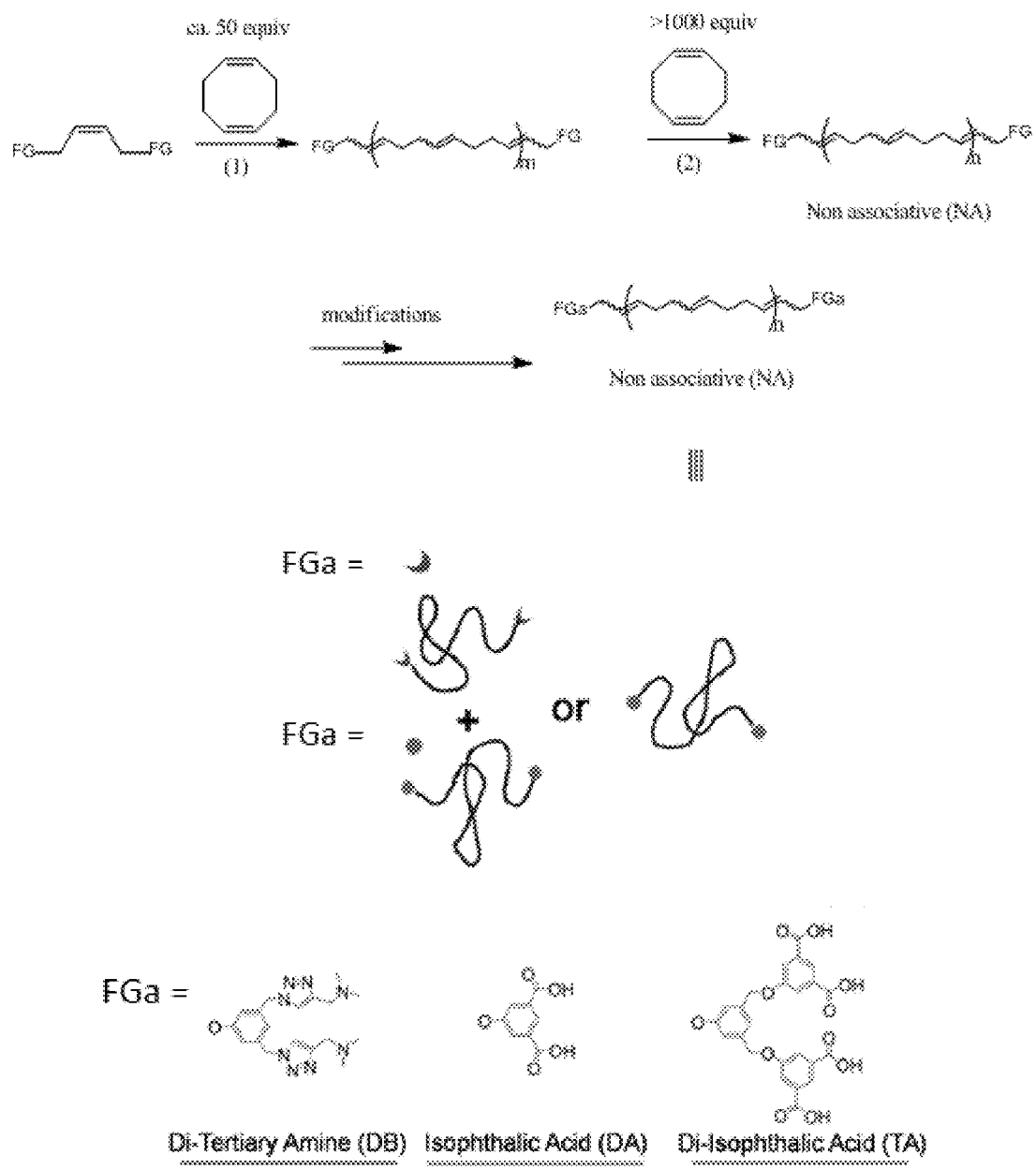
Figure 57:
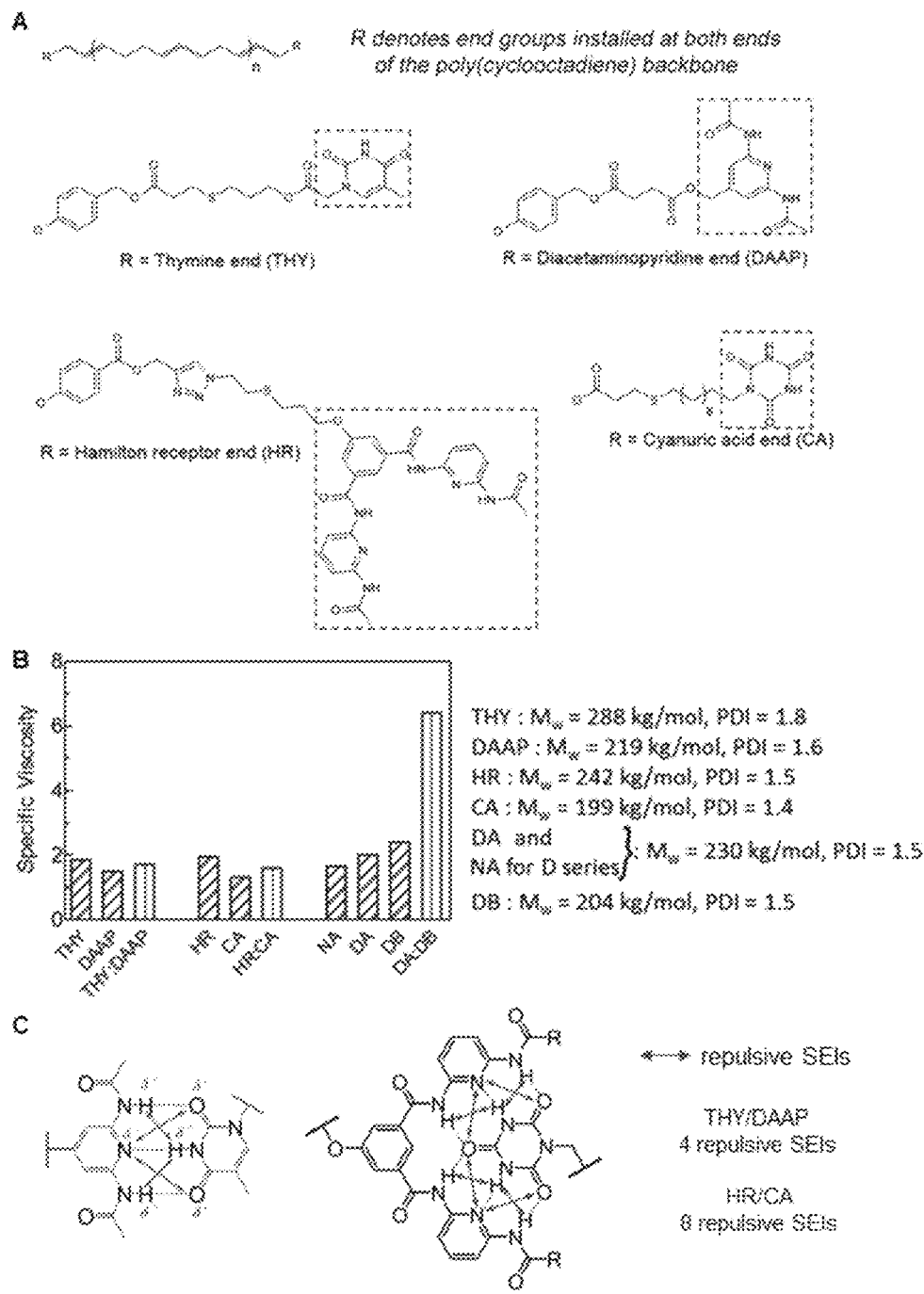
FIG. 57 shows selection of the end-groups.

FIG. 57, Panel A shows the chemical structures and molar masses of the end-associative polymers (excepting isophthalic acid/tertiary amine functionalized ones that are shown in FIG. 47C). FIG. 57, Panel B shows the specific viscosities of telechelic polymers at 8.7 mg/ml total polymer in 1-chlorododecane. Based on the literature on complementary polyvalent hydrogen-bonding pairs, it is shown that a 1:1 THY/DAAP solution had a viscosity equal to the average of the viscosities of the individual components' solutions. It is also shown that when the 1:1 HR/CA showed a viscosity equal to the average of the individual components. Only the DA/DB pair shows enhancement in viscosity relative to the individual telechelic polymers. FIG. 57, Panel C illustrates the secondary electrostatic interactions (SEIs) in THY/DAAP and HR/CA pair.

The data suggest that, despite the simplicity of carboxylic acid and tertiary amine structures, the DA/DB pair provides stronger end-association than the hexadentate HR/CA pair. This difference is primarily attributed to the 3- to 4-fold greater strength of charge-assisted hydrogen bonds (as is the case of DA/DB) relative to ordinary hydrogen bonds (in both THY/DAAP and HR/CA). Therefore, in non-polar solvent the sum of the two charge-assisted hydrogen-bonds in a DA/DB pair is likely stronger than the sum of the six ordinary hydrogen bonds in the HR/CA pair. In addition, the DA/DB pair does not suffer from the adverse effect of repulsive secondary electrostatic interactions (SEIs) that occur when the both partners have H-bond donors and H-bond acceptors: in the HR/CA pair, the polarities of the six hydrogen-bonds alternate in direction, thus decreasing the overall strength of HR/CA association. It is estimated that for THY/DAAP (association constant in deuterated chloroform at 25° C.=10³ M⁻¹) [28], three primary hydrogen bonds contribute −24 kJ/mol and four repulsive SEIs contribute +12 kJ/mol (net ca. 5 kT); and for HR/CA, six hydrogen bonds contribute −47 kJ/mol and eight repulsive SEIs contribute +23 kJ/mol (net ca. 10 kT, FIG. 57, Panel C). The literature value of the association constant for a polymer-bound HR/CA pair in deuterated chloroform at 25° C. is 1.5×10⁴ M⁻¹(7), corresponding to an end-association strength of 9.6 kT, in good agreement with the value of 10 kT estimated from SEI analysis. As described herein, the strength of the DA/DB pair is estimated to be 16-18 kT. The difference in estimated strength between DA/DB and HR/CA is consistent with the disclosed experimental results in FIG. 57, Panel B. Together, SEI analysis and shear viscometry reveal that HR/CA does not, in fact, have an association constant in non-polar solvents that is high enough to drive long telechelic polymers to form mega-supramolecules at concentrations of interest in the scope of the present work.

Example 51: ¹H NMR Study of Incorporation of Chain Transfer Agent (CTA) into Polymer To install functional groups at both chain ends with high fidelity (>95%, FIGS. 58-59), a two-step ring-opening metathesis polymerization (ROMP) protocol (FIG. 47C) ([59], [60]) in the presence of a chain transfer agent (CTA) is used. Polymers conforming to the theory are synthesized using carefully purified cis,cis-1,5-cyclooctadiene (COD, FIG. 60 ([60], [61])) and CTAs bearing functional end groups (ratio of COD:CTA>3,000:1, adjusted to give the desired molecular weight). End groups with discrete numbers of hydrogen bonds (di-functional ends, denoted DA/DB and tetra-functional ends, denoted TA) (FIG. 47C) can be installed after polymerization by conversion of ester- or chloride-ended polymers (which serve as non-associative controls, NA), with degrees of conversion>95% (FIGS. 61A-62C). To test predicted effects of backbone length, corresponding telechelics with shorter backbones (e.g., FIG. 48A, $M_w$~45, 140, 300 kg/mol, see Table 13) were prepared.

Figure 58:
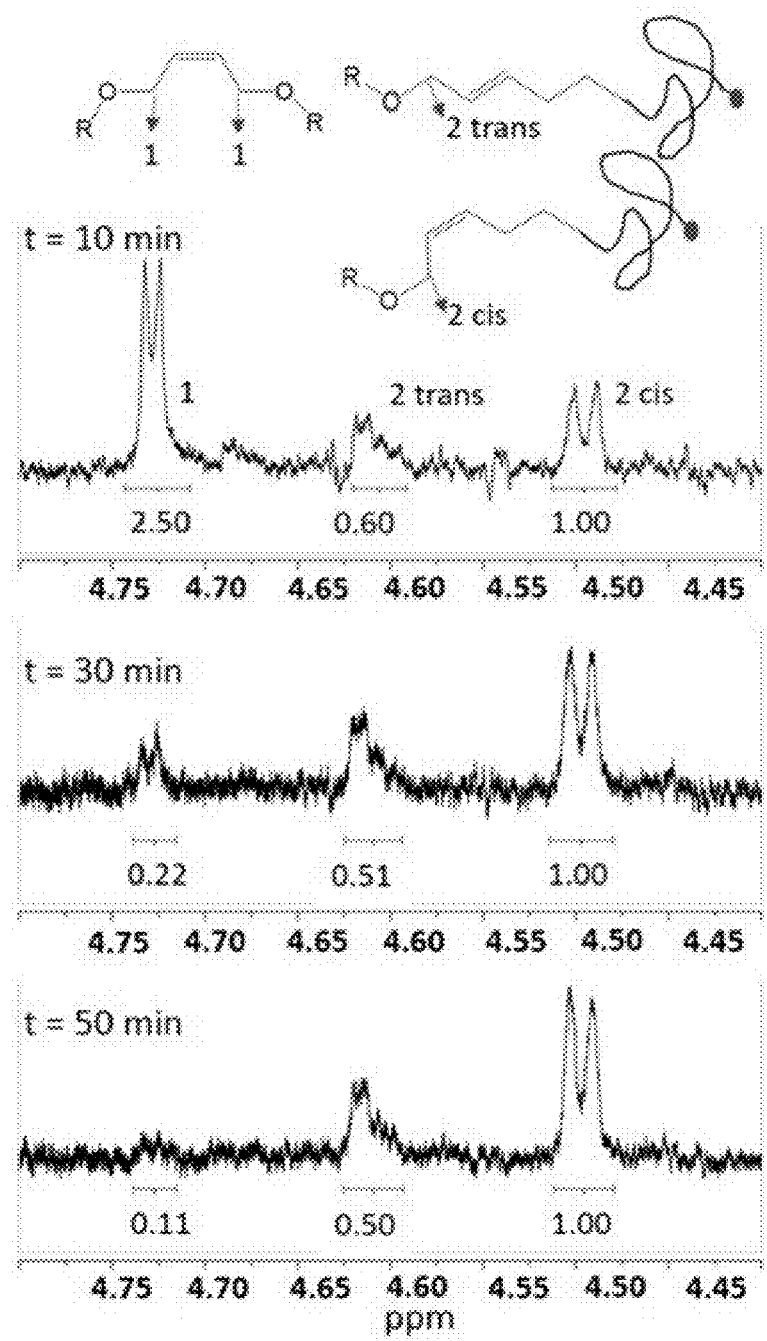
FIGS. 58 and 59 show incorporation of CTA into polymer during the first stage of two-stage ROMP of COD, and chain extension to long telechelics in the second stage.

FIGS. 58 and 59 show incorporation of CTA into polymer during the first stage of two-stage ROMP of COD, and chain extension to long telechelics in the second stage. FIG. 58 $^1$H NMR of characteristic peaks for di(di-tert-butyl-isophthalate) CTA (structure of end-group shown in FIGS. 61A and 61B), unreacted CTA (proton 1) and CTA incorporated into macromer (proton 2), at three time points; the integrations of the peaks were used to calculate the percentage of unreacted CTA, shown in FIG. 59A. FIG. 59A, Kinetic curves show that the peaks characteristic of the unincorporated CTA are already difficult to quantify in the sample taken after 40 min, and it is not evident for the sample taken at 1 hour (given the magnitude of the noise in the spectra, the amount of unincorporated CTA is less than 3%). Dashed curve is calculated based the data point at 10 min assuming exponential decay of unreacted CTA. FIG. 59B, In an example with di-chloro PCOD, the $M_n$ calculated by NMR is in good agreement with that measured by GPC, considering the inherent uncertainty in NMR integration and the inherent uncertainty in GPC measurement (5-10%). FIG. 59C, GPC traces show no indication of macro CTA (42 kg/mol) in the chain-extended telechelics (structure shown in FIG. 59C, 497 kg/mol) produced in the second step.

Example 52: Conversion of Non-Associative (NA) End-Groups to Associative End-Groups While theoretical predictions identify a class of polymers promising as mist-control additives for kerosene, telechelics of the length required ($M_w$>400 kg/mol, $M_w/M_n$ ca. 1.5), in reality, are unprecedented. In order to test the predictions regarding such telechelic polymers, a two-step ring-opening metathesis polymerization (ROMP) protocol in the presence of a chain transfer agent (CTA) is adopted, as reports indicate it could produce relatively long telechelics with $M_w$ up to ca. 260 kg/mol (FIG. 45, Panels A-B and FIG. 47C).[59, 62] Cyclooctadiene (COD) is selected as the monomer because it has an adequate ring strain to drive ROMP and provides a backbone that has both strength and solubility in hydrocarbons.[8, 63] Once carefully purified COD is used, telechelics of the required length ($M_w$>400 kg/mol, up to 1,000 kg/mol if desired) and end functionality (>95%) are accessible.

Figure 45:
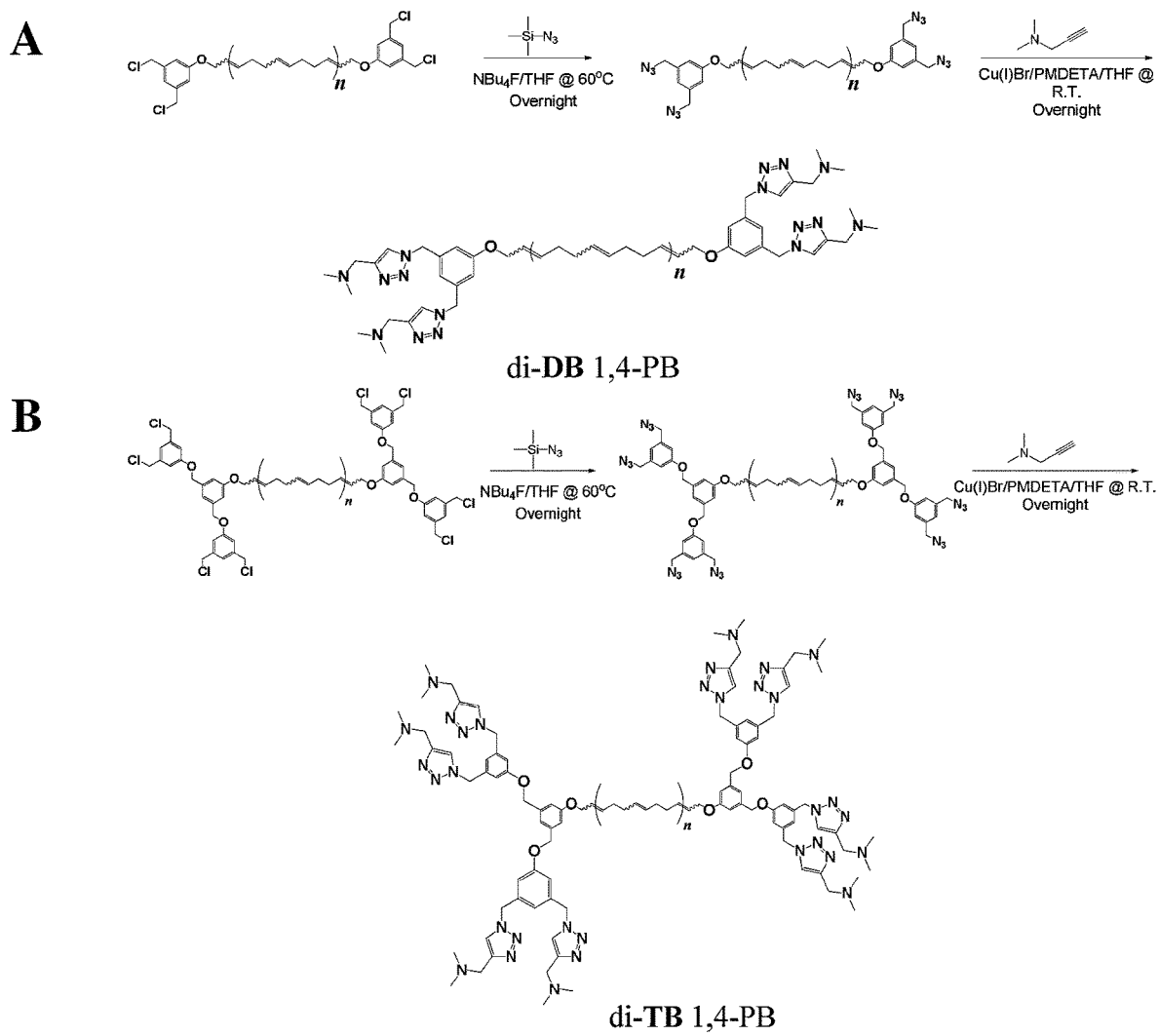
FIG. 45, Panels A-B show a schematic illustration of a synthesis of di-DB and di-TB 1,4-PBs via two-stage, post-polymerization end-functionalization reaction.

Associative groups of interest can be installed at both ends of each polymer with high fidelity using custom CTAs, a built-in benefit of the ROMP chemistry. In hydrocarbons, end-group association by charge-assisted hydrogen bonding (such as carboxylic acid/tertiary amine interaction) is particularly effective for building supramolecules.[64] Hence, in this study well-defined end-groups with discrete numbers of hydrogen bonds are synthesized: isophthalic acid and di(tertiary amine) (denoted DA/DB for diacid/dibase), and di(isophthalic acid) and tetra(tertiary amine) (TA/TB) (FIG. 45, Panels A-B and FIG. 47C). Acid and amine end-groups are installed after polymerization by conversion of ester- or chloride-ended polymers (which serve as matched non-associative negative controls, NA).

FIGS. 61A-61B show FIG. 61A, Structures of non-associative (NA) end-groups and the conversion from NA to associative end-groups: FIG. 61B, isophthalic acid. FIG. 45, Panel A shows tertiary amine (products shown in FIG. 47). Isophthalic acid end groups are obtained by deprotection of the tBu groups in the tBu-ester-ended non-associative precursor. Tertiary amine end-groups are obtained via conversion of chloride end-groups to azide end-groups, followed by an alkyne/azide cycloaddition.

Example 53: $^1$H NMR Study of Degree of Conversion of the End-Groups

Conversion of tBu-ester to carboxylic acid as end-groups on polycyclooctadiene is monitored by the peak for tBu group in the $^1$H NMR spectra. FIGS. 62A and 62B show $^1$H NMR spectra of tBu-ester ended (DE) and isophthalic acid ended (DA) polycyclooctadiene ($M_w$=630 kg/mol) to show high degree of conversion of the end-groups. FIG. 62A the peaks for protons on the phenyl ring (protons 1 and 2) shift due to the removal of tBu. Comparing the integration of peak for proton 2 (~7.82 ppm) with that of the baseline at ~7.7 ppm (where the peak for proton 2 in DE is, see FIG. 62A top) in the spectrum of DA (FIG. 62A bottom) shows a <5% (1 comparing to 0.04) potential unconverted end-groups due to baseline noise. FIG. 62B the peak for tBu group disappears in the spectrum for DA, indicating removal of the tBu group.

Example 54: $^1$H NMR Study of Azide Conversion to Tertiary Amine

Similarly, conversion of azide (obtained via conversion of chloride end groups) to tertiary amine (obtained via an alkyne/azide cycloaddition, see FIG. 45, Panel B) as end-groups on polycyclooctadiene is monitored by the proton peaks for triazole and phenyl rings in the $^1$H NMR spectra. FIG. 62C $^1$H NMR spectra of azide ended ($DN_3$) and tertiary amine ended (DB) polycyclooctadiene ($M_w$=540 kg/mol) to show high degree of conversion of the end-groups. In the spectrum for DB (bottom), the presence of a peak at 7.4 ppm indicates the formation of triazole rings (proton 5), absent in $DN_3$'s spectrum (top). The peak for protons on the phenyl ring (at positions 1 and 2) shifts from 6.85 ppm before (top) to 6.75 ppm after the cycloaddition reaction (bottom): integration of the peak for protons at 1 and 2 (~6.75 ppm, relative integral integral=3) in the spectrum of DB (bottom) and of the baseline at ~6.85 ppm (no detectable 1,2 of $DN_3$, relative integral=0.09) places an upper bound of <5% unconverted end-groups.

Example 55: Formation of Supramolecules and Effect of Excess Tertiary Amine

FIG. 63 shows formation of supramolecules in equimolar solutions of α,ω-di(isophthalic acid) polycyclooctadiene, α,ω-di(di(tertiary amine)) polycyclooctadiene (DA/DB), with non-associated controls (NA, see FIG. 61A top; and solutions treated with an excess of a small-molecule tertiary amine, triethylamine, TEA at 10 µl/ml). FIG. 63, Panel A, Effect of chain length (k refers to kg/mol) on specific viscosity of telechelics in tetralin and Jet-A (2 mg/ml) at 25°

C. FIG. 63, Panel B, Effect of TEA (2.5 l/ml) on the viscosities of associative telechelic polymers DA/DB. FIG. 63, Panel C, Left: Static light scattering shows that association between DA and DB chains (circle: 670 k series; triangle: 300 k series) in cyclohexane (CH) at 0.22 mg/ml (0.028%) produces supramolecules (filled), which separate into individual building blocks (x) when an excess of a small-molecule tertiary amine is added (open symbols, 10 µl/ml of triethylamine, TEA). Curves show predictions of the model (see Examples 37-49)). Right: Zimm plot of the same static light scattering data shown in Left part. Lines indicate the fitting to the Zimm equation and dashed lines indicate the extrapolation that was used to evaluate the intercept at zero concentration, zero angle; the slope of the line and the value of the intercept are used to evaluate the apparent $M_w$ and apparent $R_g$, details below. FIG. 63, Panel D, Resulting values of apparent $M_w$ and $R_g$ for the five polymer solutions in FIG. 63, Panel C.

Figure 48A:
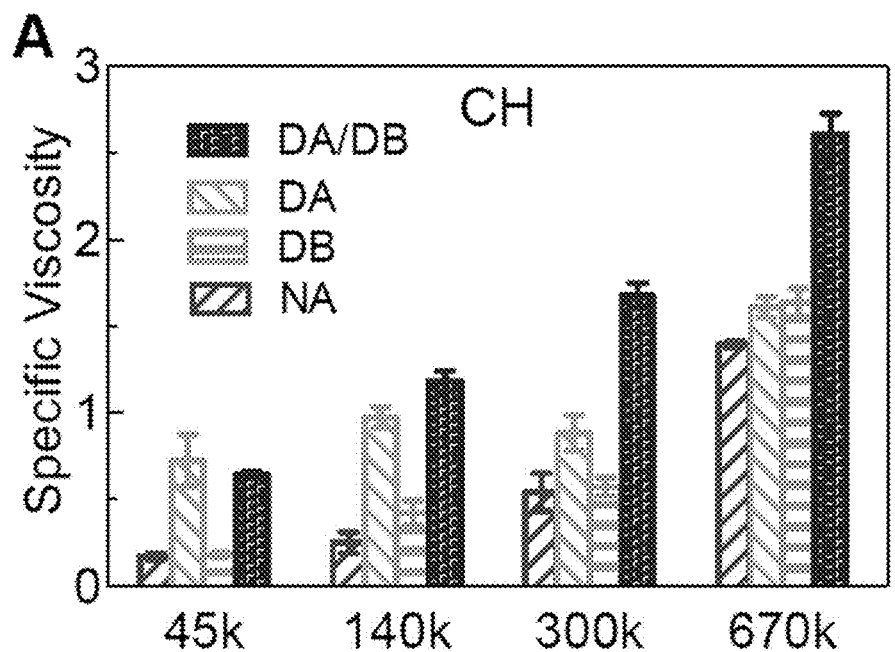
FIGS. 48A-48D show evidence of supramolecules in solutions of equimolar mixture of α,ω-di(isophthalic acid) and α,ω-di(di(tertiary amine)) polycyclooctadienes (DA/DB)
Figure 48B:
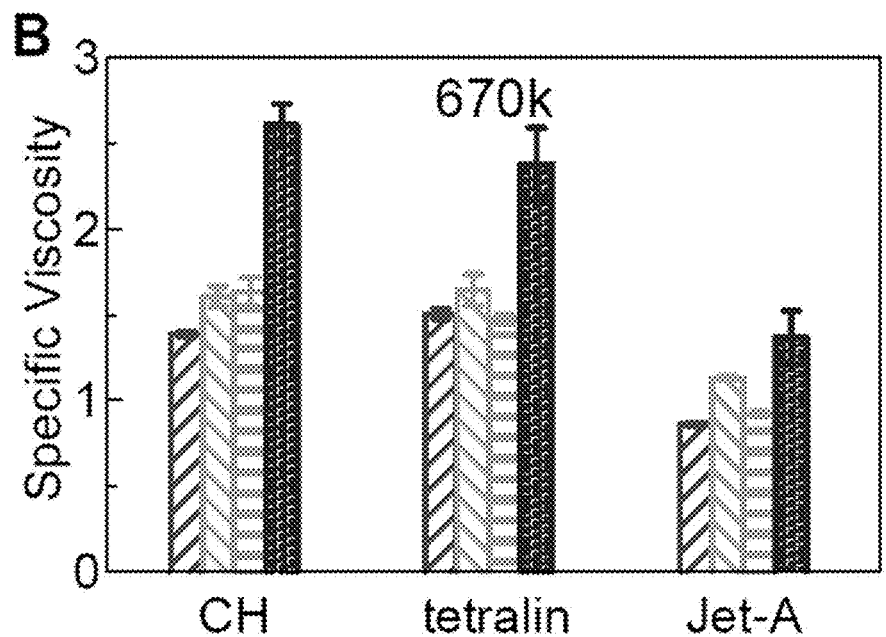

The effect of chain length on specific viscosity of telechelics in tetralin and Jet-A (FIG. 63, Panel A) is similar to that in cyclohexane (FIG. 48A). The specific viscosity of telechelics in Jet-A is generally lower than that in tetralin or cyclohexane. This effect is observed even for the non-associative polymers (NA), indicating that the backbone adopts a more compact conformation in Jet-A. This effect is related to the composition of Jet-A as a mixture of many hydrocarbons with number of carbon atoms between 6 and 16, including some components that are good solvents for PCOD and some that are theta solvents for PCOD.

The model calculations FIG. 63, Panel C show the effect of doubling the backbone length for complementary telechelics with association energy 16 kT, backbone lengths corresponding to a PCOD of 1,000 kg/mol (x) or 500 kg/mol (+) at 1,400 ppm concentration in a good solvent on the scattering pattern computed from the distribution of supramolecules (solid, supramolecules up to 9 telechelics; dashed, corresponding perfectly monodisperse non-associative telechelics). To compare with the experimental data, a single vertical shift was allowed to be applied to all four curves and a single horizontal shift. The distributions of supramolecules are shown in FIG. 64.

The Zimm fitting was performed using Wyatt Astra Software (version 5.3.4): illustrations for the 300 k DA/DB and 300 k DB are shown, with the linear regression through the data (black solid line) extrapolated to zero-concentration (horizontal light gray dashed line) and to zero angle (oblique gray dashed line). The y-intercept of the zero-angle zero-concentration extrapolation gives the apparent $M_w$, while its slope is used to compute the apparent $R_g$.

Example 56: Interplay of Telechelic Length and Concentration

Mega-supramolecules are formed at low concentration that behave like ultra-long polymers, exhibiting expanded ("self-avoiding") conformation at rest and capable of high elongation under flow (FIG. 47A, right). This is in contrast to the collapsed, inextensible supramolecules formed by long chains with associative groups distributed along their backbone (FIG. 47A, left) ([65], [66]). To mimic ultra-long polymers, association can occur at chain ends and be predominantly pairwise. In contrast to multimeric association ([53], [55]) that leads to flower-like micelles at low concentration (FIG. 47A, middle), recent studies have shown that pairwise association is readily achieved for short chains with $M_w$≤50 kg/mol using hydrogen bonding ([54], [67], [68], [69], [70], [71], [72], [73]). At low concentration, these have no significant rheological effects, consistent with the theory of ring-chain equilibrium ([74], [75], [76], [77], [78]): small rings are the predominant species at low concentration (FIG. 47A, middle). It was realized that using very long chains as the building blocks would disfavor rings, because the entropy cost of closing a ring increases strongly with chain length.

FIG. 64 shows modeling of interplay of telechelic length and concentration in a stoichiometric mixture of complementary end-associative telechelics in the regime of long telechelics (corresponding to ≥0.5 Mg/mol for high-1,4-polyisoprene, high-1,4-polybutadiene or polycyclooctadiene) and low concentration (≤0.14% wt/wt), facilitating comparison among the three different cases (FIG. 51, center column), in terms of both the number of telechelics in each supramolecular species and the molecular weight of each supramolecular species. Symmetric cases are considered (donor and acceptor telechelics have the same length). End association energy between donor and acceptor end-groups is 16 kT. The concentration of each distinct species is shown for supramolecules composed of up to 12 telechelics; the symbol in a square outline represents the sum of all supramolecules containing 13 or more telechelics (square around x is for the case 1.0 Mg/mol chains at 1,400 ppm concentration; the square around + is for the other case in each graph). FIG. 64, Panel A, Effect of telechelic length on the distribution of the number of telechelics in a supramolecule, given as the concentration in ppm wt/wt of each species, cyclic (circles) or linear (x or +), at a fixed total concentration of 1400 ppm. FIG. 64, Panel B, The same distributions as in A, presented in terms of the molar mass of the supramolecules; the weight-average molar mass of the supramolecules is given to the left of the legend. FIG. 64, Panel C, Effect of concentration on the distribution of supramolecules for telechelics of 1M g/mol (hence, the number of telechelics in a given supramolecule is also its molar mass in Mg/mol) Note the results for the 1 Mg/mol telechelics at 0.14% concentration is given in all three graphs to facilitate comparisons (see Examples 37-49).

In the regime of long telecheclics at low concentration, the equilibrium distribution of rings is dominated by rings composed of 2 telechelics (one donor+one acceptor) or 4 telechelics (in a donor/acceptor system, rings can only close if the number of telechelics is even). The fraction of telechlics "lost" to these rings is cut in half by doubling the length of the telechelics from 0.5M to 1.0 Mg/mol, increasing the formation of linear supramolecules FIG. 64, Panel A. Increasing the length of the backbone also increases the size of the supramolecules at each number of telechelics per supramolecules (compare FIG. 64, Panel B to FIG. 64, Panel A); consequently, increasing the telechelic length strongly increases the population of "mega-supramolecules" (the sum of the concentrations of all species having molecular weight greater than 5 Mg/mol increases from 200 ppm for 0.5 Mg/mol telechelics to 400 ppm for 1.0 Mg/mol). Dilution, here from 1,400 ppm to 800 ppm wt/wt, favors the formation of "small" supramolecules composed of 4 or fewer telechelics at the expense of mega-supramolecules (here, the sum of all species>5 Mg/mol falls from 400 ppm to 230 ppm). Note that "small" species assembled from 3-4 telechelics were already the dominant ones at higher concentration, so dilution has relatively mild effects on the weight average molecular weight (numbers shown to the left of the legend in FIG. 64, Panel C). For further details on the model, please see modeling.

Example 57: Shear Viscometry Study of LTPs with Donor-Acceptor Type End-Groups Shear viscometry study of donor-acceptor type LTPs in kerosene fuel (Jet-A in this study) proves that the present design of associative end-groups based on charge-assisted hydrogen bonding (DA/DB and TA/TB in FIG. 22) is successful. FIG. 72, Panel A shows the results of 1 wt % Jet-A solutions of 430 kg/mol NA-, TA- and TB-PCODs, and the 1:1 (w/w) mixture of the 1 wt % solutions of TA- and TB-PCODs at 25° C. It can be seen that self-association of TA remains effective in Jet-A, but it is not as remarkable as TA/TB association, which gives an increase in specific viscosity by 270%. These results provide motivation to further study DA/DB end-association, which is comprised of only 2 charge-assisted hydrogen bonds (TA/TB has 4), as an attempt to approach the limit of the strength of carboxylic acid/tertiary amine association. Fixed at 1 wt % in Jet-A, the results of 200 kg/mol NA-, DA- and DB-PCODs, and the 1:1 (w/w) DA/DB mixture are shown in FIG. 72, Panel B. Comparing the result of the 1:1 DA/DB mixture to that of the control NA, it is found that complementary DA/DB association is also effective in Jet-A, and it leads to an increase in specific viscosity by 150%, which indicates the formation of supramolecules via DA/DB end-association. FIG. 72, Panel C shows that at an Mw of 600 kg/mol, DA/DB association still holds, leading to an even higher enhancement of specific viscosity (nearly 200%) relative to the control solution NA. These findings are contrary to what prior literature teaches us: end-association becomes difficult when telechelics have long backbones (>100 kg/mol).[54, 55] Taking advantage of the superior strength of charge-assisted hydrogen bonding (~4 times stronger than ordinary hydrogen bonding),[79] it is able to be realized simple but yet effective pairs of end-groups capable of driving unprecedentedly long chains to form mega-supramolecules in Jet-A.

Example 58: $^1$H NMR Study of Charge Assisted-Hydrogen Bonds

Therefore, charge-assisted hydrogen bonds (CAHB, [64]) that are typically 3 times stronger than ordinary hydrogen bonds (each CAHB provides ca. 8-9 kT binding energy) are turned to. Simply placing two tertiary amines at each end of the "di-base" chains (DB) and two carboxylic acids at each end of the "di-acid" chains (DA) (FIG. 47C) provides an association strength of 16-18 kT ([64]), as recommended by the theoretical results.

FIG. 65 shows $^1$H NMR spectra of isophthalic acid ended (DA) and di(tertiary amine) ended (DB) polycyclooctadienes ($M_w$=45 kg/mol) and 1:1 molar mixture of DA/DB in deuterated chloroform (CDCl$_3$) indicating that carboxylic acid-amine hydrogen bonds dominate over carboxylic acid-carboxylic acid hydrogen bonds. FIG. 65, Panel A, $^1$H NMR peaks due to hydrogens on carbons adjacent to nitrogens of tertiary amine groups of DB (methyl protons 2; methylene protons 1) shift downfield when they form charge-assisted hydrogen bonds with carboxylic acid groups of DA (cf. upper to lower spectra: 2 shifts from 2.27 to 2.68 ppm; and 1 shifts from 3.59 to 4.13 ppm). FIG. 65, Panel B, $^1$H NMR peaks due to hydrogens on the phenyl ring of DA shift upfield upon formation of charge-assisted hydrogen bonds between carboxylic acids and tertiary amines (cf. upper to lower spectra: 1 shifts from 7.96 to 7.84 ppm; and 2 shifts from 8.46 to 8.32 ppm). In the present case, the hydrogen of the carboxylic acid itself is not observable due to extreme broadening resulting from rapid exchange with trace H$_2$O in the solvent. The formation of acid-amine charge-assisted hydrogen bonds entirely consumes the available tertiary amine (FIG. 65, Panel A, lower spectrum, no detectable peak at 3.59 ppm indicates less than 3% of non-associated amine) and eliminates acid-acid hydrogen bonds (FIG. 65, Panel B, lower spectrum, no detectable peak at 8.46 ppm indicates less than 3% of acid-acid association). The absence of acid-acid pairing is consistent with literature values of the association constants for carboxylic acid self-association (400 M$^{-1}$) and for charge assisted-hydrogen bonds that form between tertiary amine and carboxylic acid in chloroform (5×10$^4$ M$^{-1}$, [80]).

Example 59: Characterization of Mega-Supramolecule

Figure 48C:
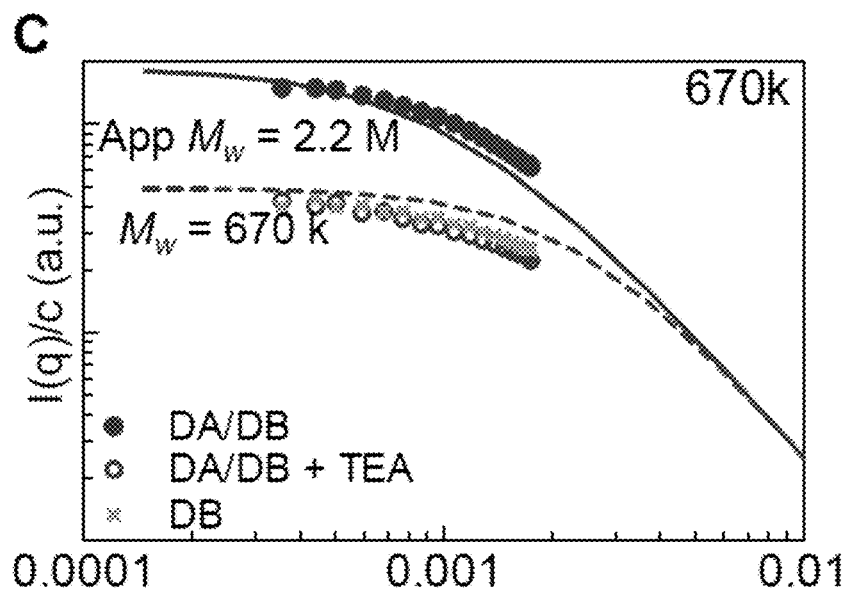
Figure 48D:
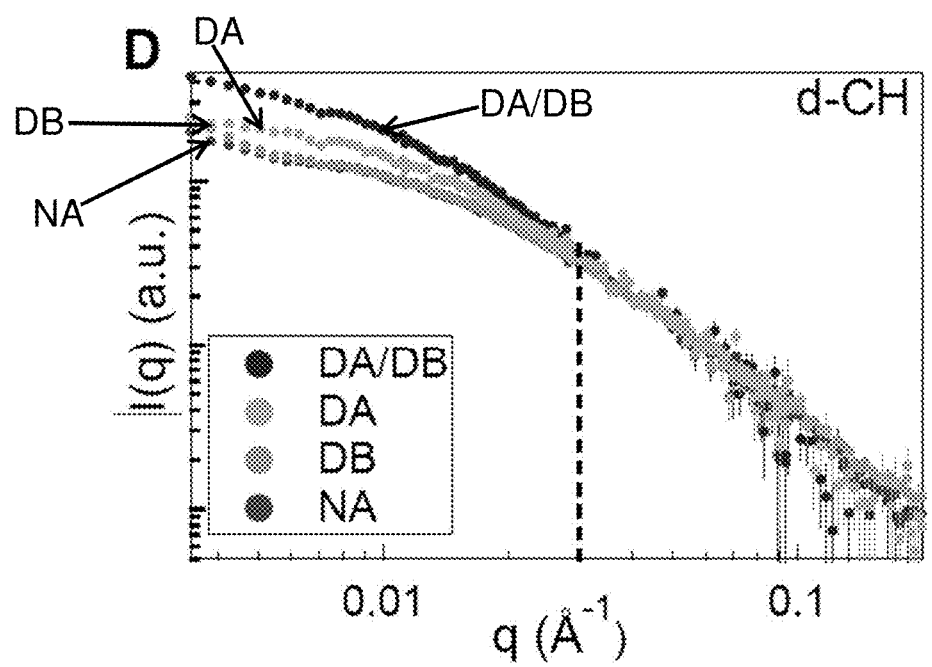

The formation of mega-supramolecules is evident from solution viscosity and multi-angle laser light scattering (MALLS) measurements. Shear viscosities show that the present longer telechelics do associate into supramolecules (e.g., at 2 mg/ml in cyclohexane, 300 k DA/DB gives a shear viscosity comparable to 670 k NA, FIG. 48A; this holds for tetralin and Jet-A, as well, FIG. 48B and FIG. 63, Panel A). Even for telechelics with $M_w$ of 670 kg/mol—for which the concentration of end groups is less than 10 M (one thousandth of previously studied concentrations)([54])—the ends manifestly associate: the viscosity of the 670 k DA/DB solution is twice that of the non-associative control (FIG. 48A) and multi-million molecular weight supramolecules are confirmed by MALLS (FIG. 48C and FIG. 63, Panels C-D). At concentrations as low as 0.22 mg/ml (0.028% wt), 670 kg/mol LTPs form supramolecules with an apparent $M_w$ of 2,200 kg/mol (FIG. 48C), in accord with the model prediction that $M_w$ corresponds to approximately a three-chain assembly for these conditions, because rings and chains from dimer to tetramer dominate (FIG. 64; and for 300 k DA/DB, FIG. 63, Panels C-D). Based on the present model, more than ⅓ of the telechelics are in species with molecular weight greater than the $M_w$ of the supramolecules. Due to the greater strength of CAHB, acid-base pairing dominates over acid-acid pairing (measured by $^1$H-NMR, FIG. 65). Small angle neutron scattering (SANS) confirms that complementary end-associative polymers avoid the problem of chain collapse. The conformation on length scales up to the radius of gyration ($R_g$) of the individual chains is just as open for end-associative chains as it is for the corresponding non-associative chains: at q>2π/R$_g$≈0.03 μl/Å their scattering patterns coincide (FIG. 48D). Together, MALLS, NMR and SANS reveal the molecular basis of the rheological behavior (FIG. 48A-B)-complementary end association into mega-supramolecules with expanded conformations.

Example 60: Phase Behavior of Associative LTPs in Jet-A

Solubility in kerosene over a wide range of operating temperature (−30 to +70° C.) is a key requirement for polymers as mist-control additives. One of the major issues with FM-9 polymer contributing to the termination of the AMK program is that it phase-separates from kerosene even at ambient temperature, making fuel handling difficult. To test if the selection of polymer backbone and end-group structures confers good low-temperature solubility in Jet-A, Jet-A solutions of associative LTPs are stored, which are homogeneous at room temperature, in a −30° C. freezer for prolonged periods of time. It is found that even after months of storage at −30° C., all solutions remain homogenous, and no cloudiness due to phase separation of polymer is observed in any sample. Two representative examples are shown in FIG. 15, Panel A and FIG. 73: 0.5 wt % Jet-A solution of 264 kg/mol TA-PCOD after storage at −30° C. for 18 months (FIG. 15, Panel A left) and 0.3 wt % Jet-A solution of 1:1(w/w) mixture of 430 kg/mol TA- and TB-PCODs (FIG. 73). Clearly the results suggest the present design of LTPs may overcome the barriers to adopting prior polymers for improving transportation safety and security.

The outstanding solubility of associative LTPs in Jet-A may result from two unique aspects of the molecular design: an unsaturated backbone (see FIG. 45, Panels A-B and FIG. 47C) and a very low content of polar groups. The multitude of carbon-carbon double bonds in the backbone provides the host Jet-A with a means to interact with the backbone, leading to the observed good low-temperature solubility without the need of any surfactant or stabilizer. As also shown in FIG. 45, Panels A-B and FIG. 47C, LTPs that show strong end-association in Jet-A have very little (≤4) polar groups on each chain end. Take 430 kg/mol TA-PCOD for example, it contains approximately one oxygen atom per 1,000 carbon atoms. As a result, the occurrence of end-association does not create polar domains that are large enough to cause phase separation. On the contrary, FM-9 polymer, which is the mist-control polymer that received the most intensive study to date and has a high content of carboxylic acid group (~5 mol %) randomly grafted along its backbone, demonstrates a strong tendency to phase separate during storage at ambient temperature. A package of "carrier fluid" comprised of polar compounds that are detrimental to engine operation, including water, glycerol, ethylene glycol, and formic or acetic acid, is needed to keep FM-9 barely soluble in Jet-A at ambient temperature.[7, 81] At sub-ambient temperatures, even the use of carrier fluid cannot prevent FM-9 from precipitating from Jet-A. In the context of solution behavior, the sharp contrast between solution associative LTPs and FM-9 emphasizes the value of the molecular design shown in FIG. 22 that is based on fundamental science.

Example 61: "Shear Degradation" Test and Home-Built Apparatus

Unfortunately, ultra-long backbones undergo chain scission during routine handling because hydrodynamic tension builds up along the backbone to a level that breaks covalent bonds; this "shear degradation" continues until the chains shorten to a point that their valuable effects are lost ($M_w$<1,000 kg/mol) ([51]). Assembly of end-associative polymers creates supramolecules that can potentially break and re-associate reversibly, but formation of such mega-supramolecules ($M_w$≥5,000 kg/mol) at low concentration has never been realized for two reasons: end-to-end association, at low concentration, predominantly leads to rings of a small number of chains ([74]) and the size of the building blocks is limited because end association is disfavored when they are longer than 100 kg/mol ([53]-[55]).

In the absence of theory, it was not known whether or not individual chains with lengths below the threshold for shear degradation (1,200 kg/mol for PCOD, FIG. 66) and end-association strengths much weaker than a covalent bond (150 kT) could form mega-supramolecules. Theory provide a rationale to test telechelics with the predicted end-association strength (16-18 kT) and chain lengths, which do form mega-supramolecules even at low concentration. They cohere well enough to confer benefits typically associated with ultra-long polymers—including mist control and drag reduction. These mega-supramolecules reversibly dissociate under flow conditions that would break covalent bonds, allowing the individual LTPs to survive pumping and filtering, and allowing treated fuel to burn cleanly and efficiently in unmodified diesel engines.

FIG. 66, Panel A shows Home-built apparatus for "shear degradation" test. Ultra-long covalent polymers undergo chain scission in intense flows, such as turbulent pipeline flow and, especially, passage through pumps. This phenomenon is called "shear degradation." To subject polymer solutions to conditions that approach the asymptotic limit of shear degradation (i.e., the backbone length is reduced to the point that further chain scission is very slow), a relatively small volume of sample (50 ml) is recirculated through a turbine fuel pump at room temperature for 60 s (approximately 60 passes through the pump using a flow rate of 3 L/min) using a Bosch 69100 In-line Electric Fuel Pump at 12 V. To prevent cross-contamination, the pump was rinsed 4 times with approximately 200 mL of hexanes, followed by drying under reduced pressure at 40° C. overnight. After recirculation, 'sheared' samples were collected in 100 mL glass jars and stored at −30° C. FIG. 66, Panel B, An initially 4,200 kg/mol PIB at a concentration of 0.35% in Jet-A shows the decrease in specific viscosity indicative of shear degradation with increasing number of passes through the pump. Notice that over 80% of the asymptotic degradation is induced by approximately 60 passes, leading to the selection of the conditions described above. FIG. 66, Panel C, GPC validation of "shear degradation" test using PIB and confirmation that associative polymers resist degradation. Polyisobutylene having an initial $M_w$=4,200 kg/mol (Before) is dissolved in Jet-A at a concentration of 0.35% wt and recirculated through the fuel pump as described in FIG. 66, Panel A for 60 s (approximately 50 passages through the pump) and the resulting solution analyzed by GPC (After). The shift to lower molecular weight ($M_w$=2,300 kg/mol) confirms that the recirculation treatment does indeed induce shear degradation in accord with the literature on multi-million molecular weight polymers in dilute solution. The length at which the before and after traces cross is the chain length for which the rate of degradation matched the rate of production (due to scission of much longer chains).

A stoichiometric solution of telechelic polycyclooctadienes bearing either isophthalic acid groups at each end (DA, initial $M_w$=670 k g/mol) or two tertiary amine groups at each end (DB, initial $M_w$=630 k g/mol) in Jet-A at concentration of 0.3% wt was also analyzed by GPC in as-prepared form (Before; detected $M_w$=747 kg/mol)) and after 60 s recirculation in apparatus (After; detected $M_w$=718 kg/mol). A small decrease in the population of the longest chains (fastest elution time; $M_w$≥1,200 kg/mol) may occur. This is considered insignificant as it is near the detection limit of the instrument; relative to the GPC trace of the as prepared DA/DB solution, the GPC trace "after" the recirculation treatment may also show a minute increase in the population of chains on the right side of the peak. The latter change is too small to be confidently measured with the GPC instrument. Note that the possible degradation of the DA and DB telechelics occurs only where the individual polymers are so long that they would be vulnerable to shear degradation. Thus, "stress relief" by reversible dissociation appears to protect all telechelics<1,200 kg/mol from hydrodynamic chain scission.

Example 62: Shear Stability of LTPs in Jet-A

Fuel is transported through pipes in highly turbulent flow, passes through pumps, and needs to be passed through filters in many engines, including aviation turbine engines and large diesel engines. It can be circulated repeatedly through heat exchangers that prevent the engine from overheating. In order to ensure that fire protection is retained up to the moment it is needed, degradation prior to fueling or during filtering and circulation during operation of the engine can be minimized. Therefore, resistance to flow-induced chain scission (often called "shear degradation") is among the most crucial requirements for mist-control additives for fuels. For linear polymers dissolved in θ— and good solvents, the correlation between shear viscosity and average molecular weight of polymer (MW) is well-described by the following scaling relationship [25]:

$$\eta_s \propto (MW)^a$$

where $\eta_s$ is the shear viscosity and a is the Mark-Houwink constant (0.5 for θ-solvents; 0.76 for good solvents). If a polymer in solution shear-degrades, such a microscopic phenomenon will be well-reflected by a macroscopic decrease in solution viscosity. Hence, shear viscometry once again provides a reliable, simple and straightforward method to evaluate shear degradation of polymers in solution after exposure to high shear-force environments, such as repeated passage through a fuel pump. Accordingly the setup shown in FIG. 66, Panel A, is used to recirculate the following Jet-A solutions for 60 s (roughly 60 passes) respectively: 4,200 kg/mol polyisobutylene (PIB, a very effective mist-control polymer but very vulnerable to shear degradation) at 0.35 wt %, 430 kg/mol TA-PCOD at 0.3 wt %, and 1:1 mixture of 600 kg/mol DA- and DB-PCODs at 0.3 wt %. Shear viscometry is performed on each solution before and after recirculation, and the results are shown in FIG. 74.

After 60 s of recirculation, the viscosity of the 4,200 kg/mol PIB solution decreases by 40% (FIG. 74 left; compare the "unsheared" to "sheared"), indicating that the polymer is degraded by shear force applied during the test. The results of 4,200 kg/mol PIB not only confirm that PIBs of such a high molecular weight are not shear stable, but also provide a validation that the setup shown in FIG. 66, Panel A can be used to find out if associative LTPs deliver the promised shear resistance. As shown in FIG. 74 (middle and right), none of the two solutions of LTPs show detectable decrease in shear viscosity, meaning that even at an $M_w$ of 600 kg/mol, associative LTPs are still resistant to shear degradation.

The quest for mist-control polymers that survive passage through pumps, filters, and turbulent pipe flow has remained a major unsolved problem despite decades of research. Typical flow conditions involved in routine fuel handling and transportation are severe enough to degrade ultra-high molecular weight PIBs and even FM-9, rendering them ineffective.[81, 82]The literature suggests that in dilute (i.e., ~0.1 wt %) solution, there is a threshold backbone length ($M_\infty$) below which shear degradation of polymers does not occur when they are exposed to strong shear, and $M_\infty$ values for polystyrene and PIB are 1,000 kg/mol and 250 kg/mol, respectively. [83-85] For the very reason, even though hard work has been performed to achieve LTPs much longer with respect to prior telechelics, the $M_w$ is deliberately kept below 1,000 kg/mol in order to avoid irreversible chain scission by shear force. With end-association strengths that are substantially weaker than covalent bonds, supramolecules of LTPs are equipped with "relief valves" that respond to turbulent flow by reversibly dissociating, leading to a new class of potent rheology modifiers that are resistant to shear degradation.

Example 63: Fuel Treatment with DA/DB for Engine Tests

The current study focuses on mega-supramolecules soluble in low-polarity fluids, especially in liquid fuels. Transportation relies on such liquids, presenting the risk of explosive combustion in the event of impact, such as in the 1977 Tenerife airport disaster—an otherwise-survivable runway collision that claimed 583 lives in the post-crash fireball. Subsequent tests of ultra-long, associative polymers (e.g., ICI's "FM-9,">3,000 kg/mol copolymer, 5 mol % carboxyl units) in fuel increased the drop diameter in post-impact mist ([50], [7]), resulting in a relatively cool, short-lived fire. However, these polymers interfered with engine operation ([86]), and their ultra-long backbone-essential for mist control-degraded upon pumping ([51]).

Unlike ultra-long polyisobutylene (4.2M PIB, 4,200 kg/mol) (FIG. 49A), LTPs survive repeated passage through a fuel pump (FIG. 49B and FIG. 66) and allow fuel to be filtered easily. The acid number, density and flash point of the fuel are not affected by mega-supramolecules (FIG. 80). Initial tests in diesel engines indicate that fuel treated with LTPs can be used without engine modification (FIG. 67): in a long-haul diesel engine (360HP Detroit Diesel), power and efficiency are not measurably affected (FIG. 67B). Interestingly LTPs provide a 12% reduction in diesel soot formation (FIG. 49C).

FIG. 67, Panel A shows that the Federal Test Protocol (FTP) for engine tests is a specified transient of RPM and torque designed to include segments characteristic of two major metropolitan areas in the US. The FTP cycle consists of four phases (300 seconds each): (1) New York Non-Freeway (NYNF, light urban traffic with frequent stops and starts), (2) Los Angeles Non-Freeway (LANF, typical of crowded urban traffic with few stops), (3) Los Angeles Freeway (LAFY, simulating crowded expressway traffic in LA), and (4) a repetition of the first NYNF phase. Initial engine test is performed in double-blind mode, averaging three repetitions of the FTP cycle with all measurements calibrated between each FTP cycle. The test was performed in diesel engines rather than aviation jets due to lack of access to an aviation jet engine test facility. FIG. 67, Panel B, Work and fuel efficiency data using an unmodified long-haul diesel engine at the University of California Riverside's Center for Environmental Research and Technology (CE-CERT). Control: untreated diesel. Treated: diesel with 0.14% w/v 670 kg/mol DA/DB. BSFC: "brake specific fuel consumption" (fuel burned per work done against dynamometer, a parameter for fuel efficiency). Bhp-hr: brake-horsepower-hr (0.746 kW-hr). Gal/bhp-hr: gallons per bhp-hr (5.19 liters/kW-hr).

Example 64: Long-Haul Engine Test

In the days of the AMK program, all testing aircrafts were required to be modified with polymer degraders installed before engines because of the disastrous effects of FM-9 on engine operation, and this very issue eventually contributed to the termination of the program[5]. The failures of the AMK program learnt, the significance to have the associative LTPs is fully aware of, no matter they are used as mist-control or drag-reducing additives, be compatible with unmodified engines. A full-scale test in a gas-turbine engine would be the ideal way to evaluate the compatibility of LTPs with jet-engine operation; however it requires approximately 100 barrels of treated jet fuel for each composition and a corresponding total quantity of associative LTPs on the order of tens of kilograms that is beyond the synthesis capability of a university research group. The following facts provide a rational basis to use a long-haul diesel engine to test diesel treated with LTPs as a preliminary and affordable means to assess the impacts of LTPs on engine operations: (1) A typical test of fuels in a diesel engine requires a quantity on the order of 1 barrel. (2) Diesel fuel is considerably easier to acquire in large quantity compared to jet fuel. (3) The U.S. Military uses jet fuel to power its fleets of diesel-engine vehicles, which suggests the significance of the interplay between the effects of LTPs and diesel-engine operation.

Initial tests in diesel engines indicate that diesel fuel treated with these associative LTPs can be used without any engine modification. Untreated diesel is compared to the same fuel treated with 0.14% w/v 1:1 mixture of 600 kg/mol DA- and DB-PCODs using a long-haul diesel engine (360HP Detroit Diesel) and heavy-duty dynamometer (GE 600HP) at the University of California Riverside's Center for Environmental Research and Technology (CE-CERT). The test is performed in double-blind mode, averaging three repetitions of the Federal Test Protocol cycle with all measurements calibrated between each FTP cycle. Power and efficiency are not measurably affected (FIG. 67, Panel B); the most significant effect of the LTPs is a reduction in production of diesel soot by 12% (FIG. 49C). Further testing will be conducted to generate better understandings of the influences of LTPs on the operation, efficiency and emission of diesel engines powered by diesel, diesel engines powered by jet fuel, and gas-turbine engines powered by jet fuel.

Measurements were performed at UC Riverside College of Engineering-Center for Environmental Research and Technology's (CE-CERT's) heavy-duty engine dynamometer laboratory. This engine dynamometer test laboratory is equipped with a 600-hp General Electric DC electric engine dynamometer. Testing was performed using a Detroit Diesel 360HP engine and the FTP (Federal Test Procedure) heavy-duty transient cycle for emission testing of heavy-duty on-road engines in the United States [40 CFR 86.1333]. The FTP transient includes "motoring" segments that take into account a variety of heavy-duty truck and bus driving patterns in American cities, including traffic in and around the cities on roads and expressways. The FTP cycle consists of four phases (300 s each): (1) New York Non Freeway (NYNF, light urban traffic with frequent stops and starts), (2) Los Angeles Non Freeway (LANF, typical of crowded urban traffic with few stops), (3) Los Angeles Freeway (LAFY, simulating crowded expressway traffic in LA), and (4) a repetition of the first NYNF phase. The average load factor of the FTP is roughly 20-25% of the maximum engine power available at a given engine speed. The equivalent average vehicle speed is about 30 km/h and the equivalent distance traveled is 10.3 km for a running time of 1200 s. Fuel was prepared the day before the test. Cans with 3 gallons each of control and treated concentrates were provided and identified simply as RED and BLUE to minimize bias during the test and data analysis. The mixture of DA- and DB-PCODs was dissolved at 1.5% in the concentrate. CERT prepared two barrels of identical fuel (25 gal in each barrel). On the day before the test, CERT staff added RED can to one barrel and BLUE can to the other. Mixing was promoted by placing the barrel on a roller and turning it for approximately 1 hour. The fuel was allowed to stand overnight and was used without further mixing during the actual tests. For all tests, standard emissions measurements of non-methane hydrocarbons (NMHC), total hydrocarbons (THC), carbon monoxide (CO), NOx, particulate matter (PM), and carbon dioxide (CO2) were performed, along with fuel consumption via carbon balance. The emissions measurements were made using the standard analyzers in CE-CERT's heavy-duty Mobile Emissions Laboratory (MEL).

Example 65: Impact/Flame Propagation Comparison Tests for TA and PIB

Similarly, high-speed impact experiments (FIG. 69, Panel A) show that, unlike ultralong PIB, LTPs retain their efficacy in mist control after repeated passage through a fuel pump. For untreated Jet-A fuel, the impact conditions generate a fine mist through which flames rapidly propagate into a hot fireball within 60 ms. Polymer-treated fuel samples are tested in two forms: as prepared ("unsheared") and after approximately 60 passes through a fuel pump ("sheared") (FIG. 66). Ultra-long PIB (4,200 kg/mol, 0.35% wt) is known to confer mist control that prevents flame propagation (FIG. 50A, top left; [6]); however, "sheared" PIB loses efficacy (FIG. 50A, top right). LTPs (TA, properties shown in FIG. 70, Panel A) provide mist control both before and after severe shearing (FIG. 50A bottom), confirming their resistance to shear degradation (FIG. 70, Panel B). The qualitative effects seen in still images at 60 ms (FIG. 50) are quantified by computing the average brightness of each frame (3,000 images in 300 ms), which shows that both "unsheared" and "sheared" TA-treated fuels control misting (FIG. 69, Panel C). Moreover, the test also proves that chain length of the telechelics plays a crucial role in mist control (FIG. 50B), consistent with the hypothesis that mega-supramolecules are the active species conferring the observed effect.

FIG. 69, Panel A shows apparatus for impact/flame propagation experiments. An aluminum canister (outer diameter=23 mm, height=100 mm) was used as a miniature fuel tank to hold ~30 mL of a test sample. The cap was tightly sealed with superglue and electrical tape. A stainless steel cylinder (diameter=24 mm, length=50 mm) was used as a projectile to impact the sample canister and disperse the fuel. To the left of this image: Compressed air at $6.89\times10^5$ Pa was used to propel the projectile through a 1.66 m-long barrel (inner diameter=25.4 mm), resulting in a muzzle speed of 63 m/s measured by time of flight between two flush-mounted sensors in the barrel. An array of three continuously burning propane torches was placed in the path of the ejected fuel. To prevent the torches from being extinguished by the burst of air from the gun, a shield was placed between the torch tip and the gun. The impact, misting, subsequent ignition and flame propagation were captured using a high-speed camera (Photron SA1.1, frame rate 10 kHz). Image acquisition was triggered by a laser-motion detector attached to the end of muzzle.

FIG. 69, Panel B shows frame at 60.4 ms for untreated Jet-A. The rectangular box is the area within which pixels were analyzed for brightness.

FIG. 69, Panel C shows average brightness of the pixels in the rectangle box of FIG. 69, Panel B as a function of time during the first 300 ms after impact for five compositions (untreated Jet-A, 0.35% wt 4.2M PIB unsheared, 0.35% wt 4.2M PIB sheared, 0.3% wt 430 kg/mol TA unsheared and 0.3% wt 430 k TA sheared). The brightness of each pixel was scaled from 0 to 250. The average brightness of the pixels in the rectangular box (shown in part FIG. 69, Panel B) was calculated for each frame (every 0.1 ms). Untreated Jet-A generated a large fireball (almost all pixels in the red rectangle were saturated) that was relatively long lasting (intense flame from 40 ms to 60 ms, followed by a prolonged time in which separated flames continued to burn until all fuel was consumed). As-prepared 4.2M PIB suppressed flame propagation, but lost its efficacy after the shear treatment described in FIG. 66. 430 kg/mol TA was effective in mist-control before and after shear.

Example 66: Impact/Flame Propagation Test

Associative LTPs are proven to be highly effective in mist control, preventing flame propagation in post-impact jet fuel mist. The apparatus shown in FIG. 69, Panel A is used to emulate the impact-induced atomization and subsequent ignition of kerosene released from ruptured fuel tanks in crash scenarios of ground vehicles/aircraft. A steel projectile is shot at 63 m/s at a sealed aluminum tube containing the fuel sample to generate mist, while three propane torches are burning along the path of the ejected fluid. The process of impact, misting, ignition and flame propagation is captured using high-speed imaging.

Efficacy of high molecular-weight end-associative polymers as mist-control additives for fuels was studied via high-speed imaging during an impact/flame propagation test. The apparatus (FIG. 69, Panel A) emulates the atomization and subsequent ignition of fuels released from ruptured fuel tanks in crash scenarios of ground vehicles/aircraft. An aluminum canister (outer diameter=23 mm, height=140 mm) pre-loaded with a cylindrical aluminum filler (diameter=22 mm, height=40 mm) was used as a miniature fuel tank to hold ~30 mL of a test sample. The cap was tightly sealed with superglue and 2-3 wraps of electrical tape to keep it in place during the impact. A solid stainless steel cylinder (diameter=24 mm, length=50 mm) was used as a projectile to impact the canister and disperse the fuel. Compressed air at $6.89 \times 10^5$ Pa was used to propel the projectile through a 1.66 m-long barrel (inner diameter=25.4 mm), resulting in a muzzle speed of 63 m/s. An array of three continuously burning propane torches was placed in the path of the ejected fuel to serve as ignition sources. The onset of impact, formation of mist, and the following ignition events and propagation of flame were captured at a frame rate of 10 kHz using a high-speed camera (Photron SA1.1). Image acquisition was triggered by a laser-motion detector attached to the end of muzzle.

For untreated Jet-A, the impact conditions generate a fine mist: at 30 ms after the impact, a cloud of very fine mist of Jet-A is observed (FIG. 75, Panel A), and at 60 ms after impact flames rapidly propagate through the fine mist into a hot fireball (FIG. 75, Panel B). The flame propagated to engulf the entire cloud of fuel mist within a further 60 ms. Polymer-treated Jet-A samples are tested in two forms: as prepared ("unsheared") and after being passed through a fuel pump approximately 60 times ("sheared") using the setup shown in FIG. 66, Panel A. The ultra-long 4,200 kg/mol PIB at 0.35 wt % in Jet-A is used as a positive control that is known to confer mist control which prevents flame propagation. As shown in FIG. 76 (left), much larger droplets interconnected by fluid filaments are observed at 30 and 60 ms after impact. As ejected fluid flies over the propane torches, localized ignition events are observed, but they soon self-extinguish. The "sheared" sample of the 0.35 wt % Jet-A solution of 4,200 kg/mol PIB, however, shows a significantly different pattern of ejection of fluid after impact (FIG. 76 right): fine droplets formed and interconnecting filaments are no longer observed. Ignition events observed at 30 ms after impact quickly propagate and engulf the fuel cloud in fireball (FIG. 76 right, t=60 ms), indicating the polymer loses its efficacy due to shear degradation. The results confirm that the method is capable of creating a post-impact fuel mist that propagates fire from any ignition event, correctly captures the fire protection that is known to be conferred by 4,200 kg/mol PIB at 0.35 wt % and the loss of fire protection that is known to occur after fuel is passed through pumps, filters or turbulent pipe flow.

Figure 50A:
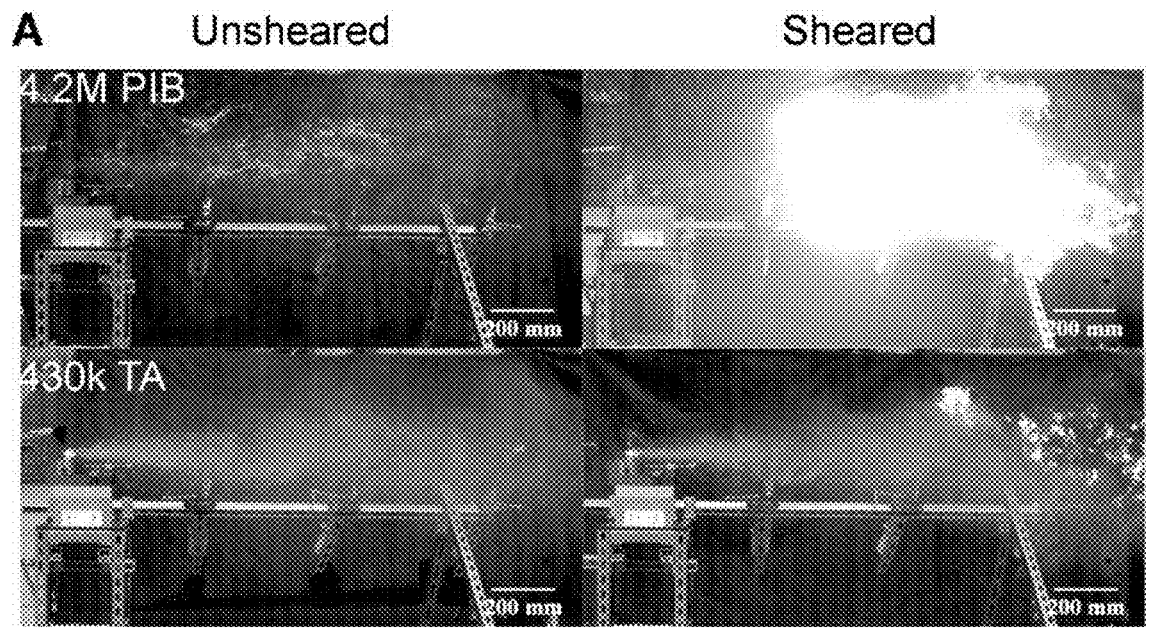
FIGS. 50A-50B show impact test in the presence of ignition sources (60 ms after impact, maximal flame propagation) for Jet-A solutions treated with 4.2M PIB or α,ω-di(di-isophthalic acid) polycyclooctadienes (TA)
Figure 50B:
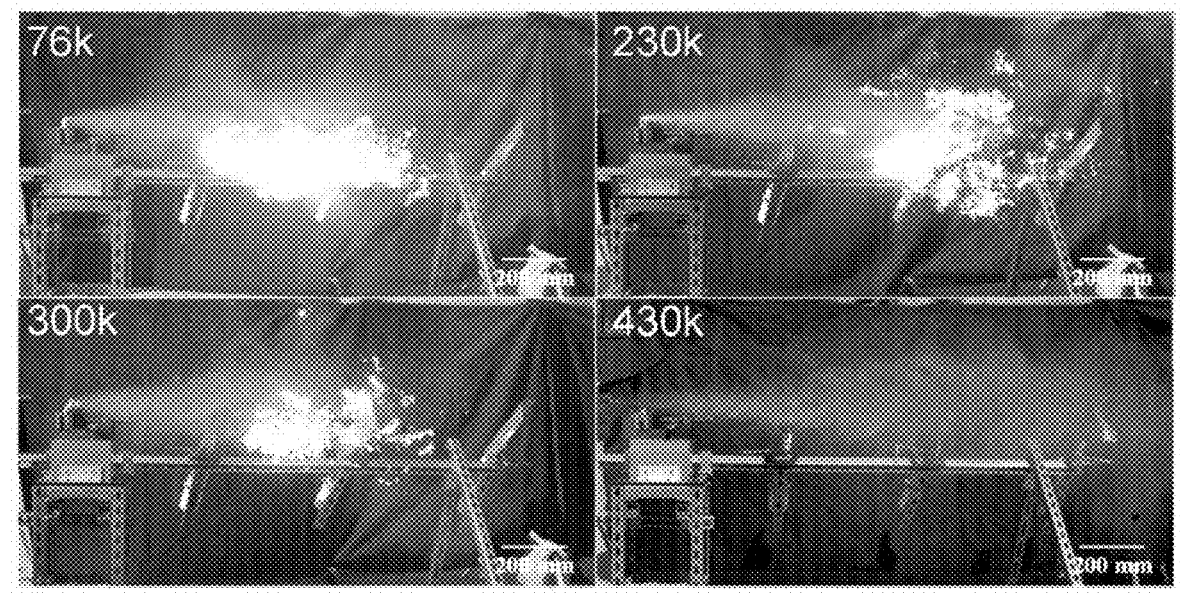
Figure 51:
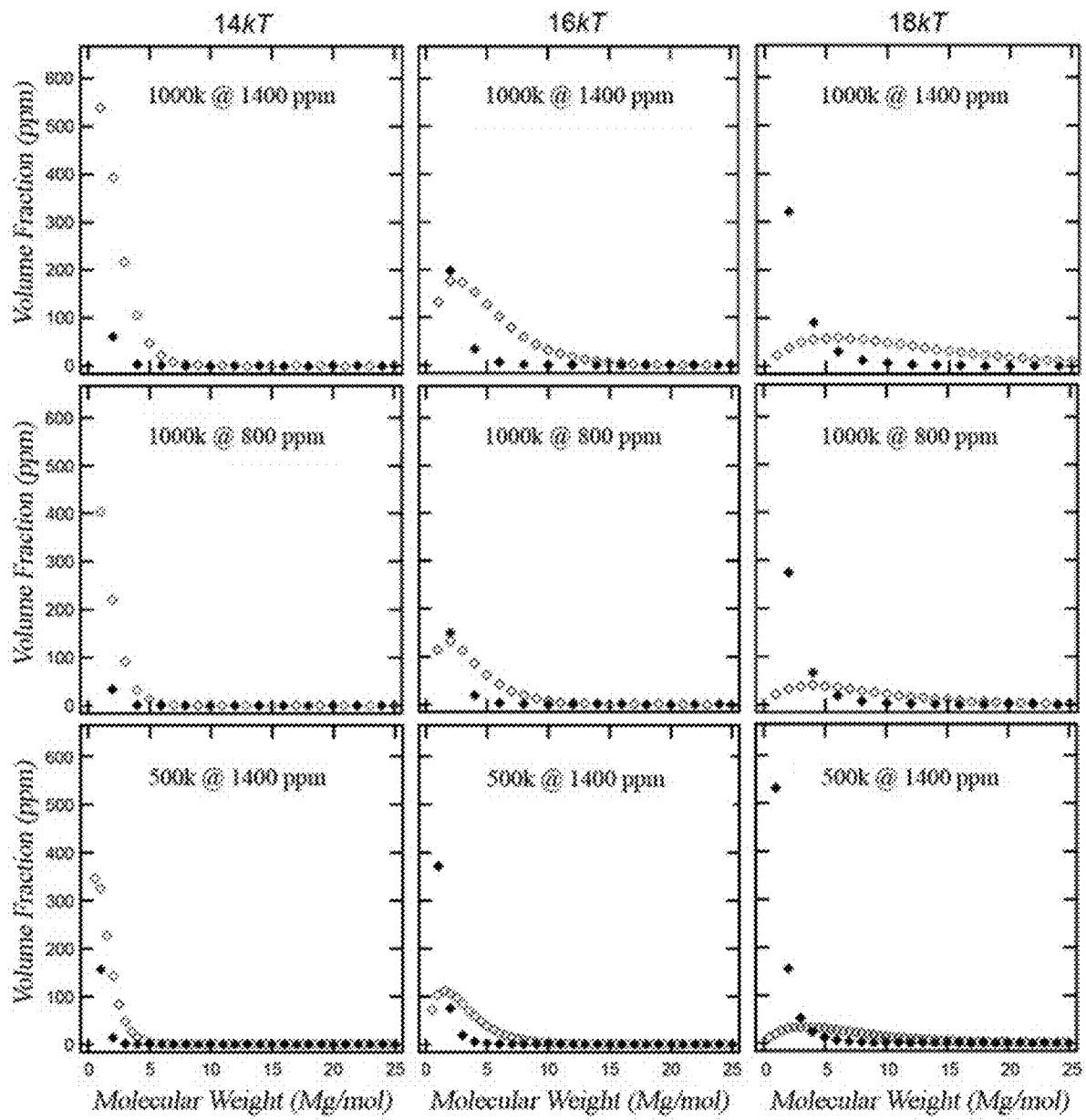
FIG. 51 shows model predictions for two different values of the strength of interaction εkT=14 kT (left), εkT=16 kT (middle) and εkT=18 kT (right) (open diamond: linear supramolecules; solid diamond: cyclic supramolecules).
Figure 52:
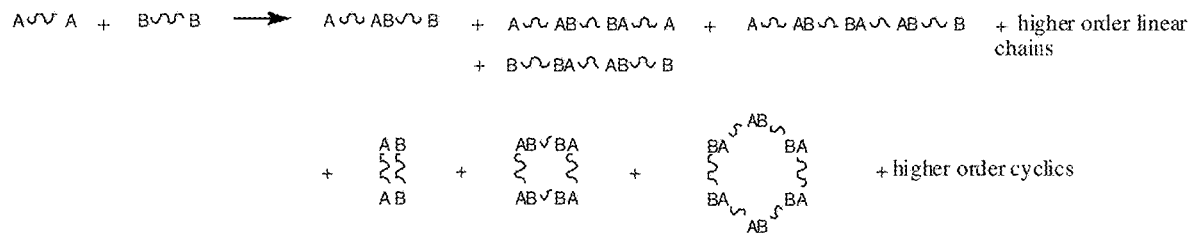
FIG. 52 shows molecular design for self-assembly of telechelic polymeric building blocks into larger linear and cyclic supramolecules via end association

Having validated the setup, it is used to test the efficacy of associative LTPs as mist-control additives for Jet-A. Here 430 kg/mol TA-PCOD is selected as a representative example. The results in FIG. 77 prove that associative LTPs provide mist control both before and after severe shearing, confirming their resistance to shear degradation. It is found that in the test of the unsheared solution of 430 kg/mol TA-PCOD, supramolecules suppress mist formation of Jet-A: ignition events self-extinguish and, as a result, no propagating fireballs are observed. When the sheared solution is tested, the post-impact ignition events propagate to a very limited extent (FIG. 77 right, t=60 ms), and they do not evolve into a propagating fireball at all, evidencing that the mist-control ability of the polymer remains after going through severe shearing. Moreover, the test also proves that chain length of associative LTPs plays a crucial role in mist control, consistent with the hypothesis that mega-supramolecules are the active species conferring the observed effect. Unsheared 0.5 wt % Jet-A solutions of TA-PCODs at Mw=76, 230, 300 and 430 kg/mol are tested, and complete suppression of fire propagation is only observed in the case of the longest TA polymer (FIG. 50B).

The results shown in FIG. 77 clearly indicate that associative LTPs do avoid the problem of chain collapse resulting from randomly placing associative groups along polymer backbone.[65, 87] If not, propagating fireballs would have been observed in tests of 430 kg/mol TA-PCOD solutions. In accord with theoretical predictions that very long backbones reduce cyclic association and favor intermolecular association even at low concentration, the results show that increasing the length of long telechelic associative polymers favors formation elastic supramolecules at low concentrations and confers mist control.[88] Hence, overcoming synthetic obstacles to long (>300 kg/mol) telechelic associative polymers is proved to be significant, for it provides access to the unexplored regime of very long LTPs (>400 kg/mol) that can control misting of kerosene like ultra-high molecular weight PIBs and survive turbulent flows that can destroy ultra-high molecular weight PIBs.

In the 70's and 80's, the prevailing concept for improving fire safety of fuels was that it could be achieved through the addition of then-known anti-misting polymers into fuels to completely eliminate the impact-induced atomization of fuels and the subsequent fire/explosion hazards.[6, 7, 81, 89, 90] However, more recent studies indicate that simply shifting the drop size distribution to higher values can prevent flame propagation through a fuel mist. For example, the critical values of Sauter mean diameter of droplets of military fuel JP-8 in a droplet/air (aerosol) mixture to propagate a flame from an ignition source is approximately 52 m; at lower droplet sizes than this critical values the aerosol becomes entirely engulfed in flame.[91] Thus, complete elimination of mist formation is not necessary. This idea is in good agreement with the data shown in FIGS. 75-77. Even though fire resistance are observed in both unsheared solutions of 4,200 kg/mol PIB and 430 kg/mol TA-PCOD, impact on the latter results in a cloud of finer droplets compared to the former. The observed fire protection conferred by 430 kg/mol TA-PCOD clearly indicates that it does not require complete elimination of misting to achieve fire-safe fuels; instead, the goal can be achieved via proper control of misting.

Motivated by the hope to prevent the use of civilian aircrafts as weapons of mass destruction, long telechelic polymers (LTPs) were explored and it was demonstrated that their length is key to LTPs' potent rheological effects. It is found that by carefully selecting associative end-groups that associate with a strength much greater than thermal energy (kT), yet much weaker than a covalent bond (ca. 150 kT), LTPs form mega-supramolecules even at low concentration. These supramolecules provide benefits typically associated with ultra-long polymers—including mist control and drag reduction, and they reversibly dissociate under flow conditions that would break covalent bonds, allowing the individual LTPs to survive pumping and filtering and allowing treated fuel to burn cleanly and efficiently in unmodified diesel engines. After a 30-year gap in polymer research to improve fire safety and stewardship of fuel, LTPs represent an "existence proof" that polymers can indeed control misting and reduce pumping costs without losing efficacy due to shear degradation, or harming fuel economy or emissions.

Example 67: Effect of TA on Specific Viscosity of Tetralin

FIG. 70 shows characterization of $\alpha,\omega$-di(di(isophthalic acid)) (TA) polycyclooctadiene used in Impact test. FIG. 70, Panel A, Effect of chain length on specific viscosity of TA in tetralin at 10 mg/ml. FIG. 70, Panel B, Specific viscosity of 2.4 mg/ml 430 kg/mol TA in Jet-A at 25° C., sheared vs unsheared. The 430 kg/mol $\alpha,\omega$-di(di(isophthalic acid)) polycyclooctadiene (TA), which is used in the impact test, is self-associative (and might not be pairwise). Although its physics may differ from that of complementary pairs, its rheological properties are similar FIG. 70, Panel A, it has similar resistance to shear degradation FIG. 70, Panel B as the $\alpha,\omega$-di(isophthalic acid) polycyclooctadiene and $\alpha,\omega$-di (di(tertiary amine)) polycyclooctadiene 1:1 molar ratio mixture (~670 kg/mol DA/DB).

Example 68: Safer and Cleaner Fuel by End-Association of Long Telechelic Polymers Liquid fuels, such as gasoline, diesel and kerosene, are the world's dominant power source, representing 34% of global energy consumption. Transportation relies on such liquids, presenting the risk of explosive combustion in the event of impact, such as the 1977 Tenerife airport disaster an otherwise-survivable runway collision that claimed 583 lives in the post-crash fireball. The UK and the U.S. responded with a multi-agency effort to develop polymeric fuel additives for "mist control." Ultra-long, associative polymers (e.g., ICI's "FM-9,">3,000 kg/mol copolymer, 5 mol % carboxylic acid units) increased the drop diameter in post-impact mist, resulting in a relatively cool, short-lived mist fire. However, the polymers interfered with engine operation, and their ultra-long backbone-essential for mist control-degraded upon pumping. They were abandoned in 1986. 15 years later, the post-impact fuel fireball involved in the collapse of the World Trade Center provided motivations to revisit polymers for mist control.

Building on recent advances in supramolecular assembly as a route to emergent functional materials, particularly assembly of complex polymer architectures, an unexplored class of polymers that is both effective and compatible with fuel systems was discovered. Here, it is shown that long (>400 kg/mol) end-associative polymers form "mega-supramolecules" that control post-impact mist without adversely affecting power, efficiency or emissions of unmodified diesel engines. They also reduce turbulent drag, hence, conserving energy used to distribute fuel. The length and end-association strength of the present polymers were designed using statistical mechanical considerations. In comparison with ultra-long polymers for mist control, the present polymers are an order of magnitude shorter; therefore, they are able to resist shear degradation. In contrast to prior randomly-functionalized associative polymers, these end-associative polymers also avoid chain collapse. It is found that simple carboxylic-acid/tertiary-amine end-association is effective, and the unprecedented length of these telechelic polymers is essential for their potent rheological effects.

Kerosene fuels have been a major source of fire hazard and vulnerability when they are released in an uncontrolled manner. It is estimated that 40% of the fatalities in so-called "survivable aircraft crashes," which make up approximately 70% of accidents that occur on takeoff and landing, are due to fire caused by combustion of aviation fuel.[92] Similarly, the violent and catastrophic combustion of leaked fuel after the direct or indirect ballistic penetration of a vehicle's fuel tank or fuel line by shrapnel in IED attacks has inflicted heavy casualties on US military over the last decade. In impact scenarios, fuel is atomized by mechanical energy involved into fine mist, and such mist burns explosively when ignited. The resultant fire can rapidly propagate away from the ignition source, involve more fuel, and trigger deadly pool fires that are very violent and difficult to contain. Such fire often accompanies tank explosions, leaving no chance for firefighters to intervene, as demonstrated in the collapse of the World Trade Center[93].

Increasing the droplet size in post-impact mist of kerosene (i.e., "mist control") has been identified as the most promising way to mitigate impact-induced kerosene fires.[94]' [95] "Mist-control kerosene" is indeed a fuel that "burns but doesn't burn—" after ignition from an incendiary threat, it self-extinguishes and slows the spread of fire so that fire-extinguishing systems can intervene, and personnel can have time to escape.[82] Ultra-high molecular weight (on the order 10,000 kg/mol) polymers have potent effects on the breakup of liquid jets and drops even at very low concentration (on the order of 100 ppm),[96] since they are long enough to exhibit elasticity and sustain tensile stress.[97-100] However, using such polymers to provide mist control for kerosene has been found practically difficult due to their vulnerability to shear degradation in fuel transportation and dispensing processes.[101] Once they are degraded, they lose their efficacy permanently. Beginning in the late 1970's, efforts had been made to adopt the concept of "associative polymers" in hope of providing mist-control effectiveness of ultra-high molecular weight polymers while circumventing their loss of efficacy due to shear degradation. Specifically, these associative polymers are comprised of shear-stable polymer chains (molecular weight≤1,000 kg/mol) with associative groups randomly placed on the backbone, capable of aggregating into larger clusters (which might be effective in mist control) via hydrogen bonding and responding to turbulent flow via reversible dissociation.[102] A good example is ICI's FM-9 polymer (>3,000 kg/mol copolymer, 5 mol % carboxylic acid units) used in the engineering-oriented UK-U.S. joint Anti-Misting Kerosene (AMK) program.[81, 82] Despite demonstration of efficacy, FM-9 interfered with engine operation and fuel handling, and it was not immune to shear degradation upon pumping. Eventually research in this area was largely abandoned in 1986.

With a view towards improving fire safety of jet fuels, polymers for mist control of kerosene are disclosed herein.

Fundamental relationship between molecular designs of mist-control polymers and corresponding solution behaviors are described. It was found that the design of associative polymers prevailing in the 80's suffers a fatal flaw: it leads to self-assembly of chains into collapsed, inextensible structures that are of little use in mist control.[65, 87]Using statistical mechanical analysis of ring-chain equilibrium, it is found that exceptionally long telechelic polymers (LTPs, FIG. 22) are needed to assemble large supramolecules effective in mist control and other applications that rely on large polymer coils, such as drag reduction.[88] The theory provides a guideline on polymer backbone length based on two trade-offs: the chain is typically be long enough that mega-supramolecules form, yet short enough to avoid chain scission (<1,000 kg/mol) during pumping and turbulent flow. Specifically, it is expected that an adequate concentration (>50 ppm) of >5,000 kg/mol supramolecules forms when the individual telechelics are 500 kg/mol, if donor-acceptor type associations are used with end-association energy approximately 16-18 kT, and the total polymer concentration is 1,400 ppm. These criteria point to an unprecedented class of polymers that did not exist before.

In the present disclosure, the recent advance in development of LTPs for mist control of kerosene are described, including the breakthrough in polymer and supramolecular chemistry and the properties and performance of these polymers as fuel additives.

Example 69: Identification of Associative Polymers to Control Drag Reduction in Aviation Fuel The following approach can be used to identify associative polymers for drag reduction in aviation fuel, in particular in to achieve a 10% increase in pipeline capacity through the existing pipelines serving an airport.

Candidate polymer backbones can be identified for a certain fuel composition to be used as a host composition in the sense of the present disclosure. For example a skilled person can refer to literature to identify polyisobutylene (PIB) as a candidate known to be widely used in fuel additives and be able remains in solution down to low temperatures (e.g. −30° C.).

Additional candidates (e.g. polycyclooctadiene) can be found based on literature or experiments to be performed to identify the solubility and stability of the polymer in a fuel composition of choice.

Prioritization (rank order) of the candidate backbones can be achieved by the following steps Step 1. For each candidate backbone, identify the threshold molecular weight for the onset of shear degradation. This provides a good estimate for the maximum span of associative polymers herein described, whether linear or branched, suitable for their application.

Step 2. For each candidate backbone, determine (e.g. by measuring) the overlap concentration that corresponds to the maximum span of the associative polymers suitable for their application, determined in Step 1. If a backbone shorter than the maximum is used, it will increase the value of the overlap concentration. So the overlap concentration determined in this step is the lowest overlap concentration relevant to their application.

Step 3. For each candidate polymer backbone, determine the end group concentration that corresponds to the overlap concentration determined in Step 2.

Step 4. For each candidate polymer backbone, estimate the range of the association constants worthy of testing. Specifically, using the molar concentration of end groups from Step 3, determine the value of the association constant that would provide a pairing of the end groups equal to or greater than 75% (e.g. 99%) according to the binding constant calculated in accordance with the present disclosure. If the polymer will be tested at concentrations below c*, the association constant estimated using c* provides a lower estimate of the association constant that will give the desired effects. If polymers will be used at higher concentration than c*, the association constant estimated using c* will provide desired effects.

Results of application of the above approach to the exemplary PIB and PCOD indicated above is summarized in the following Table 15 below Results of application of the above approach to the exemplary PIB and PCOD indicated above is summarized in the following Table 15 below

TABLE 15

| Candidate backbone structure | Threshold $M_w$ [g/mol] for shear degradation | $R_g$ [nm] for threshold Mw | Overlap cnc. [g/L] at threshold $M_w$ & $R_g$ | End group conc. [M] at c* | Association constant range of interest: For 75% end assn. | Association constant range of interest: For 99% end assn. |
|---|---|---|---|---|---|---|
| PIB | 300,000 | 25 | 7.7 | $2.6 \times 10^{-5}$ | $2 \times 10^{5}$ | $1.2 \times 10^{8}$ |
| PCOD | 700,000 | 73 | 2 | $2.3 \times 10^{-6}$ | $5 \times 10^{6}$ | $3 \times 10^{9}$ |

A skilled person can also perform experiments to identify the threshold molecular weight for their application. For example, an apparatus can be constructed that subjects the fluid to the number of passes through a pump, the exposure to turbulent pipe flow and passage through filters that is pertinent to the application of interest to them. Alternatively, the skilled person can perform a literature search to obtain an estimate of the value of the threshold molecular weight for each backbone of interest. For illustration, exemplary estimates for PIB and PCOD obtained from laboratory experiments are provided in the second column of Table 15 above.

The threshold molecular weight if the architecture are linear, given in the second column of table 15 (the longest span—see e.g. FIGS. 81A-81H—for the application of interest), can be used to determine (e.g. by calculation or measurement) the corresponding radius of gyration, shown in the third column of the table. The radius of gyration $R_g$ calculated for a linear chain corresponding to the longest span provides a good estimate of the radius of gyration for the other polymer architectures of the present disclosure. The skilled person can either perform experiments to measure $R_g$ for the backbones of interest and obtain the value of $R_g$ that corresponds to the threshold molecular weight in the second column of table 15. Alternatively, the skilled person can refer to the literature and their knowledge of the solution condition relevant to the candidate backbones.

In the present example, fuel is a good solvent for both of the backbones being considered. The values shown in the third column of Table 15 were calculated for good solvent conditions using equations provided for polybutadiene and polyisobutylene as equations (6) and (26) in "Molecular Weight Dependence of Hydrodynamic and Thermodynamic Properties for Well-Defined Linear Polymers in Solution" (1994) by Fetters et al. [14].

The threshold molecular weight and the corresponding radius of gyration can be used to calculate the minimum overlap concentration that can be achieved with each candidate backbone, limited by their individual threshold for shear degradation under the condition of the user's application. As noted above, the $R_g$ calculated from the longest span provides a good estimate of the radius of gyration for the other polymer architectures of the present disclosure. In the exemplary case of PIB and PCOD, the Mw used to calculate the concentration in the fourth column of the table assumes that the polymers are linear. A skilled person would know how to determine Mw for other architectures from the size of the longest span and the specific architecture of interest.

The end group concentration for the threshold molecular weight at the overlap concentration can be determined (e.g. by calculation or measurement). In this example, the case of a linear associative molecule is used and complementary association (A+B pairwise association) is assumed: each polymer has two ends; half of the polymers carry the A functional group and half carry the B functional group. Thus, the molar concentration of A ends equals the molar concentration of B ends equals the molar concentration of chains, given in the fifth column of the table. The skilled person can adjust this as appropriate to the associative molecules of interest to them, which might have more than two functional groups if branched structures are considered (see e.g. FIGS. 81A-81H) and might be self-associative or involve more than two complementary functional groups.

In the example given in table 15, the relevant range of association constants is calculated assuming pairwise, complementary association, as described in the preceding paragraph. Thus, the values given in the sixth and seventh columns of the table are equal to $(0.75 \text{ [end]})/\{(0.25 \text{ [end]})^2\}$ for the 75% case and $(0.99 \text{ [end]})/\{(0.01 \text{ [end]})^2\}$ for the 99% case, where [end]denotes the end group concentration value given in the fifth column. The skilled person would be able to adjust the calculation as appropriate to other scenarios, also described above.

A skilled person can now prioritize the experiments to be performed to develop the formulation that meets the required 10% reduction in pipeline drag. For example, if the concentration needs to be kept below 3 g/L, then the skilled person may exclude PIB from further consideration. Initial experiments may focus on linear PCOD with Mw and PDI such that less than 1% of chains are longer than 700 kg/mol. Experiments can focus on end group structures that give association constant greater than $4.9 \times 10^6$. The reduction of pipeline drag can then be measured for a small number of concentrations, perhaps c*, c*/2 and c*/4, to characterize trends in performance as a function of concentration. If the effects are not adequate, a stronger association constant can be tested. If the resistance to shear degradation is not adequate, a branched architecture can be tested. The skilled person can use a relatively modest number of experiments to develop a polymer and formulation that meets the requirement for 10% reduction in pipeline drag.

Example 70: Associative Polymers to Control Droplet Breakout During Fibers' Preparation A skilled person seeks to prepare fibers using electrospinning of a nonpolar monomer, ethylhexylmethacrylate. The liquid undergoes electrospray into fine droplets rather than electrospinning. The skilled person adds 0.1% of 700 k DA/DB to the monomer. The problem of droplet breakup is eliminated, enabling spinning of the desired fiber. When the fiber diameter is drawn down to 80 nm, photopolymerization is used to solidify the fiber.

Example 71: Associative Polymers to Control Size and Uniformity of Drug Particles A pharmaceutical company uses atomization of hydrophobic drug in a non-polar solvent followed by evaporation of the nonpolar solvent to produce particles of the drug. The size and uniformity of the drug particles can be used to optimize their time release when administered to the patient. A skilled person seeks to eliminate satellite droplets. The skilled person chooses as the backbone of the associative polymer herein described a hydrophobic polymer accepted for use in drug formulations and soluble in the drug solution used for atomization. The skilled person identifies 10 g/L concentration as the acceptable amount of polymer in the drug solution used for atomization. Therefore, they choose a polymer molecular weight that gives the polymer a radius of gyration of 22 nm. They consider functional groups in relation to the composition of the atomization solution to select functional groups that will associate with association constant $k > 10^5$ when used in that solution. The polymer is introduced to the solution at a concentration of 10 g/L and the formation of satellite drops is reduced.

Example 72: Associative Polymers to Increase Volume of a Fluid Supplied in a Pipeline A fuel pipeline is operating at its maximum capacity. A skilled person wants to increase the volume of fuel supplied through the pipeline. The pipeline is operating at its maximum pressure, so the increase in throughput cannot be accomplished by increasing the pressure. The flow in the pipeline is turbulent (the Reynolds number is greater than 5,000, e.g. 25,000). Therefore, frictional losses in the pipeline are described using the familiar friction coefficient $C_f$ defined as $$C_f = \frac{\text{Wall Shear Stress}}{\text{Dynamic Pressure}} = \frac{2D\Delta p}{4L\rho u_m^2} \tag{26}$$

where D is the inner diameter of the pipe, $\Delta p/L$ is the frictional pressure loss over a distance L along the pipeline, $\rho$ is the density of the fuel, $u\_m = Q/A$, where Q is the volumetric flow rate and $A = \pi D^2/4$ is the cross sectional area of the pipe. Often the frictional pressure loss is expressed as "head loss" $h_f = \Delta p/(\rho g)$:

$$h_f = \frac{4C_f L u_m^2}{2gD} = \frac{4C_f L Q^2}{2gDA^2} = \frac{32 C_f L Q^2}{g\pi^2 D^5} = RQ^2 \tag{27}$$

$R$ is the fluid resistance

Laboratory experiments were performed at a Reynold's number of Re=14,000 using 9 m long and 12 m long tubes. Compared to untreated fuel, the fluid resistance due to flow through the tube was reduced from $hf/Q^2=1.1\times10^{11}$ $s^2/m^5$ (untreated fuel) to $hf/Q^2=6.8\times10^{10}$ $s^2/m^55$ when treated with 0.1% of a 1:1 mixture of 700 k DA and 700 k DB.

In the pipeline, the Reynold's number is much greater, approximately approximately 100,000. In accord with prior literature indicating that the fractional drag reduction increases with Re over this range, when the polymer was used in the pipeline, the increase in throughput was more than 25%.

Example 73: Associative Polymers to Provide Grafting Sites on a Fiber Surface

In an exemplary application, a hydrophobic polydrug is only available in molecular weights that are too short to enable fiber spinning. In addition, a covalently grafted layer is needed on the surface to inhibit non-specific protein adsorption. A product development team seeks a single additive that can be used at low concentration to provide grafting sites on the fiber surface. Therefore, the team chooses a branched polymer with the following average structure.

On average the polymers have four nodes. On average they have four associative functional groups, FGas. In addition, on average, each molecule has one FGd. On average they have nine —[chain]— segments each approximately 100 kg/mol, such that the average molecular weight of the polymer is approximately 1,000 kg/mol. When 0.3% of the above is added to the solution, the associative polymer facilitates fiber spinning and provides FGd groups at the fiber surface. The FGd groups displayed on the surface of the fiber are later used as chemical groups for grafting PEG or zwitterionic polymer chains to the fiber surface.

The examples set forth above are provided to give those of ordinary skill in the art a complete disclosure and description of how to make and use the embodiments of the associative polymers, materials, compositions, systems and methods of the disclosure, and are not intended to limit the scope of what the inventors regard as their disclosure. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Unless otherwise indicated, the term "alkyl" as used herein refers to a linear, branched, or cyclic saturated hydrocarbon group typically although not necessarily containing 1 to about 15 carbon atoms, or 1 to about 6 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 15 carbon atoms. The term "cycloalkyl" intends a cyclic alkyl group, typically having 4 to 8, or 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

Unless otherwise indicated, the term "hydrocarbyl" as used herein refers to any univalent radical, derived from a hydrocarbon, such as, for example, methyl or phenyl. The term "hydrocarbylene" refers to divalent groups formed by removing two hydrogen atoms from a hydrocarbon, the free valencies of which may or may not be engaged in a double bond, typically but not necessarily containing 1 to 20 carbon atoms, in particular 1 to 12 carbon atoms and more particularly 1 to 6 carbon atoms which includes but is not limited to linear cyclic, branched, saturated and unsaturated species, such as alkylene, alkenylene alkynylene and divalent aryl groups, e.g., 1,3-phenylene, —CH$_2$CH$_2$CH$_2$-propane-1,3-diyl, —CH$_2$-methylene, —CH═CH—CH═CH—. The term "hydrocarbyl" as used herein refers to univalent groups formed by removing a hydrogen atom from a hydrocarbon, typically but not necessarily containing 1 to 20 carbon atoms, in particular 1 to 12 carbon atoms and more particularly 1 to 6 carbon atoms, including but not limited to linear cyclic, branched, saturated and unsaturated species, such as univalent alkyl, alkenyl, alkynyl and aryl groups e.g. ethyl and phenyl groups.

Unless otherwise indicated, the term "heteroatom-containing" as in a "heteroatom-containing alky group" refers to a alkyl group in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, and others known to a skilled person, and examples of heteroatom-containing alicyclic groups are pyrrolidino, morpholino, piperazino, piperidino, and other known to a skilled person.

Unless otherwise indicated, the term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

Unless otherwise indicated, the term "alkylamino" as used herein intends an alkyl group bound through a single terminal amine linkage; that is, an "alkylamino" may be represented as —NH-alkyl where alkyl is as defined above. A "lower alkylamino" intends an alkylamino group containing 1 to 6 carbon atoms. The term "dialkylamino" as used herein intends two identical or different bound through a common amine linkage; that is, a "dialkylamino" may be represented as —N(alkyl)$_2$ where alkyl is as defined above. A "lower dialkylamino" intends an alkylamino wherein each alkyl group contains 1 to 6 carbon atoms. Analogously, "alkenylamino", "lower alkenylamino", "alkynylamino", and "lower alkynylamino" respectively refer to an alkenyl, lower alkenyl, alkynyl and lower alkynyl bound through a single terminal amine linkage; and "dialkenylamino", "lower dialkenylamino", "dialkynylamino", "lower dialkynylamino" respectively refer to two identical alkenyl, lower alkenyl, alkynyl and lower alkynyl bound through a common amine linkage. Similarly, "alkenylalkynylamino", "alkenylalkylamino", and "alkynylalkylamino" respectively refer to alkenyl and alkynyl, alkenyl and alkyl, and alkynyl and alkyl groups bound through a common amine linkage.

Unless otherwise indicated, the term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Aryl groups can contain 5 to 24 carbon atoms, or aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

Unless otherwise indicated, the term "arene", as used herein, refers to an aromatic ring or multiple aromatic rings that are fused together. Exemplary arenes include, for example, benzene, naphthalene, anthracene, and the like. The term "heteroarene", as used herein, refers to an arene in which one or more of the carbon atoms has been replaced by a heteroatom (e.g. O, N, or S). Exemplary heteroarenes include, for example, indole, benzimidazole, thiophene, benzthiazole, and the like. The terms "substituted arene" and "substituted heteroarene", as used herein, refer to arene and heteroarene molecules in which one or more of the carbons and/or heteroatoms are substituted with substituent groups.

Unless otherwise indicated, the terms "cyclic", "cyclo-", and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

Unless otherwise indicated, the terms "halo", "halogen", and "halide" are used in the conventional sense to refer to a chloro, bromo, fluoro or iodo substituent or ligand.

Unless otherwise indicated, the term "substituted" as in "substituted alkyl," "substituted aryl," and the like, is meant that in the, alkyl, aryl, or other moiety, at least one hydrogen atom bound to a carbon (or other) atom is replaced with one or more non-hydrogen substituents.

Examples of such substituents can include, without limitation: functional groups such as halo, hydroxyl, sulfhydryl, C1-C24 alkoxy, C2-C24 alkenyloxy, C2-C24 alkynyloxy, C5-C24 aryloxy, C6-C24 aralkyloxy, C6-C24 alkaryloxy, acyl (including C2-C24 alkylcarbonyl (—CO— alkyl) and C6-C24 arylcarbonyl (—CO-aryl)), acyloxy (—O-acyl, including C2-C24 alkylcarbonyloxy (—O—CO-alkyl) and C6-C24 arylcarbonyloxy (—O—CO-aryl)), C2-C24 alkoxycarbonyl (—(CO)—O-alkyl), C6-C24 aryloxycarbonyl (—(CO)—O-aryl), halocarbonyl (—CO)—X where X is halo), C2-C24 alkylcarbonato (—O—(CO)—O-alkyl), C6-C24 arylcarbonato (—O—(CO)—O-aryl), carboxy (—COOH), carboxylato (COO—), carbamoyl (—(CO)—NH$_2$), mono-(C1-C24 alkyl)-substituted carbamoyl (—(CO)—NH(C1-C24 alkyl)), di-(C1-C24 alkyl)-substituted carbamoyl (—(CO)—N(C1-C24 alkyl)$_2$), mono-(C5-C24 aryl)-substituted carbamoyl (—(CO)—NH-aryl), di-(C5-C24 aryl)-substituted carbamoyl (—(CO)—N(C5-C24 aryl)2), di-N—(C1-C24 alkyl),N—(C5-C24 aryl)-substituted carbamoyl, thiocarbamoyl (—(CS)—NH2), mono-(C1-C24 alkyl)-substituted thiocarbamoyl (—(CO)—NH (C1-C24 alkyl)), di-(C1-C24 alkyl)-substituted thiocarbamoyl (—(CO)—N(C1-C24 alkyl)$_2$), mono-(C5-C24 aryl)-substituted thiocarbamoyl (—(CO)—NH-aryl), di-(C5-C24 aryl)-substituted thiocarbamoyl (—(CO)—N (C5-C24 aryl)2), di-N—(C1-C24 alkyl),N—(C5-C24 aryl)-substituted thiocarbamoyl, carbamido (—NH—(CO)—NH$_2$), cyano(—C—N), cyanato (—O—C—N), thiocyanato (—S—C—N), formyl (—(CO)—H), thioformyl ((CS)—H), amino (—NH2), mono-(C1-C24 alkyl)-substituted amino, di-(C1-C24 alkyl)-substituted amino, mono-(C5-C24 aryl)-substituted amino, di-(C5-C24 aryl)-substituted amino, C2-C24 alkylamido (—NH—(CO)-alkyl), C6-C24 arylamido (—NH—(CO)-aryl), imino (—CR=NH where R=hydrogen, C1-C24 alkyl, C5-C24 aryl, C6-C24 alkaryl, C6-C24 aralkyl, and others known to a skilled person), C2-C20 alkylimino (CR=N(alkyl), where R=hydrogen, C1-C24 alkyl, C5-C24 aryl, C6-C24 alkaryl, C6-C24 aralkyl, and others known to a skilled person), arylimino (—CR=N(aryl), where R=hydrogen, C1-C20 alkyl, C5-C24 aryl, C6-C24 alkaryl, C6-C24 aralkyl, and others known to a skilled person), nitro (—NO2), nitroso (—NO), sulfo (—SO2-OH), sulfonato (—SO2-O—), C1-C24 alkylsulfanyl (—S-alkyl; also termed "alkylthio"), C5-C24 arylsulfanyl (—S-aryl; also termed "arylthio"), C1-C24 alkylsulfinyl (—(SO)-alkyl), C5-C24 arylsulfinyl (—(SO)-aryl), C1-C24 alkylsulfonyl (—SO2-alkyl), C5-C24 arylsulfonyl (—SO2-aryl), boryl (—BH2), borono (—B (OH)$_2$), boronato (—B(OR)$_2$ where R is alkyl or other hydrocarbyl), phosphono (—P(O)(OH)$_2$), phosphonato (—P(O)(O—)$_2$), phosphinato (—P(O)(O—)), phospho (—PO$_2$), phosphino (—PH$_2$), silyl (—SiR$_3$ wherein R is hydrogen or hydrocarbyl), and silyloxy (—O-silyl); and the hydrocarbyl moieties C1-C24 alkyl (e.g. C1-C12 alkyl and C1-C6 alkyl), C2-C24 alkenyl (e.g. C2-C12 alkenyl and C2-C6 alkenyl), C2-C24 alkynyl (e.g. C2-C12 alkynyl and C2-C6 alkynyl), C5-C24 aryl (e.g. C5-C14 aryl), C6-C24 alkaryl (e.g. C6-C16 alkaryl), and C6-C24 aralkyl (e.g. C6-C16 aralkyl).

Unless otherwise indicated, the term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl," and "aralkyl" are as defined above.

Unless otherwise indicated, the term "alkaryl" refers to an aryl group with an alkyl substituent, and the term "aralkyl" refers to an alkyl group with an aryl substituent, wherein "aryl" and "alkyl" are as defined above. In some embodiments, alkaryl and aralkyl groups contain 6 to 24 carbon atoms, and particularly alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES

1. Fetters, L., D. Lohse, and R. Colby, *Chain dimensions and entanglement spacings, in Physical Properties of Polymers Handbook.* 2007, Springer. p. 447-454.
2. Krishnamoorti, R., et al., *Melt-state polymer chain dimensions as a function of temperature.* Journal of Polymer Science Part B: Polymer Physics, 2002. 40(16): p. 1768-1776.
3. Brandrup, J. and E. Immergut, *Polymer handbook,* 3rd. 1989: John Wiley and Sons.
4. Gotro, J. and W. W. Graessley, *Model hydrocarbon polymers: rheological properties of linear polyisoprenes and hydrogenated polyisoprenes.* Macromolecules, 1984. 17(12): p. 2767-2775.
5. Colby, R. H., L. J. Fetters, and W. W. Graessley, *The melt viscosity-molecular weight relationship for linear polymers.* Macromolecules, 1987. 20(9): p. 2226-2237.
6. Chao, K. K., et al., *Antimisting Action of Polymeric Additives in Jet Fuels.* Aiche Journal, 1984. 30(1): p. 111-120.
7. Peng, S. T. J. and R. F. Landel, *Rheological Behavior of Fm-9 Solutions and Correlation with Flammability Test-Results and Interpretations.* Journal of Non-Newtonian Fluid Mechanics, 1983. 12(1): p. 95-111.
8. Nyden, M. R., et al., *Applications of reactive molecular dynamics to the study of the thermal decomposition of polymers and nanoscale structures.* Materials Science and Engineering a-Structural Materials Properties Microstructure and Processing, 2004. 365(1-2): p. 114-121.
9. Brandrup, J., et al., *Polymer handbook.* Vol. 1999. 1999: Wiley New York.
10. Maurer-Chronakis, K., *Synthesis of cyanuric acid and Hamilton receptor functionalized tetraphenylporphyrins: investigation on the chiroptical and photophysical properties of their self-assembled superstructures with depsipeptide and fullerene dendrimers,* 2010, Erlangen, Nürnberg, Univ.
11. Larock, R. C., *Comprehensive organic transformations: a guide to functional group preparations,* 2nd Ed. 1999: Wiley-vch New York.
12. Ying, Q. and B. Chu, *Overlap concentration of macromolecules in solution.* Macromolecules, 1987. 20(2): p. 362-366.
13. Colby, R. H. and M. Rubinstein, *Two-parameter scaling for polymers in θ solvents.* Macromolecules, 1990. 23(10): p. 2753-2757.
14. Fetters, L., et al., *Molecular Weight Dependence of Hydrodynamic and Thermodynamic Properties for Well-Defined Linear Polymers in Solution.* Journal of physical and chemical reference data, 1994. 23(4): p. 619-640.
15. Rubinstein, M. and R. H. Colby, *Polymer physics.* 2003: OUP Oxford. 53-176.
16. Ke, F.-y., X.-4. Mo, and D.-h. Liang, *Effect of Overlap Concentration and Persistence Length on DNA Separation in Polymer Solutions by Electrophoresis.* Chinese Journal of Polymer Science, 2009. 27(5): p. 601-610.
17. Thordarson, P., *Determining association constants from titration experiments in supramolecular chemistry.* Chem Soc Rev, 2011. 40(3): p. 1305-23.
18. Grubbs, R., *Handbook of Metathesis,* vol. 3. 2003: Wiley-VCH, Weinheim.

19. Tasdelen, M. A., M. U. Kahveci, and Y. Yagci, *Telechelic polymers by living and controlled/living polymerization methods*. Progress in Polymer Science, 2011. 36(4): p. 455-567.
20. Goethals, E., *Telechelic polymers: Synthesis and applications*. 1989: CRC Press (Boca Raton, Fla.).
21. Wuts, P. G. and T. W. Greene, *Greene's protective groups in organic synthesis*. 2006: John Wiley & Sons.
22. Nese, A., et al., *Synthesis of Poly (vinyl acetate) Molecular Brushes by a Combination of Atom Transfer Radical Polymerization (ATRP) and Reversible Addition—Fragmentation Chain Transfer (RAFT) Polymerization*. Macromolecules, 2010. 43(9): p. 4016-4019.
23. Park, T. and S. C. Zimmerman, *A supramolecular multi-block copolymer with a high propensity for alternation*. J Am Chem Soc, 2006. 128(43): p. 13986-7.
24. *Polymer Solutions: Solvents and Solubility Parameters*. Jan. 25, 2012]; Available from: http://www.sigmaaldrich.com/etc/medialib/docs/Aldrich/General_Information/polymer_solutions.Par.0001.File.tmp/polymer_solutions.pdf.
25. Rubinstein, M. and R. H. Colby, *Polymer physics*. 2003, Oxford; New York: Oxford University Press. xi, 440 p.
26. Chang, S. K. and A. D. Hamilton, *Molecular Recognition of Biologically Interesting Substrates—Synthesis of an Artificial Receptor for Barbiturates Employing 6 Hydrogen-Bonds*. Journal of the American Chemical Society, 1988. 110(4): p. 1318-1319.
27. Beijer, F. H., et al., *Hydrogen-bonded complexes of diaminopyridines and diaminotriazines: Opposite effect of acylation on complex stabilities (vol 61, pg 6374, 1996)*. Journal of Organic Chemistry, 1996. 61(26): p. 9636-9636.
28. Higley, M. N., et al., *A modular approach toward block copolymers*. Chemistry-a European Journal, 2005. 11(10): p. 2946-2953.
29. Burd, C. and M. Weck, *Self-sorting in polymers*. Macromolecules, 2005. 38(17): p. 7225-7230.
30. Stubbs, L. P. and M. Week, *Towards a universal polymer backbone: Design and synthesis of polymeric scaffolds containing terminal hydrogen-bonding recognition motifs at each repeating unit*. Chemistry-a European Journal, 2003. 9(4): p. 992-999.
31. Cheng, C. C., et al., *New self-assembled supramolecular polymers formed by self-complementary sextuple hydrogen bond motifs*. Rsc Advances, 2012. 2(26): p. 9952-9957.
32. Park, T., S. C. Zimmerman, and S. Nakashima, *A highly stable quadruply hydrogen-bonded heterocomplex useful for supramolecular polymer blends*. Journal of the American Chemical Society, 2005. 127(18): p. 6520-6521.
33. Altintas, O., et al., *Bioinspired dual self-folding of single polymer chains via reversible hydrogen bonding*. Polymer Chemistry, 2012. 3(3): p. 640-651.
34. Altintas, O., U. Tunca, and C. Barner Kowollik, *Star and miktoarm star block (co)polymers via self-assembly of ATRP generated polymer segments featuring Hamilton wedge and cyanuric acid binding motifs*. Polymer Chemistry, 2011. 2(5): p. 1146-1155.
35. Yang, S. K., A. V. Ambade, and M. Weck, *Supramolecular ABC Triblock Copolymers via One-Pot, Orthogonal Self-Assembly*. Journal of the American Chemical Society, 2010. 132(5): p. 1637-1645.
36. Burd, C. and M. Weck, *Solvent influence on the orthogonality of noncovalently functionalized terpolymers*. Journal of Polymer Science Part a-Polymer Chemistry, 2008. 46(6): p. 1936-1944.
37. Kolomiets, E., et al., *Structure and properties of supramolecular polymers generated from heterocomplementary monomers linked through sextuple hydrogen-bonding arrays*. Macromolecules, 2006. 39(3): p. 1173-1181.
38. Berl, V., et al., *Supramolecular polymers generated from heterocomplementary monomers linked through multiple hydrogen-bonding arrays—Formation, characterization, and properties*. Chemistry-a European Journal, 2002. 8(5): p. 1227-1244.
39. Hietala, S., et al., *Rheological Properties of Associative Star Polymers in Aqueous Solutions: Effect of Hydrophobe Length and Polymer Topology*. Macromolecules, 2009. 42(5): p. 1726-1732.
40. Stavrouli, N., T. Aubry, and C. Tsitsilianis, *Rheological properties of ABA telechelic polyelectrolyte and ABA polyampholyte reversible hydrogels: A comparative study*. Polymer, 2008. 49(5): p. 1249-1256.
41. Suzuki, S., et al., *Nonlinear Rheology of Telechelic Associative Polymer Networks: Shear Thickening and Thinning Behavior of Hydrophobically Modified Ethoxylated Urethane (HEUR) in Aqueous Solution*. Macromolecules, 2012. 45(2): p. 888-898.
42. Chassenieux, C., T. Nicolai, and L. Benyahia, *Rheology of associative polymer solutions*. Current Opinion in Colloid & Interface Science, 2011. 16(1): p. 18-26.
43. Li, H. K., et al., *Metal-free click polymerization of propiolates and azides: facile synthesis of functional poly(aroxycarbonyltriazole)s*. Polymer Chemistry, 2012. 3(4): p. 1075-1083.
44. Izunobi, J. U. and C. L. Higginbotham, *Polymer Molecular Weight Analysis by H-1 NMR Spectroscopy*. Journal of Chemical Education, 2011. 88(8): p. 1098-1104.
45. Nielen, M. W. F., *Maldi time-of-flight mass spectrometry of synthetic polymers*. Mass Spectrometry Reviews, 1999. 18(5): p. 309-344.
46. Meyers, R. A., *Encyclopedia of analytical chemistry: applications, theory, and instrumentation*. 2000, Chichester; New York: Wiley.
47. Yalcin, T., D. C. Schriemer, and L. Li, *Matrix-assisted laser desorption ionization time-of-flight mass spectrometry for the analysis of polydienes*. Journal of the American Society for Mass Spectrometry, 1997. 8(12): p. 1220-1229.
48. Pitet, L. M. and M. A. Hillmyer, *Carboxy-Telechelic Polyolefins by ROMP Using Maleic Acid as a Chain Transfer Agent*. Macromolecules, 2011. 44(7): p. 2378-2381.
49. Morita, T., et al., *A ring-opening metathesis polymerization (ROMP) approach to carboxyl-and amino-terminated telechelic poly(butadiene)s*. Macromolecules, 2000. 33(17): p. 6621-6623.
50. McKinley, G. H. and T. Sridhar, *Filament-stretching rheometry of complex fluids*. Annual Review of Fluid Mechanics, 2002. 34(1): p. 375-415.
51. Paterson, R. W. and F. Abernathy, *Turbulent flow drag reduction and degradation with dilute polymer solutions*. Journal of Fluid Mechanics, 1970. 43(04): p. 689-710.
52. Larson, R. G., *The structure and rheology of complex fluids*. 1999: Oxford university press New York. 132-142.
53. Tant, M. R., *Ionomers: synthesis, structure, properties and applications*. 1997: Blackie Academic and Professional, London. Chap. 4.
54. Yang, S. K., A. V. Ambade, and M. Weck, *Main-chain supramolecular block copolymers*. Chemical Society Reviews, 2011. 40(1): p. 129-137.

55. Winnik, M. A. and A. Yekta, *Associative polymers in aqueous solution*. Current Opinion in Colloid & Interface Science, 1997. 2(4): p. 424-436.
56. Goldstein, R. E., *Model for phase equilibria in micellar solutions of nonionic surfactants*. The Journal of chemical physics, 1986. 84(6): p. 3367-3378.
57. Hill, T., *An Introduction to Statistical Thermodynamics*. NY: Dover, 1986: p. 402-404.
58. van Lint, J. H. and R. M. Wilson, *A course in combinatorics*. 2001: Cambridge university press. 522-525.
59. Hillmyer, M. A., S. T. Nguyen, and R. H. Grubbs, *Utility of a ruthenium metathesis catalyst for the preparation of end-functionalized polybutadiene*. Macromolecules, 1997. 30(4): p. 718-721.
60. Ji, S., T. R. Hoye, and C. W. Macosko, *Controlled synthesis of high molecular weight telechelic polybutadienes by ring-opening metathesis polymerization*. Macromolecules, 2004. 37(15): p. 5485-5489.
61. Nickel, A., et al., *A highly efficient olefin metathesis process for the synthesis of terminal alkenes from fatty acid esters*. Topics in Catalysis, 2012. 55(7-10): p. 518-523.
62. Ji, S. X., T. R. Hoye, and C. W. Macosko, *Controlled synthesis of high molecular weight telechelic polybutadienes by ring-opening metathesis polymerization*. Macromolecules, 2004. 37(15): p. 5485-5489.
63. Lerum, M. F. Z. and W. Chen, *Surface-Initiated Ring-Opening Metathesis Polymerization in the Vapor Phase: An Efficient Method for Grafting Cyclic Olefins with Low Strain Energies*. Langmuir, 2011. 27(9): p. 5403-5409.
64. Gilli, G. and P. Gilli, *The nature of the hydrogen bond: outline of a comprehensive hydrogen bond theory*. IUCr monographs on crystallography. 2009, Oxford; New York: Oxford University Press. 147-192.
65. David, R. L. A., et al., *Effects of Pairwise, Self-Associating Functional Side Groups on Polymer Solubility, Solution Viscosity, and Mist Control*. Macromolecules, 2009. 42(4): p. 1380-1391.
66. Pedley, A., et al., *Thermodynamics of the aggregation phenomenon in associating polymer solutions*. Macromolecules, 1990. 23(9): p. 2494-2500.
67. Lehn, J.-M., *Toward self-organization and complex matter*. science, 2002. 295(5564): p. 2400-2403.
68. Aida, T., E. Meijer, and S. Stupp, *Functional supramolecular polymers*. science, 2012. 335(6070): p. 813-817.
69. Boal, A. K., et al., *Self-assembly of nanoparticles into structured spherical and network aggregates*. Nature, 2000. 404(6779): p. 746-748.
70. Tayi, A. S., et al., *Room-temperature ferroelectricity in supramolecular networks of charge-transfer complexes*. Nature, 2012. 488(7412): p. 485-489.
71. Ikkala, O. and G. ten Brinke, *Functional materials based on self-assembly of polymeric supramolecules*. science, 2002. 295(5564): p. 2407-2409.
72. Li, S.-L., et al., *Advanced supramolecular polymers constructed by orthogonal self-assembly*. Chem Soc Rev, 2012. 41(18): p. 5950-5968.
73. Sijbesma, R. P., et al., *Reversible polymers formed from self-complementary monomers using quadruple hydrogen bonding*. science, 1997. 278(5343): p. 1601-1604.
74. Jacobson, H. and W. H. Stockmayer, *Intramolecular reaction in polycondensations. I. The theory of linear systems*. The Journal of chemical physics, 1950. 18(12): p. 1600-1606.
75. Chen, Z.-R., et al., *Modeling ring-chain equilibria in ring-opening polymerization of cycloolefins*. Macromolecules, 1995. 28(7): p. 2147-2154.
76. Freed, K. F., *Influence of small rings on the thermodynamics of equilibrium self-assembly*. The Journal of chemical physics, 2012. 136(24): p. 244904.
77. de Greef, T. F., et al., *Influence of selectivity on the supramolecular polymerization of AB-type polymers capable of both A-A and A-B interactions*. J Am Chem Soc, 2008. 130(41): p. 13755-13764.
78. Petschek, R., P. Pfeuty, and J. C. Wheeler, *Equilibrium polymerization of chains and rings: A bicritical phenomenon*. Physical Review A, 1986. 34(3): p. 2391-2421.
79. Fang, Y., et al., *Charge-assisted hydrogen bond-directed self-assembly of an amphiphilic zwitterionic quinonemonoimine at the liquid-solid interface*. Chemical Communications, 2011. 47(40): p. 11255-11257.
80. DeTar, D. F. and R. W. Novak, *Carboxylic acid-amine equilibria in nonaqueous solvents*. J Am Chem Soc, 1970. 92(5): p. 1361-1365.
81. John Knight, F., *Antimisting additives for aviation fuels*, 1983, U.S. Pat. No. 2,726,942 (December, 1955) Arkis et al. 44/56; U.S. Pat. No. 2,936,223 (May, 1960) Lovett et al. 44/56; U.S. Pat. No. 3,687,644 (August, 1972) Delafield et al. 44/56; U.S. Pat. No. 3,792,984 (February, 1974) Cole et al. 44/62; U.S. Pat. No. 3,803,034 (April, 1974) Gaydasch 44/62; U.S. Pat. No. 3,812,034 (May, 1974) Gaydasch 44/62; U.S. Pat. No. 3,846,090 (November, 1974) Osmond et al. 44/62; U.S. Pat. No. 3,846,091 (November, 1974) Osmond et al. 44/62; U.S. Pat. No. 4,292,045 (September, 1981) Brooks et al. 44/62; U.S. Pat. No. 4,334,891 (June, 1982) Brooks et al. 44/62: US.
82. Wright, B. R., *Hydrocarbon Fuels as A Terrorist Weapon: Safety, Flammability, Testing, and Protecting Ourselves*. The Forensic Examiner, 2004. 13(2): p. 14-19.
83. Brostow, W., *Drag Reduction and Mechanical Degradation in Polymer-Solutions in Flow*. Polymer, 1983. 24(5): p. 631-638.
84. Hunston, D. L. and J. L. Zakin, *Flow-Assisted Degradation in Dilute Polystyrene Solutions*. Polymer Engineering and Science, 1980. 20(7): p. 517-523.
85. Yu, J. F. S., J. L. Zakin, and G. K. Patterson, *Mechanical Degradation of High Molecular-Weight Polymers in Dilute-Solution*. Journal of Applied Polymer Science, 1979. 23(8): p. 2493-2512.
86. (U.S.), N.R.C., *Committee on Aviation Fuels with Improved Fire Safety. Aviation fuels with improved fire safety:a proceedings*, 1997, National Academy Press: Washington, D.C.
87. David, R. L. A., M. H. Wei, and J. A. Kornfield, *Effects of pairwise, donor-acceptor functional groups on polymer solubility, solution viscosity and mist control*. Polymer, 2009. 50(26): p. 6323-6330.
88. David, R. L. A., *Associative polymers as antimisting agents and other functional materials via thiol-ene coupling*, in *Chemistry and Chemical Engineering* 2008, California Institute of Technology: USA.
89. Henry F. Hamil, N.B.T.X., J.S.A.T.X. William D. Weatherford, and S.A.T.X. George E. Fodor, *Hydrocarbon compositions of high elongational viscosity and process for making the same*, 1988, U.S. Pat. No. 2,807,597 (September, 1957) Sonnenfeld et al. 60/29 . . . 7; U.S. Pat. No. 2,921,043 (January, 1960) Uraneck 60/45 . . . 5; U.S. Pat. No. 3,091,604 (May, 1963) Lukens 60/87 . . . 3; U.S. Pat. No. 3,395,134 (July, 1968) D'Aleilo 60/89 . . . 5; U.S. Pat. No. 3,467,604 (September, 1969) Michaels 60/2 . . . 5; U.S. Pat. No. 3,574,575 (April, 1971) Gee et al. 44/62; U.S. Pat. No. 3,579,613 (May, 1971) Schaper et al. 260/901; U.S. Pat. No. 3,658,492 (April, 1972) Messina 44/62; U.S. Pat. No. 3,812,034 (May, 1974) Gaydasch 44/62; U.S. Pat. No. 3,920,605 (November, 1975) Sato et al. 0 4/2.1.7; U.S. Pat. No. 4,205,143 (May, 1980) Goodman 525/213; U.S. Pat. No. 4,288,511 (September, 1981) Myers et al. 430/17; U.S. Pat. No. 4,334,891 (June, 1982) Brooks et al. 44/62: US.

90. Ilan Duvdevani, L. N. J., et al., *Antimisting system for hydrocarbon fluids*, 1985, U.S. Pat. No. 3,475,358 (October, 1969) Bixler 524/521; U.S. Pat. No. 3,546,142 (December, 1970) Michaels 524/521; U.S. Pat. No. 3,867,330 (February, 1975) Frisque 524/516; U.S. Pat. No. 4,118,439 (October, 1978) Marze 525/203: US.

91. Willauer, H. D., et al., *Flammability of aerosols generated by a rotary atomizer*. Combustion Science and Technology, 2007. 179(7): p. 1303-1326.

92. Yaffee, M. L., *Antimisting Research and Development for Commercial Aircraft—Final Summary Report*, in FAA report DOT/FAA/CT-86/71986, Federal Aviation Administration Technical Center: Atlantic City Airport, NJ.

93. Eagar, T. W. and C. Musso, *Why did the World Trade Center collapse? Science, engineering, and speculation*. Jom-Journal of the Minerals Metals & Materials Society, 2001. 53(12): p. 8-11.

94. *Aviation Fuels with Improved Fire Safety: A Proceedings*, in NRC Proceedings 1997: Washington D.C.

95. Wright, B., *Assessment of Concepts and Research for Commercial Aviation Fire-Safe Fuel*, 2000, NASA Lewis Research Center.

96. Joseph, D. D., G. S. Beavers, and T. Funada, *Rayleigh-Taylor instability of viscoelastic drops at high Weber numbers*. Journal of Fluid Mechanics, 2002. 453: p. 109-132.

97. Anna, S. L. and G. H. McKinley, *Elasto-capillary thinning and breakup of model elastic liquids*. Journal of Rheology, 2001. 45(1): p. 115-138.

98. Goldin, M., et al., *Breakup of a Laminar Capillary Jet of a Viscoelastic Fluid*. Journal of Fluid Mechanics, 1969. 38: p. 689-&.

99. Yu, J. H., S. V. Fridrikh, and G. C. Rutledge, *The role of elasticity in the formation of electrospun fibers*. Polymer, 2006. 47(13): p. 4789-4797.

100. Christanti, Y. and L. M. Walker, *Effect of fluid relaxation time of dilute polymer solutions on jet breakup due to a forced disturbance*. Journal of Rheology, 2002. 46(3): p. 733-748.

101. Kowalik, R. M., et al., *Enhanced Drag Reduction Via Interpolymer Associations*. Journal of Non-Newtonian Fluid Mechanics, 1987. 24(1): p. 1-10.

102. Schulz, D. N., et al., *Hydrocarbon-Soluble Associating Polymers as Antimisting and Drag-Reducing Agents*. Acs Symposium Series, 1991. 462: p. 176-189.

The invention claimed is:

1. A system for controlling a physical and/or chemical property in a non-polar composition, the system comprising at least two between at least one host composition having a dielectric constant equal to or less than 5, and at least one framing associative polymer comprising a linear, branched, or hyperbranched polymer backbone having at least two ends and a functional group presented at two or more ends of the at least two ends of the linear, branched, or hyperbranched polymer backbone;

wherein the linear, branched, or hyperbranched polymer backbone is substantially soluble in the at least one host composition, and wherein a number of the functional groups presented at the two or more ends is formed by associative functional groups each capable of undergoing an associative interaction with another associative functional group in the at least one host composition with an association constant (k) wherein $$k(M^{-1}) \geq \frac{\frac{4}{3}\pi(R_g^2)^{\frac{3}{2}} N_a}{n_F} \times 10^{-23}$$

in which $R_g$ is the radius of gyration of the framing associative polymer in the non-polar composition in nanometers, $N_a$ is Avogadro's constant; and $n_F$ is the average number of the associative functional groups in the framing associative polymer the at least one host composition and at least one framing associative polymer for combined use to provide a non-polar composition in which the at least at a concentration c selected between from about 0.05c* to about 10c*, $$c^* = \frac{3M_W}{4\pi(R_g^2)^{3/2} N_a},$$

in which $M_w$ is the weight averaged molecular weight, $R_g$ is the radius of gyration, and $N_a$ is Avogadro's constant depending on the weight averaged molecular weight and/or Radius of gyration of the at least one framing associative polymer and on the physical and/or chemical property to be controlled.

2. The system of claim 1, wherein the at least one framing associative polymer has a weight averaged molecular weight equal to or lower than about 2,000,000 g/mol.

3. The system of claim 1, wherein the at least one framing associative polymer has a weight averaged molecular weight 400,000<$M_w$ [g/mol]≤1,000,000.

4. The system of claim 1, wherein the association constant is 6≤$\log_{10}k$≤14.

5. The system of claim 1, wherein the association constant is 6.9 $\log_{10}$ k≤7.8.

6. The system of claim 1, wherein the associative functional group is a carboxylic acid and the another associative functional group is a carboxylic acid, or the associative functional group is a carboxylic acid and the another associative functional group is an amine, or the associative functional group is an alcohol and the another associative functional group is an amine, or the associative functional group is an alcohol and the another associative functional group is a carboxylic acid, or the associative functional group is a diacetamidopyridine and the another associative functional group is a thymine, or the associative functional group is a Hamilton Receptor and the another associative functional group is a cyanuric acid, the associative functional group is zinc sulfonate or palladated sulfur-carbon-sulfur (SCS) pincer and the another associative functional group is selected from pyridine or primary, secondary and tertiary amines.

7. The system of claim 1, wherein the another associative functional groups is presented at at least one end of a different associative polymer.

8. The system of claim 1, wherein the at least one framing associative polymer is formed by at least two structure units having formula [[FG-chain–[node]$_z$–(I) and optionally one or more structural units having formula –[–[ node–]– [ chain]–[ (II), wherein:

FG is an associative functional group (FGa);
chain is a non-polar polymer substantially soluble in a non-polar composition, the polymer having formula:

$$R_1\text{-}[A]_n R_2 \tag{III}$$

wherein:
A is a chemical and in particular an organic moiety forming the monomer of the polymer;
$R_1$ and $R_2$ are independently selected from any carbon based or organic group with one of $R_1$ and $R_2$ linked to an FG or a node and the other one of $R_1$ and $R_2$ linked to an FG or a node; and
n is an integer$\geq 1$;
z is 0 or 1;
node is a covalently linked moiety linking one of $R_1$ and $R_2$ of at least one first chain with one of the $R_1$ and $R_2$ of at least one second chain;
and wherein the FG, chain and node of different structural units of the polymer can be the same or different.

9. The system of claim 8, wherein the associative functional group FGa is selected from diacetamidopyridine group, thymine group, Hamilton Receptor group, cyanuric acid group, carboxylic acid group, primary secondary or tertiary amine group, primary secondary and tertiary alcohol group, zinc sulfonate, palladated sulfur-carbon-sulfur (SCS) pincer pyridine or primary, secondary and tertiary amines.

10. The system of claim 8, wherein A is a diene, olefin, styrene, acrylonitrile, methacrylate or acrylate, vinyl acetate, dichlorodimethylsilane, tetrafluoroethylene, acids, esters, amides, amines, glycidyl ethers, or isocyanates, siloxane.

11. The system of claim 8, wherein n is equal to or greater than 200.

12. The system of claim 1, wherein the at least one host composition comprises a hydrocarbon composition, a fluorocarbon composition or a silicone composition.

13. The system of claim 1, wherein the at least one host composition comprises a mineral oil, a biofuel, pentane, hexane, cyclohexane, benzene, toluene, chloroform and diethyl ether, liquefied petroleum gas, liquid methane, butane, gasoline, kerosene, jet fuel and diesel fuel.

14. The system of claim 1, wherein the at least one host composition comprises crude oil or a refined fuel.

15. The system of claim 1, wherein the at least one host composition comprises a refined fuel selected from Jet-A, Jet-A1, kerosene, JP-8, gasoline and/or diesel.

16. The system of claim 1, wherein when the at least one rheological property is selected from drag reduction, mist control, lubrication and/or viscoelastic properties.

17. The system of claim 8, wherein n is equal to or greater than 800.

* * * * *